(12) United States Patent
Persson

(10) Patent No.: US 12,380,779 B2
(45) Date of Patent: *Aug. 5, 2025

(54) GENERATING TACTILE OUTPUT SEQUENCES ASSOCIATED WITH AN OBJECT

(71) Applicant: Apple Inc., Cupertino, CA (US)

(72) Inventor: Per Haakan Linus Persson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,157

(22) Filed: Oct. 31, 2023

(65) Prior Publication Data

US 2024/0062634 A1 Feb. 22, 2024

Related U.S. Application Data

(63) Continuation of application No. 17/594,742, filed as application No. PCT/US2020/030149 on Apr. 27, 2020, now Pat. No. 11,823,558.

(Continued)

(51) Int. Cl.
*H04B 3/36* (2006.01)
*G06F 1/16* (2006.01)
*G08B 6/00* (2006.01)

(52) U.S. Cl.
CPC .............. *G08B 6/00 (2013.01); G06F 1/163 (2013.01); G06F 1/1694 (2013.01)

(58) Field of Classification Search
CPC ......... G08B 6/00; G06F 1/163; G06F 1/1694; G06F 1/1684; G06F 1/1698; G06F 3/016;

(Continued)

(56) References Cited

U.S. PATENT DOCUMENTS 5,672,820 A 9/1997 Rossi et al.
5,956,038 A 9/1999 Rekimoto
(Continued)

FOREIGN PATENT DOCUMENTS

CN 103269510 A 8/2013
CN 109146954 A 1/2019
(Continued)

OTHER PUBLICATIONS

Extended European Search Report received for European Patent Application No. 20790659.5, mailed on Nov. 29, 2022, 11 pages.
(Continued)

*Primary Examiner* — Toan N Pham
(74) *Attorney, Agent, or Firm* — Kubota & Basol LLP

(57) ABSTRACT

In some embodiments, an electronic device generates a tactile output sequence in response to detecting that the electronic device is oriented within a range of orientations that changes as the distance between the electronic device and a respective object changes. In some embodiments, an electronic device changes one or more characteristics of a tactile output in response to detecting a change in the orientation of the electronic device relative to a respective object. In some embodiments, an electronic device generates tactile outputs with characteristics indicative of the orientation of a camera of the electronic device relative to one or more AR (augmented reality) planes. In some embodiments, an electronic device generates tactile outputs indicative of a data sharing process with a second electronic device.

66 Claims, 127 Drawing Sheets

Related U.S. Application Data

(60) Provisional application No. 62/839,735, filed on Apr. 28, 2019.

(58) Field of Classification Search
  CPC ............... G06F 3/04847; G06F 3/0486; G06F 3/04883; G06F 3/0488; G06F 2203/04808; G06F 3/0416; G01C 21/3652; G07C 9/00174; H04L 65/1069; H04L 65/4015; H04L 65/403
  See application file for complete search history.

(56) References Cited

U.S. PATENT DOCUMENTS

| | | |
|---|---|---|
| 6,144,318 A | 11/2000 | Hayashi et al. |
| 6,144,956 A | 11/2000 | Yajima et al. |
| 6,323,846 B1 | 11/2001 | Westerman et al. |
| 6,421,608 B1 | 7/2002 | Motoyama et al. |
| 6,570,557 B1 | 5/2003 | Westerman et al. |
| 6,636,249 B1 | 10/2003 | Rekimoto |
| 6,677,932 B1 | 1/2004 | Westerman |
| 7,274,292 B2 | 9/2007 | Velhal et al. |
| 7,372,276 B2 | 5/2008 | Mulcahey |
| 7,523,871 B1 | 4/2009 | Wilson et al. |
| 7,575,065 B1 | 8/2009 | Podhrasky |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,788,032 B2 | 8/2010 | Moloney |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,094,011 B2 | 1/2012 | Faris et al. |
| 8,239,784 B2 | 8/2012 | Hotelling et al. |
| 8,279,180 B2 | 10/2012 | Hotelling et al. |
| 8,380,430 B2 | 2/2013 | Malone et al. |
| 8,381,135 B2 | 2/2013 | Hotelling et al. |
| 8,433,722 B2 | 4/2013 | Shin et al. |
| 8,462,591 B1 | 6/2013 | Marhaben |
| 8,479,122 B2 | 7/2013 | Hotelling et al. |
| 8,526,677 B1 | 9/2013 | Crichton et al. |
| 8,576,669 B2 | 11/2013 | Onda |
| 8,847,754 B2 | 9/2014 | Buchheim et al. |
| 8,878,671 B2 | 11/2014 | Buchheim et al. |
| 9,002,372 B2 | 4/2015 | Shakespeare et al. |
| 9,348,458 B2 | 5/2016 | Hotelling et al. |
| 9,357,348 B2 | 5/2016 | Evans et al. |
| 9,443,414 B2 | 9/2016 | Scavezze et al. |
| 9,514,630 B1 | 12/2016 | Steven |
| 9,547,939 B2 | 1/2017 | Hittel et al. |
| 9,549,282 B1 | 1/2017 | Mcdonough et al. |
| 9,609,515 B2 | 3/2017 | Tredoux et al. |
| 9,654,598 B1 | 5/2017 | Crawford et al. |
| 9,706,357 B1 | 7/2017 | Heo et al. |
| 9,836,187 B2 | 12/2017 | Lee et al. |
| 9,892,535 B1 | 2/2018 | Guy |
| 9,900,733 B2 | 2/2018 | Beattie, Jr. |
| 9,911,310 B2 | 3/2018 | Neumeyer et al. |
| 9,933,937 B2 | 4/2018 | Lemay et al. |
| 9,997,043 B2 | 6/2018 | Kazerouni |
| 10,102,749 B1 | 10/2018 | Wagner |
| 10,147,303 B1 | 12/2018 | Carter |
| 10,154,379 B2 | 12/2018 | Mei et al. |
| 10,212,541 B1 | 2/2019 | Brody et al. |
| 10,292,006 B2 | 5/2019 | Yu et al. |
| 10,318,811 B1 | 6/2019 | Gold et al. |
| 10,373,463 B1 | 8/2019 | Herring |
| 10,386,960 B1 | 8/2019 | Smith |
| 10,424,189 B2 | 9/2019 | Daoura et al. |
| 10,438,409 B2 | 10/2019 | Todeschini et al. |
| 10,448,211 B1 | 10/2019 | Shen et al. |
| 10,462,611 B1 | 10/2019 | Klinkner et al. |
| 10,568,035 B1 | 2/2020 | Tong |
| 10,757,057 B2 | 8/2020 | Friend et al. |
| 10,757,540 B1 | 8/2020 | Klinkner et al. |
| 10,757,676 B1 | 8/2020 | De La Broise et al. |
| 10,777,053 B2 | 9/2020 | Jenkins et al. |
| 10,852,918 B1 | 12/2020 | Voss |
| 11,047,702 B1 | 6/2021 | Meyer et al. |
| 11,138,251 B2 | 10/2021 | Estruch Tena et al. |
| 11,145,183 B2 | 10/2021 | Daoura et al. |
| 11,216,624 B2 | 1/2022 | Zarshchikov et al. |
| 11,221,752 B2 | 1/2022 | Howard et al. |
| 11,222,203 B2 | 1/2022 | Dante et al. |
| 11,792,605 B2 | 10/2023 | Daoura et al. |
| 11,823,558 B2 * | 11/2023 | Persson ................ G06F 3/0488 |
| 2002/0015024 A1 | 2/2002 | Westerman et al. |
| 2002/0183077 A1 | 12/2002 | Fomukong |
| 2004/0021567 A1 | 2/2004 | Dunn |
| 2004/0212630 A1 | 10/2004 | Hobgood et al. |
| 2004/0217859 A1 | 11/2004 | Pucci et al. |
| 2005/0190059 A1 | 9/2005 | Wehrenberg |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2006/0255935 A1 | 11/2006 | Scalisi et al. |
| 2006/0277469 A1 | 12/2006 | Chaudhri et al. |
| 2007/0021108 A1 | 1/2007 | Bocking et al. |
| 2007/0037582 A1 | 2/2007 | Mohi et al. |
| 2007/0037587 A1 | 2/2007 | Mohi et al. |
| 2007/0037588 A1 | 2/2007 | Mohi et al. |
| 2007/0042790 A1 | 2/2007 | Mohi et al. |
| 2007/0101291 A1 | 5/2007 | Forstall et al. |
| 2007/0106457 A1 | 5/2007 | Rosenberg |
| 2007/0157089 A1 | 7/2007 | Van et al. |
| 2007/0197229 A1 | 8/2007 | Kalliola et al. |
| 2007/0229350 A1 | 10/2007 | Scalisi et al. |
| 2007/0252696 A1 | 11/2007 | Belisle et al. |
| 2007/0291104 A1 | 12/2007 | Petersen et al. |
| 2008/0102786 A1 | 5/2008 | Griffin |
| 2008/0125040 A1 | 5/2008 | Kalayjian |
| 2008/0129491 A1 | 6/2008 | Ruperto |
| 2008/0143516 A1 | 6/2008 | Mock et al. |
| 2008/0170118 A1 | 7/2008 | Albertson et al. |
| 2008/0242278 A1 | 10/2008 | Rekimoto |
| 2008/0254808 A1 | 10/2008 | Rekimoto |
| 2009/0076723 A1 | 3/2009 | Moloney |
| 2009/0260022 A1 | 10/2009 | Louch et al. |
| 2009/0300511 A1 | 12/2009 | Behar et al. |
| 2010/0002938 A1 | 1/2010 | Mulcahey |
| 2010/0107179 A1 | 4/2010 | Quintanilla et al. |
| 2010/0151840 A1 | 6/2010 | Bauchot et al. |
| 2010/0198867 A1 | 8/2010 | Rekimoto |
| 2010/0255882 A1 | 10/2010 | Kozitsyn et al. |
| 2010/0325194 A1 | 12/2010 | Williamson et al. |
| 2011/0052083 A1 | 3/2011 | Rekimoto |
| 2011/0081920 A1 | 4/2011 | Hung et al. |
| 2011/0148625 A1 | 6/2011 | Velusamy |
| 2011/0181289 A1 | 7/2011 | Rushing |
| 2011/0187527 A1 | 8/2011 | Goodwill et al. |
| 2011/0210847 A1 | 9/2011 | Howard et al. |
| 2011/0222729 A1 | 9/2011 | Gabara |
| 2011/0234399 A1 | 9/2011 | Yan |
| 2011/0285506 A1 | 11/2011 | Hillis |
| 2011/0286310 A1 | 11/2011 | Onda |
| 2012/0008526 A1 | 1/2012 | Borghei |
| 2012/0052870 A1 | 3/2012 | Habicher |
| 2012/0075099 A1 | 3/2012 | Brown |
| 2012/0092373 A1 | 4/2012 | Ryu et al. |
| 2012/0166077 A1 | 6/2012 | Herzog et al. |
| 2012/0171998 A1 | 7/2012 | Kang |
| 2012/0229400 A1 | 9/2012 | Birnbaum et al. |
| 2013/0030931 A1 | 1/2013 | Moshfeghi |
| 2013/0107057 A1 | 5/2013 | Zhou et al. |
| 2013/0113715 A1 | 5/2013 | Grant et al. |
| 2013/0172016 A1 | 7/2013 | Ooka |
| 2013/0288719 A1 | 10/2013 | Alonzo |
| 2013/0328665 A1 | 12/2013 | Cranfill et al. |
| 2013/0332721 A1 | 12/2013 | Chaudhri et al. |
| 2014/0044305 A1 | 2/2014 | Scavezze et al. |
| 2014/0047413 A1 | 2/2014 | Sheive et al. |
| 2014/0089810 A1 | 3/2014 | Chen et al. |

(56) References Cited

U.S. PATENT DOCUMENTS

| | | |
|---|---|---|
| 2014/0101189 A1 | 4/2014 | Schenkel |
| 2014/0135042 A1 | 5/2014 | Buchheim et al. |
| 2014/0136633 A1 | 5/2014 | Murillo et al. |
| 2014/0173439 A1 | 6/2014 | Gutierrez et al. |
| 2014/0213301 A1 | 7/2014 | Evans et al. |
| 2014/0242972 A1 | 8/2014 | Slotznick |
| 2014/0266698 A1 | 9/2014 | Hall et al. |
| 2014/0267411 A1 | 9/2014 | Fein et al. |
| 2014/0300452 A1 | 10/2014 | Rofe et al. |
| 2014/0327518 A1 | 11/2014 | Loutit |
| 2014/0329460 A1 | 11/2014 | Loutit |
| 2014/0364099 A1 | 12/2014 | Pai et al. |
| 2014/0365923 A1 | 12/2014 | Lee et al. |
| 2014/0365945 A1 | 12/2014 | Karunamuni et al. |
| 2015/0012307 A1 | 1/2015 | Moss |
| 2015/0058744 A1 | 2/2015 | Dhingra et al. |
| 2015/0154851 A1 | 6/2015 | Vincent et al. |
| 2015/0170496 A1 | 6/2015 | King et al. |
| 2015/0172393 A1 | 6/2015 | Oplinger et al. |
| 2015/0356393 A1 | 12/2015 | Daoura et al. |
| 2016/0026869 A1 | 1/2016 | Rekimoto |
| 2016/0027307 A1 | 1/2016 | Abhyanker et al. |
| 2016/0055676 A1 | 2/2016 | Kasahara et al. |
| 2016/0092705 A1 | 3/2016 | Wadman et al. |
| 2016/0171777 A1 | 6/2016 | Todeschini et al. |
| 2016/0203641 A1 | 7/2016 | Bostick et al. |
| 2016/0350639 A1 | 12/2016 | Tere |
| 2017/0006577 A1 | 1/2017 | Koum et al. |
| 2017/0048686 A1 | 2/2017 | Chang et al. |
| 2017/0053560 A1 | 2/2017 | Aldossary et al. |
| 2017/0064504 A1 | 3/2017 | Jose |
| 2017/0064511 A1 | 3/2017 | Mccormick |
| 2017/0092085 A1 | 3/2017 | Agarwal |
| 2017/0092090 A1 | 3/2017 | Lerner |
| 2017/0168159 A1 | 6/2017 | Gatland |
| 2017/0180543 A1 | 6/2017 | Brice et al. |
| 2017/0353833 A1 | 12/2017 | De Barros Chapiewski et al. |
| 2017/0357320 A1* | 12/2017 | Chaudhri .............. G06F 3/0488 |
| 2017/0365100 A1 | 12/2017 | Walton |
| 2018/0077097 A1 | 3/2018 | Alfaro et al. |
| 2018/0084517 A1 | 3/2018 | Do et al. |
| 2018/0091951 A1 | 3/2018 | Sandel et al. |
| 2018/0147472 A1 | 5/2018 | Deangelis et al. |
| 2018/0158197 A1 | 6/2018 | Dasgupta et al. |
| 2018/0165924 A9 | 6/2018 | Olsson et al. |
| 2018/0184286 A1 | 6/2018 | Patterson |
| 2018/0189567 A1 | 7/2018 | Maheriya et al. |
| 2018/0198973 A1 | 7/2018 | Eronen et al. |
| 2018/0227393 A1 | 8/2018 | Daub |
| 2018/0240176 A1 | 8/2018 | Cronin et al. |
| 2018/0241488 A1 | 8/2018 | Daoura et al. |
| 2018/0276427 A1 | 9/2018 | Depew et al. |
| 2018/0278888 A1 | 9/2018 | Kasahara et al. |
| 2018/0343561 A1 | 11/2018 | Patterson |
| 2018/0349516 A1 | 12/2018 | Dutta et al. |
| 2018/0357876 A1 | 12/2018 | Smoak |
| 2019/0050901 A1 | 2/2019 | Vincent et al. |
| 2019/0073113 A1 | 3/2019 | Yang |
| 2019/0086666 A1 | 3/2019 | Wu |
| 2019/0102372 A1 | 4/2019 | Hailpern et al. |
| 2019/0103012 A1 | 4/2019 | Daoura et al. |
| 2019/0114887 A1 | 4/2019 | Brantley |
| 2019/0114921 A1 | 4/2019 | Cazzoli |
| 2019/0163748 A1 | 5/2019 | Cuthbert et al. |
| 2019/0174265 A1 | 6/2019 | Chen |
| 2019/0182626 A1 | 6/2019 | Miller et al. |
| 2019/0285413 A1 | 9/2019 | Hallett |
| 2019/0362556 A1 | 11/2019 | Ben-dor et al. |
| 2019/0370544 A1 | 12/2019 | Wright et al. |
| 2020/0015040 A1 | 1/2020 | Baird et al. |
| 2020/0107164 A1 | 4/2020 | Lopatin et al. |
| 2020/0107165 A1 | 4/2020 | Pai et al. |
| 2020/0110934 A1 | 4/2020 | Paul |
| 2020/0117339 A1 | 4/2020 | Amitay et al. |
| 2020/0139929 A1 | 5/2020 | Turley |
| 2020/0220914 A1 | 7/2020 | Carrigan et al. |
| 2020/0242848 A1 | 7/2020 | Ambler et al. |
| 2020/0257865 A1 | 8/2020 | Zarshchikov et al. |
| 2020/0259908 A1 | 8/2020 | Klinkner et al. |
| 2020/0260142 A1 | 8/2020 | Kasahara et al. |
| 2020/0273235 A1 | 8/2020 | Emami et al. |
| 2020/0382908 A1 | 12/2020 | Behzadi et al. |
| 2020/0382912 A1 | 12/2020 | Dancie et al. |
| 2020/0409537 A1 | 12/2020 | Story et al. |
| 2021/0190503 A1 | 6/2021 | Landers |
| 2021/0264154 A1 | 8/2021 | Lamont |
| 2021/0314735 A1 | 10/2021 | Klinkner et al. |
| 2022/0023136 A1 | 1/2022 | Xia et al. |
| 2022/0035510 A1 | 2/2022 | Behzadi et al. |
| 2022/0050563 A1 | 2/2022 | Behzadi et al. |
| 2022/0075503 A1 | 3/2022 | Behzadi et al. |
| 2022/0100286 A1 | 3/2022 | De Jong et al. |
| 2022/0103974 A1 | 3/2022 | De Jong et al. |
| 2022/0107187 A1 | 4/2022 | Okabe et al. |
| 2022/0223013 A1* | 7/2022 | Persson .............. G06F 3/04847 |
| 2022/0335807 A1 | 10/2022 | Jong et al. |
| 2022/0365633 A1 | 11/2022 | Rochette et al. |
| 2023/0164103 A1 | 5/2023 | Ham et al. |
| 2023/0262420 A1 | 8/2023 | Behzadi et al. |
| 2023/0342009 A1 | 10/2023 | De Jong et al. |
| 2023/0375359 A1 | 11/2023 | Fleizach et al. |
| 2024/0012531 A1 | 1/2024 | Behzadi et al. |
| 2024/0272773 A1 | 8/2024 | De Jong et al. |
| 2024/0334161 A1 | 10/2024 | De Jong et al. |
| 2024/0406672 A1 | 12/2024 | Sart |
| 2024/0406677 A1 | 12/2024 | Allen |
| 2025/0088584 A1 | 3/2025 | De Jong et al. |

FOREIGN PATENT DOCUMENTS

| | | |
|---|---|---|
| EP | 2439920 A1 | 4/2012 |
| EP | 2482164 A1 | 8/2012 |
| IT | UA20163647 A1 | 11/2017 |
| JP | 2006-284458 A | 10/2006 |
| JP | 2007-88943 A | 4/2007 |
| JP | 2017-15593 A | 1/2017 |
| JP | 2018-101831 A | 6/2018 |
| JP | 2020-531938 A | 11/2020 |
| WO | 2001/037004 A1 | 5/2001 |
| WO | 2012/047920 A1 | 4/2012 |
| WO | 2013/169849 A2 | 11/2013 |
| WO | 2014/105276 A1 | 7/2014 |
| WO | 2018/034053 A1 | 2/2018 |
| WO | 2020/214864 A1 | 10/2020 |

OTHER PUBLICATIONS

Extended European Search Report received for European Patent Application No. 20798438.6, mailed on Jan. 3, 2023, 11 pages.
Final Office Action received for U.S. Appl. No. 17/452,971, mailed on Jun. 1, 2022, 22 pages.
Final Office Action received for U.S. Appl. No. 17/455,821, mailed on Jul. 29, 2022, 20 pages.
Final Office Action received for U.S. Appl. No. 17/455,843, mailed on Oct. 3, 2022, 27 pages.
Final Office Action received for U.S. Appl. No. 17/503,246, mailed on May 20, 2022, 17 pages.
Google Maps' Location Sharing Feature Can Show Your Friends' Battery Status, Available online at: <https://www.firstpost.com/tech/news-analysis/google-maps-location-sharing-feature-can-show-your-friends-battery-status-4885521.html>, [Retrieved Jan. 27, 2023], Aug. 3, 2018, 2 pages.
International Search Report received for PCT Patent Application No. PCT/US2020/028595, mailed on Aug. 14, 2020, 5 pages.
International Search Report received for PCT Patent Application No. PCT/US2020/030149, mailed on Sep. 4, 2020, 6 pages.
International Search Report received for PCT Patent Application No. PCT/US2021/071555, mailed on Feb. 14, 2022, 6 pages.
International Search Report received for PCT Patent Application No. PCT/US2022/071806, mailed on Oct. 21, 2022, 6 pages.

(56) References Cited

OTHER PUBLICATIONS

International Search Report received for PCT Patent Application No. PCT/US2022/072389, mailed on Nov. 30, 2022, 7 pages.
Non-Final Office Action received for U.S. Appl. No. 17/448,491, mailed on Jul. 27, 2022, 16 pages.
Non-Final Office Action received for U.S. Appl. No. 17/452,971, mailed on Feb. 15, 2023, 17 pages.
Non-Final Office Action received for U.S. Appl. No. 17/452,971, mailed on Jan. 21, 2022, 12 pages.
Non-Final Office Action received for U.S. Appl. No. 17/455,821, mailed on Apr. 7, 2022, 18 pages.
Non-Final Office Action received for U.S. Appl. No. 17/455,821, mailed on Dec. 8, 2022, 24 pages.
Non-Final Office Action received for U.S. Appl. No. 17/455,843, mailed on Feb. 15, 2023, 28 pages.
Non-Final Office Action received for U.S. Appl. No. 17/455,843, mailed on May 26, 2022, 20 pages.
Non-Final Office Action received for U.S. Appl. No. 17/503,246, mailed on Feb. 3, 2022, 15 pages.
Notice of Allowance received for U.S. Appl. No. 17/448,491, mailed on Jan. 18, 2023, 8 pages.
Notice of Allowance received for U.S. Appl. No. 17/448,491, mailed on May 4, 2023, 7 pages.
Notice of Allowance received for U.S. Appl. No. 17/503,246, mailed on Dec. 7, 2022, 10 pages.
Notice of Allowance received for U.S. Appl. No. 17/503,246, mailed on Jan. 25, 2023, 9 pages.
Notice of Allowance received for U.S. Appl. No. 17/503,246, mailed on May 18, 2023, 9 pages.
Notice of Allowance received for U.S. Appl. No. 17/594,742, mailed on Jul. 24, 2023, 8 pages.
Notice of Allowance received for U.S. Appl. No. 17/594,742, mailed on Mar. 29, 2023, 9 pages.
Hill, Spencer, "Does Airplane Mode Stop GPS Tracking?", Retrieved from the Internet: <https://web.archive.org/web/20200921071851/https://www.imyfone.com/change-location/does-airplane-mode-stop-tracking/>, [retrieved on Aug. 18, 2022], Part 1. Does Airplane Mode Stop GPS Tracking?, Sep. 21, 2020, pp. 1-2.
Mokatren et al., "Exploring the Potential of a Mobile Eye Tracker as an Intuitive Indoor Pointing Device: A Case Study in Cultural Heritage", In: Future Generation Computer Systems, Available online at: <https://is-web.hevra.haifa.ac.il/images/lecturers_files/ishimshoni_files/MokatrenFGCS.pdf>, [retrieved on Jul. 26, 2020], Jul. 1, 2017, 14 pages.
Roberts et al., "The Use of Augmented Reality, GPS and INS for Subsurface Data Visualisation", Fig XXII International Congress, Washington, D.C. USA, Apr. 19-26, 2002, 12 pages.
Corrected Notice of Allowability received for U.S. Appl. No. 17/452,971, mailed on Mar. 11, 2024, 3 pages.
Corrected Notice of Allowability received for U.S. Appl. No. 17/455,843, mailed on Mar. 14 2024, 3 pages.
Final Office Action received for U.S. Appl. No. 17/663,816, mailed on Mar. 27, 2024, 38 pages.
Final Office Action received for U.S. Appl. No. 18/474,133, mailed on Aug. 26, 2024, 13 pages.
HowTechs, Motorola Moto G—How to reorganize app and widget, https://www.youtube.com/watch?v=0szKlr7xnqs, Dec. 22, 2013, 15 pages.
International Search Report received for PCT Application No. PCT/US2023/019402, mailed on Sep. 19, 2023, 6 pages.
International Search Report received for PCT Patent Application No. PCT/US2023/022602, mailed on Sep. 4, 2023, 4 pages.
International Search Report received for PCT Patent Application No. PCT/US2024/015620, mailed on Jul. 17, 2024, 7 pages.
Non-Final Office Action received for U.S. Appl. No. 17/659,830, mailed on Mar. 14, 2024, 14 pages.
Non-Final Office Action received for U.S. Appl. No. 17/663,816, mailed on Oct. 19, 2023, 35 pages.
Non-Final Office Action received for U.S. Appl. No. 18/304,911, mailed on Sep. 12, 2024, 41 pages.
Non-Final Office Action received for U.S. Appl. No. 18/474,133, mailed on Jul. 3, 2024, 13 pages.
Notice of Allowance received for U.S. Appl. No. 17/452,971, mailed on Aug. 17, 2023, 11 pages.
Notice of Allowance received for U.S. Appl. No. 17/452,971, mailed on Dec. 12, 2023, 7 pages.
Notice of Allowance received for U.S. Appl. No. 17/455,821, mailed on Dec. 12, 2023, 9 pages.
Notice of Allowance received for U.S. Appl. No. 17/455,821, mailed on Sep. 20, 2023, 8 pages.
Notice of Allowance received for U.S. Appl. No. 17/455,843, mailed on Jul. 19, 2023, 9 pages.
Notice of Allowance received for U.S. Appl. No. 17/455,843, mailed on Nov. 1, 2023, 7 pages.
Notice of Allowance received for U.S. Appl. No. 18/309,492, mailed on Mar. 8, 2024, 10 pages.
Notice of Allowance received for U.S. Appl. No. 18/309,492, mailed on Nov. 24, 2023, 10 pages.
Search Report received for Chinese Patent Application No. 202210059059.2, mailed on Dec. 22, 2023, 5 pages (2 pages of English Translation and 3 pages of Official Copy).
Stolyar, Brenda, "Google Maps' Location Sharing Now Lets You Track Battery Status", https://www.digitaltrends.com/mobile/google-maps-lets-you-share-your-location-and-battery-level/, Aug. 3, 2018, pp. 1-4.
Wikipedia, "Virtual Network Computing", Wikipedia, Available online at <https://en.wikipedia.org/w/index.php?t%20itle=Virtual%20Network%20Computing&oldid=1120211990>, Nov. 5, 2024, 5 pages.
Non-Final Office Action received for U.S. Appl. No. 17/663,816, mailed on Sep. 28, 2024, 39 Pages.
Non-Final Office Action received for U.S. Appl. No. 18/474,133, mailed on Mar. 24, 2025, 12 Pages.
Final Office Action received for U.S. Appl. No. 17/663,816, mailed on Mar. 21, 2025, 36 Pages.
European Search Report received for European Patent Application No. 21799155.3, mailed on Sep. 27, 2024, 4 pages.
Final Office Action received for U.S. Appl. No. 17/659,830, mailed on Nov. 19, 2024, 16 pages.
International Search Report received for PCT Patent Application No. PCT/US2024/031500, mailed on Nov. 21, 2024, 6 pages.
International Search Report received for PCT Patent Application No. PCT/US2024/031781, mailed on Aug. 13, 2024, 5 pages.

\* cited by examiner

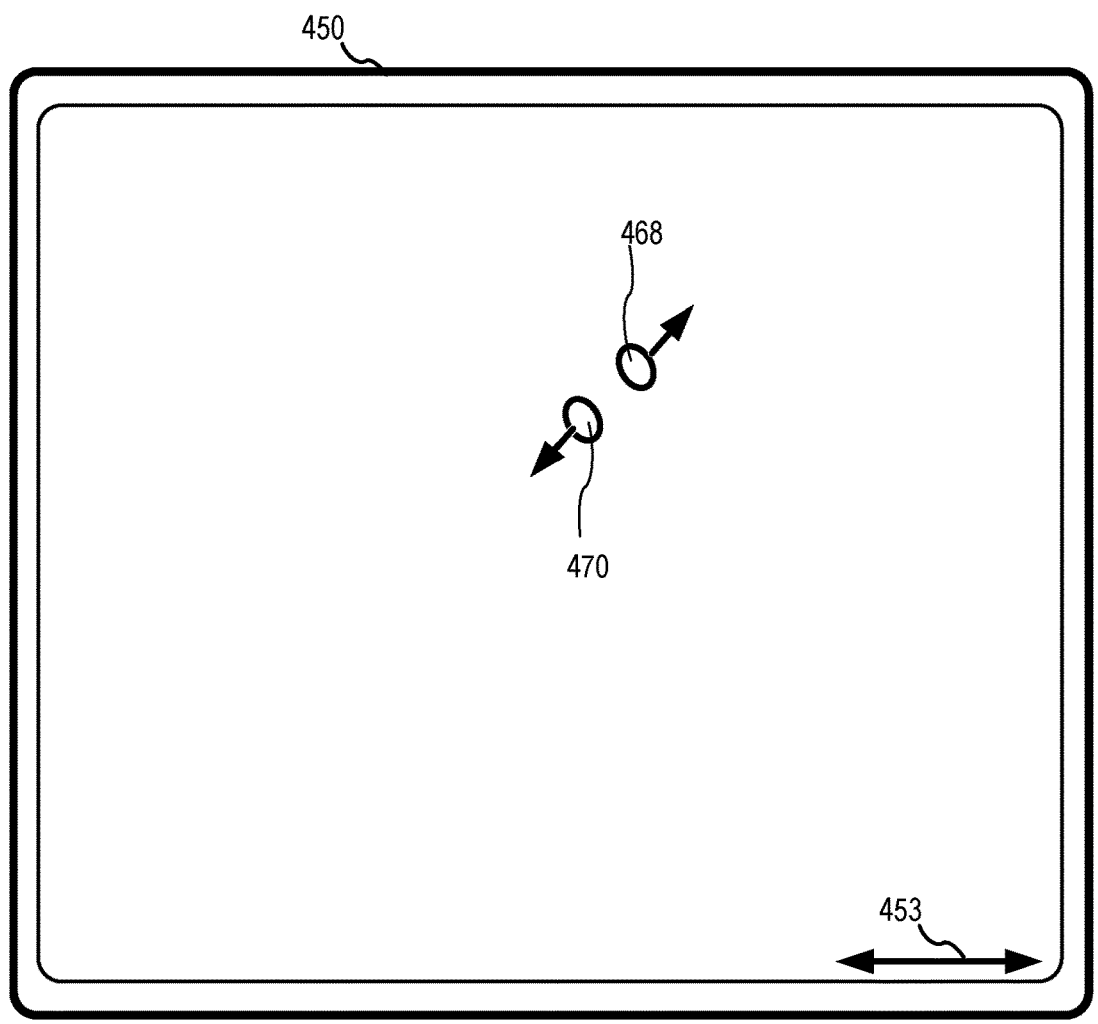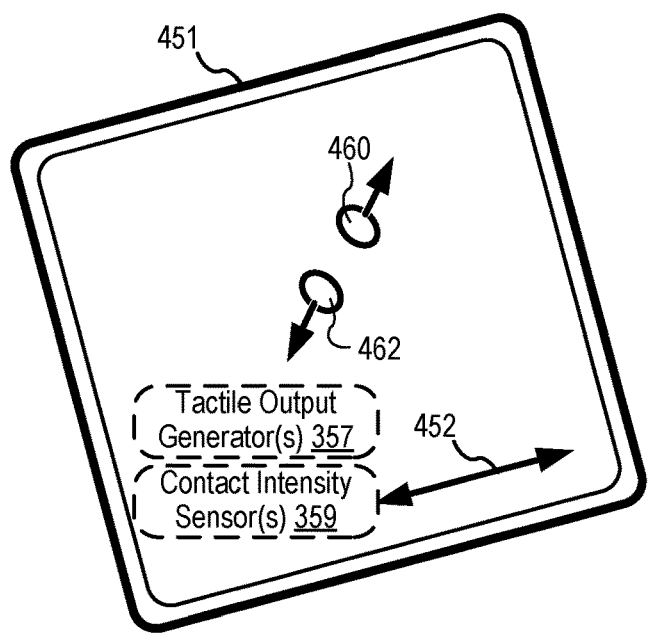
FIG. 4B

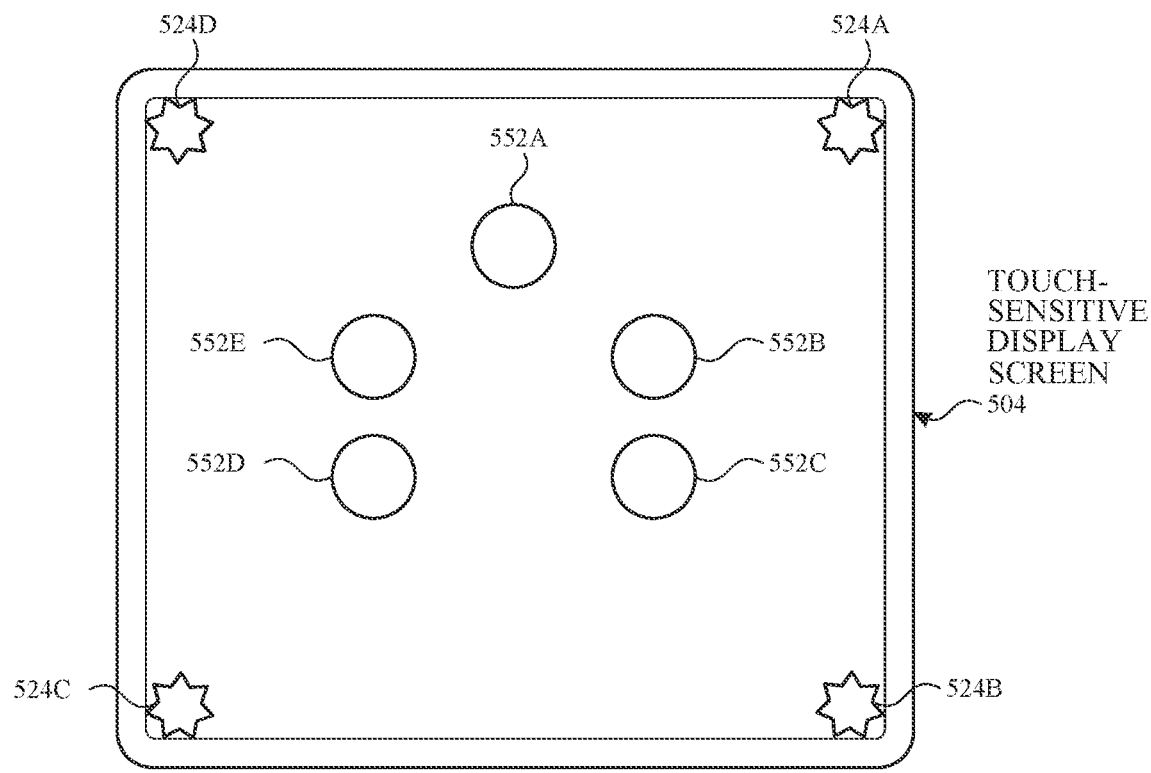
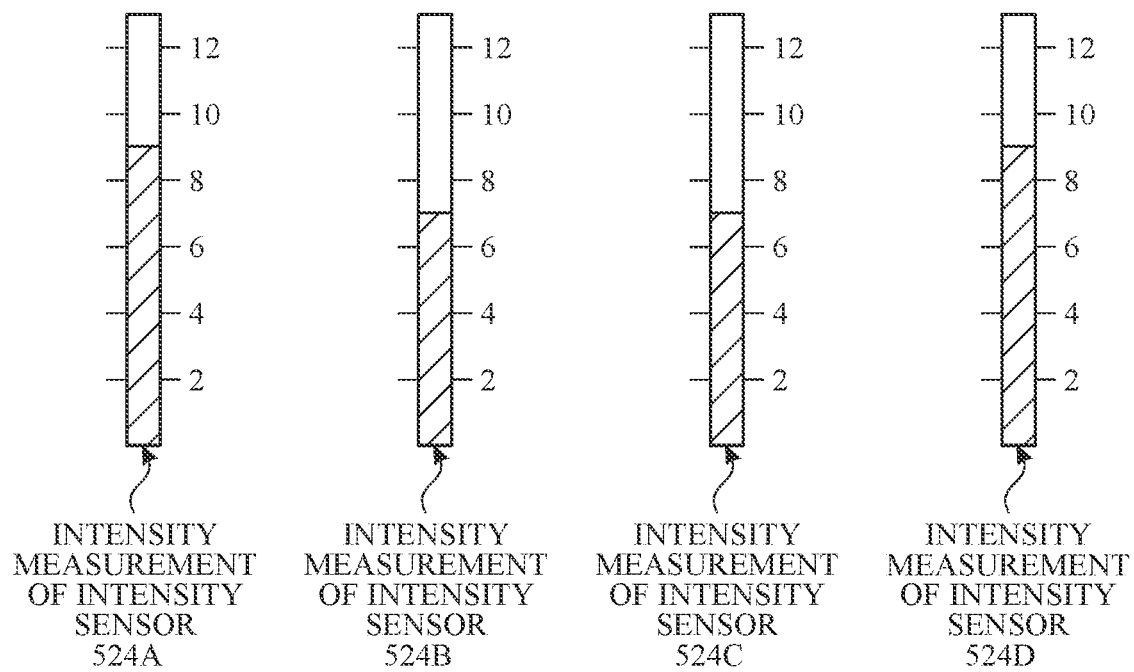
FIG. 5C

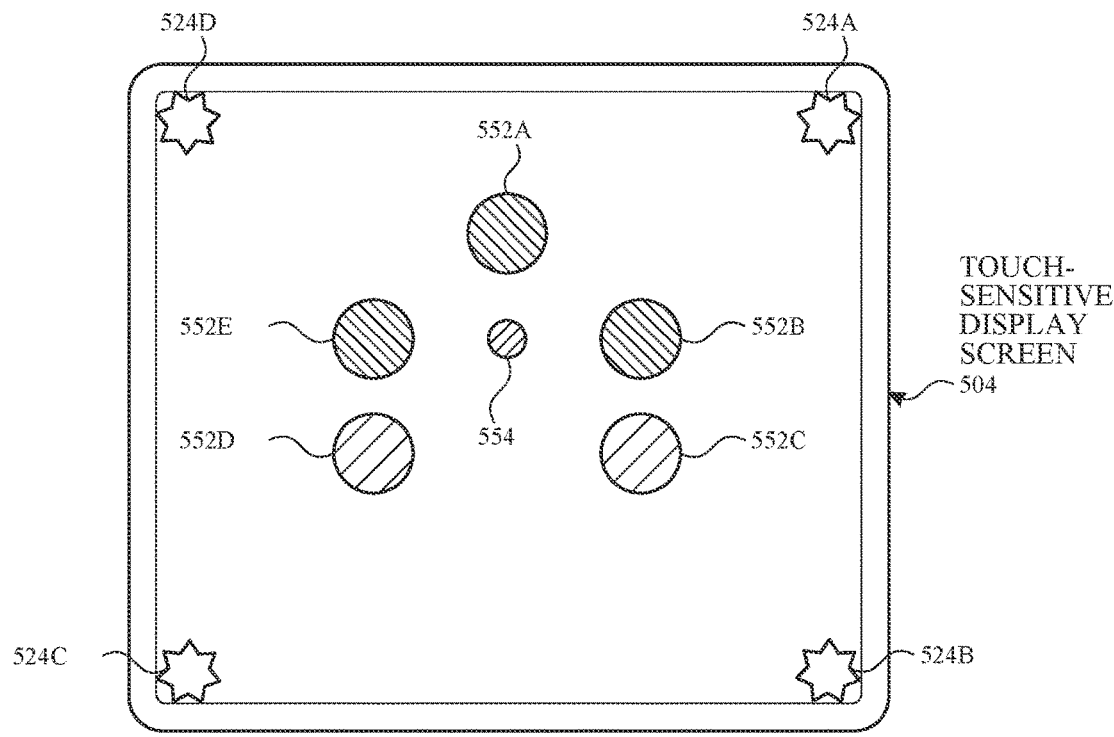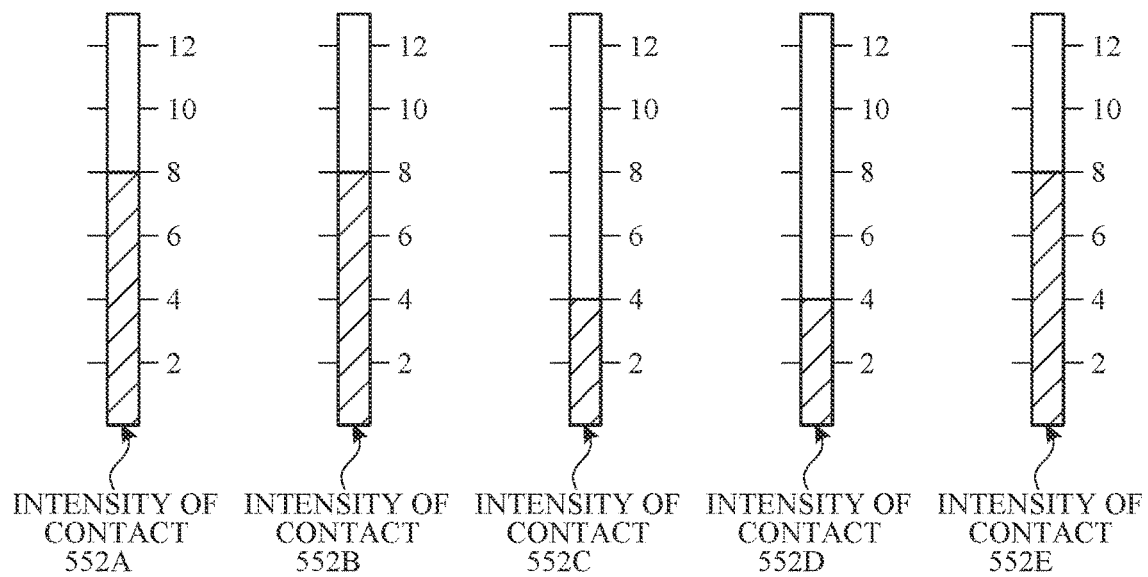
FIG. 5D

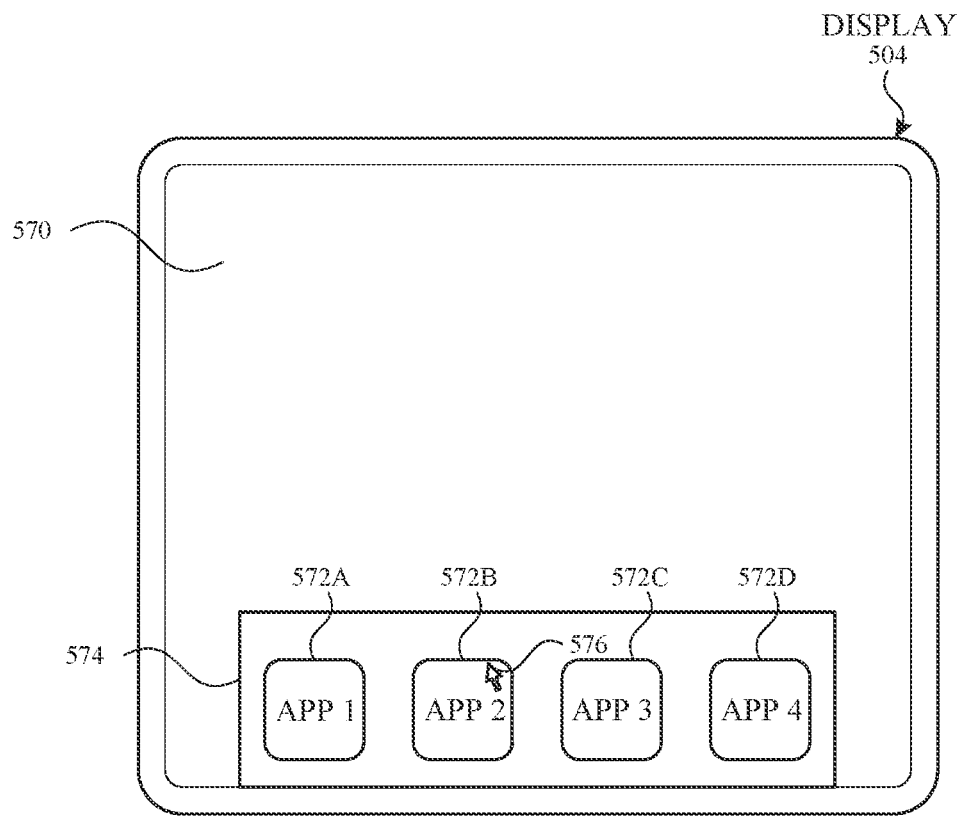
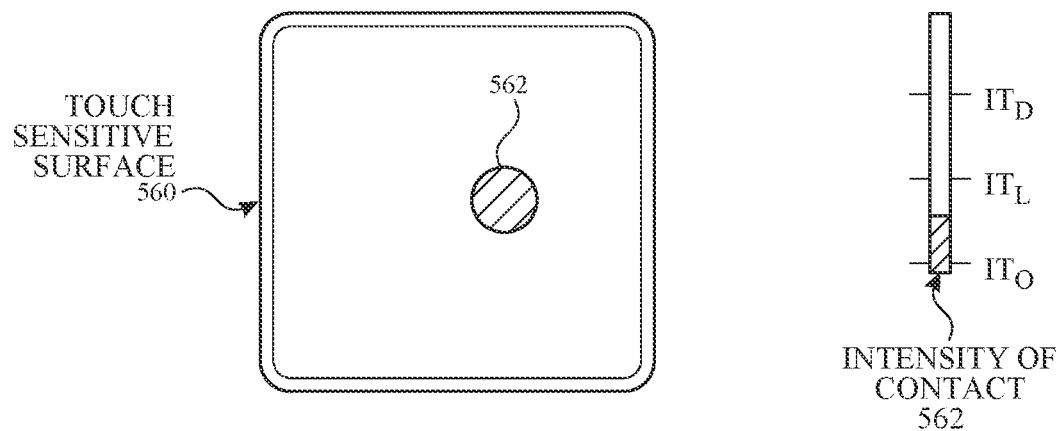
FIG. 5E

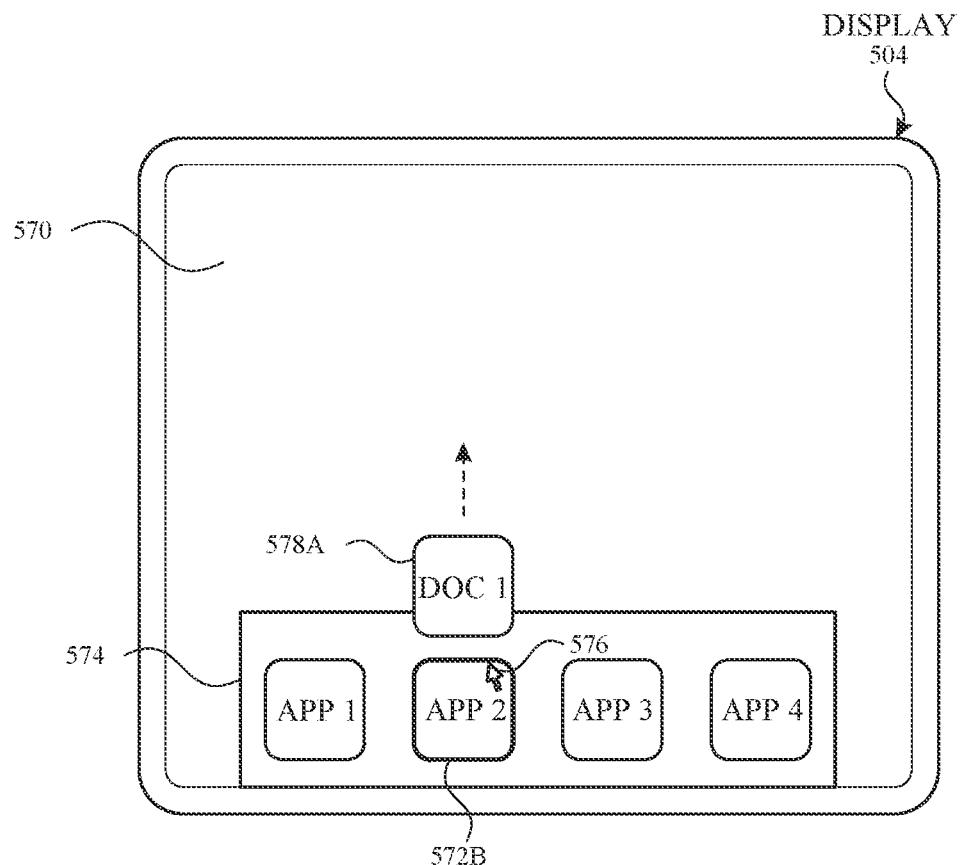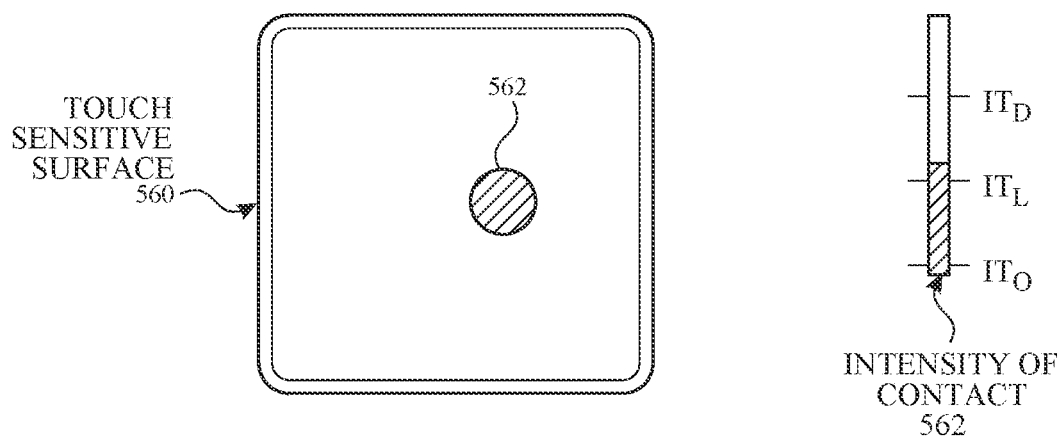
FIG. 5F

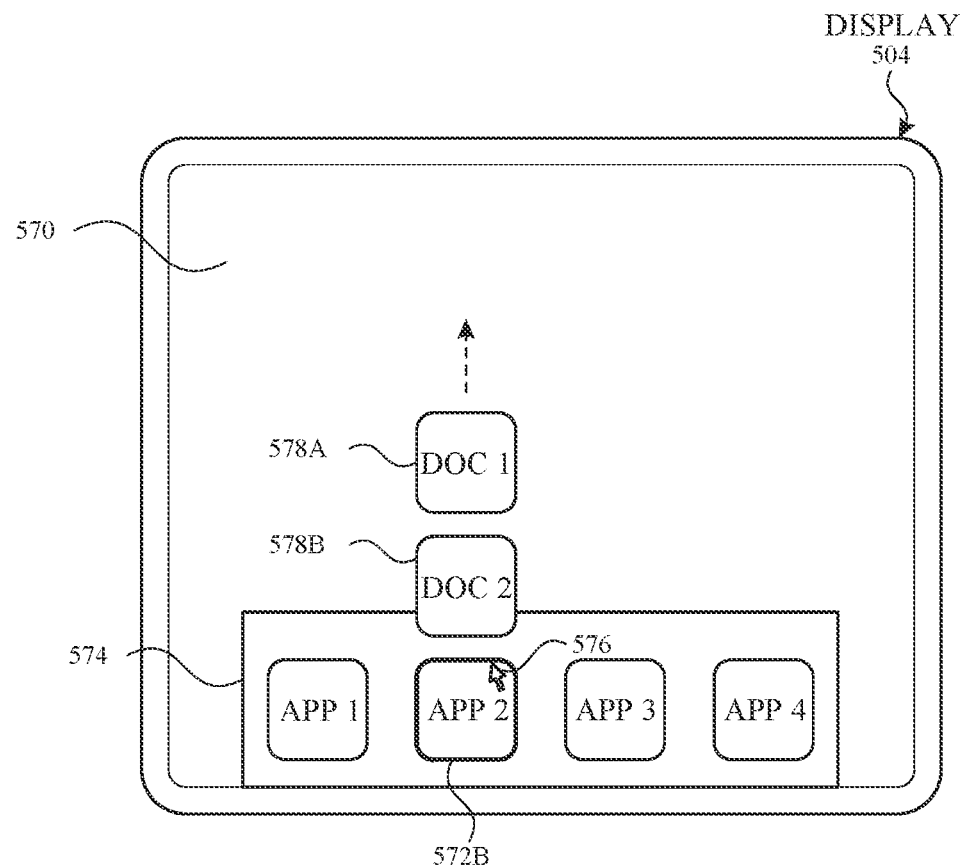
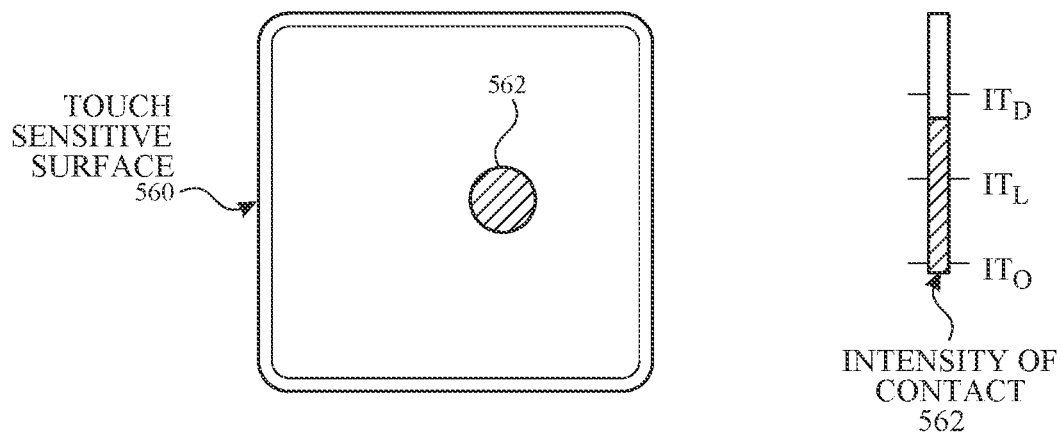
FIG. 5G

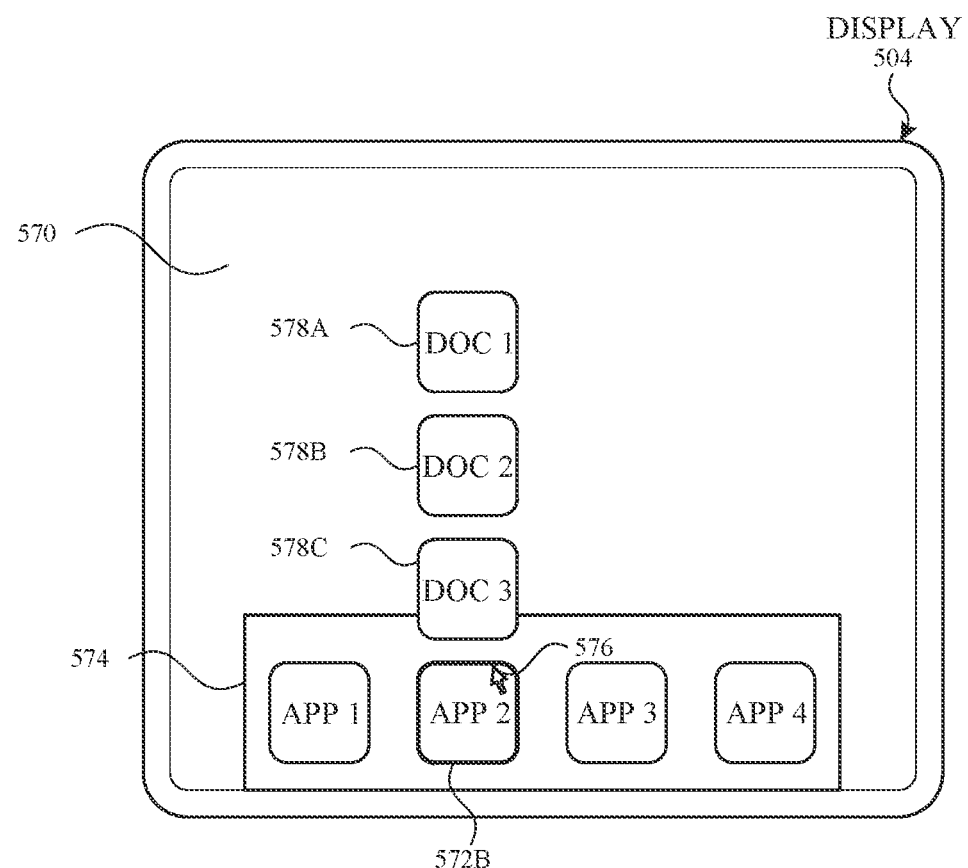
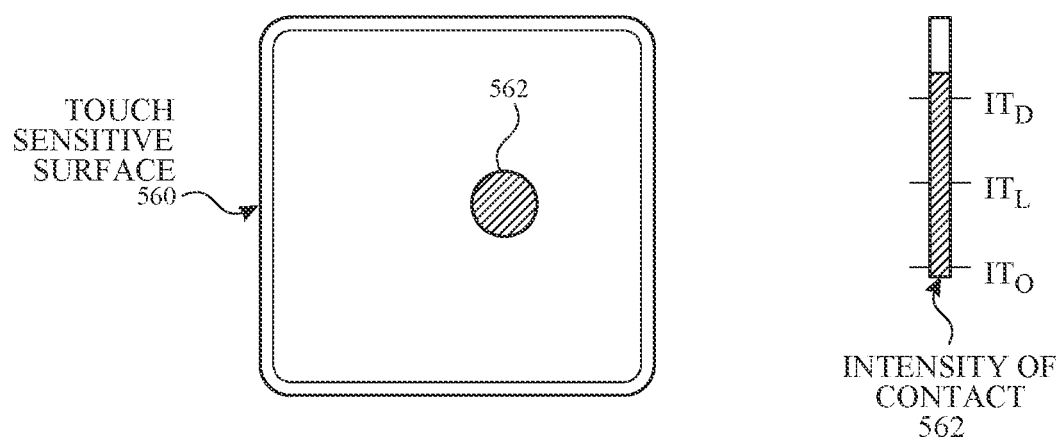
FIG. 5H

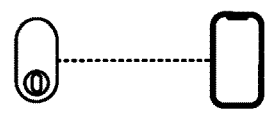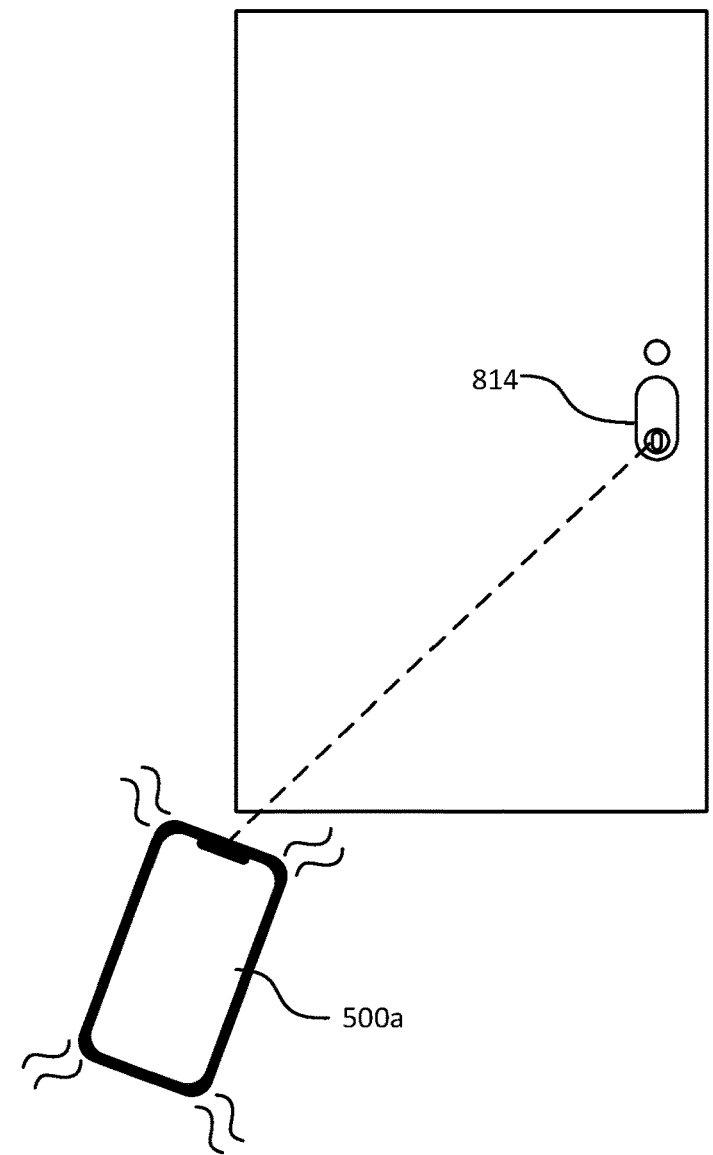
FIG. 8G

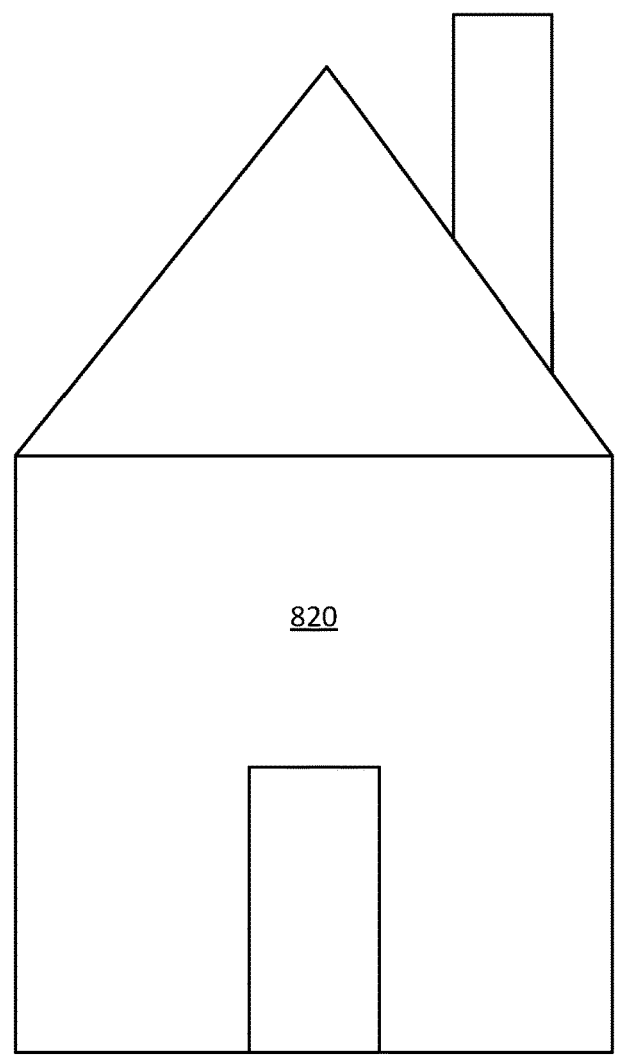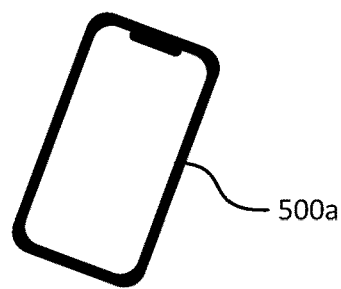
FIG. 8J

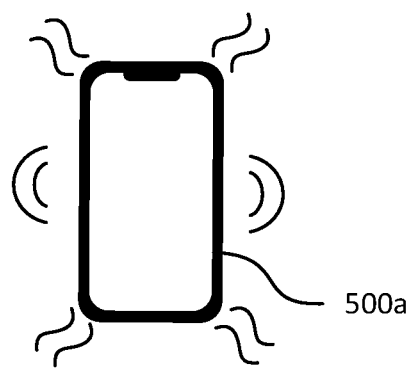
FIG. 8K

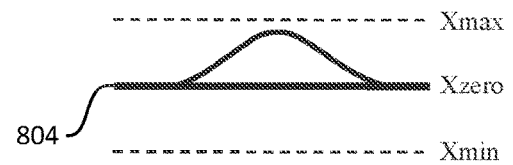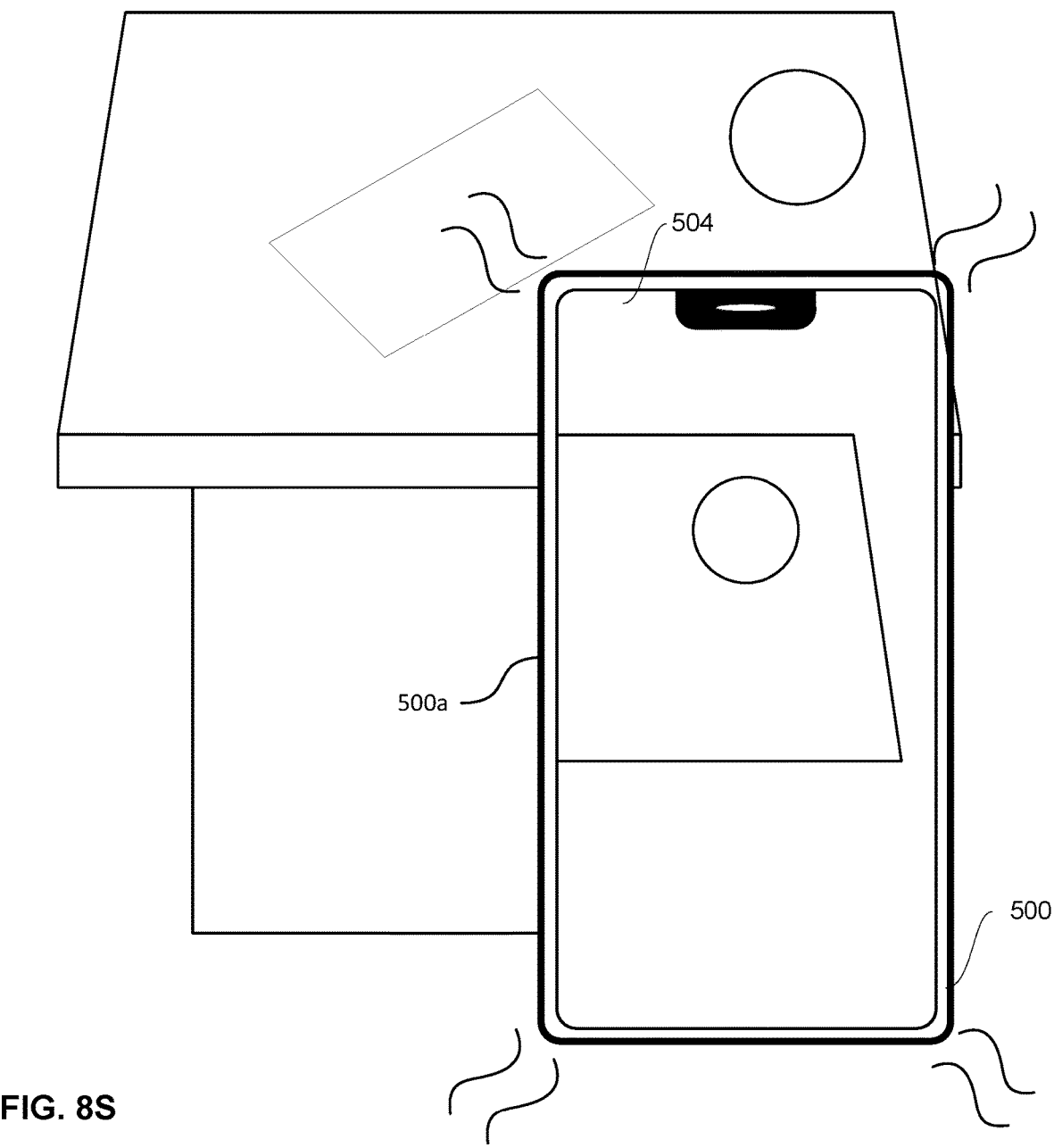
FIG. 8S

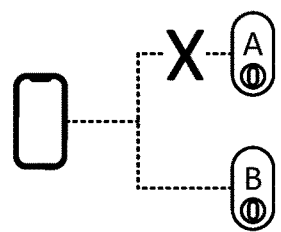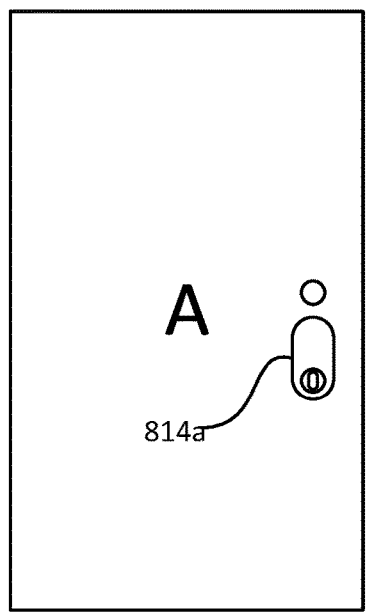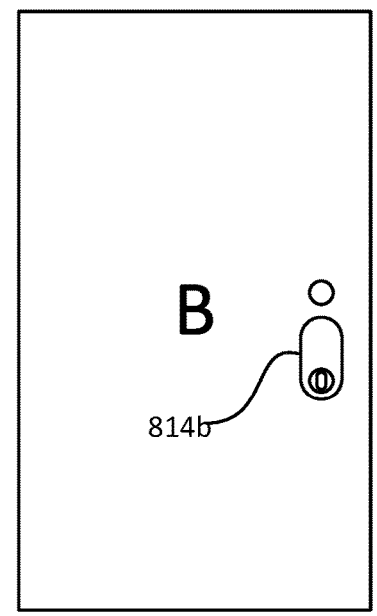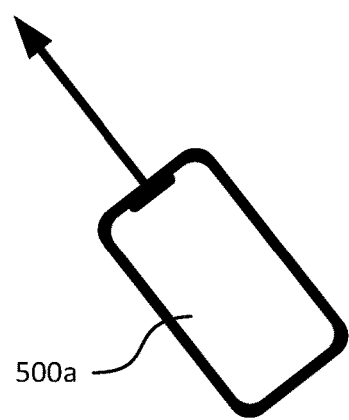
FIG. 8T

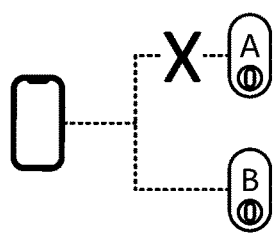
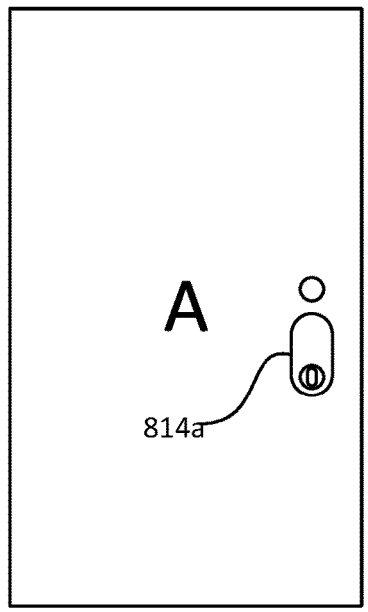
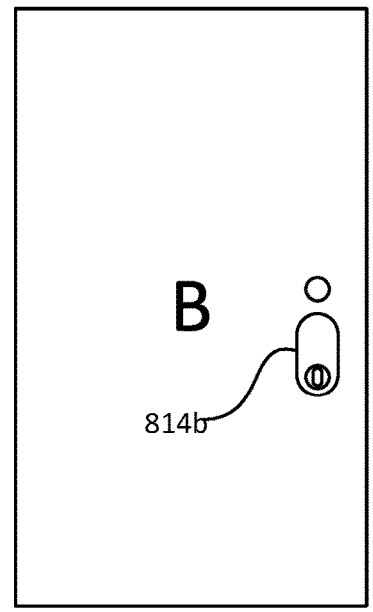
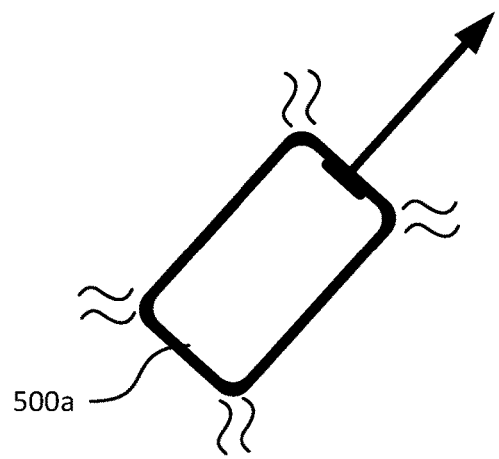
FIG. 8U

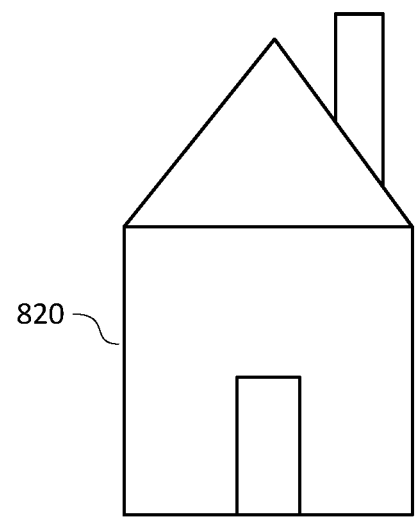
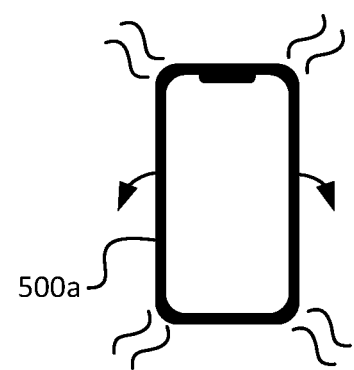
FIG. 8Z

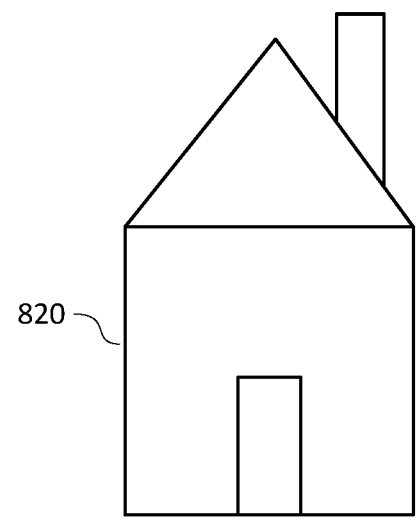
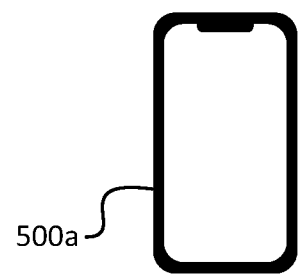
FIG. 8AA

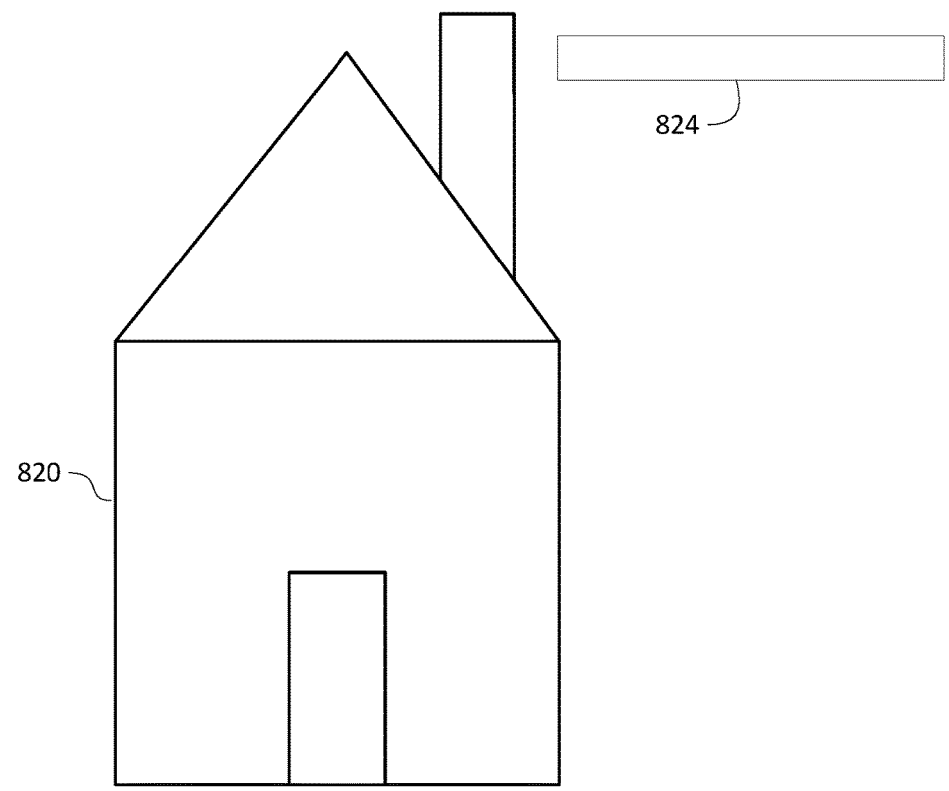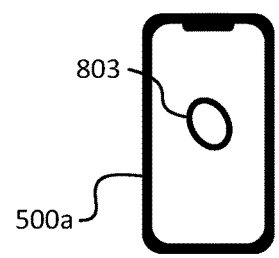
FIG. 8DD

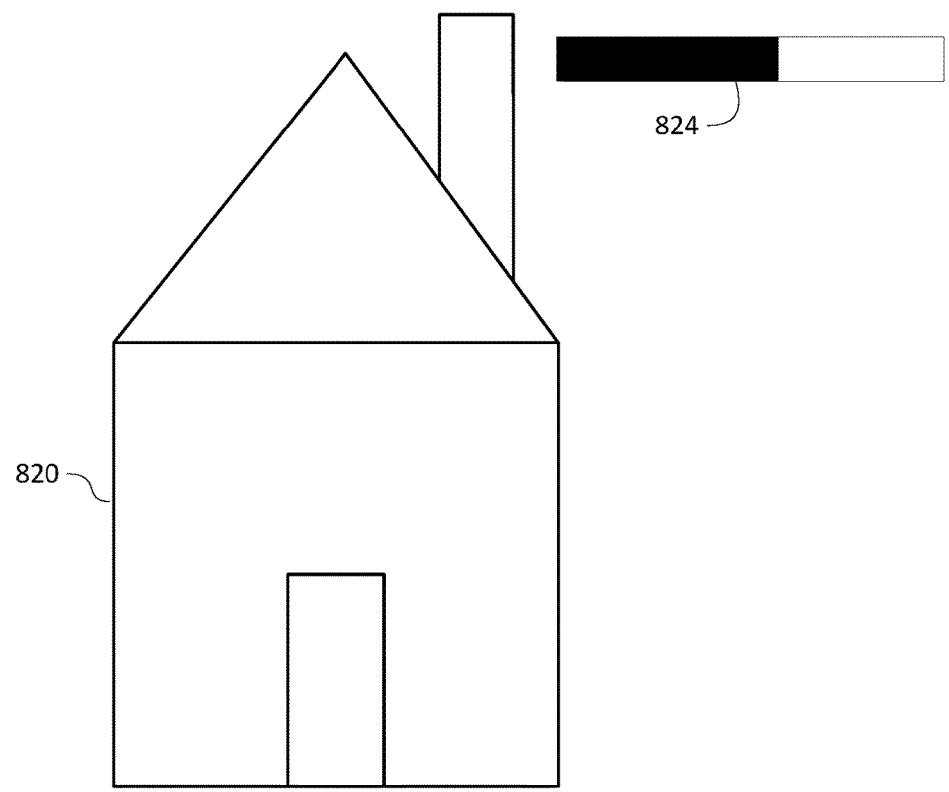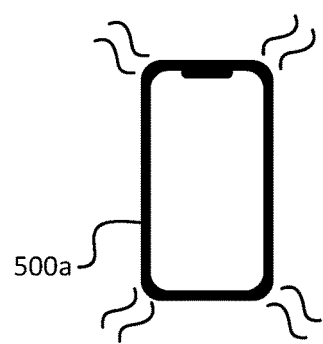
FIG. 8EE

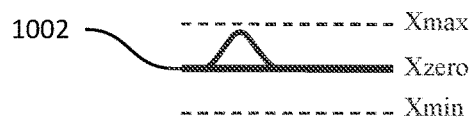
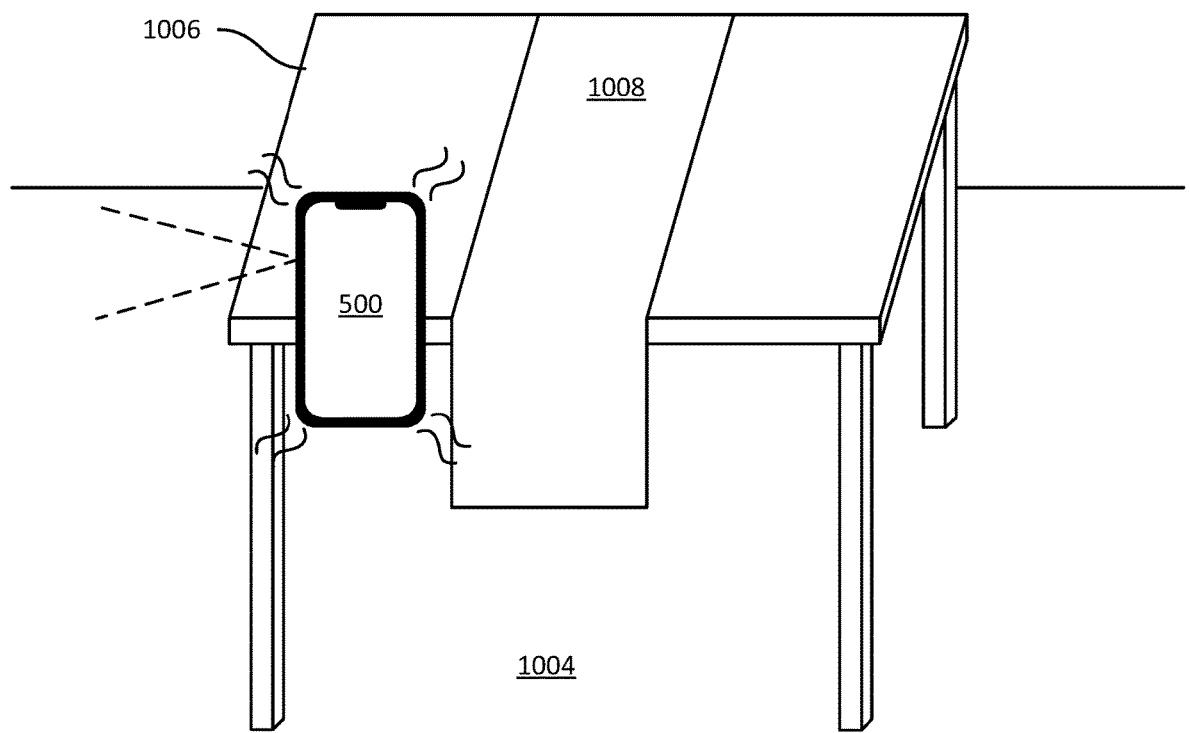
FIG. 10A

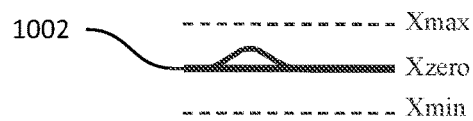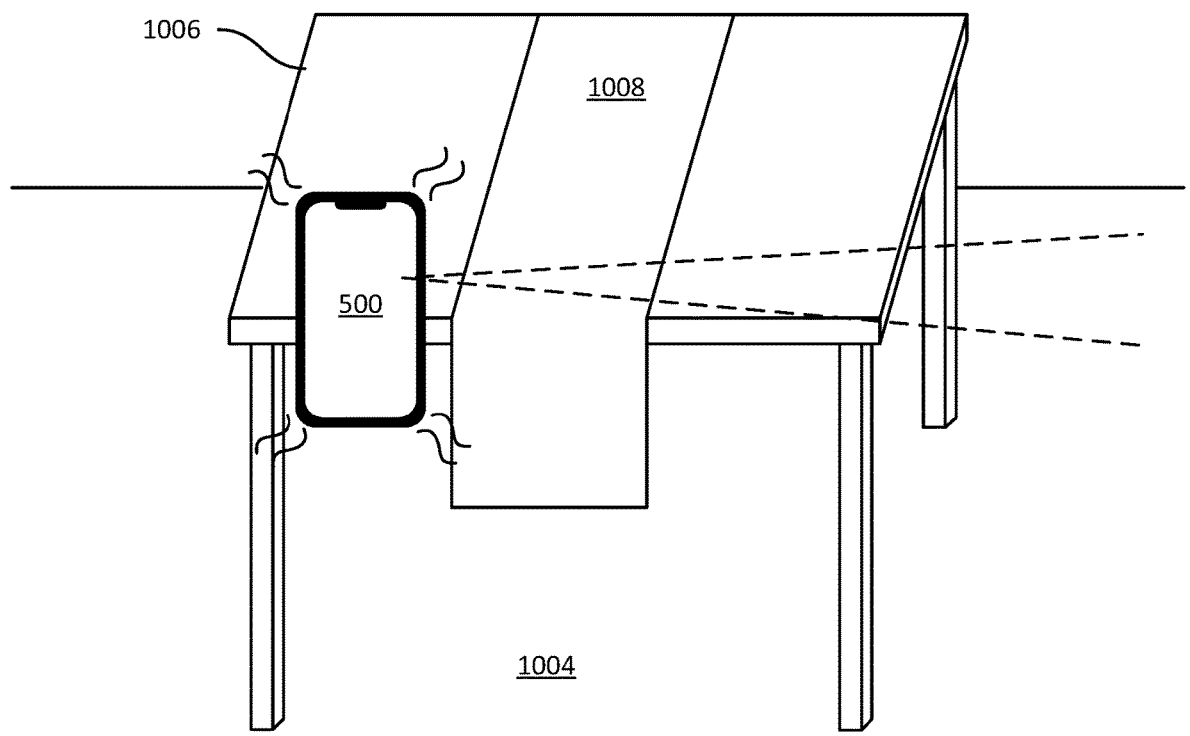
FIG. 10B

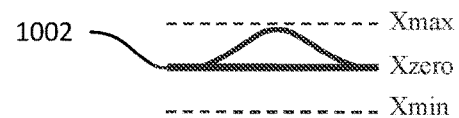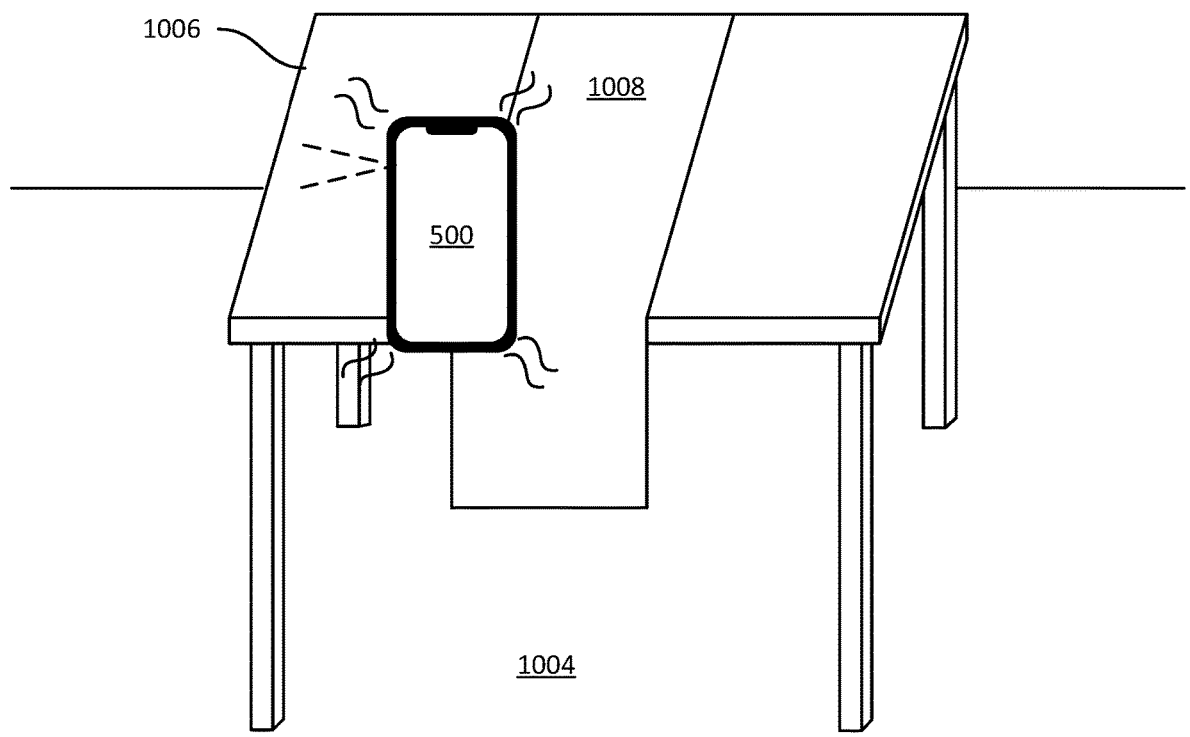
FIG. 10C

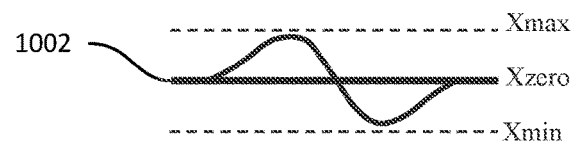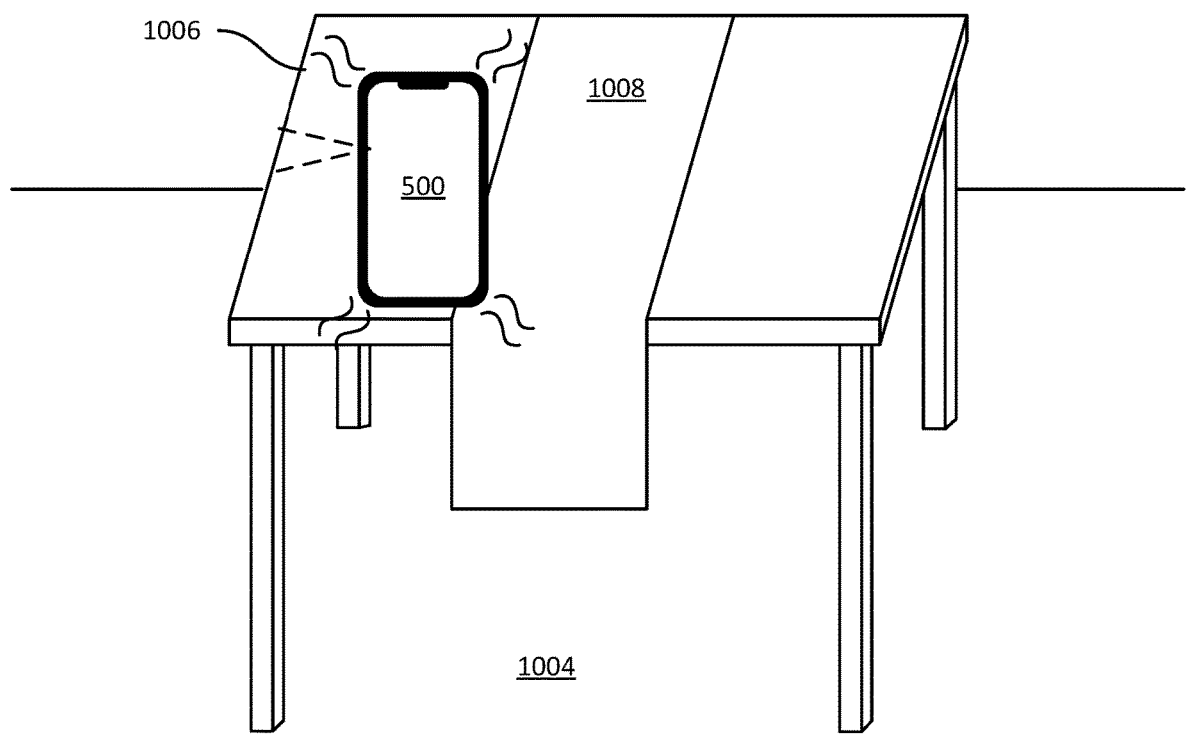
FIG. 10D

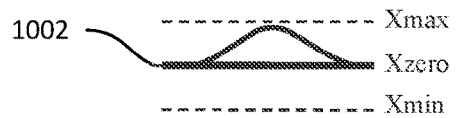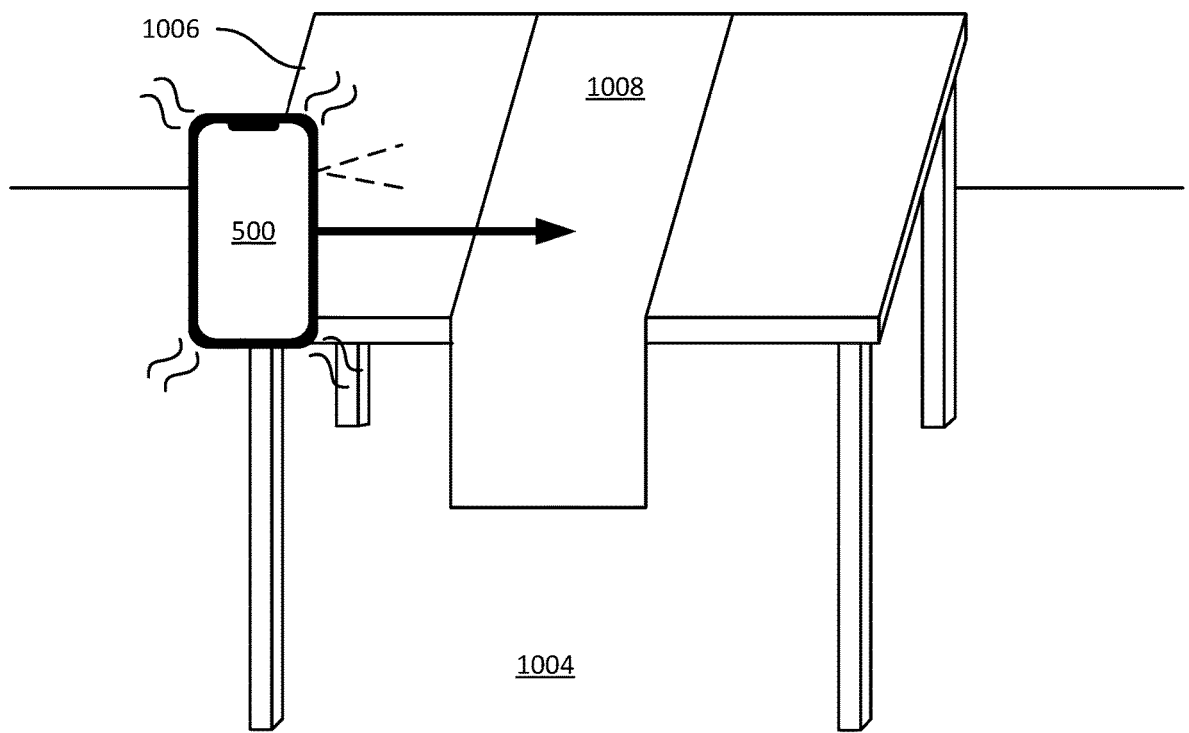
FIG. 10F

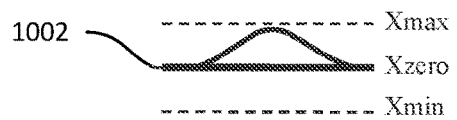
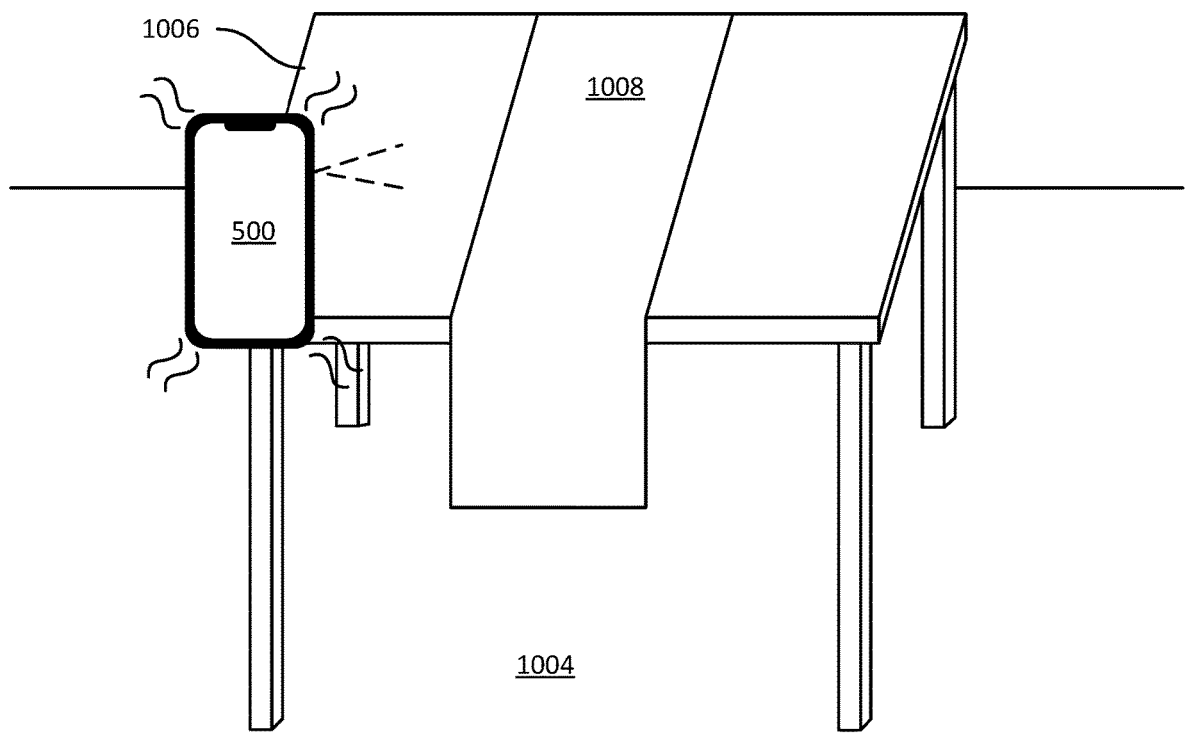
FIG. 10G

GENERATING TACTILE OUTPUT SEQUENCES ASSOCIATED WITH AN OBJECT

CROSS-REFERENCE TO RELATED APPLICATIONS

This application is a continuation of U.S. patent application Ser. No. 17/594,742, filed Oct. 28, 2021, and published on Jul. 14, 2022 as U.S. Publication No. 2022-0223013, which is a National Phase application under 35 U.S.C. § 371 of International Application No. PCT/US2020/030149, filed Apr. 27, 2020, which claims the benefit of U.S. Provisional Application No. 62/839,735, filed Apr. 28, 2019, the contents of which are herein incorporated by reference in their entireties for all purposes.

FIELD OF THE DISCLOSURE

This relates generally to electronic devices that generate tactile output sequences in response to the electronic device's orientation relative to a respective object, and user interactions with such devices.

BACKGROUND

User interaction with electronic devices has increased significantly in recent years. These devices can be devices such as televisions, multimedia devices, mobile devices, computers, tablet computers, and the like.

In some circumstances, users may wish to receive a tactile output sequence from an electronic device that indicates the electronic device's orientation relative to another object. Enhancing these interactions improves the user's experience with the device and decreases user interaction time, which is particularly important where input devices are battery-operated.

It is well understood that personally identifiable information data should be managed and handled so as to minimize risks of unintentional or unauthorized access or use, and the nature of authorized use should be clearly indicated to users. In particular, the use of personally identifiable information should follow privacy policies and practices that are generally recognized as meeting or exceeding industry or governmental requirements for maintaining the privacy of users.

SUMMARY

Some embodiments described in this disclosure are directed to one or more electronic devices that generate a tactile output sequence in response to detecting that the electronic device is oriented within a range of orientations that changes as the distance between the electronic device and a respective object changes. Some embodiments described in this disclosure are directed to one or more electronic devices that change one or more characteristics of a tactile output in response to detecting a change in the orientation of the electronic device relative to a respective object. Some embodiments described in this disclosure are directed to one or more electronic devices that generate tactile outputs with characteristics indicative of the orientation of a camera of the electronic device relative to one or more AR (augmented reality) planes. Some embodiments described in this disclosure are directed to one or more first electronic devices that generate tactile outputs indicative of a data sharing process with one or more second electronic devices.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 5I-5N provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein.

FIGS. 10A-10I illustrate exemplary ways in which an electronic device generates tactile outputs with characteristics indicative of the orientation of a camera of the electronic device relative to one or more AR (augmented reality) planes in accordance with some embodiments of the disclosure.

DETAILED DESCRIPTION

Description of Embodiments

Figure 1A:
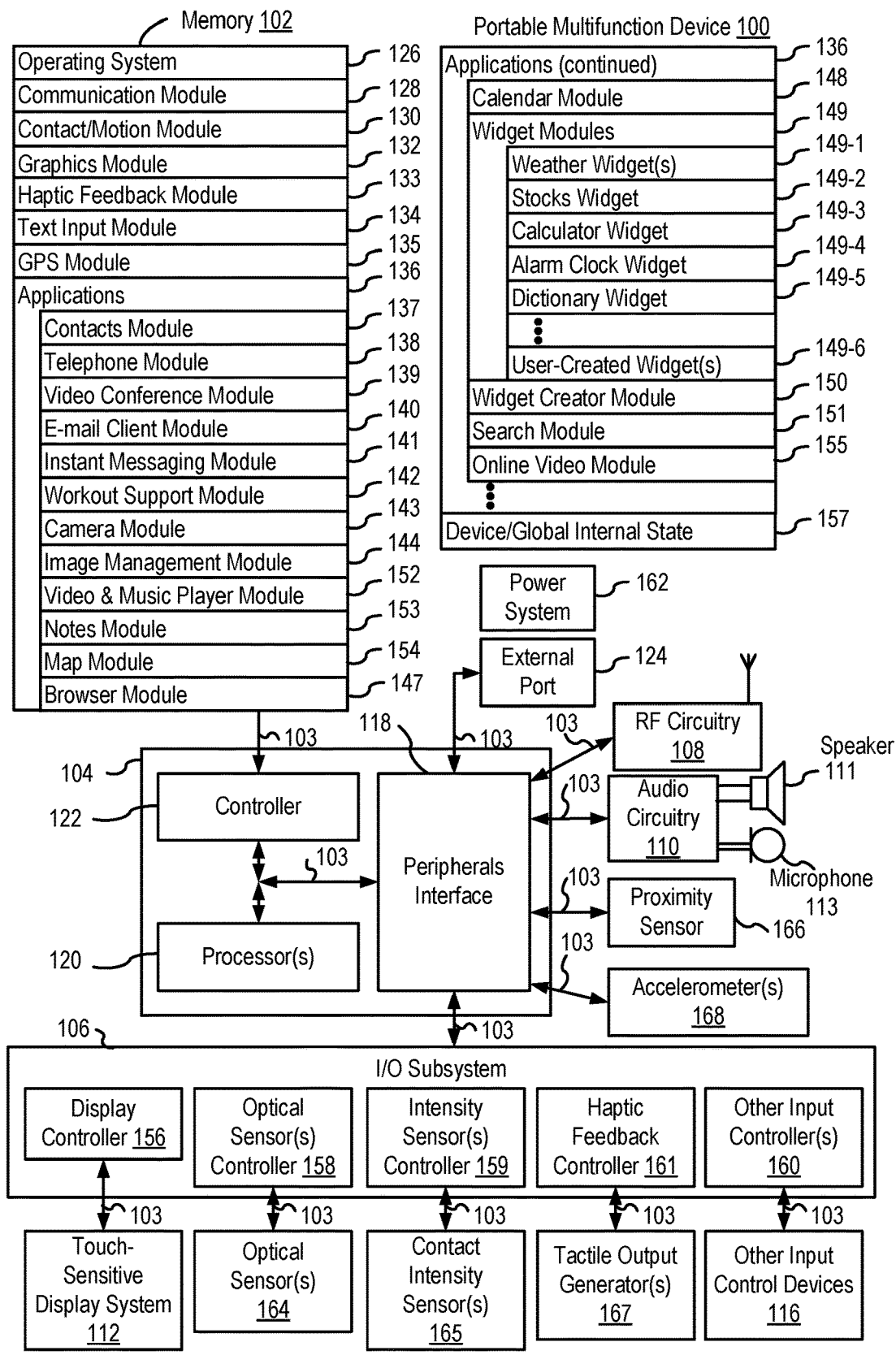
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that generate tactile output sequences indicative of the electronic device's orientation relative to a respective object. Such techniques can reduce the cognitive burden on a user who uses such devices and/or wishes to control their use of such devices. Further, such techniques can reduce processor and battery power otherwise wasted on redundant user inputs.

Although the following description uses terms "first," "second," etc. to describe various elements, these elements should not be limited by the terms. For example, a first touch could be termed a second touch, and, similarly, a second touch could be termed a first touch, without departing from the scope of the various described embodiments. The first touch and the second touch are both touches, but they are not the same touch. These terms are only used to distinguish one element from another.

The terminology used in the description of the various described embodiments herein is for the purpose of describing particular embodiments only and is not intended to be limiting. It will be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used in the description of the various described embodiments and the appended claims, the singular forms "a," "an," and "the" are intended to include the plural forms as well, unless the context clearly indicates otherwise.

The phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. The term "if" is, optionally, construed to mean "when" or "upon" or "in response to determining" or "in response to detecting," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. It should also be understood that, in some embodiments, the device is not a portable communications device, but is a desktop computer with a touch-sensitive surface (e.g., a touch screen display and/or a touchpad). Other portable electronic devices, such as laptops or tablet computers with touch-sensitive surfaces (e.g., touch screen displays and/or touchpads), are, optionally, used.

It should be understood that the electronic device optionally includes one or more other physical user-interface devices, such as a physical keyboard, a mouse, and/or a joystick. In the discussion that follows, an electronic device that includes a display and a touch-sensitive surface is described.

The device typically supports a variety of applications, such as one or more of the following: a web browsing application, a website creation application, a word processing application, a disk authoring application, a spreadsheet application, a gaming application, a telephone application, a drawing application, a presentation application, a video conferencing application, a workout support application, a digital camera application, a digital video camera application, a photo management application, an e-mail application, an instant messaging application, a digital music player application, and/or a digital video player application.

One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user. The various applications that are executed on the device optionally use at least one common physical user-interface device, such as the touch-sensitive surface.

Attention is now directed toward embodiments of portable devices with touch-sensitive displays. FIG. 1A is a block diagram illustrating portable multifunction device 100 with touch-sensitive display system 112 in accordance with some embodiments. Device 100 includes memory 102 (which optionally includes one or more computer-readable storage mediums), memory controller 122, one or more processing units (CPUs) 120, audio circuitry 110, speaker 111, microphone 113, input/output (I/O) subsystem 106, peripherals interface 118, RF circuitry 108, other input control devices 116, and external port 124. Touch-sensitive display 112 is sometimes called a "touch screen" for convenience and is sometimes known as or called a "touch-sensitive display system." Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). Device 100 optionally includes one or more optical sensors 164. These components optionally communicate over one or more communication buses or signal lines 103.

Using the intensity of a contact as an attribute of a user input allows for user access to additional device functionality that may otherwise not be accessible by the user on a reduced-size device with limited real estate for receiving user input (e.g., via a touch-sensitive display, a touch-sensitive surface, or a physical/mechanical control such as a knob or a button) and/or displaying affordances (e.g., on a touch-sensitive display). As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. The intensity of a contact has a range of values that includes at least four distinct values and more typically includes hundreds of distinct values (e.g., at least 256). In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). In some implementations, the substitute measurements for contact force or pressure are used directly to determine whether an intensity threshold has been exceeded (e.g., the intensity threshold is described in units corresponding to the substitute measurements).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. In some cases, a user will feel a tactile sensation such as an "down click" or "up click" even when there is no movement of a physical actuator button associated with the touch-sensitive surface that is physically pressed (e.g., displaced) by the user's movements. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

The various components shown in FIG. 1A are implemented in hardware, software, or a combination of both hardware and software, including one or more signal processing and/or application-specific integrated circuits. It should be appreciated that device 100 is only one example of a portable multifunction device, and that device 100 optionally has more or fewer components than shown, optionally combines two or more components, or optionally has a different configuration or arrangement of the components.

Memory controller 122 optionally controls access to memory 102 by other components of device 100. Memory 102 optionally includes high-speed random access memory and optionally also includes non-volatile memory, such as one or more flash memory devices, magnetic disk storage devices, or other non-volatile solid-state memory devices.

The one or more processors 120 run or execute various software programs and/or sets of instructions stored in memory 102 to perform various functions for device 100 and to process data. Peripherals interface 118 can be used to couple input and output peripherals of the device to CPU 120 and memory 102. In some embodiments, peripherals interface 118, memory controller 122, and CPU 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 optionally includes well-known circuitry for detecting near field communication (NFC) fields, such as by a short-range communication radio. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols, and technologies, including but not limited to high-speed uplink packet access (HSUPA), Evolution, Data-Only (EV-DO), HSPA, HSPA+, Dual-Cell HSPA (DC-HSPDA), Global System for Mobile Communications (GSM), Enhanced Data GSM Environment (EDGE), high-speed downlink packet access (HSDPA), long term evolution (LTE), near field communication (NFC), wideband code division multiple access (W-CDMA), code division multiple access (CDMA), time division multiple access (TDMA), Wireless Fidelity (Wi-Fi) (e.g., IEEE 802.11a, IEEE 802.11b, IEEE 802.11g, IEEE 802.11n, and/or IEEE 802.11ac), Bluetooth, Bluetooth Low Energy (BTLE), voice over Internet Protocol (VoIP), Wi-MAX, a protocol for e-mail (e.g., Internet message access protocol (IMAP) and/or post office protocol (POP)), Session Initiation Protocol for Instant Messaging and Presence Leveraging Extensions (SIMPLE), Instant Messaging and Presence Service (IMPS)), Short Message Service (SMS), and/or instant messaging (e.g., extensible messaging and presence protocol (XMPP), or any other suitable communication protocol, including communication protocols not yet developed as of the filing date of this document.

Audio circuitry 110, speaker 111, and microphone 113 provide an audio interface between a user and device 100. Speaker 111 converts the electrical signal to human-audible sound waves. Audio circuitry 110 receives audio data from peripherals interface 118, converts the audio data to an electrical signal, and transmits the electrical signal to speaker 111. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). Other input control devices 116 optionally include physical buttons (e.g., push buttons, rocker buttons, etc.), dials, slider switches, joysticks, click wheels, and so forth.

A quick press of the push button optionally disengages a lock of touch screen 112 or optionally begins a process that uses gestures on the touch screen to unlock the device. A longer press of the push button (e.g., 206) optionally turns power to device 100 on or off. Touch screen 112 is used to implement virtual or soft buttons and one or more soft keyboards. The functionality of one or more of the buttons are, optionally, user-customizable.

Touch-sensitive display 112 provides an input interface and an output interface between the device and a user. Touch screen 112 displays visual output to the user. In some embodiments, some or all of the visual output optionally corresponds to user-interface objects. The visual output optionally includes graphics, text, icons, video, and any combination thereof (collectively termed "graphics"). Display controller 156 receives and/or sends electrical signals from/to touch screen 112.

Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. Touch screen 112 has a touch-sensitive surface, sensor, or set of sensors that accepts input from the user based on haptic and/or tactile contact. In an exemplary embodiment, a point of contact between touch screen 112 and the user corresponds to a finger of the user.

Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used. Touch screen 112 optionally uses LED (light emitting diode) technology LCD (liquid crystal display) technology, or LPD (light emitting polymer display) technology, although other display technologies are used in other embodiments.

A touch-sensitive display in some embodiments of touch screen 112 is, optionally, analogous to multi-touch sensitive touchpads. However, touch screen 112 displays visual output from device 100, whereas touch-sensitive touchpads do not provide visual output.

The user optionally makes contact with touch screen 112 using any suitable object or appendage, such as a stylus, a finger, and so forth. In some embodiments, the device translates the rough finger-based input into a precise pointer/cursor position or command for performing the actions desired by the user. In some embodiments, the user interface is designed to work primarily with finger-based contacts and gestures, which can be less precise than stylus-based input due to the larger area of contact of a finger on the touch screen. Touch screen 112 optionally has a video resolution in excess of 100 dpi. In some embodiments, the touch screen has a video resolution of approximately 160 dpi.

In some embodiments, in addition to the touch screen, device 100 optionally includes a touchpad (not shown) for activating or deactivating particular functions. The touchpad is, optionally, a touch-sensitive surface that is separate from touch screen 112 or an extension of the touch-sensitive surface formed by the touch screen. In some embodiments, the touchpad is a touch-sensitive area of the device that, unlike the touch screen, does not display visual output.

Device 100 also includes power system 162 for powering the various components. Power system 162 optionally includes a power management system, one or more power sources (e.g., battery, alternating current (AC)), a power converter or inverter, a power status indicator (e.g., a light-emitting diode (LED)) a recharging system, a power failure detection circuit, and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 receives light from the environment, projected through one or more lenses, and converts the light to data representing an image. Optical sensor 164 optionally includes charge-coupled device (CCD) or complementary metal-oxide semiconductor (CMOS) phototransistors. In conjunction with imaging module 143 (also called a camera module), optical sensor 164 optionally captures still images or video. In some embodiments, an optical sensor is located on the front of the device so that the user's image is, optionally, obtained for video conferencing while the user views the other video conference participants on the touch screen display. In some embodiments, an optical sensor is located on the back of device 100, opposite touch screen display 112 on the front of the device so that the touch screen display is enabled for use as a viewfinder for still and/or video image acquisition. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

FIG. 1A shows a contact intensity sensor coupled to intensity sensor controller 159 in I/O subsystem 106. Device 100 optionally also includes one or more contact intensity sensors 165. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is located on the back of device 100, opposite touch screen display 112, which is located on the front of device 100. In some embodiments, at least one contact intensity sensor is collocated with, or proximate to, a touch-sensitive surface (e.g., touch-sensitive display system 112).

Device 100 optionally also includes one or more proximity sensors 166. FIG. 1A shows proximity sensor 166 coupled to peripherals interface 118. In some embodiments, the proximity sensor turns off and disables touch screen 112 when the multifunction device is placed near the user's ear (e.g., when the user is making a phone call). Alternately, proximity sensor 166 is, optionally, coupled to input controller 160 in I/O subsystem 106.

FIG. 1A shows a tactile output generator coupled to haptic feedback controller 161 in I/O subsystem 106. Device 100 optionally also includes one or more tactile output generators 167. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator sensor is located on the back of device 100, opposite touch screen display 112, which is located on the front of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100).

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
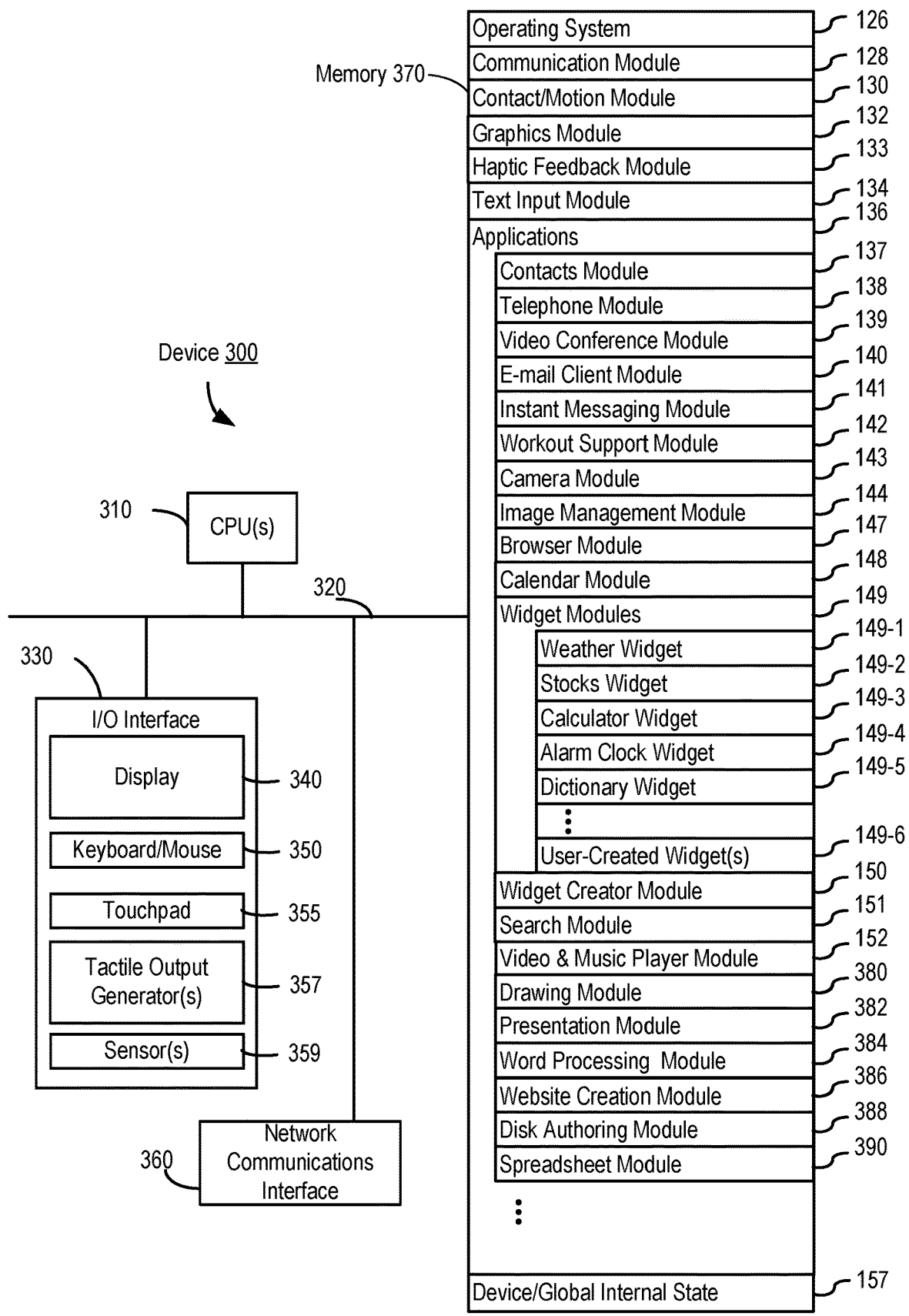
FIG. 3 is a block diagram of an exemplary multifunction device with a display and a touch-sensitive surface in accordance with some embodiments.

In some embodiments, the software components stored in memory 102 include operating system 126, applications (or sets of instructions) 136, communication module (or set of instructions) 128, contact/motion module (or set of instructions) 130, text input module (or set of instructions) 134, graphics module (or set of instructions) 132, and Global Positioning System (GPS) module (or set of instructions) 135. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., WINDOWS, Darwin, RTXC, LINUX, UNIX, OS X, iOS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. In some embodiments, the external port is a multi-pin (e.g., 30-pin) connector. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 optionally detects contact with touch screen 112 (in conjunction with display controller 156) and other touch-sensitive devices (e.g., a touchpad or physical click wheel). Contact/motion module 130 receives contact data from the touch-sensitive surface. Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). For example, a mouse "click" threshold of a trackpad or touch screen display can be set to any of a large range of predefined threshold values without changing the trackpad or touch screen display hardware. In some embodiments, at least a subset of the intensity thresholds are determined in accordance with software parameters (e.g., the intensity thresholds are not determined by the activation thresholds of particular physical actuators and can be adjusted without changing the physical hardware of device 100). Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). For example, detecting a finger tap gesture includes detecting a finger-down event followed by detecting a finger-up (liftoff) event at the same position (or substantially the same position) as the finger-down event (e.g., at the position of an icon). Thus, a gesture is, optionally, detected by detecting a particular contact pattern. As another example, detecting a finger swipe gesture on the touch-sensitive surface includes detecting a finger-down event followed by detecting one or more finger-dragging events, and subsequently followed by detecting a finger-up (liftoff) event.

As used herein, the term "graphics" includes any object that can be displayed to a user, including, without limitation, text, web pages, icons (such as user-interface objects including soft keys), digital images, videos, animations, and the like. Graphics module 132 includes various known software components for rendering and displaying graphics on touch screen 112 or other display, including components for changing the visual impact (e.g., brightness, transparency, saturation, contrast, or other visual property) of graphics that are displayed.

In some embodiments, graphics module 132 stores data representing graphics to be used. Graphics module 132 receives, from applications etc., one or more codes specifying graphics to be displayed along with, if necessary, coordinate data and other graphic property data, and then generates screen image data to output to display controller 156. Each graphic is, optionally, assigned a corresponding code.

Haptic feedback module 133 includes various software components for generating instructions used by tactile output generator(s) 167 to produce tactile outputs, in response to user interactions with device 100, at one or more locations on device 100.

Text input module 134, which is, optionally, a component of graphics module 132, provides soft keyboards for entering text in various applications (e.g., contacts 137, browser 147, IM 141, e-mail client module 140, and any other application that needs text input).

GPS module 135 determines the location of the device and provides this information for use in various applications (e.g., to camera module 143 as picture/video metadata; to telephone module 138 for use in location-based dialing; and to applications that provide location-based services such as local yellow page widgets, weather widgets, and map/navigation widgets).

Applications 136 optionally include the following modules (or sets of instructions), or a subset or superset thereof:
  Video player module;
  Music player module;
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Browser module 147;
  Calendar module 148;
  Widget modules 149, which optionally include one or more of: dictionary widget 149-5, weather widget 149-1, stocks widget 149-2, alarm clock widget 149-4, calculator widget 149-3, and other widgets obtained by the user, as well as user-created widgets 149-6;
  Widget creator module 150 for making user-created widgets 149-6;
  Search module 151;
  Video and music player module 152, which merges music player module and video player module;
  Notes module 153;
  Map module 154; and/or
  Online video module 155.

Examples of other applications 136 that are, optionally, stored in memory 102 include JAVA-enabled applications, other word processing applications, drawing applications, presentation applications, other image editing applications, encryption, digital rights management, voice recognition, and voice replication.

In conjunction with touch screen 112, contact/motion module 130, graphics module 132, text input module 134, and display controller 156, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), physical address(es), e-mail address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

As noted above, the wireless communication optionally uses any of a plurality of communications standards, protocols, and technologies. In conjunction with RF circuitry 108, audio circuitry 110, speaker 111, microphone 113, touch screen 112, contact/motion module 130, graphics module 132, text input module 134, and display controller 156, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed.

In conjunction with RF circuitry 108, audio circuitry 110, speaker 111, microphone 113, touch screen 112, contact/motion module 130, graphics module 132, text input module 134, contacts module 137, telephone module 138, display controller 156, optical sensor controller 158, and optical sensor 164, video conference module 139 includes executable instructions to initiate, conduct, and terminate a video conference between a user and one or more other participants in accordance with user instructions.

In conjunction with RF circuitry 108, touch screen 112, contact/motion module 130, graphics module 132, text input module 134, and display controller 156, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

As used herein, "instant messaging" refers to both telephony-based messages (e.g., messages sent using SMS or MMS) and Internet-based messages (e.g., messages sent using XMPP, SIMPLE, or IMPS). In conjunction with RF circuitry 108, touch screen 112, contact/motion module 130, graphics module 132, text input module 134, and display controller 156, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using SIMPLE, XMPP, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS).

In conjunction with RF circuitry 108, touch screen 112, contact/motion module 130, graphics module 132, text input module 134, GPS module 135, map module 154, display controller 156, and music player module, workout support module 142 includes executable instructions to create workouts (e.g., with time, distance, and/or calorie burning goals); select and play music for a workout; communicate with workout sensors (sports devices); receive workout sensor data; calibrate sensors used to monitor a workout; and display, store, and transmit workout data.

In conjunction with touch screen 112, contact/motion module 130, graphics module 132, image management module 144, display controller 156, optical sensor(s) 164, and optical sensor controller 158, camera module 143 includes executable instructions to capture still images or video (including a video stream) and store them into memory 102, modify characteristics of a still image or video, or delete a still image or video from memory 102.

In conjunction with touch screen 112, contact/motion module 130, graphics module 132, text input module 134, display controller 156, and camera module 143, image management module 144 includes executable instructions to arrange, label, delete, modify (e.g., edit), or otherwise manipulate, present (e.g., in a digital slide show or album), and store still and/or video images.

In conjunction with RF circuitry 108, touch screen 112, contact/motion module 130, graphics module 132, text input module 134, and display controller 156, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, contact/motion module 130, graphics module 132, text input module 134, e-mail client module 140, display controller 156, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an XML (Extensible Markup Language) file and a JavaScript file (e.g., Yahoo! Widgets). In some embodiments, a widget includes an HTML (Hypertext Markup Language) file, a CSS (Cascading Style Sheets) file, and a JavaScript file.

In conjunction with RF circuitry 108, touch screen 112, contact/motion module 130, graphics module 132, text input module 134, display controller 156, and browser module 147, the widget creator module 150 are, optionally, used by a user to create widgets (e.g., turning a user-specified portion of a web page into a widget).

In conjunction with touch screen 112, contact/motion module 130, graphics module 132, text input module 134, and display controller 156, search module 151 includes executable instructions to search for text, sound, music, image, video, and/or other files in memory 102 that match one or more search criteria (e.g., one or more user-specified search terms) in accordance with user instructions.

In some embodiments, device 100 optionally includes the functionality of an MP3 player. In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124).

In conjunction with touch screen 112, display controller 156, contact/motion module 130, graphics module 132, and text input module 134, notes module 153 includes executable instructions to create and manage to-do lists, notes, and the like in accordance with user instructions.

In conjunction with RF circuitry 108, touch screen 112, contact/motion module 130, graphics module 132, text input module 134, GPS module 135, browser module 147, and display controller 156, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, contact/motion module 130, graphics module 132, audio circuitry 110, speaker 111, RF circuitry 108, text input module 134, e-mail client module 140, browser module 147, and display controller 156, online video module 155 includes instructions that allow the user to receive, access, browse (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. In some embodiments, memory 102 optionally stores a subset of the modules and data structures identified above. For example, video player module is, optionally, combined with music player module into a single module (e.g., video and music player module 152, FIG. 1A). Furthermore, memory 102 optionally stores additional modules and data structures not described above.

By using a touch screen and/or a touchpad as the primary input control device for operation of device 100, the number of physical input control devices (such as push buttons, dials, and the like) on device 100 is, optionally, reduced. In some embodiments, device 100 is a device where operation of a predefined set of functions on the device is performed exclusively through a touch screen and/or a touchpad.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In some embodiments, the menu button is a physical push button or other physical input control device instead of a touchpad. In such other embodiments, a "menu button" is implemented using a touchpad.

Figure 1B:
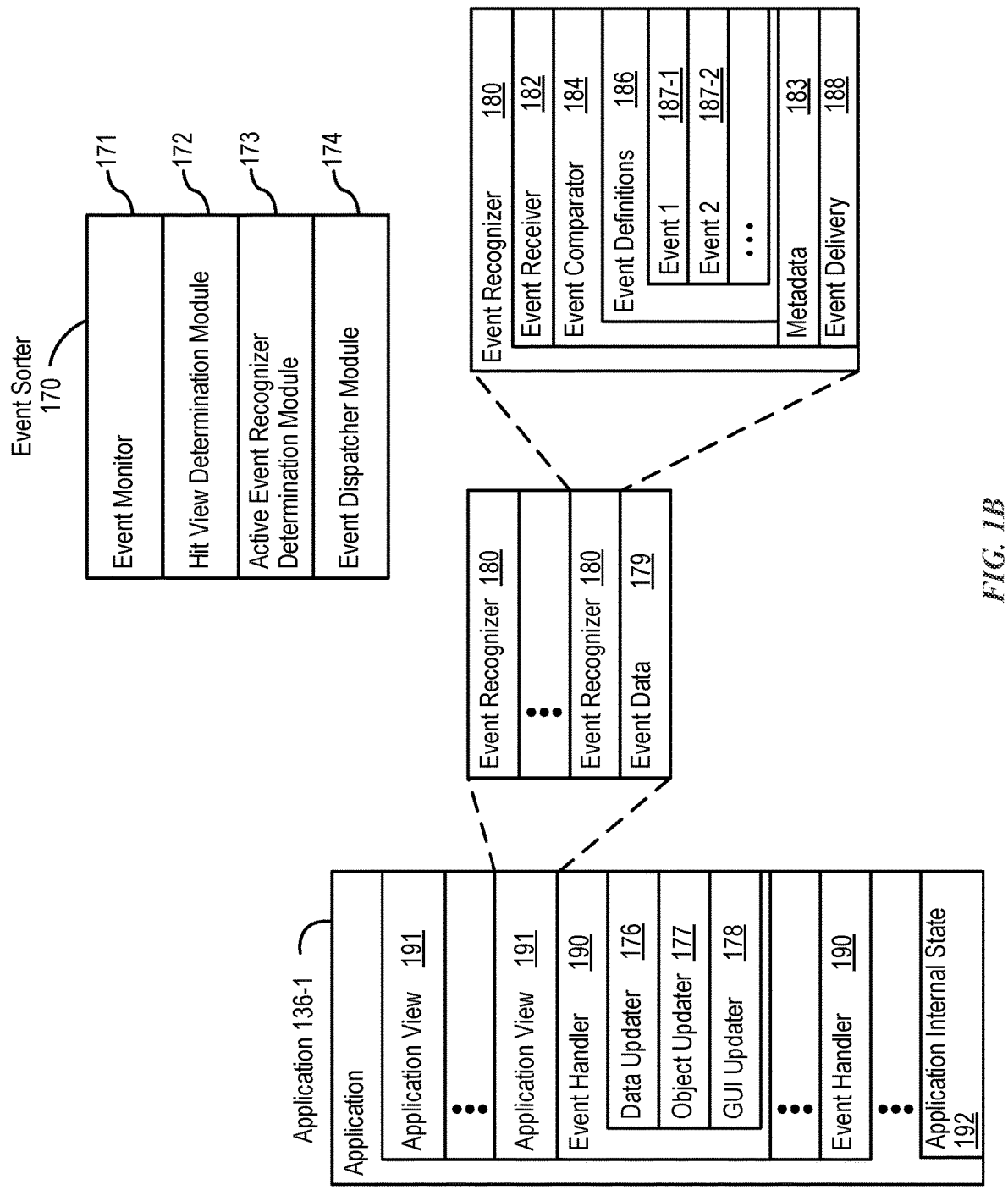
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes a respective application 136-1 (e.g., any of the aforementioned applications 137-151, 155, 380-390) and event sorter 170 (e.g., in operating system 126).

Event sorter 170 includes event monitor 171 and event dispatcher module 174. Event sorter 170 receives event information and determines the application 136-1 and application view 191 of application 136-1 to which to deliver the event information. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: user interface state information that indicates information being displayed or that is ready for display by application 136-1, resume information to be used when application 136-1 resumes execution, a state queue for enabling the user to go back to a prior state or view of application 136-1, and a redo/undo queue of previous actions taken by the user.

Event monitor 171 receives event information from peripherals interface 118. Peripherals interface 118 transmits information it receives from I/O subsystem 106 or a sensor, such as proximity sensor 166, accelerometer(s) 168, and/or microphone 113 (through audio circuitry 110). Event information includes information about a sub-event (e.g., a user touch on touch-sensitive display 112, as part of a multi-touch gesture). Information that peripherals interface 118 receives from I/O subsystem 106 includes information from touch-sensitive display 112 or a touch-sensitive surface.

In some embodiments, peripherals interface 118 transmits event information only when there is a significant event (e.g., receiving an input above a predetermined noise threshold and/or for more than a predetermined duration). In other embodiments, event monitor 171 sends requests to the peripherals interface 118 at predetermined intervals. In response, peripherals interface 118 transmits event information.

In some embodiments, event sorter 170 also includes an active event recognizer determination module 173 and/or a hit view determination module 172.

Views are made up of controls and other elements that a user can see on the display. Hit view determination module 172 provides software procedures for determining where a sub-event has taken place within one or more views when touch-sensitive display 112 displays more than one view.

Another aspect of the user interface associated with an application is a set of views, sometimes herein called application views or user interface windows, in which information is displayed and touch-based gestures occur. In some embodiments, the lowest level view in which a touch is detected is, optionally, called the hit view, and the set of events that are recognized as proper inputs are, optionally, determined based, at least in part, on the hit view of the initial touch that begins a touch-based gesture. Thus, the application views (of a respective application) in which a touch is detected optionally correspond to programmatic levels within a programmatic or view hierarchy of the application.

When an application has multiple views organized in a hierarchy, hit view determination module 172 identifies a hit view as the lowest view in the hierarchy which should handle the sub-event. Hit view determination module 172 receives information related to sub-events of a touch-based gesture. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that all views that include the physical location of a sub-event are actively involved views, and therefore determines that all actively involved views should receive a particular sequence of sub-events. In other embodiments, active event recognizer determination module 173 determines that only the hit view should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In some embodiments, event dispatcher module 174 stores in an event queue the event information, which is retrieved by a respective event receiver 182. In embodiments including active event recognizer determination module 173, event dispatcher module 174 delivers the event information to an event recognizer determined by active event recognizer determination module 173.

In some embodiments, operating system 126 includes event sorter 170. Alternatively, application 136-1 includes event sorter 170. In yet other embodiments, event sorter 170 is a part of another module stored in memory 102, such as contact/motion module 130, or is a stand-alone module.

In some embodiments, application 136-1 includes a plurality of event handlers 190 and one or more application views 191, each of which includes instructions for handling touch events that occur within a respective view of the application's user interface. Typically, a respective application view 191 includes a plurality of event recognizers 180. Each application view 191 of the application 136-1 includes one or more event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Also, in some embodiments, one or more of data updater 176, object updater 177, and GUI updater 178 are included in a respective application view 191. Alternatively, one or more of the application views 191 include one or more respective event handlers 190.

A respective event recognizer 180 receives event information (e.g., event data 179) from event sorter 170 and identifies an event from the event information. In some embodiments, event recognizer 180 also includes at least a subset of: metadata 183, and event delivery instructions 188 (which optionally include sub-event delivery instructions). Event recognizer 180 includes event receiver 182 and event comparator 184.

Event receiver 182 receives event information from event sorter 170. The event information includes information about a sub-event, for example, a touch or a touch movement. When the sub-event concerns motion of a touch, the event information optionally also includes speed and direction of the sub-event. Depending on the sub-event, the event information also includes additional information, such as location of the sub-event. In some embodiments, events include rotation of the device from one orientation to another (e.g., from a portrait orientation to a landscape orientation, or vice versa), and the event information includes corresponding information about the current orientation (also called device attitude) of the device.

In some embodiments, event comparator 184 includes event definitions 186. Event comparator 184 compares the event information to predefined event or sub-event definitions and, based on the comparison, determines an event or sub-event, or determines or updates the state of an event or sub-event. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In another example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In some embodiments, the event also includes information for one or more associated event handlers 190.

In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test. In some embodiments, event definition 187 includes a definition of an event for a respective user-interface object.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event failed, event impossible, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate whether sub-events are delivered to varying levels in the view or programmatic hierarchy. In some embodiments, metadata 183 includes configurable properties, flags, and/or lists that indicate how event recognizers interact, or are enabled to interact, with one another.

In some embodiments, a respective event recognizer 180 activates event handler 190 associated with an event when one or more particular sub-events of an event are recognized. Activating an event handler 190 is distinct from sending (and deferred sending) sub-events to a respective hit view. In some embodiments, a respective event recognizer 180 delivers event information associated with the event to event handler 190. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with actively involved views or with the series of sub-events receive the event information and perform a predetermined process.

In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display. In some embodiments, data updater 176 creates and updates data used in application 136-1. For example, data updater 176 updates the telephone number used in contacts module 137, or stores a video file used in video player module.

In some embodiments, event handler(s) 190 includes or has access to data updater 176, object updater 177, and GUI updater 178. In other embodiments, they are included in two or more software modules. In some embodiments, data updater 176, object updater 177, and GUI updater 178 are included in a single module of a respective application 136-1 or application view 191.

It shall be understood that the foregoing discussion regarding event handling of user touches on touch-sensitive displays also applies to other forms of user inputs to operate multifunction devices 100 with input devices, not all of which are initiated on touch screens. For example, oral instructions; mouse movement and mouse button presses, optionally coordinated with single or multiple keyboard presses or holds; pen stylus inputs; contact movements such as taps, drags, scrolls, etc. on touchpads; movement of the device; detected eye movements; biometric inputs; and/or any combination thereof are optionally utilized as inputs corresponding to sub-events which define an event to be recognized.

Figure 2:
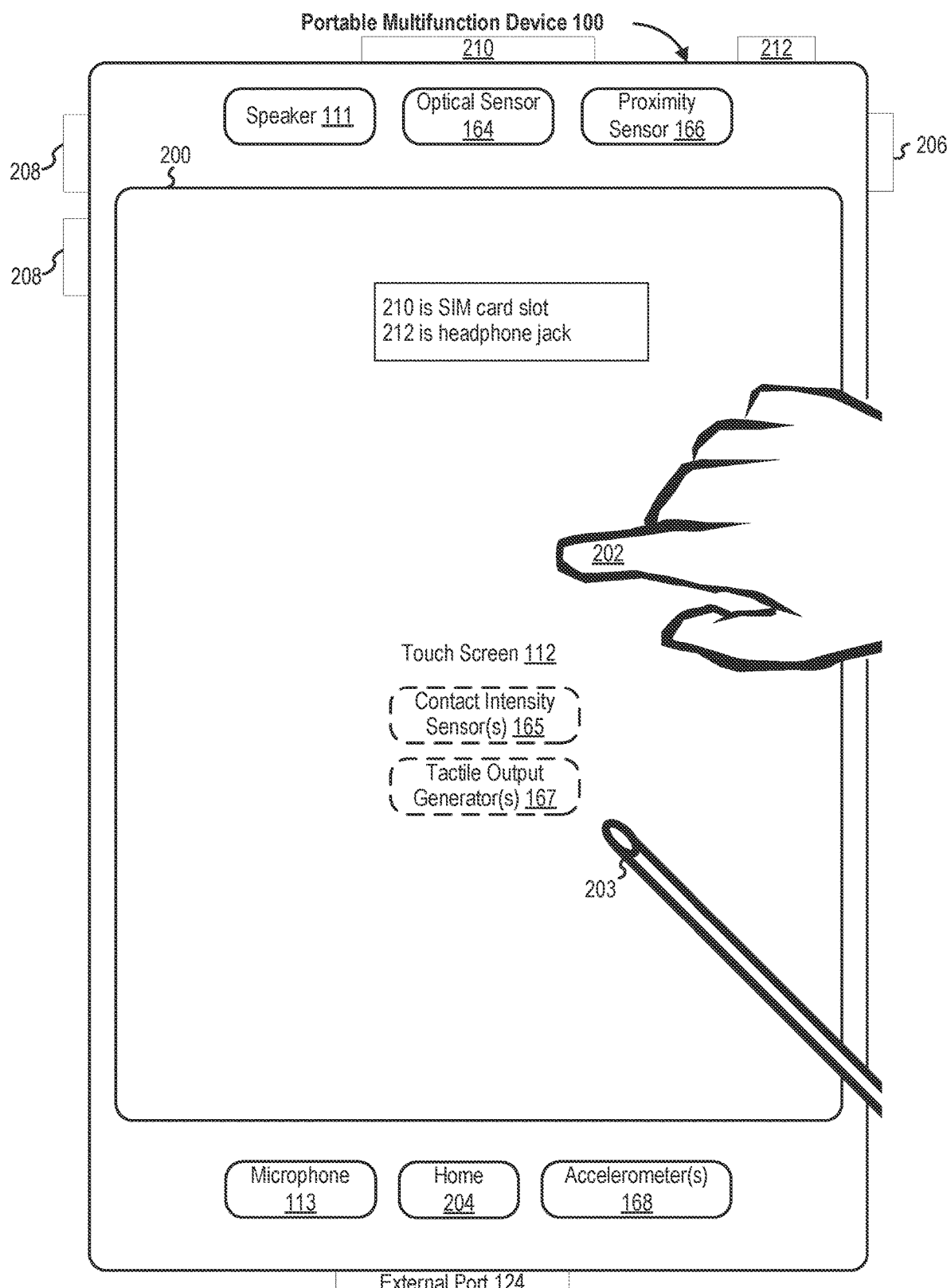
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, the gesture optionally includes one or more taps, one or more swipes (from left to right, right to left, upward and/or downward), and/or a rolling of a finger (from right to left, left to right, upward and/or downward) that has made contact with device 100. In some embodiments, selection of one or more graphics occurs when the user breaks contact with the one or more graphics. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. Alternatively, in some embodiments, the menu button is implemented as a soft key in a GUI displayed on touch screen 112. As described previously, menu button 204 is, optionally, used to navigate to any application 136 in a set of applications that are, optionally, executed on device 100.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Device 100 also, optionally, includes one or more contact intensity sensors 165 for detecting intensity of contacts on touch screen 112 and/or one or more tactile output generators 167 for generating tactile outputs for a user of device 100. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113.

FIG. 3 is a block diagram of an exemplary multifunction device with a display and a touch-sensitive surface in accordance with some embodiments. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 need not be portable. Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 optionally includes one or more storage devices remotely located from CPU(s) 310. Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. In some embodiments, memory 370 optionally stores a subset of the modules and data structures identified above. Furthermore, memory 370 optionally stores additional modules and data structures not described above. The above-identified modules or programs (e.g., sets of instructions) need not be implemented as separate software programs, procedures, or modules, and thus various subsets of these modules are, optionally, combined or otherwise rearranged in various embodiments.

Attention is now directed towards embodiments of user interfaces that are, optionally, implemented on, for example, portable multifunction device 100.

Figure 4A:
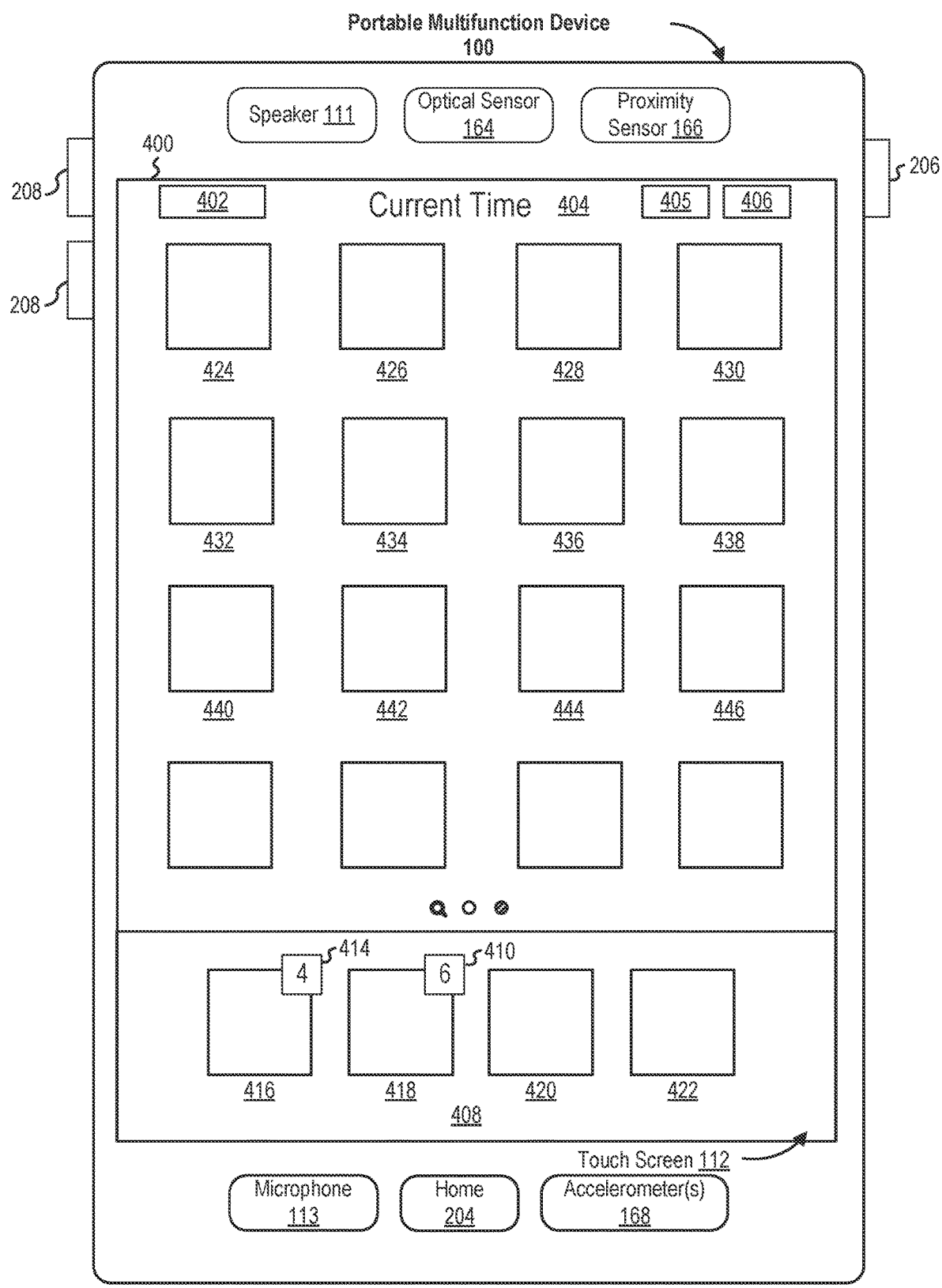
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, which optionally includes an indicator 414 of the number of missed calls or voicemail messages;
  Icon 418 for e-mail client module 140, which optionally includes an indicator 410 of the number of unread e-mails;
  Icon 422 for video and music player module 152; and
  Icon 420 for browser module 147; and
Icons for other applications, such as:
  Icon 424 for IM module 141;
  Icon 442 for workout support module 142;
  Icon 430 for camera module 143;
  Icon 428 for image management module 144;
  Icon 426 for calendar module 148;
  Icon 438 for weather widget 149-1;
  Icon 434 for stocks widget 149-2;
  Icon 440 for alarm clock widget 149-4;
  Icon 444 for notes module 153;
  Icon 436 for map module 154;
  Icon 432 for online video module 155; and
  Icon 446 for a settings application or module, which provides access to settings for device 100 and its various applications 136.

In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more tactile output generators 357 for generating tactile outputs for a user of device 300 and/or one or more contact intensity sensors (e.g., one or more of sensors 359) for detecting intensity of contacts on touch-sensitive surface 451.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a tap gesture is, optionally, replaced with a mouse click while the cursor is located over the location of the tap gesture (e.g., instead of detection of the contact followed by ceasing to detect the contact). As another example, a swipe gesture is, optionally, replaced with a mouse click (e.g., instead of a contact) followed by movement of the cursor along the path of the swipe (e.g., instead of movement of the contact). Similarly, when multiple user inputs are simultaneously detected, it should be understood that multiple computer mice are, optionally, used simultaneously, or a mouse and finger contacts are, optionally, used simultaneously.

Figure 5A:
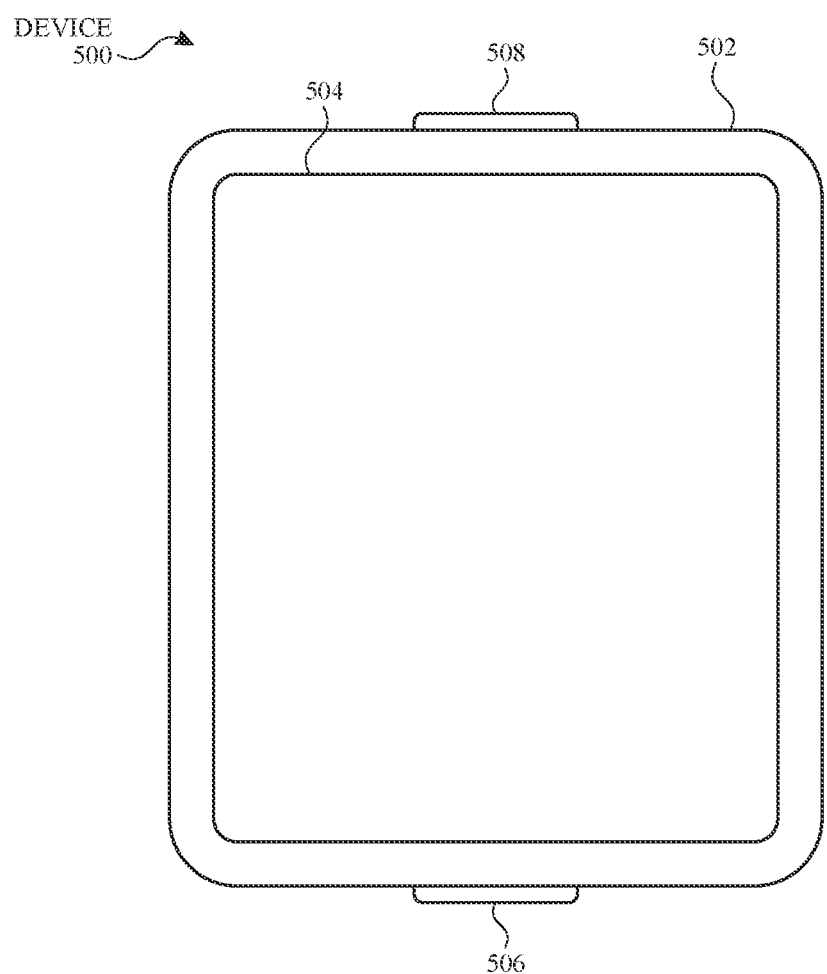
FIG. 5A illustrates a personal electronic device in accordance with some embodiments.

FIG. 5A illustrates exemplary personal electronic device 500. In some embodiments, device 500 can include some or all of the features described with respect to devices 100 and 300 (e.g., FIGS. 1A-4B). Device 500 includes body 502. In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

In some embodiments, device 500 has one or more input mechanisms 506 and 508. Examples of physical input mechanisms include push buttons and rotatable mechanisms. Input mechanisms 506 and 508, if included, can be physical. In some embodiments, device 500 has one or more attachment mechanisms. These attachment mechanisms permit device 500 to be worn by a user. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth.

Figure 5B:
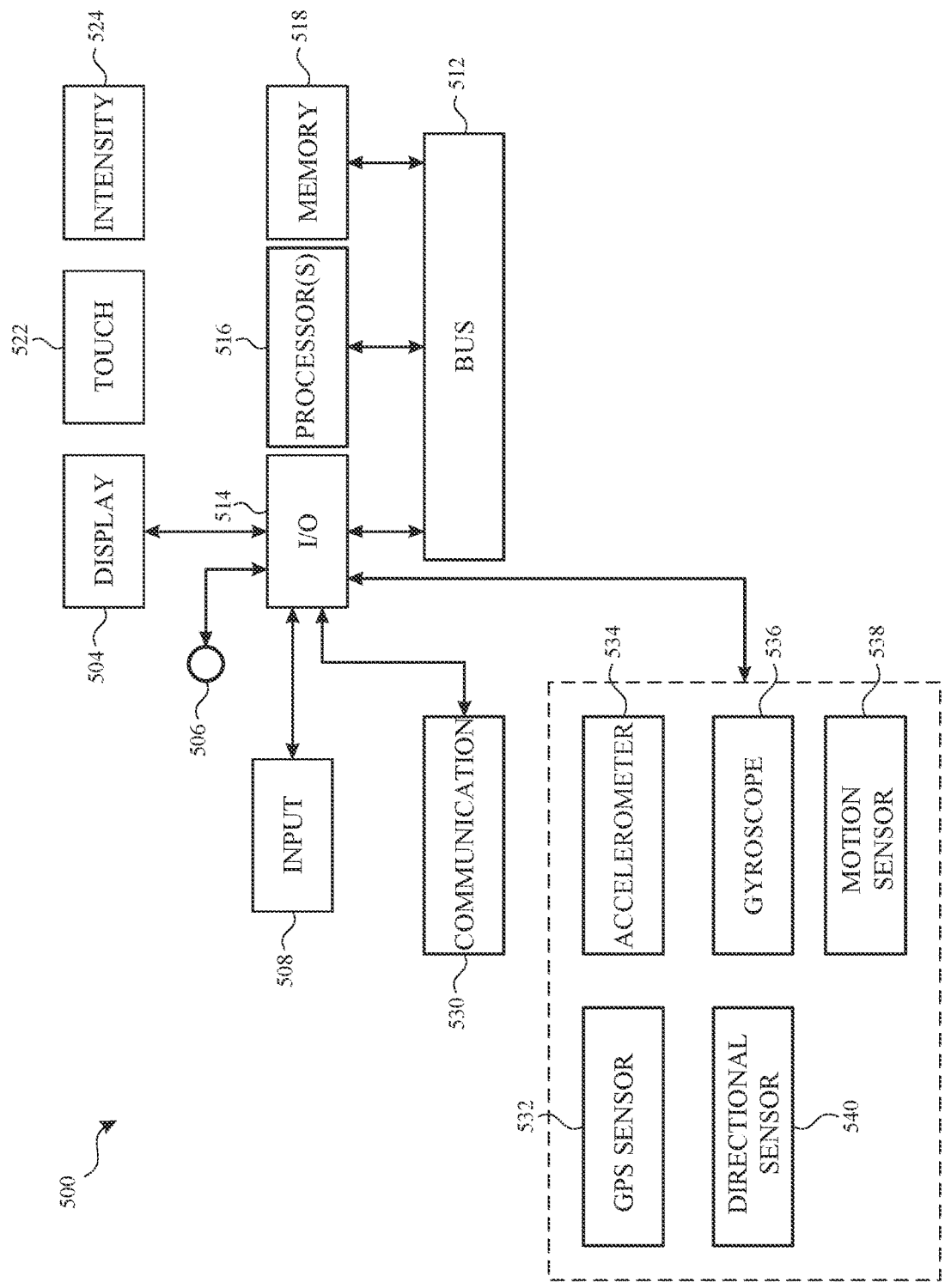
FIG. 5B is a block diagram illustrating a personal electronic device in accordance with some embodiments.
Figure 51:
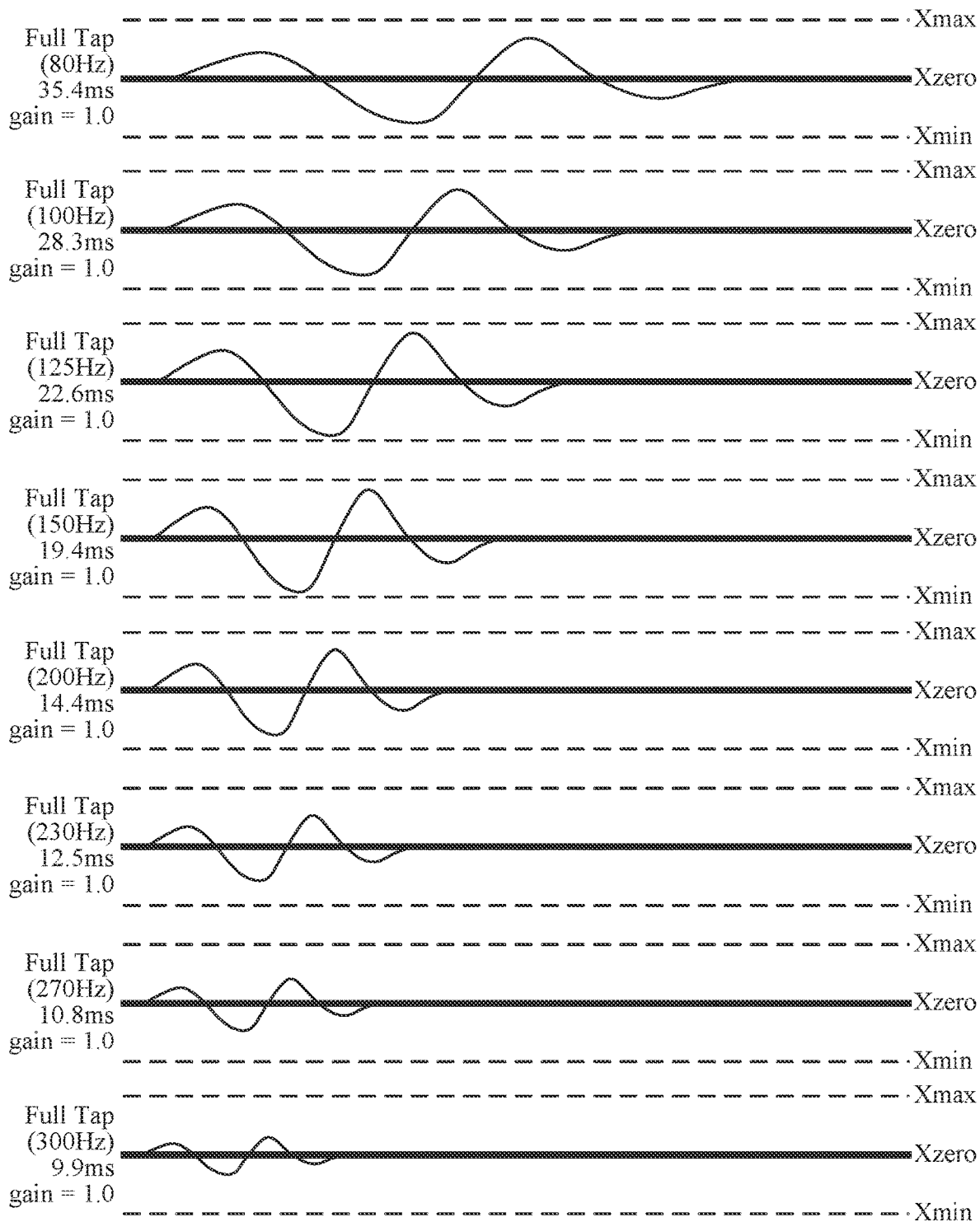

FIG. 5B depicts exemplary personal electronic device 500. In some embodiments, device 500 can include some or all of the components described with respect to FIGS. 1A, 1B, and 3. Device 500 can include input mechanisms 506 and/or 508. Input mechanism 506 is, optionally, a rotatable input device or a depressible and rotatable input device, for example. Input mechanism 508 is, optionally, a button, in some examples. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques.

Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514. Input mechanism 508 is, optionally, a microphone, in some examples.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, and 1300 (FIGS. 7, 9, 11, 13). In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. A computer-readable storage medium can be any medium that can tangibly contain or store computer-executable instructions for use by or in connection with the instruction execution system, apparatus, or device. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, a button, an image (e.g., icon), and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). In some embodiments, the characteristic intensity is based on multiple intensity samples. A characteristic intensity of a contact is, optionally, based on one or more of: a maximum value of the intensities of the contact, an average value of the intensities of the contact, a mean value of the intensities of the contact, a top 10 percentile value of the intensities of the contact, a value at the half maximum of the intensities of the contact, a value at the 90 percent maximum of the intensities of the contact, or the like. In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, the duration of the contact is used in determining the characteristic intensity (e.g., when the characteristic intensity is an average of the intensity of the contact over time). In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. The operations described with reference to FIGS. 5C-5D can be performed using an electronic device similar or identical to device 100, 300, or 500. In some embodiments, the intensity sensors are used to determine a single characteristic intensity (e.g., a single characteristic intensity of a single contact). In some embodiments, a characteristic intensity of a contact is based on one or more intensities of the contact. It should be noted that the intensity diagrams are not part of a displayed user interface, but are included in FIGS. 5C-5D to aid the reader.

In some embodiments, a smoothing algorithm is, optionally, applied to the intensities of the swipe contact prior to determining the characteristic intensity of the contact. For example, the smoothing algorithm optionally includes one or more of: a triangular smoothing algorithm, an unweighted sliding-average smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity. In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location).

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the deep press intensity threshold corresponds to an intensity at which the device will perform operations that are different from operations typically associated with clicking a button of a physical mouse or a trackpad. In some embodiments, the light press intensity threshold corresponds to an intensity at which the device will perform operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the deep press intensity threshold to an intensity above the deep press intensity threshold is sometimes referred to as a "deep press" input. An increase of characteristic intensity of the contact from an intensity below the light press intensity threshold to an intensity between the light press intensity threshold and the deep press intensity threshold is sometimes referred to as a "light press" input. A decrease of characteristic intensity of the contact from an intensity above the contact-detection intensity threshold to an intensity below the contact-detection intensity threshold is sometimes referred to as detecting liftoff of the contact from the touch-surface. An increase of characteristic intensity of the contact from an intensity below the contact-detection intensity threshold to an intensity between the contact-detection intensity threshold and the light press intensity threshold is sometimes referred to as detecting the contact on the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input). In some embodiments, the respective operation is performed in response to detecting the increase in intensity of the respective contact above the press-input intensity threshold (e.g., a "down stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. Contact 562 is maintained on touch-sensitive surface 560. The device determines that the intensity of contact 562 peaked above the deep press intensity threshold (e.g., "$IT_D$"). In some embodiments, the intensity, which is compared to the one or more intensity thresholds, is the characteristic intensity of a contact. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. Representations 578A-578C form an array above icon 572B. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). In some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances). In some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input).

For ease of explanation, the descriptions of operations performed in response to a press input associated with a press-input intensity threshold or in response to a gesture including the press input are, optionally, triggered in response to detecting either: an increase in intensity of a contact from an intensity below the hysteresis intensity threshold to an intensity above the press-input intensity threshold, an increase in intensity of a contact above the press-input intensity threshold, a decrease in intensity of the contact below the hysteresis intensity threshold corresponding to the press-input intensity threshold, and/or a decrease in intensity of the contact below the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, electronic device 500 includes one or more tactile output generators, where the one or more tactile output generators generate different types of tactile output sequences, as described below in Table 1. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output.

Figure 5J:
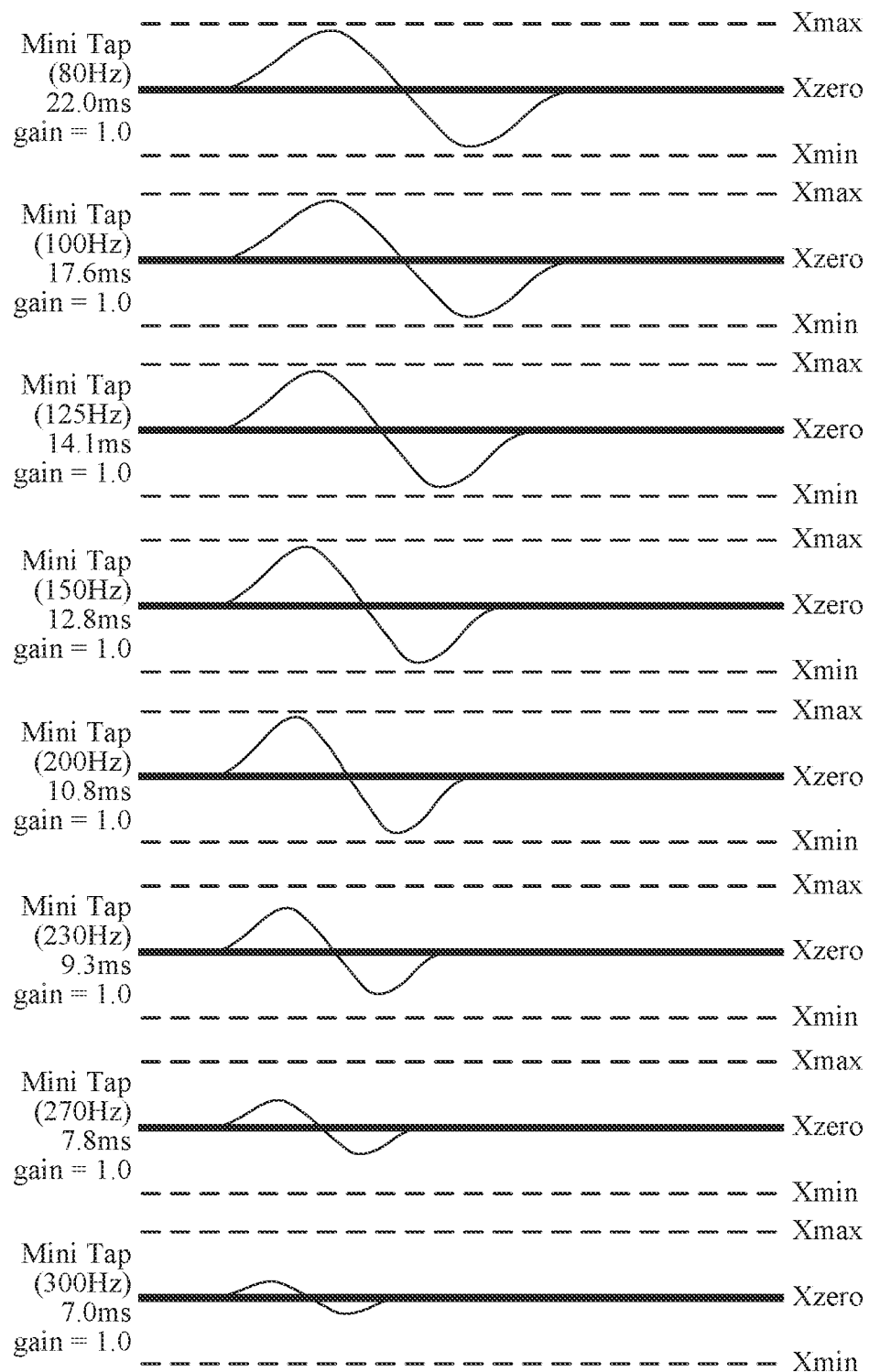
Figure 5K:
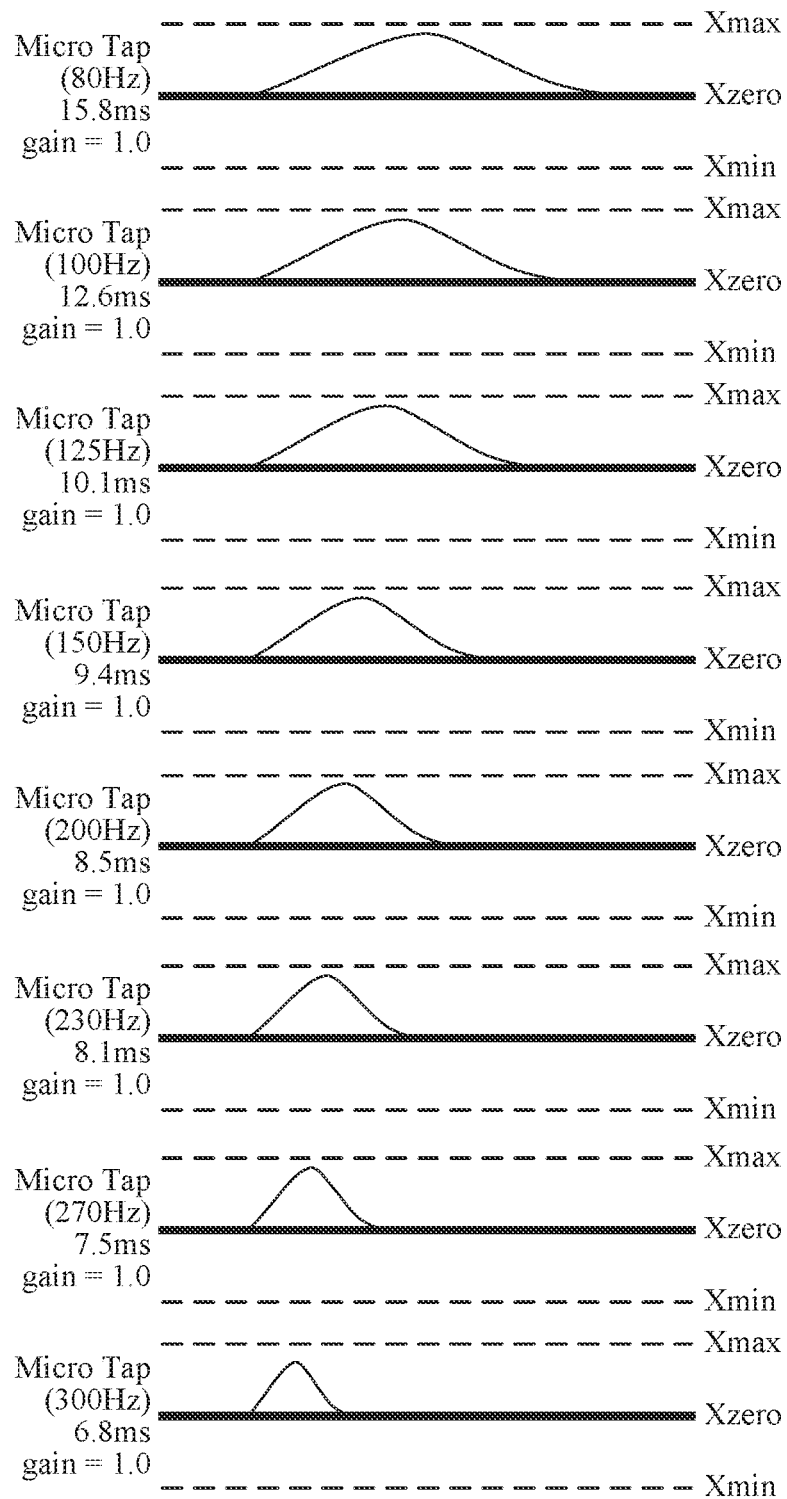
Figure 5L:
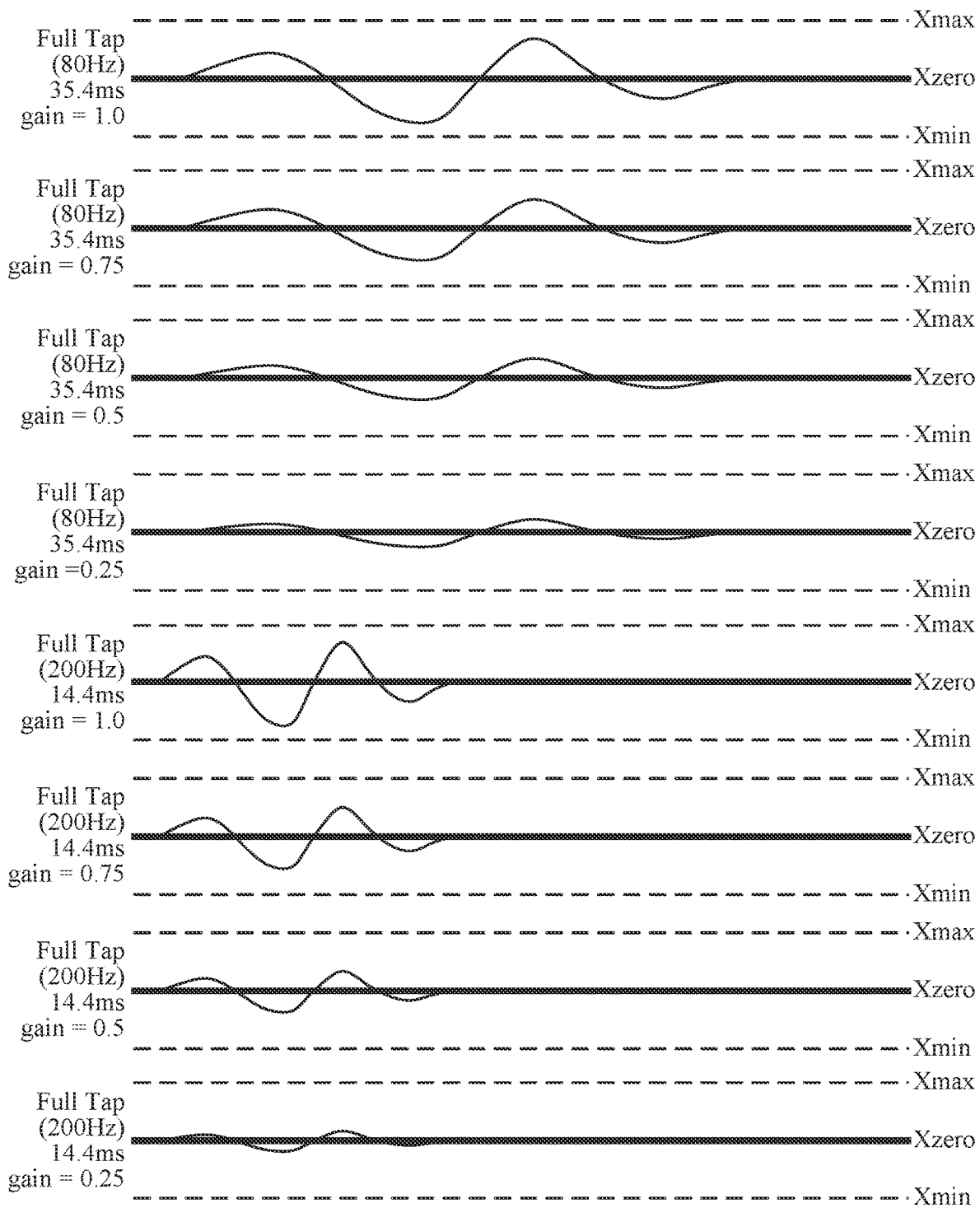
Figure 5M:
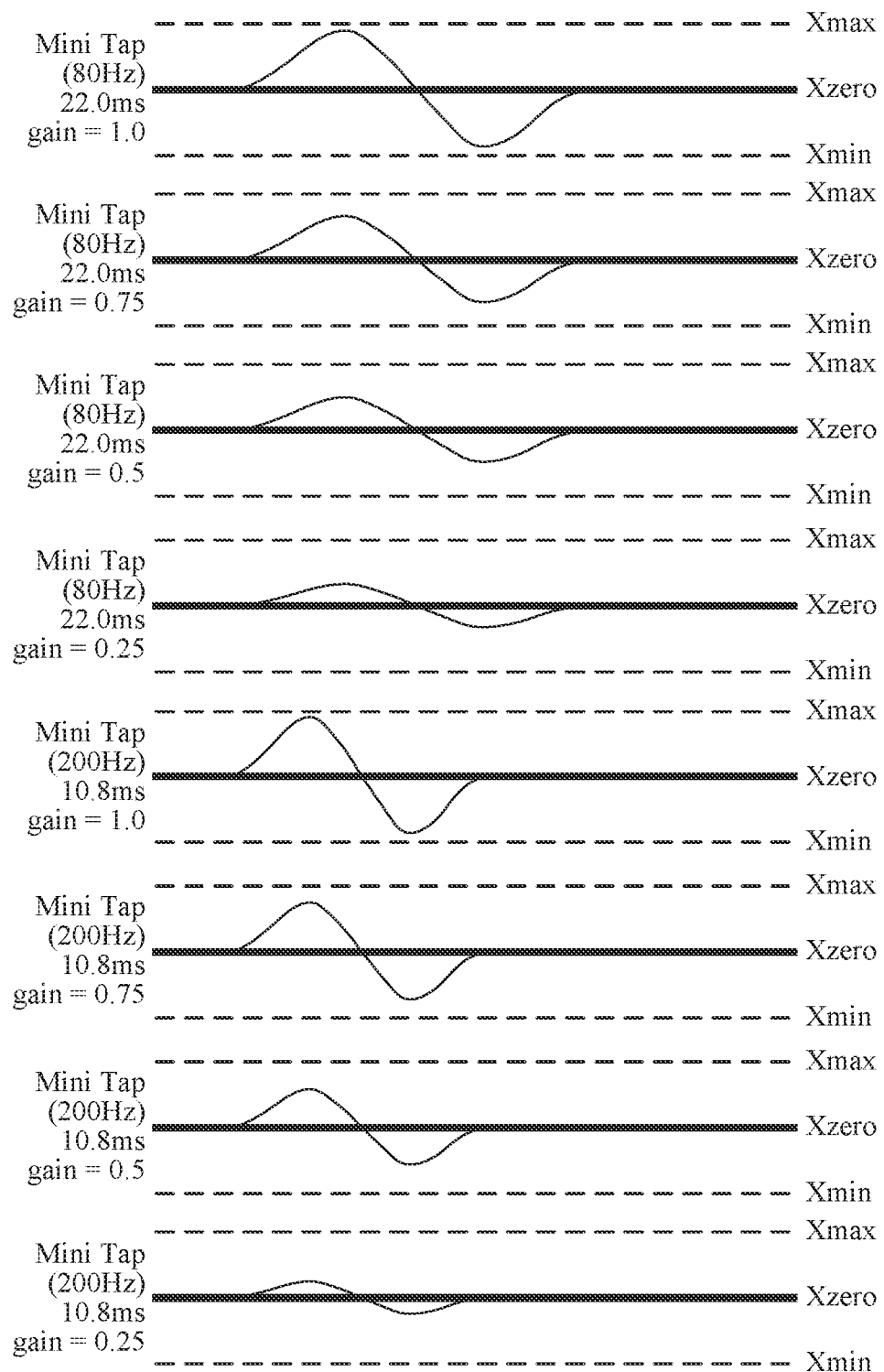
Figure 5N:
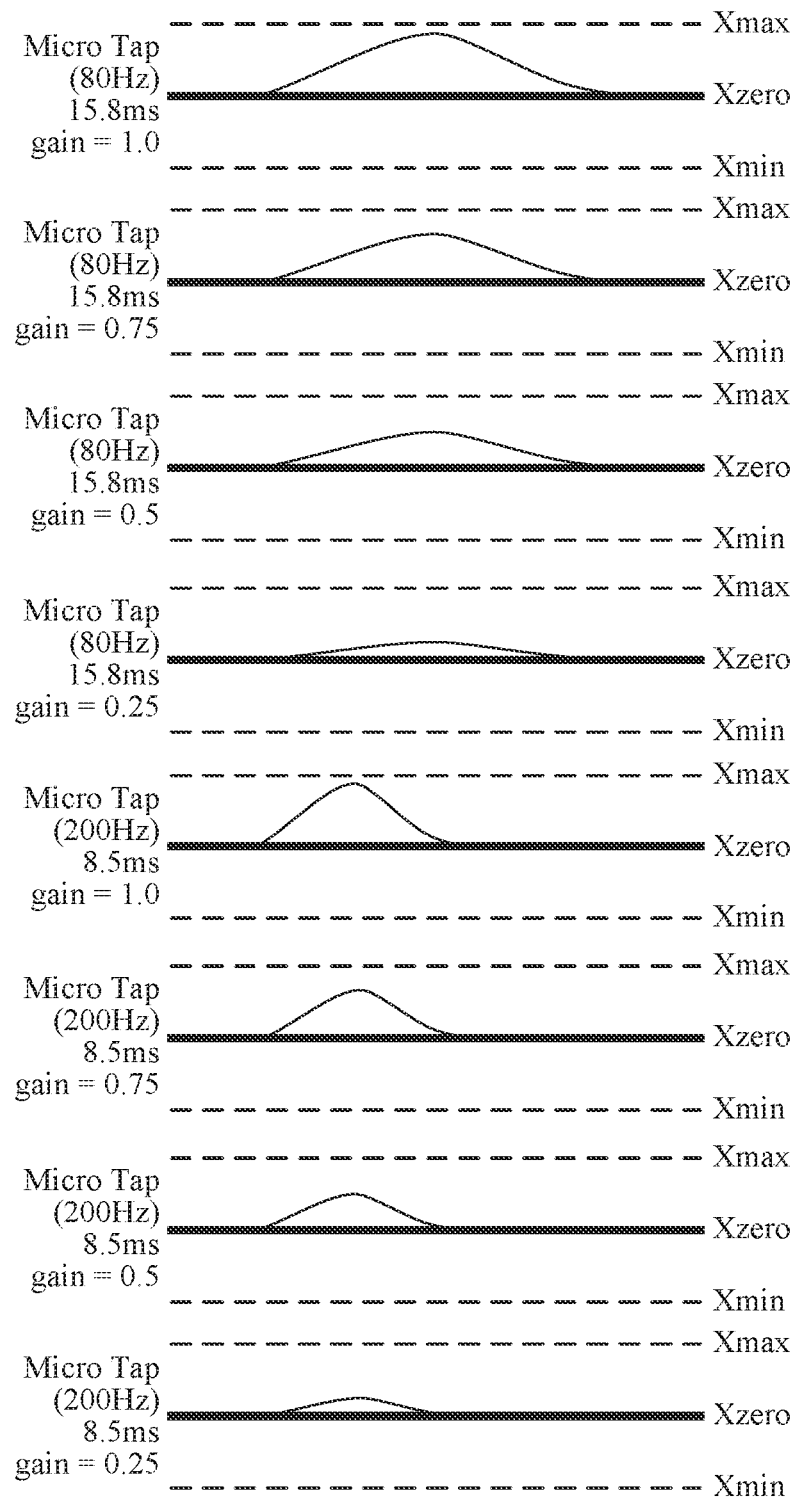

More specifically, FIGS. 5I-5K provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5L-5N, which are each shown with variants having a gain of 1.0, 0.75, 0.5, and 0.25. This example of a palette of tactile outputs shows how a set of three waveforms and eight frequencies can be used to produce an array of tactile output patterns. As shown in FIGS. 5L-5N, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230

Hz, 270 Hz, and 300 Hz are lower than the amplitudes of the FullTap at 80 Hz, 100 Hz, 125 Nz, and 200 Hz).

FIGS. 5I-5N show tactile output patterns that have a particular waveform. The waveform of a tactile output pattern represents the pattern of physical displacements relative to a neutral position (e.g., Xzero) versus time that a moveable mass goes through to generate a tactile output with that tactile output pattern. The example waveforms shown in FIGS. 5I-5N include Xmin and Xmax values which represent the maximum and minimum extent of movement of the moveable mass. For larger electronic devices with larger moveable masses, there may be larger or smaller minimum and maximum extents of movement of the mass. The examples shown in FIGS. 5I-5N describe movement of a mass in one dimension, however similar principles would also apply to movement of a moveable mass in two or three dimensions. For example, a first set of tactile output patterns shown in FIG. 5I (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 5J (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 5K (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output.

As shown in FIGS. 5I-5K, each tactile output pattern also has a corresponding characteristic frequency that affects the "pitch" of a haptic sensation that is felt by a user from a tactile output with that characteristic frequency. For a discrete tactile output, a discrete output signal (e.g., with 0.5, 1, or 2 cycles) is generated, and the characteristic frequency value specifies how fast the moveable mass needs to move to generate a tactile output with that characteristic frequency. For a continuous tactile output, the characteristic frequency represents the number of cycles that are completed within a given period of time (e.g., cycles per second) by the moveable mass of the tactile output generator. As shown in FIGS. 5I-5N, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 5I). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 5I-5K, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, the characteristic amplitude of a tactile output pattern refers to an absolute or normalized value that represents the maximum displacement of the moveable mass from a neutral position when generating the tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific amplitudes, frequencies, and waveforms are represented in the sample tactile output patterns in FIGS. 5I-5K for illustrative purposes, tactile output patterns with other amplitudes, frequencies, and waveforms may be used for similar purposes. Other frequencies in the range of 60 Hz-400 Hz may be used as well. For example, waveforms that have between 0.5 to 4 cycles can be used. Table 1 below provides representative examples of tactile output/haptic feedback behaviors and configurations, and examples of their use with respect to the user interfaces for managing content-based tactile outputs that are illustrated and described herein.

TABLE 1

Figure 6A:
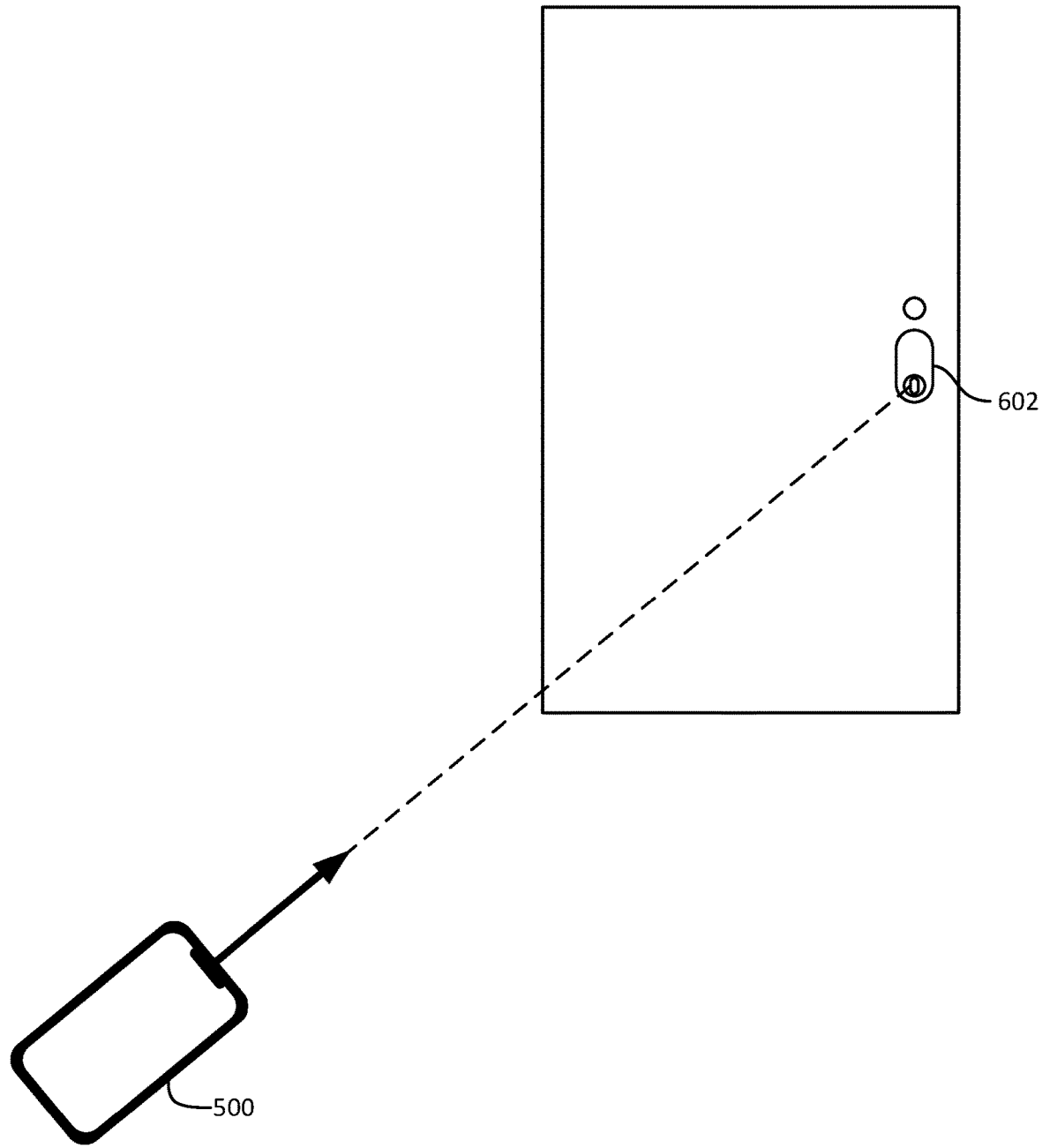
FIGS. 6A-6DD illustrate exemplary ways in which an electronic device generates a tactile output sequence in response to detecting that the electronic device is oriented within a range of orientations that changes as the distance between the electronic device and a respective object changes in accordance with some embodiments of the disclosure.
Figure 6B:
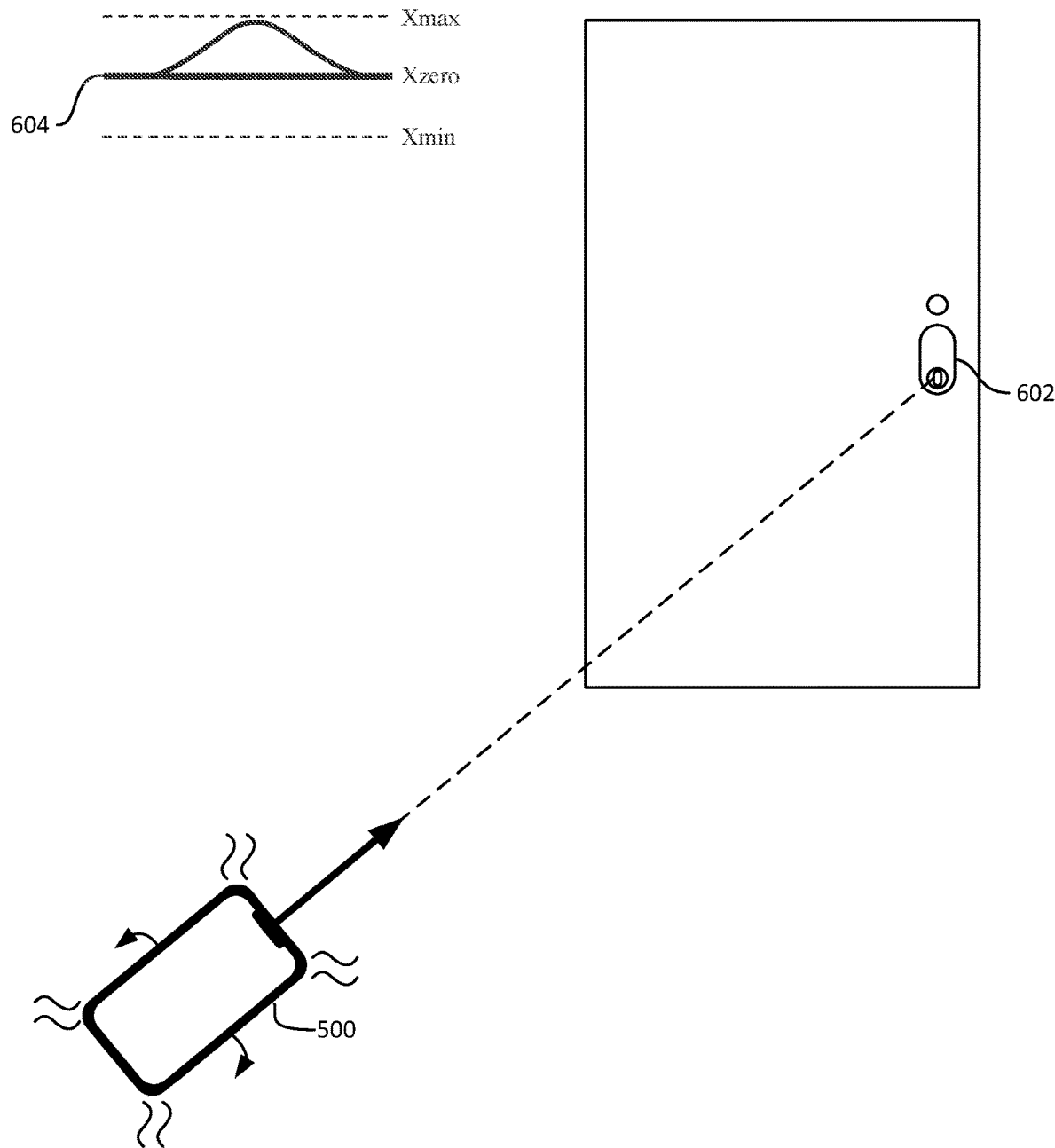
Figure 6C:
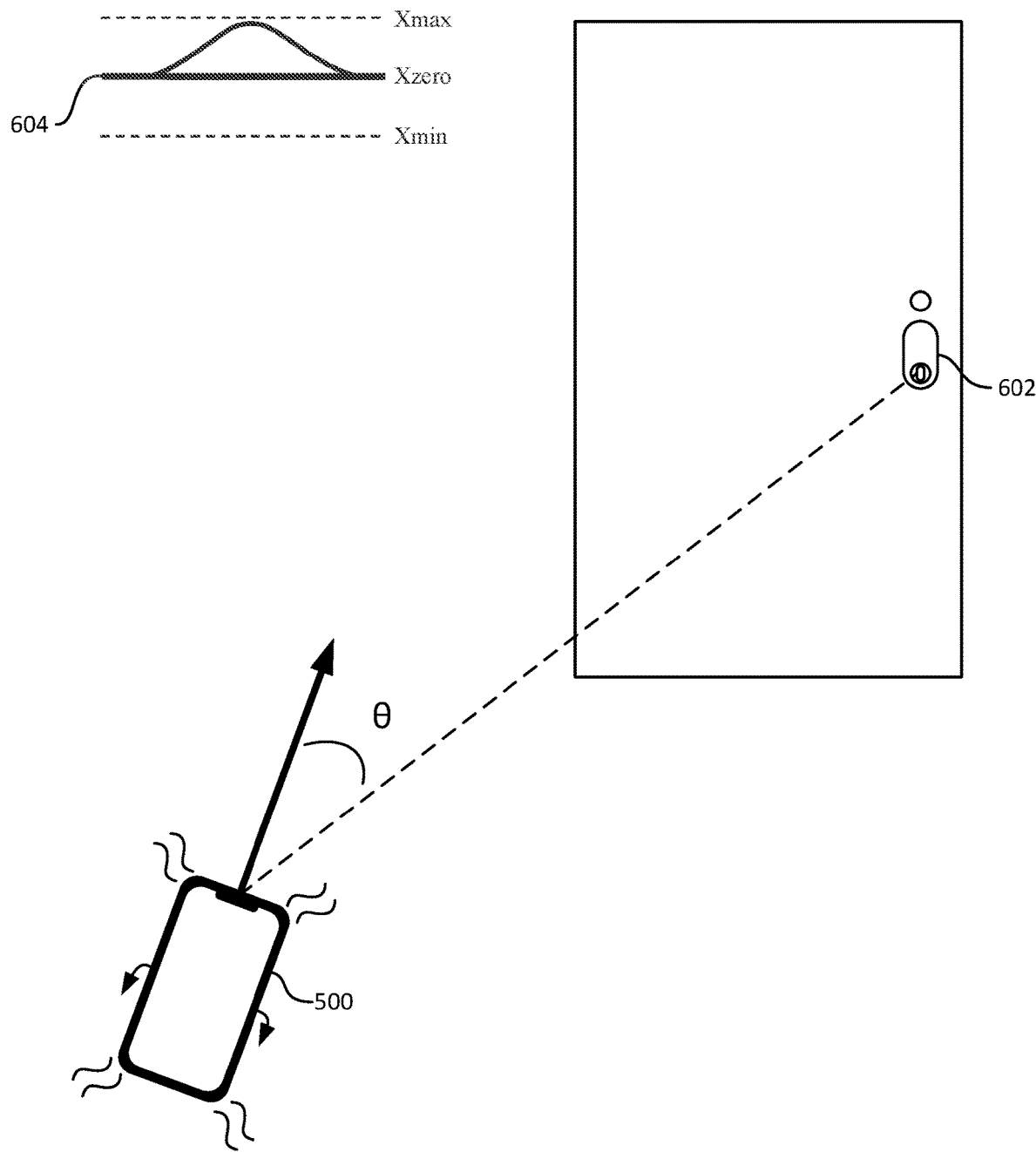
Figure 6D:
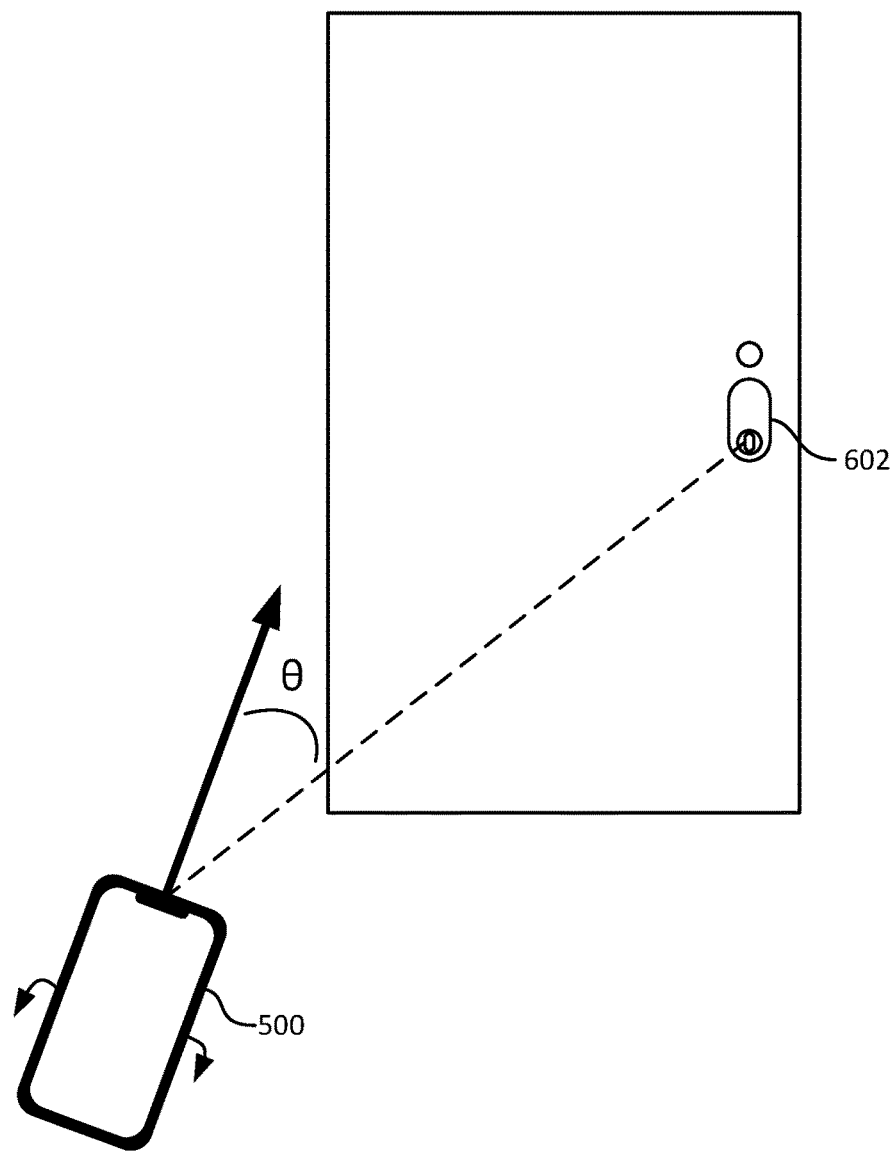
Figure 6E:
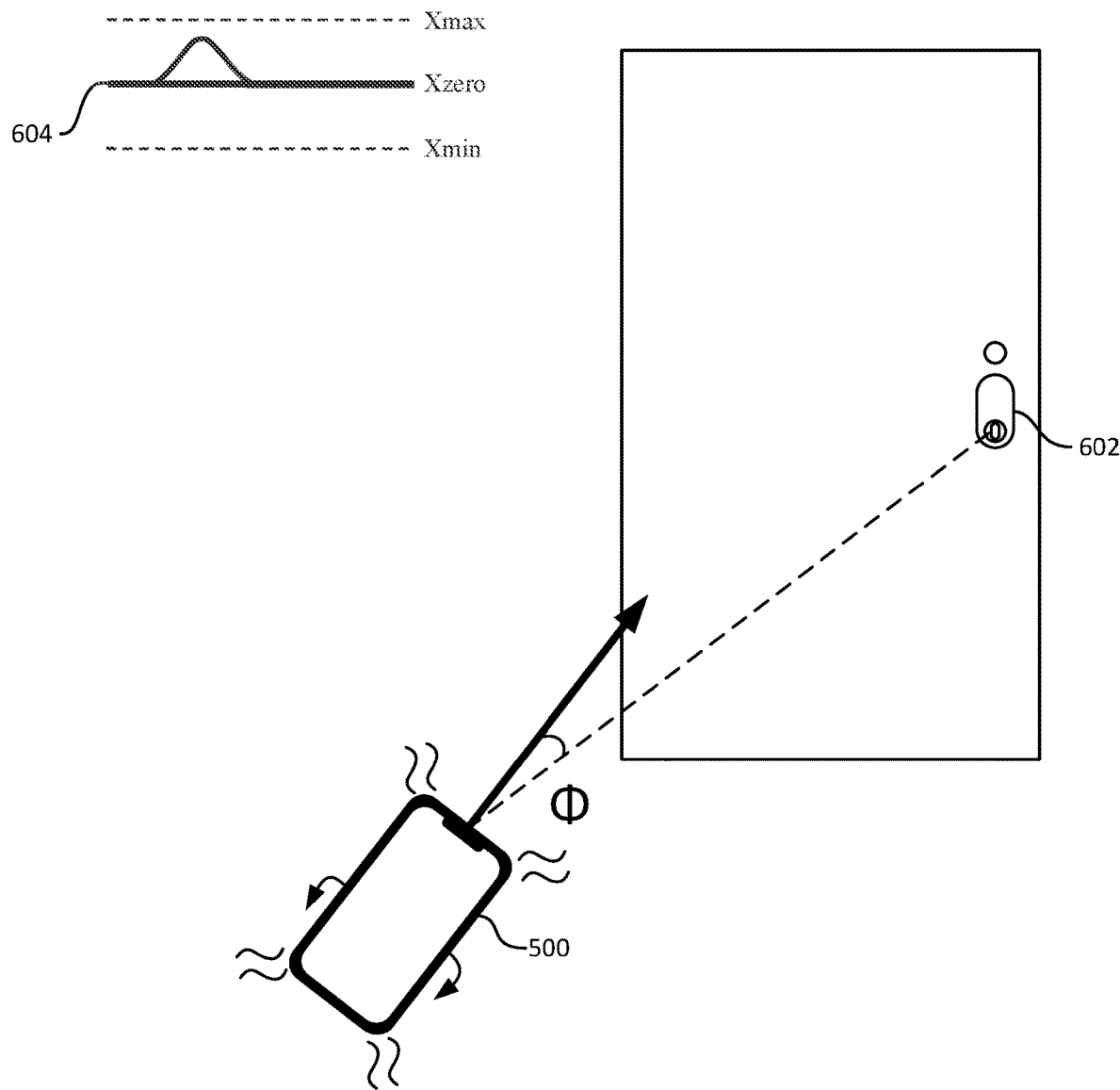
Figure 6F:
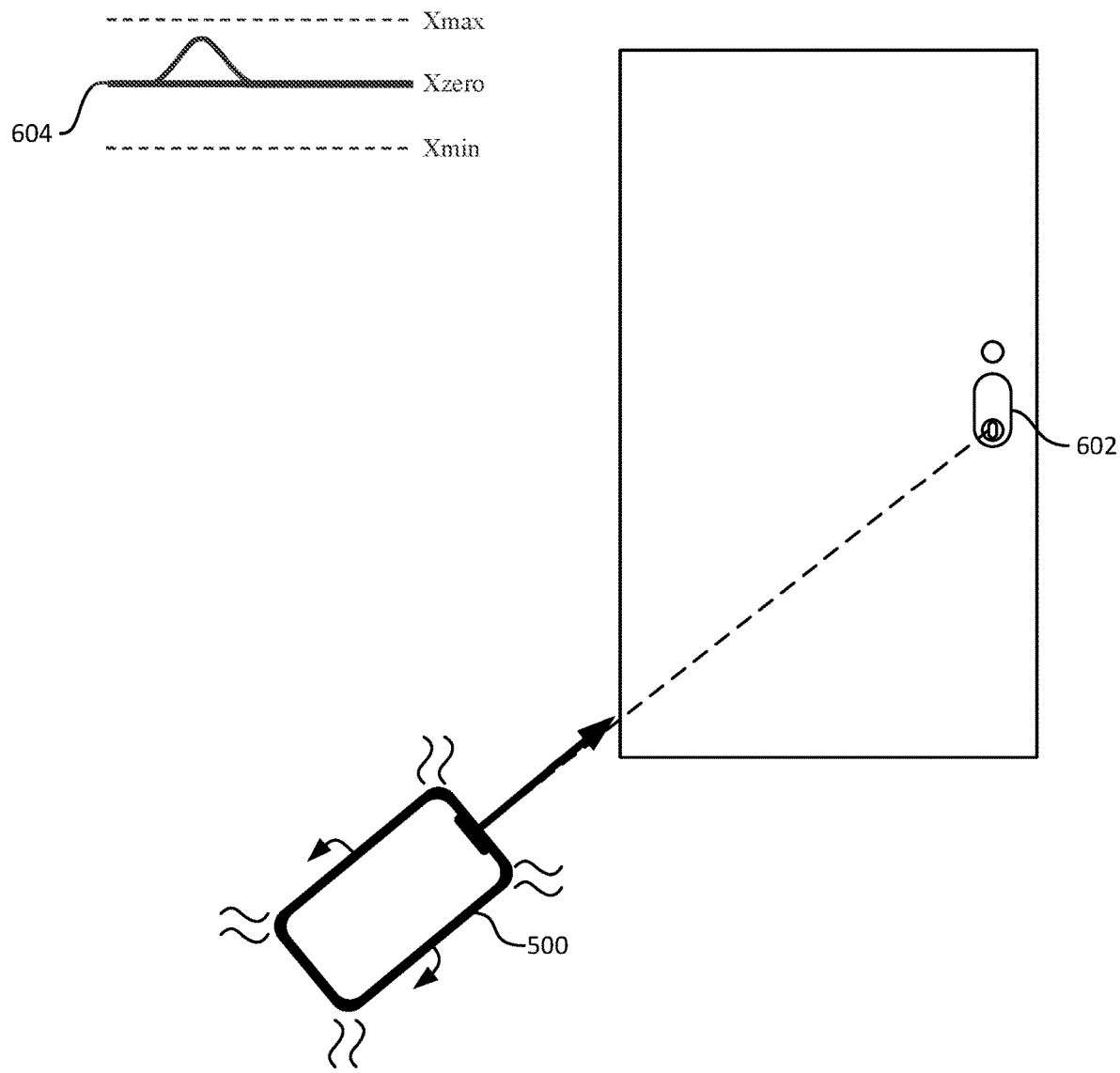
Figure 6G:
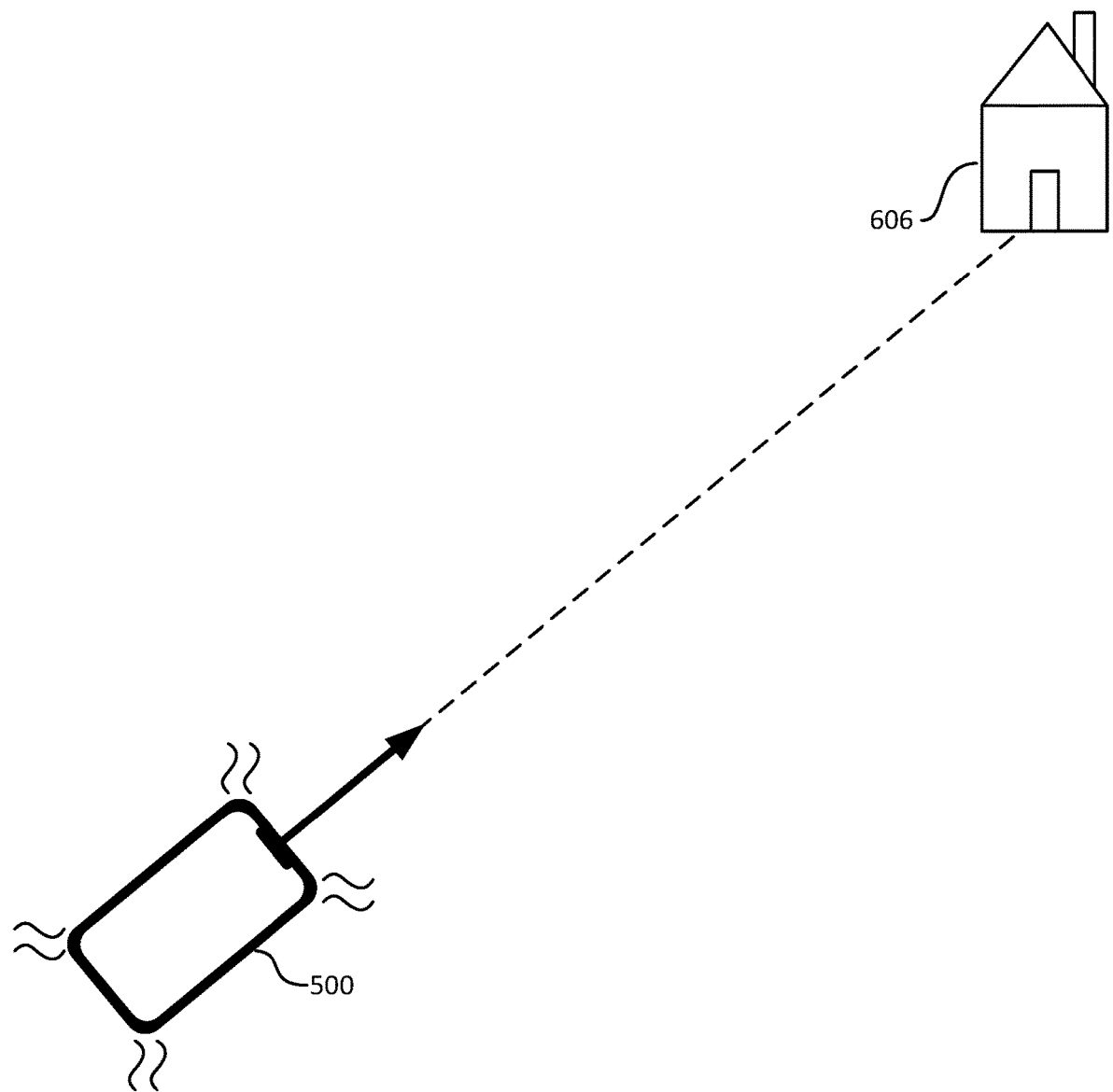
Figure 6H:
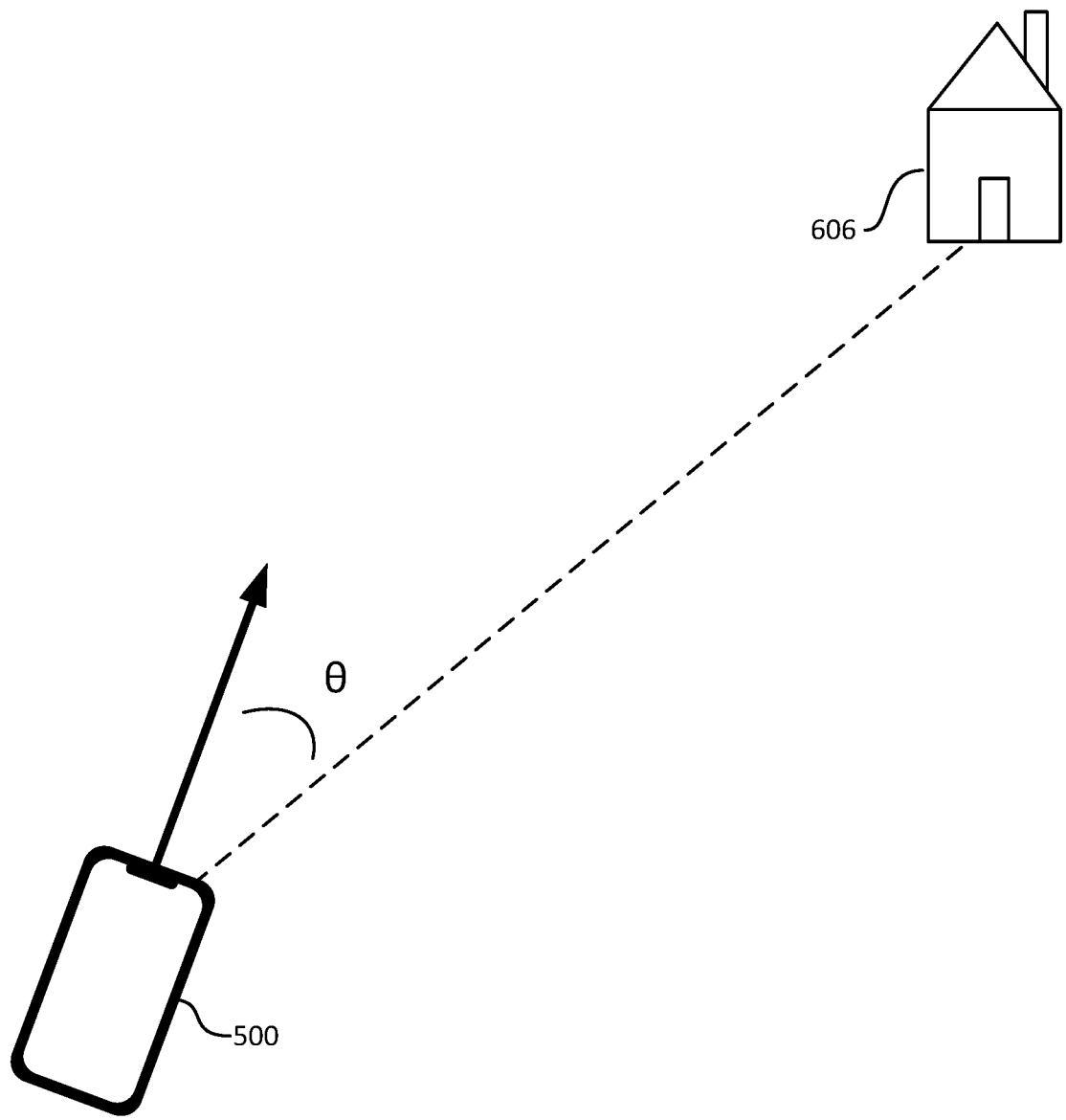
Figure 6I:
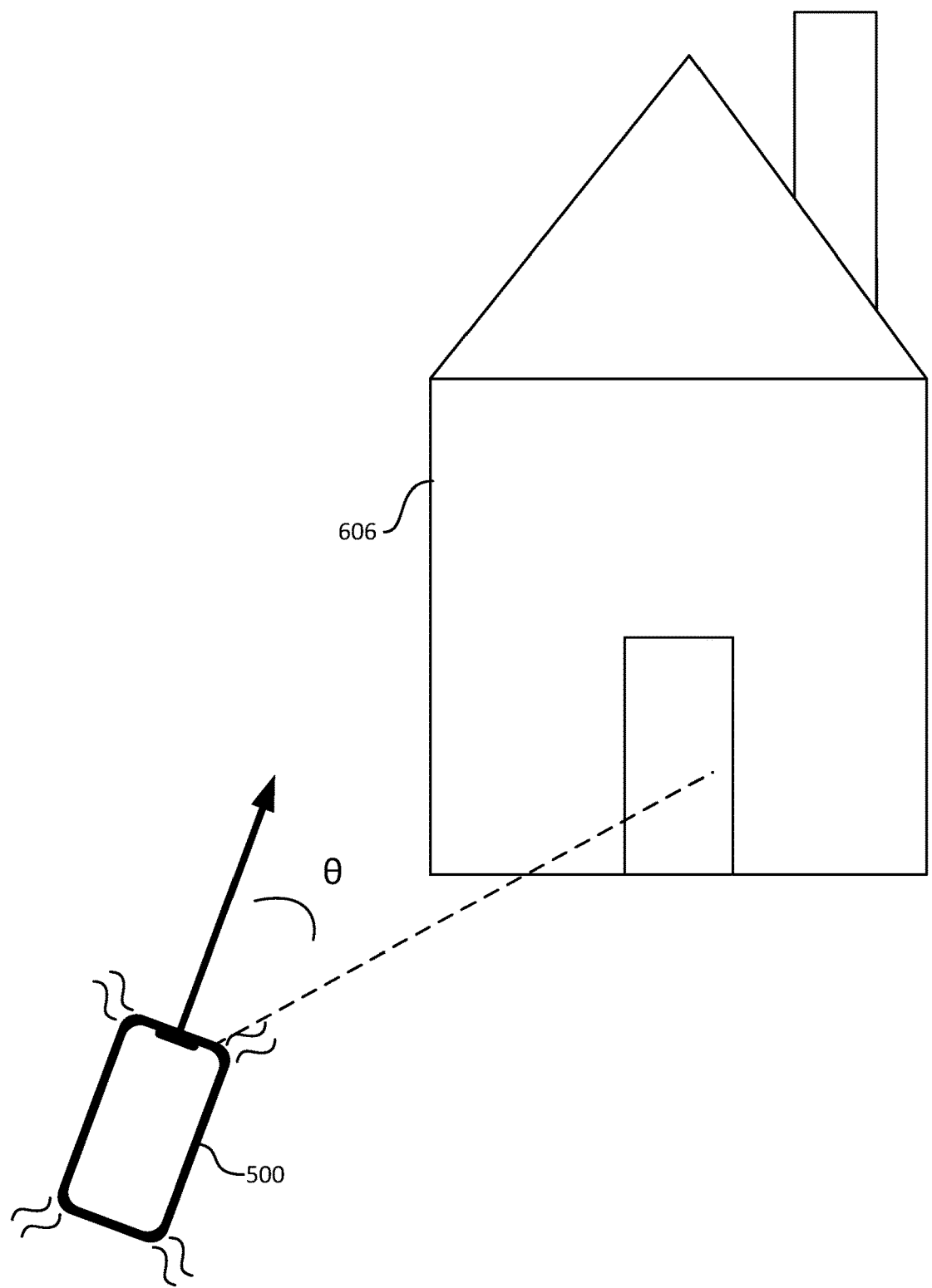
Figure 6J:
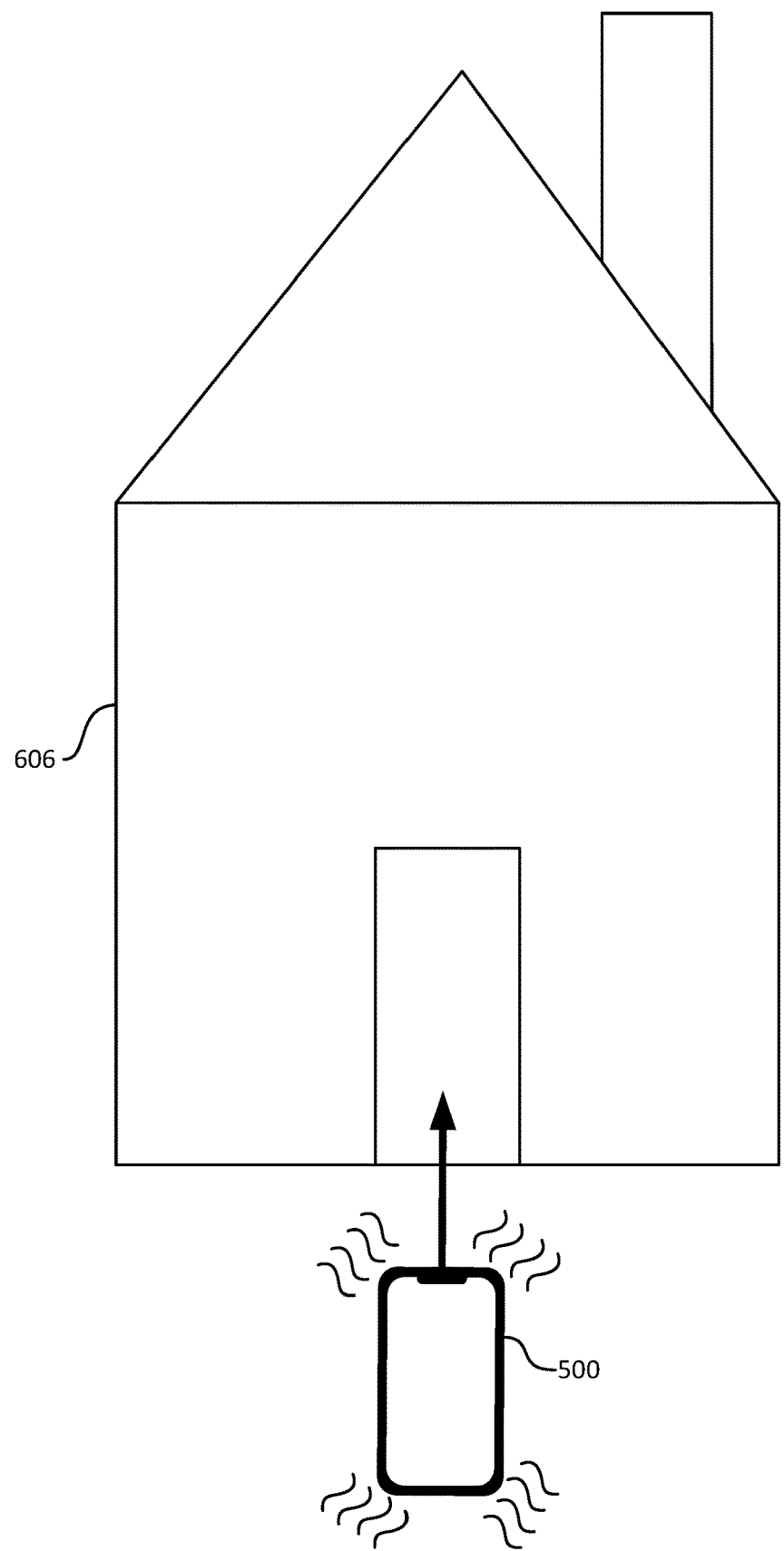
Figure 8A:
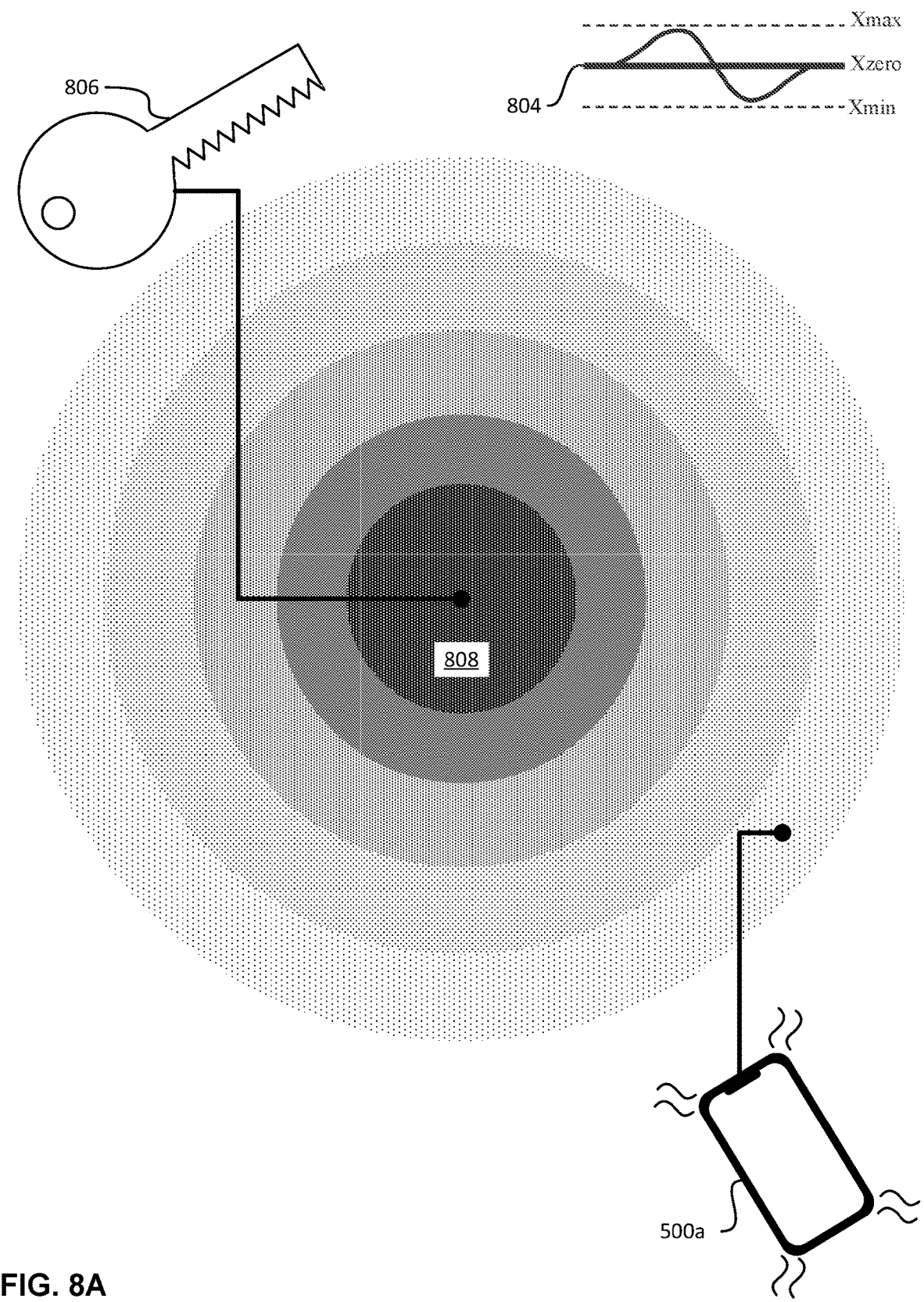
FIGS. 8A-8EE illustrate exemplary ways an electronic device changes one or more characteristics of a tactile output in response to detecting a change in the orientation of the electronic device relative to a respective object in accordance with some embodiments of the disclosure.
Figure 8B:
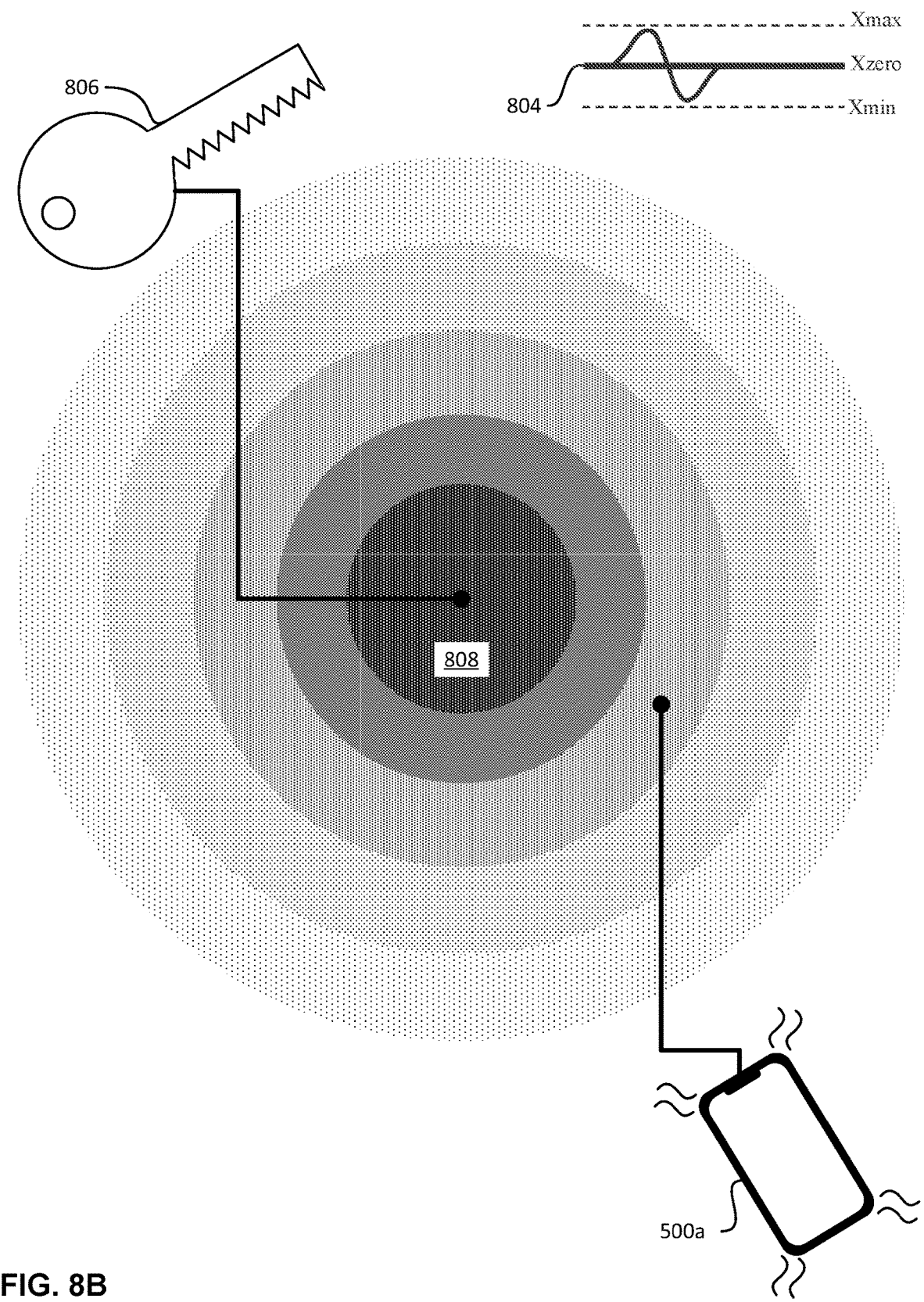

| Type of Tactile Output Sequence | Waveform | Textural (continuous) or Discrete | Example |
| --- | --- | --- | --- |
| "Major" | MiniTap at 180 Hz | Discrete | FIG. 6J |
| "Minor" | MicroTap at 80 Hz | Textural | FIG. 6B |
| "Major-reduced" | MiniTap at 200 Hz | Discrete | FIG. 8B |
| "Minor-Reduced" | MicroTap at 200 Hz | Discrete | FIG. 10A |

In some embodiments, a downloaded application becomes an installed application by way of an installation program that extracts program portions from a downloaded package and integrates the extracted portions with the operating system of the computer system. As used herein, an "installed application" refers to a software application that has been downloaded onto an electronic device (e.g., devices 100, 300, and/or 500) and is ready to be launched (e.g., become opened) on the device.

As used herein, the terms "executing application" or "open application" refer to a software application with retained state information (e.g., as part of device/global internal state 157 and/or application internal state 192). An open or executing application is, optionally, any one of the following types of applications:
- an active application, which is currently displayed on a display screen of the device that the application is being used on;
- a suspended or hibernated application, which is not running, but has state information that is stored in memory (volatile and non-volatile, respectively) and that can be used to resume execution of the application; and
- a background application (or background processes), which is not currently displayed, but one or more processes for the application are being processed by one or more processors.

Generally, opening a second application while in a first application does not close the first application. When the second application is displayed and the first application ceases to be displayed, the first application becomes a background application. As used herein, the term "closed application" refers to software applications without retained state information (e.g., state information for closed applications is not stored in a memory of the device). Accordingly, closing an application includes stopping and/or removing application processes for the application and removing state information for the application from the memory of the device.

Attention is now directed towards embodiments of user interfaces ("UI") and associated processes that are implemented on an electronic device, such as portable multifunction device 100, device 300, or device 500.

User Interfaces and Associated Processes

Generating a Tactile Output within a Range of Orientations that Changes with Respect to Distance from a Respective Object Users interact with electronic devices in many different manners, including locating respective objects using the electronic device. The embodiments described below provide ways in which an electronic device generates a tactile output indicative of a range of orientations of the electronic device relative to the respective object, wherein the range of orientations changes as the distance between the electronic device and the respective object changes. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6DD illustrate exemplary ways in which an electronic device 500 generates a tactile output sequence in response to detecting that the electronic device 500 is oriented within a range of orientations that changes as the distance between the electronic device 500 and a respective object changes in accordance with some embodiments of the disclosure. The embodiments in these figures are used to illustrate the processes described below, including the processes described with reference to FIGS. 7A-7E.

FIGS. 6A-6F illustrate the electronic device 500 generating a tactile output sequence for a range of orientations that gets smaller as the distance between the electronic device 500 and a smart lock 602 gets smaller. In FIG. 6A, the electronic device 500 is oriented towards a smart lock 602. The electronic device 500 is in communication with the smart lock 602 and is able to interact with (e.g., lock or unlock) the smart lock. While the electronic device 500 is oriented towards the smart lock and is not moving, the electronic device 500 does not generate a tactile output sequence indicative of the smart lock 602 because the electronic device 500 is not moving.

As shown in FIG. 6B, once the electronic device 500 is moving, such as moving in a scanning motion executed by the user (e.g., a left-right scanning motion). In response to detecting that the electronic device 500 is moving and is oriented towards the smart lock 602 and is at a particular distance from the smart lock 602, the electronic device 500 generates a tactile output sequence 604 (e.g., "minor" tactile output described in Table 1). The tactile output sequence 604 is a continuous textural tactile output with a frequency or pitch that corresponds to the distance between the electronic device 500 and the smart lock 602.

In FIG. 6C, while the electronic device 500 is a distance from the smart lock 602 that is the same as the distance illustrated in FIG. 6B, the electronic device 500 is oriented at an angle θ with respect to directly facing the smart lock 602. The angle θ is within the range of angles at the distance illustrated in FIG. 6C for which the electronic device 500 generates a tactile output sequence associated with the smart lock 602. Thus, the electronic device 500 continues to generate the tactile output sequence 604 described above with reference to FIG. 6B.

As shown in FIG. 6D, the electronic device 500 moves closer to the smart lock 602 while oriented at the angle θ with respect to the smart lock 602. At the distance from the smart lock 602 illustrated in FIG. 6D, the electronic device 500 ceases generating the tactile output sequence when the angle of orientation between the electronic device 500 and the smart lock 602 is 0 because, at the distance illustrated in FIG. 6D, the angle θ is within the range of orientations at which the electronic device 500 generates a tactile output indicative of smart lock 602.

In FIG. 6E, the electronic device 500 changes its orientation relative to the smart lock 602 while remaining the same distance from the smart lock 602 as the distance illustrated in FIG. 6D. While the electronic device 500 is oriented at an angle Φ from the smart lock 602 that is less than the angle θ illustrated in FIG. 6D, the electronic device 500 generates a tactile output sequence 604 (e.g., a "minor" tactile output sequence discussed above with reference to Table 1) associated with the electronic device's distance and orientation relative to smart lock 602. Tactile output sequence 604 is a continuous textural tactile output sequence that has a frequency or pitch associated with the distance between the electronic device 500 and the smart lock 602.

The frequency of tactile output sequence 604 illustrated in FIG. 6E is higher than the frequency of the tactile output sequence 604 illustrated in FIG. 6C. Thus, the frequency of the continuous textural tactile output sequence 604 increases as the distance between the electronic device 500 and the smart lock 602 decreases. The range of angles for which the electronic device 500 generates a tactile output sequence 604 decreases as the distance between the electronic device 500 and the smart lock 602 decreases.

As shown in FIG. 6F, the electronic device 500 continues to generate the tactile output 604 when oriented directly towards the smart lock 602. In FIG. 6F, the electronic device 500 is at the same distance from the smart lock 602 as the distance between the electronic device 500 and the smart lock 602 illustrated in FIG. 6E. Thus, the electronic device 500 generates the same continuous textural tactile output sequence 604 as the tactile output sequence 604 illustrated in FIG. 6E.

FIGS. 6G-6J illustrate the electronic device 500 generating a tactile output sequence for a range of orientations that gets larger as the distance between the electronic device 500 and a smart lock 602 gets smaller. In FIG. 6G, the electronic device 500 is oriented towards a navigation destination 606. In response to detecting the orientation and distance of the electronic device 500 relative to the navigation destination 606, the electronic device 500 generates a tactile output sequence, such as a continuous textural tactile output sequence (e.g., a "Minor" tactile output sequence, as described above with reference to Table 1).

In FIG. 6H, the electronic device 500 changes orientation such that there is an angle of θ between the electronic device 500 and the navigation destination 606. As shown in FIG. 6H, the electronic device 500 does not generate a tactile output sequence in response to the electronic device's orientation and distance relative to the navigation destination 606 because the angle θ is outside of the range of orientations for which the electronic device 500 generates a tactile response at the distance from the navigation destination 606 illustrated in FIG. 6H.

In FIG. 6I, the electronic device 500 is a distance from the navigation destination 606 that is less than the distance illustrated in FIG. 6H. The electronic device 500 is oriented at an angle θ from the navigation destination 606. In response to the distance and orientation of the electronic device 500 relative to the navigation destination 606 illustrated in FIG. 6I, the electronic device 500 generates a tactile output sequence (e.g., a "Minor" tactile output sequence discussed with reference to Table 1). The tactile output sequence is a continuous textural tactile output sequence. The electronic device generates the tactile output in FIG. 6I because at the distance illustrated in FIG. 6I, the angle θ is included within the range of orientations at which the electronic device 500 generates a tactile output indicative of navigation destination 606.

In FIG. 6J, the electronic device 500 is within a predetermined threshold distance of the navigation destination 606 (e.g., the electronic device 500 has arrived at the navigation destination 606). In response to the distance and orientation of the electronic device 500 relative to the navigation destination 606 illustrated in FIG. 6J, the electronic device 500 generates a tactile output that is different from the tactile output described above with reference to FIG. 6I. For example, the electronic device generates a discrete tactile output (e.g., a "Major" tactile output described above with reference to Table 1).

Figure 6K:
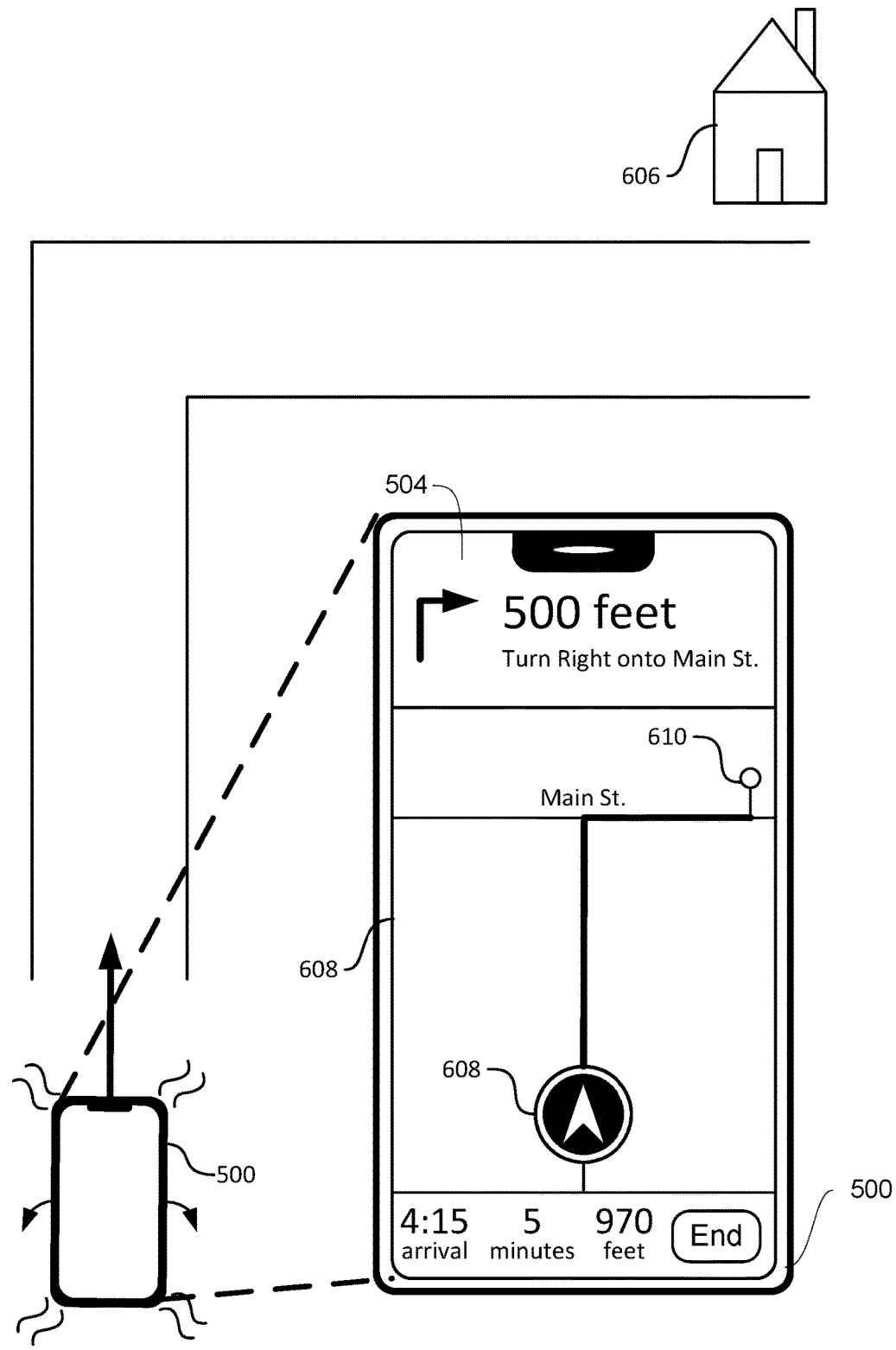

FIGS. 6K-6N illustrate the electronic device 500 generating a tactile output sequence in response to the electronic device's orientation relative to a path to a navigation destination 606. In FIG. 6K, the electronic device 500 presents a maps user interface on the display 504. The maps user interface includes a map 608 illustrating a path from the location 608 of the electronic device 500 to the location 610 of the navigation destination 606. As shown in FIG. 6K, while the electronic device 500 is on the path and oriented along the path to the navigation destination 606 and while the electronic device 500 is moving (e.g., the user is moving the electronic device 500 in a scanning motion, such as a left-right scanning motion), the electronic device 500 generates a tactile output. The tactile output indicates that the electronic device 500 is following the path to the navigation destination 606. The tactile output is a continuous textural tactile output (e.g., a "Minor" tactile output described above with reference to Table 1).

Figure 6L:
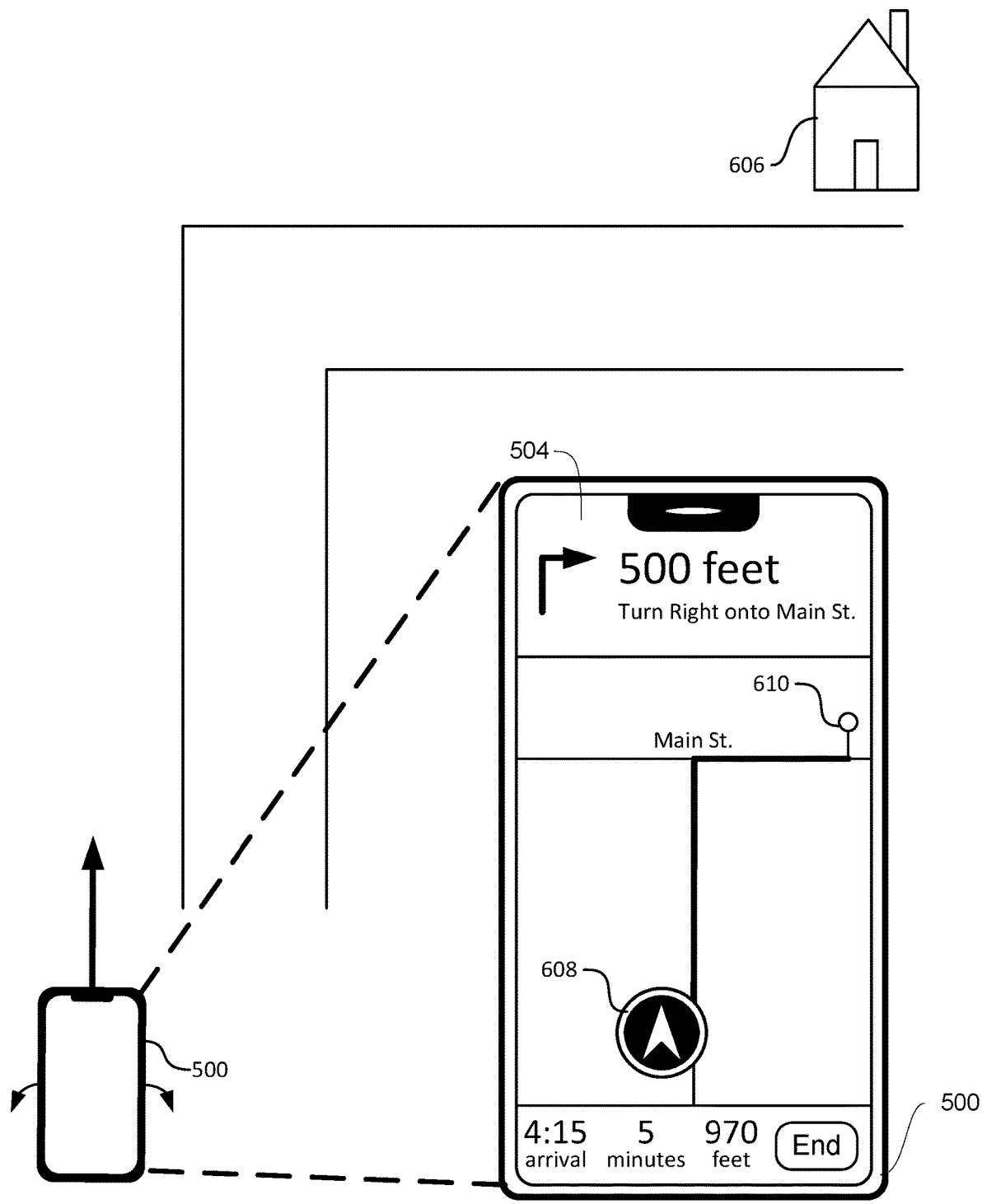

As shown in FIG. 6L, the electronic device 500 does not generate the tactile output when the electronic device 500 is not on the path and therefore not oriented along the path to the navigation destination 606. As shown in FIG. 6L, the indication 608 of the electronic device's current location in the maps user interface has moved to reflect the location and orientation of the electronic device 500 (e.g., to the left of the path to the navigation destination 606).

Figure 6M:
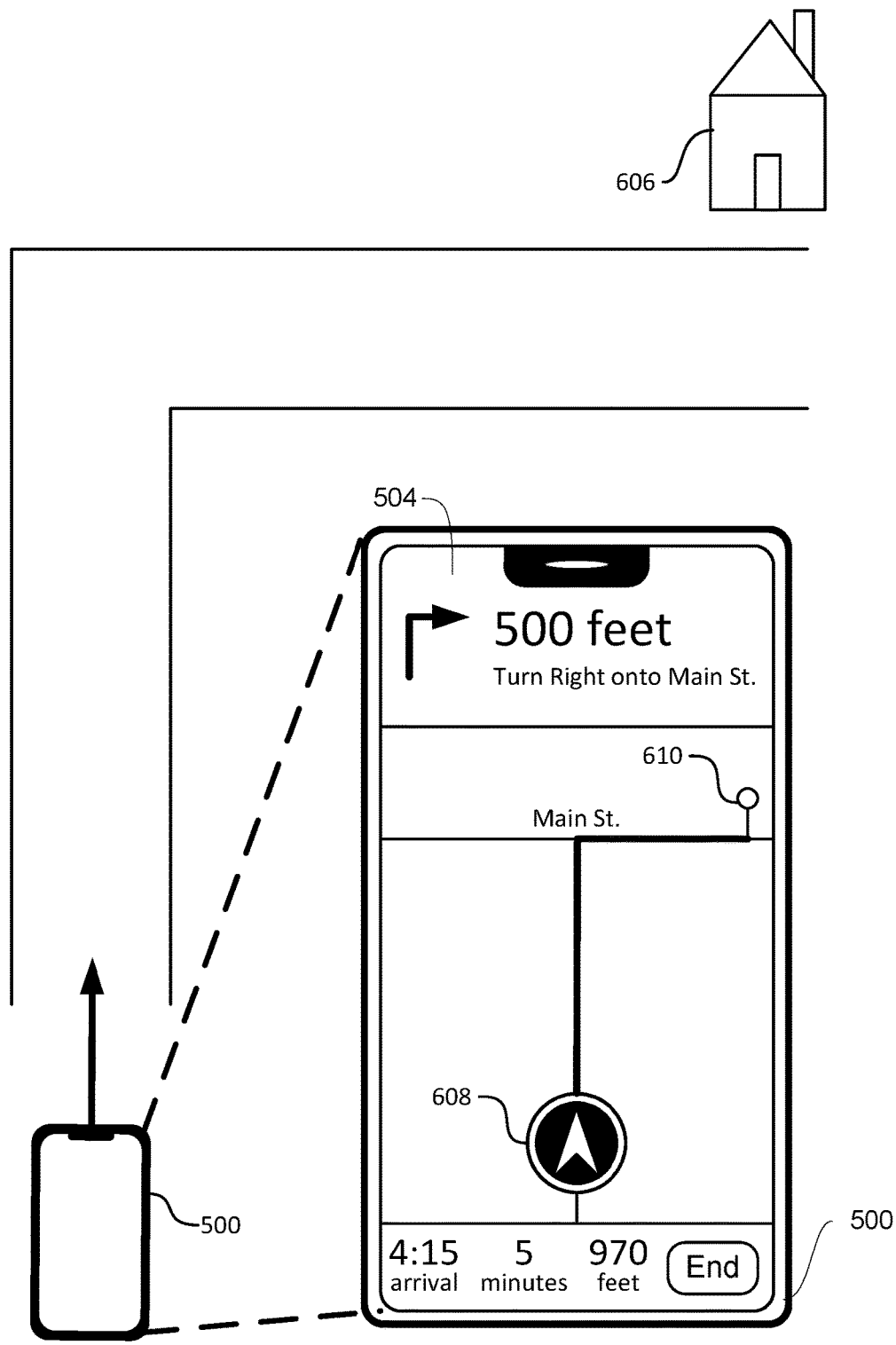

In FIG. 6M, the electronic device 500 is on the path and oriented along the path to the navigation destination 606 while not moving. Because the electronic device 500 is not moving, the electronic device 500 does not generate a tactile output even though the electronic device 500 is oriented towards the path to the navigation destination 606.

Figure 6N:
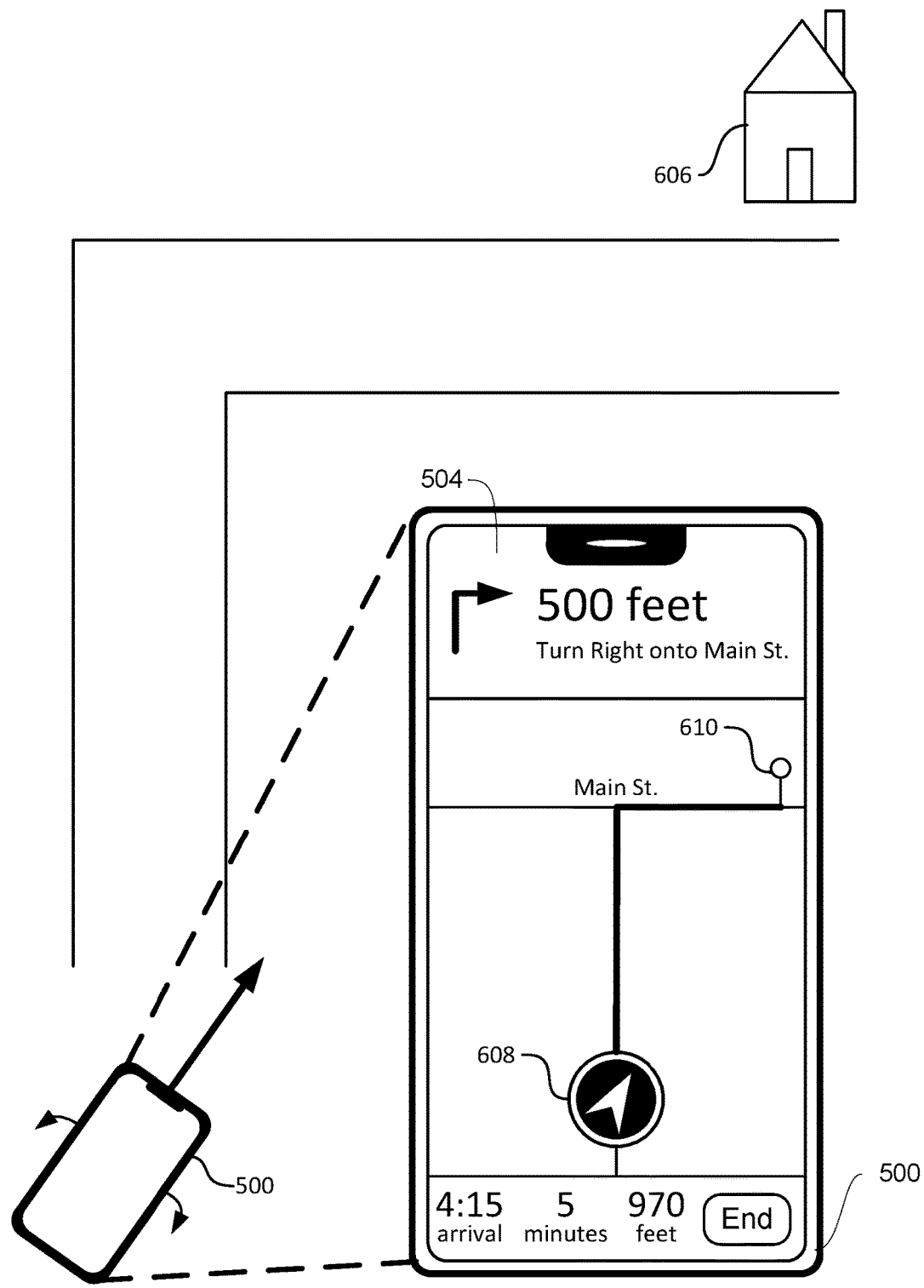

In FIG. 6N, the electronic device 500 is oriented towards the navigation destination 606. The indication 608 of the location and orientation of the electronic device 500 in the maps user interface reflects that the electronic device 500 is oriented towards the navigation destination 606, but not along the path to the navigation destination 606. Because the electronic device 500 is not oriented along the path to the navigation destination, the electronic device 500 does not generate a tactile output, even if the electronic device 500 is moving (e.g., the user is moving the electronic device 500 in a scanning motion).

Figure 6O:
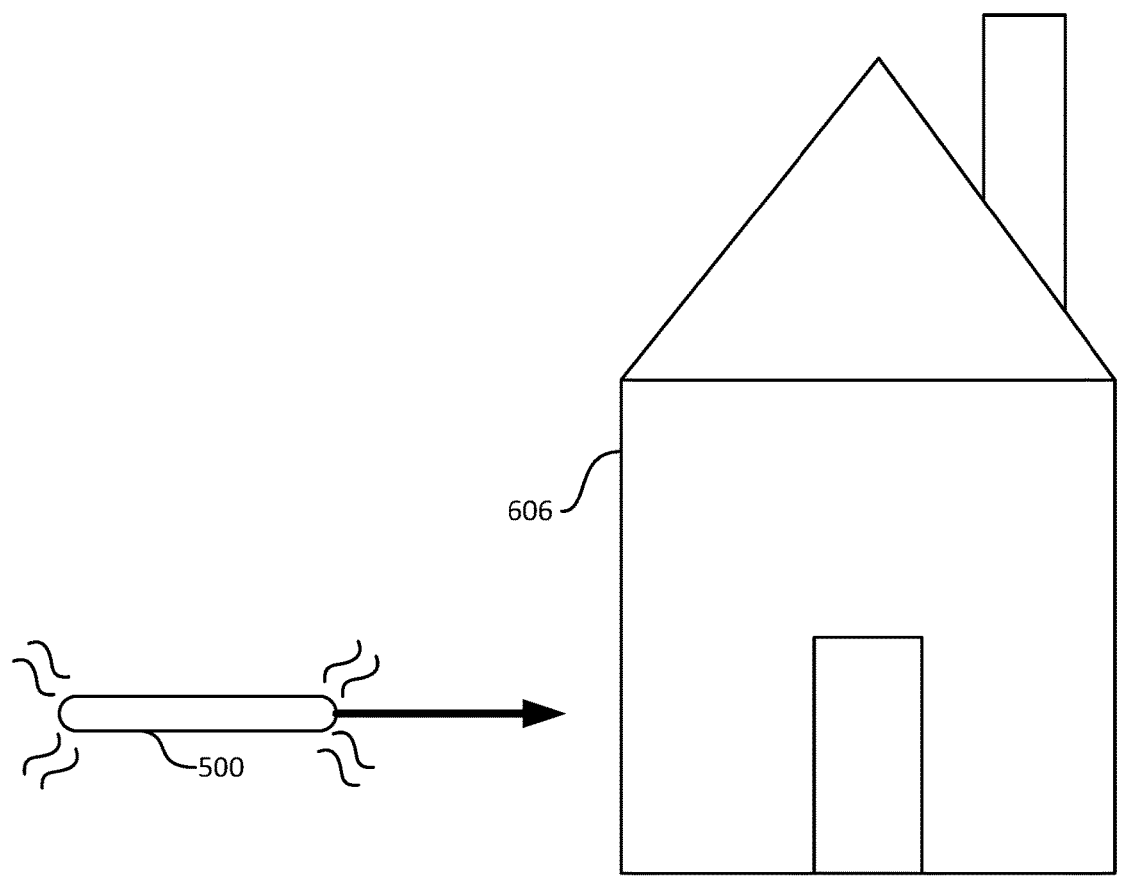
Figure 6P:
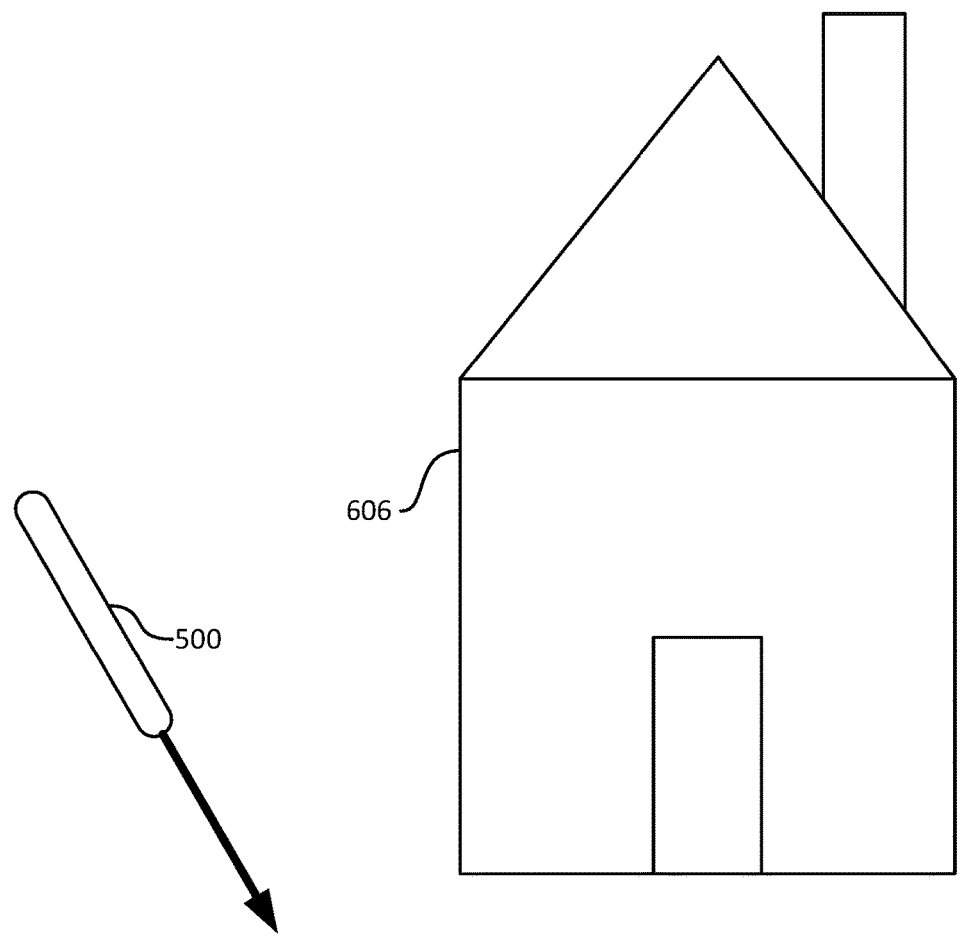

FIGS. 6O-6P illustrate the electronic device 500 generating a tactile output in response to the orientation of the electronic device 500 in three dimensions with respect to a navigation destination 606. In FIG. 6O, the electronic device 500 is oriented towards the navigation destination 606 in three dimensions (e.g., x, y, and z). In response to the electronic device's orientation relative to the navigation destination 606, the electronic device 500 generates a tactile output (e.g., a "Minor" tactile output described above with reference to Table 1).

In FIG. 6P, the electronic device 500 is oriented towards the navigation destination 606 in two dimensions (e.g., x and y) but not in the third dimension (e.g., z). Because the electronic device 500 generates the tactile output sequence in response to being oriented towards the navigation destination 606 in three dimensions, when the electronic device 500 is not oriented towards the navigation destination 606 in one of the three dimensions, the electronic device 500 forgoes generating the tactile output sequence.

Figure 6Q:
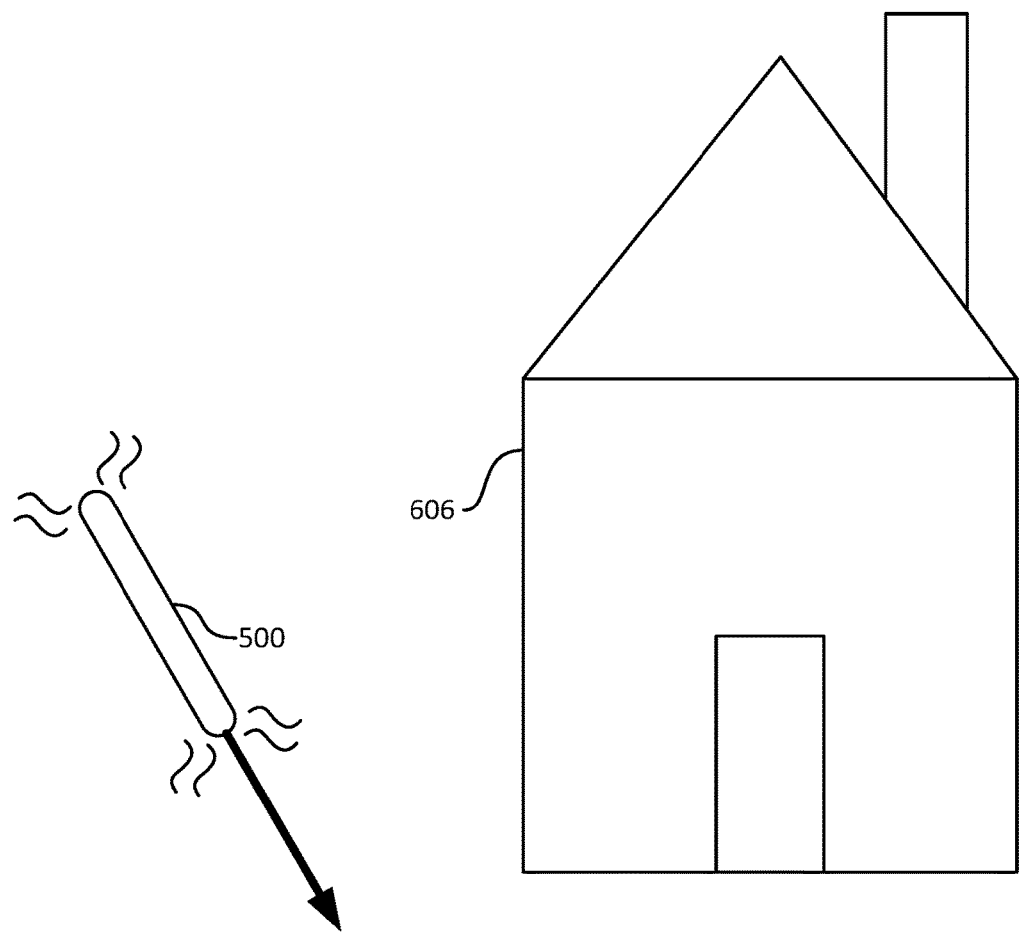

FIG. 6Q illustrates the electronic device 500 generating the tactile output sequence in response to the orientation of the electronic device 500 facing the navigation destination 606 in two of three dimensions (e.g., x and y, but not z). The electronic device 500 generates a continuous textural tactile output (e.g., a "Minor" tactile output described above with reference to Table 1) because the electronic device 500 is oriented towards the navigation destination 606 in two dimensions (e.g., x and y).

FIGS. 6R-6W illustrate the electronic device 500 changing the amplitude or intensity of a textural tactile output sequence as the orientation of the electronic device 500 moves closer to facing a navigation destination 606. As shown in FIGS. 6R-6W, the electronic device 500 generates a discrete tactile output in response to detecting that the orientation of the electronic device 500 is facing the navigation destination 606.

Figure 6R:
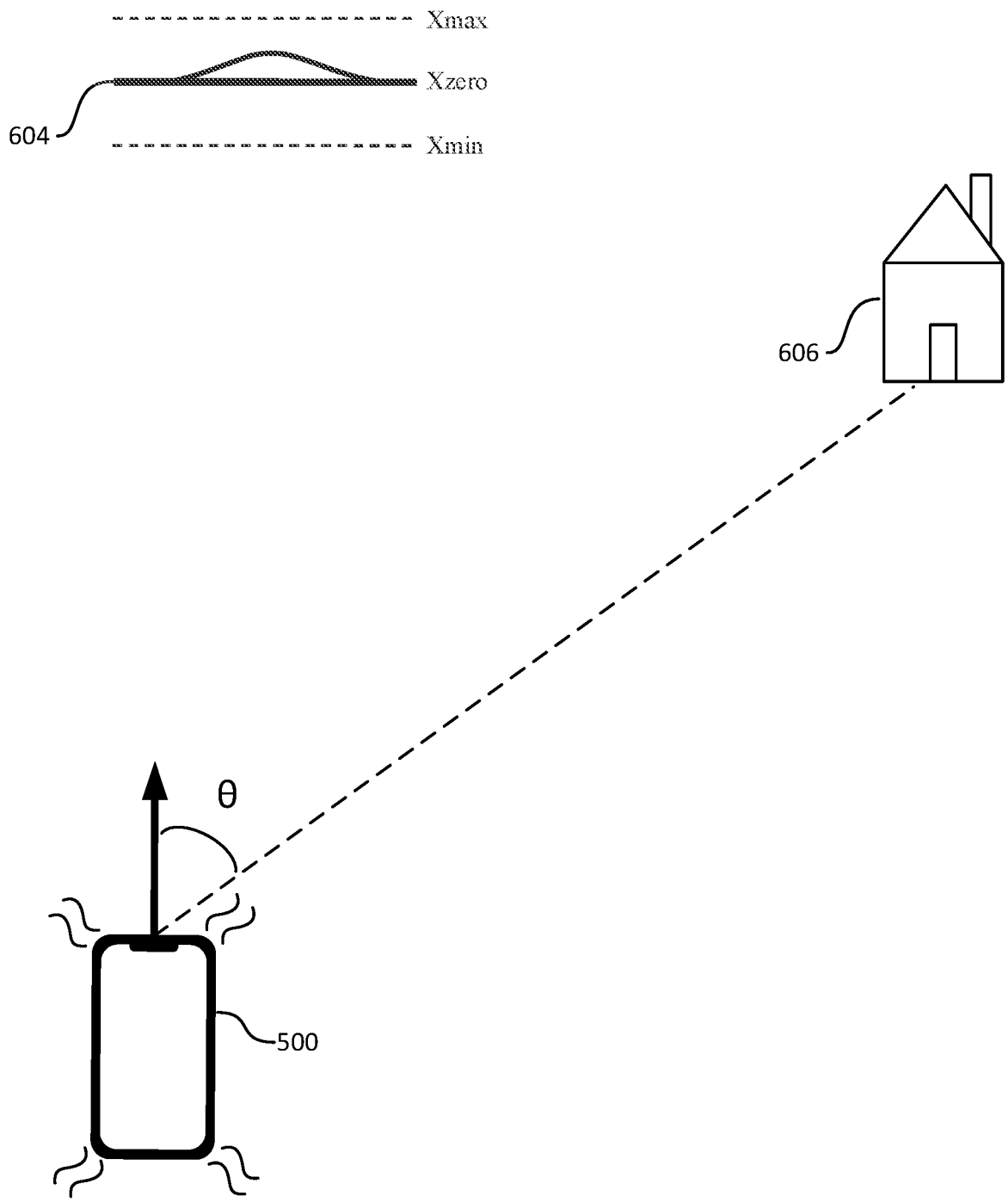
Figure 6S:
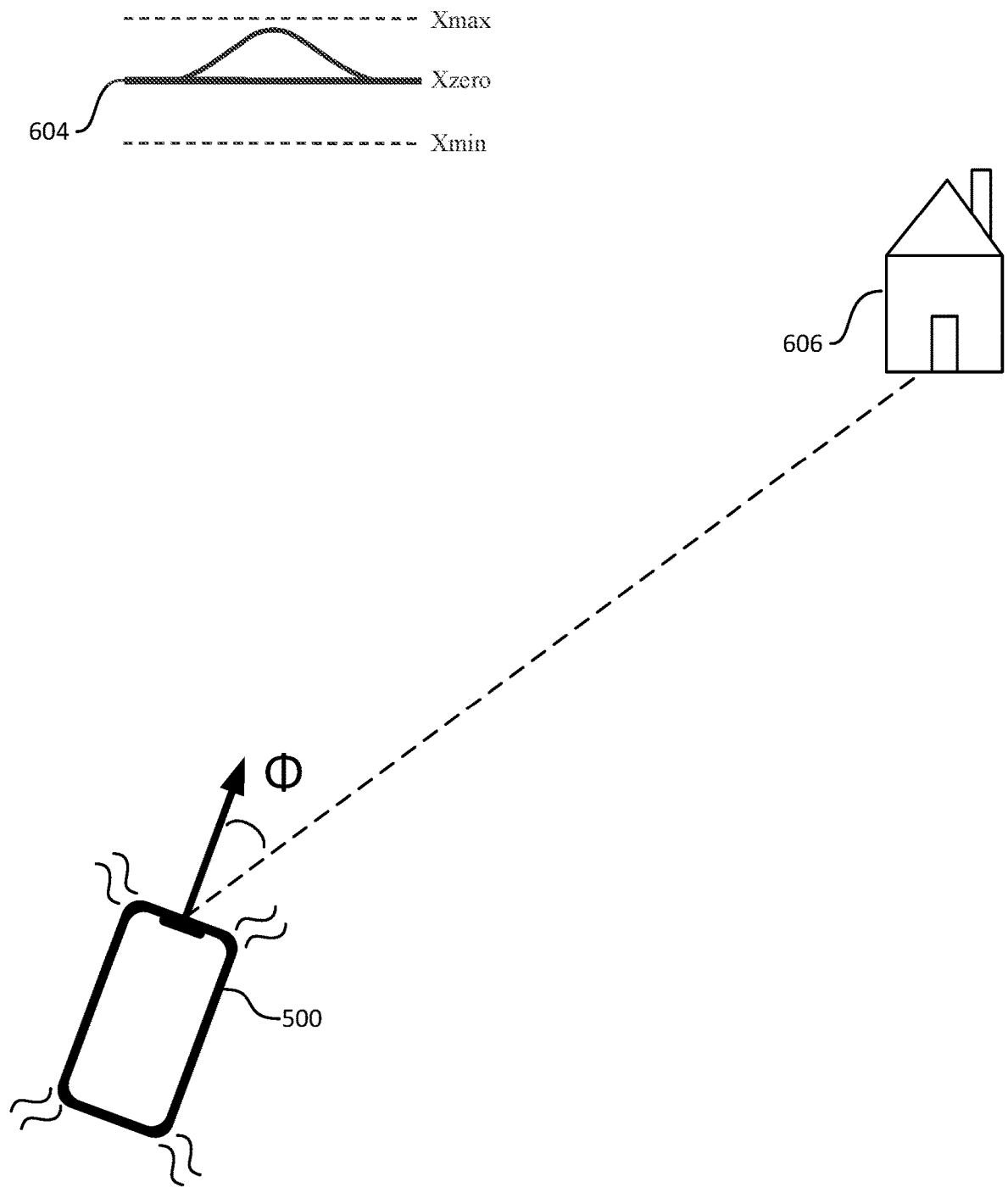

In FIGS. 6R-6S, the electronic device 500 increases the amplitude or intensity of the textural tactile output sequence as the orientation of the electronic device 500 moves closer to facing the navigation destination 606. As shown in FIG. 6R, when the electronic device 500 is oriented with an angle θ relative to the navigation destination 606, the electronic device 500 generates a continuous textural tactile output (e.g., a "Minor" tactile output described with reference to Table 1). In FIG. 6S, the electronic device 500 is oriented at an angle (relative to the navigation destination 606. The angle (is less than the angle θ and, as shown in FIG. 6S, while the angle between the electronic device 500 and the navigation destination 606 is (D, the amplitude or intensity of the tactile output sequence 604 is greater than the amplitude or intensity of the tactile output sequence 604 illustrated in FIG. 6R.

Figure 6T:
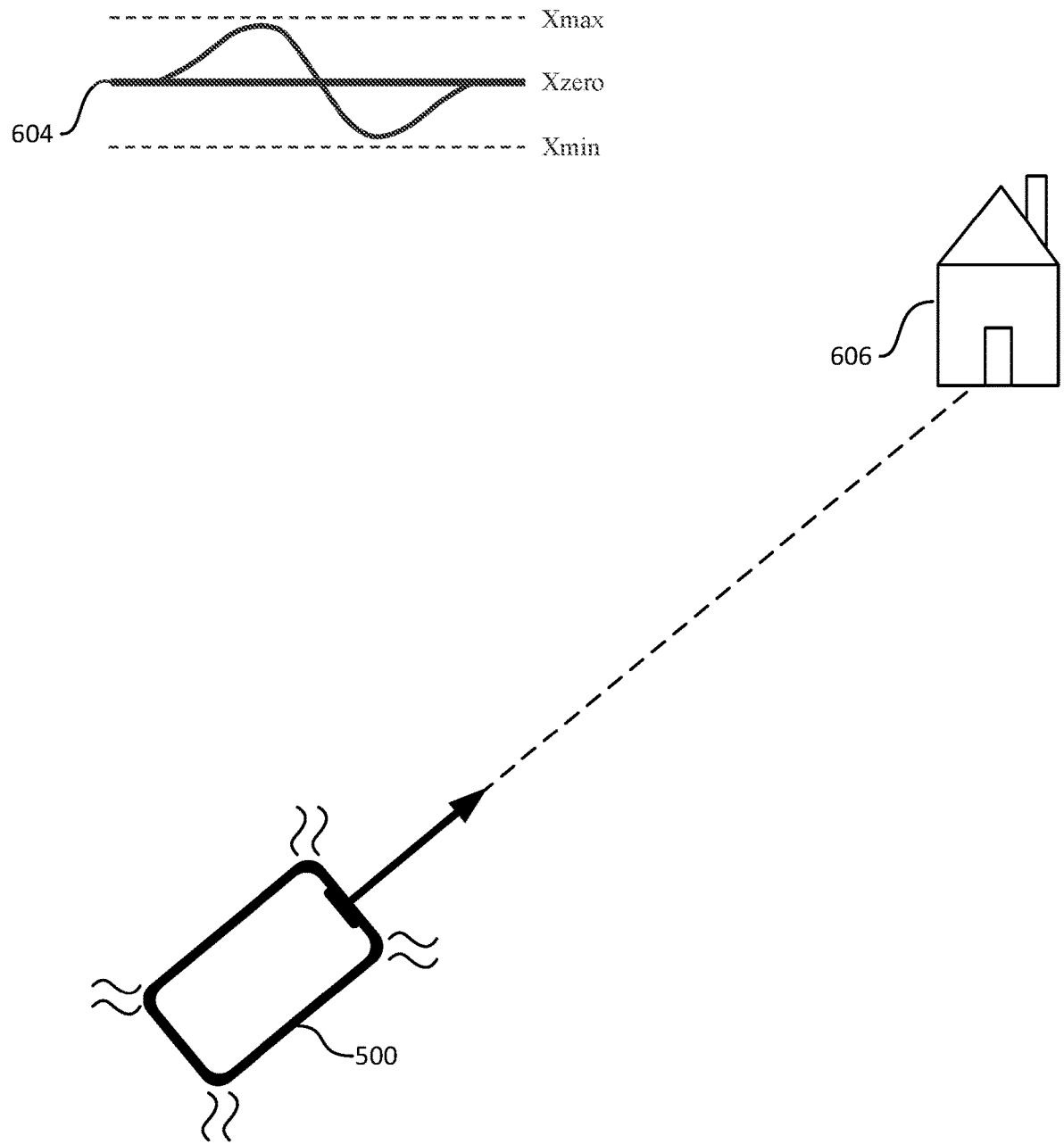

As shown in FIG. 6T, after generating a textural tactile output with an amplitude or intensity that increases as the angle between the electronic device 500 and a navigation destination 606 decreases, the electronic device 500 generates a discrete tactile output 604 (e.g., a "Major" tactile output described above with reference to Table 1) in response to detecting that the electronic device 500 is oriented towards the navigation destination 606.

Figure 6U:
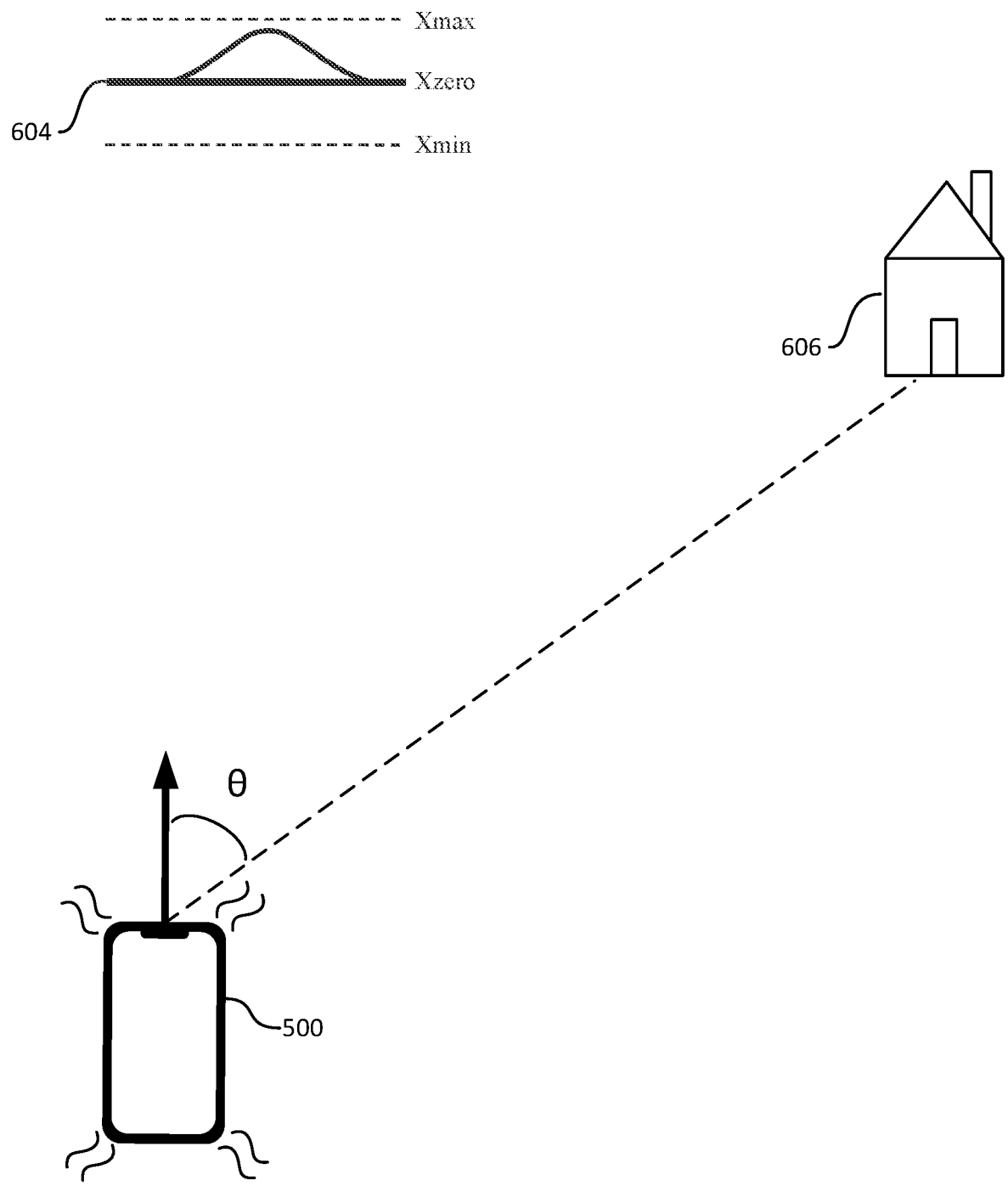
Figure 6V:
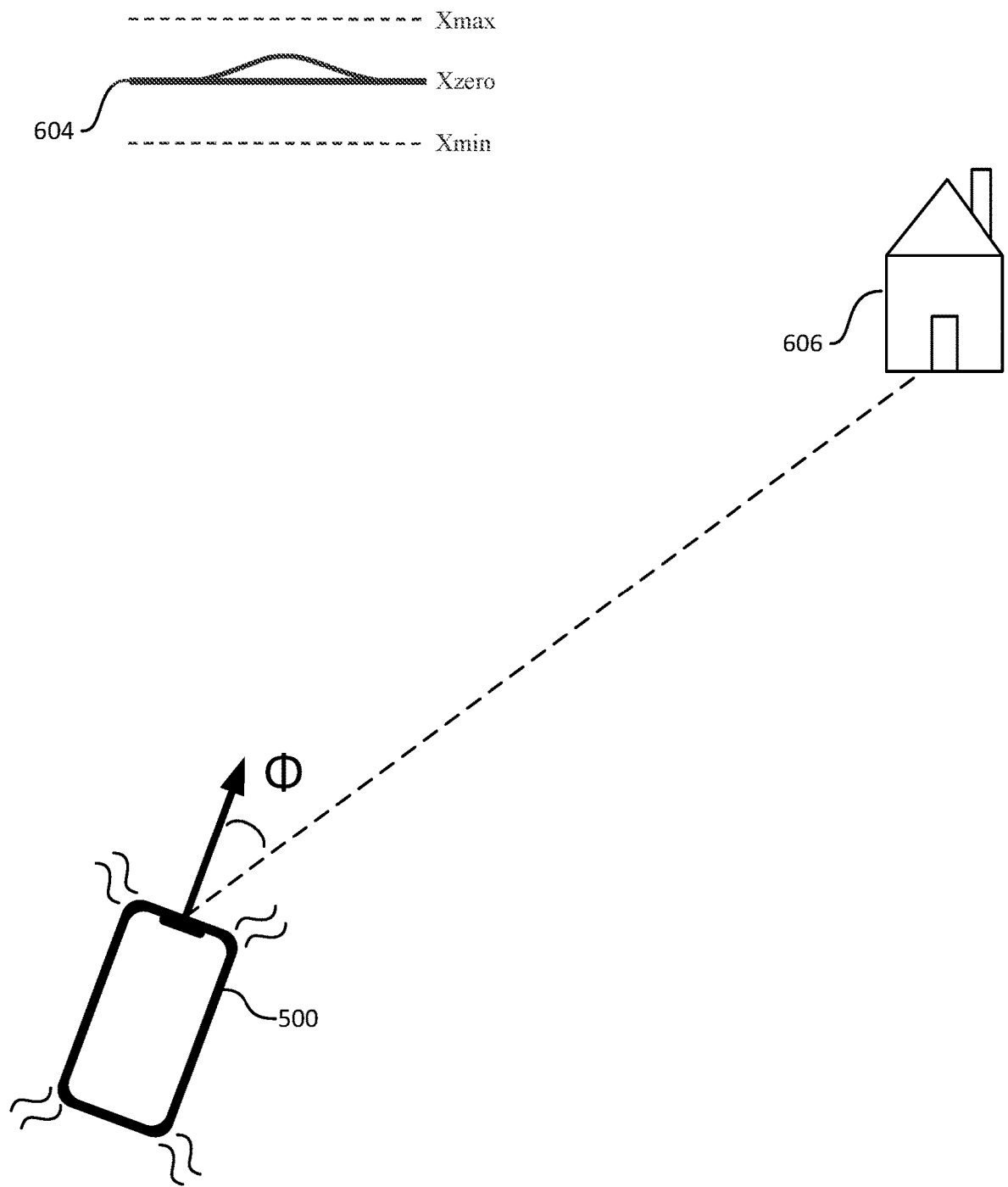

In FIGS. 6U-6V, the electronic device 500 decreases the amplitude or intensity of the textural tactile output sequence as the orientation of the electronic device 500 moves closer to facing the navigation destination 606. As shown in FIG. 6U, when the electronic device 500 is oriented with an angle θ relative to the navigation destination 606, the electronic device 500 generates a continuous textural tactile output (e.g., a "Minor" tactile output described with reference to Table 1). In FIG. 6V, the electronic device 500 is oriented at an angle (relative to the navigation destination 606. The angle (is less than the angle θ and, as shown in FIG. 6V, while the angle between the electronic device 500 and the navigation destination 606 is (D, the amplitude or intensity of the tactile output sequence 604 is less than the amplitude or intensity of the tactile output sequence 604 illustrated in FIG. 6U.

Figure 6W:
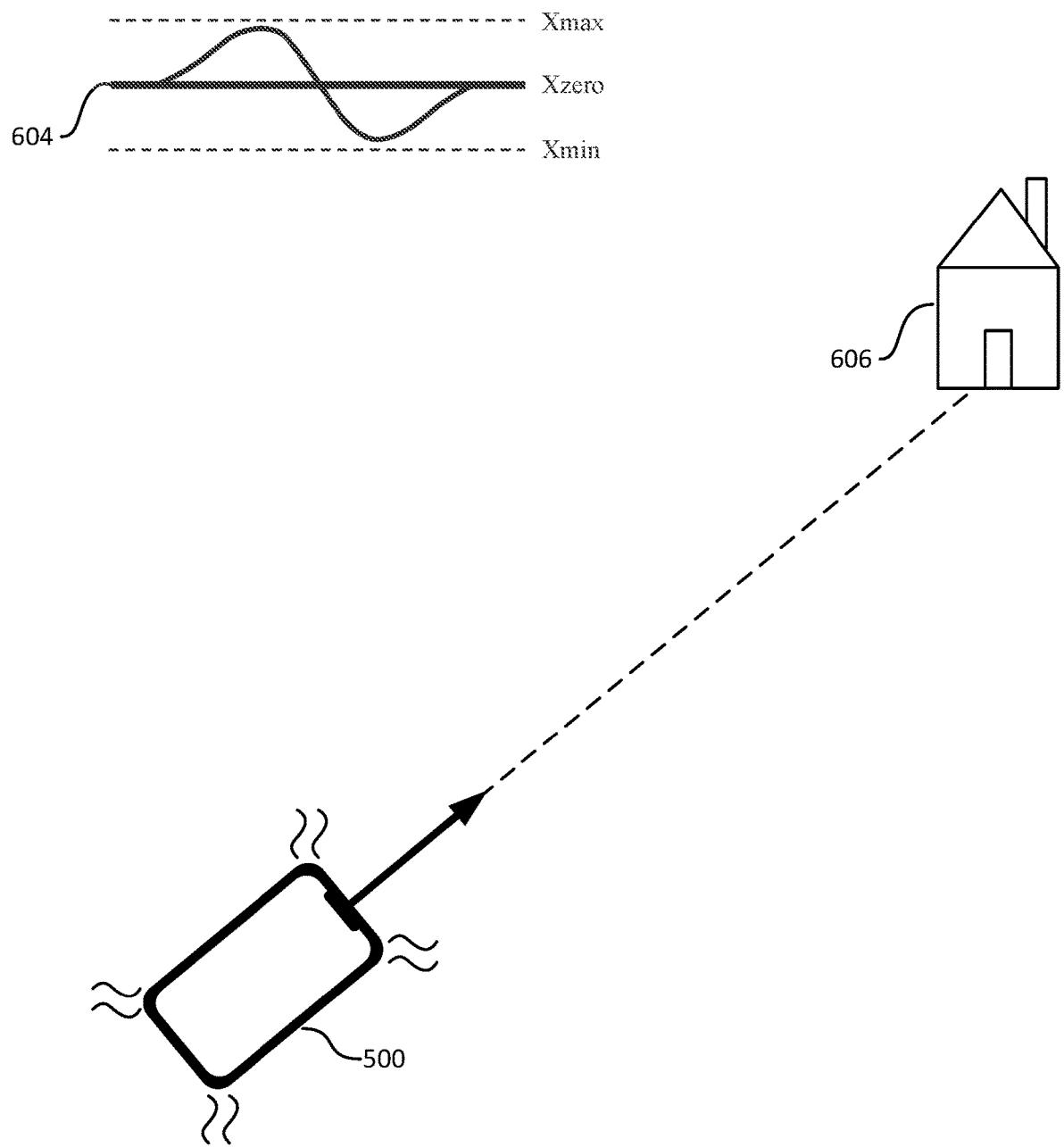

As shown in FIG. 6W, after generating a textural tactile output with an amplitude or intensity that decreases as the angle between the electronic device 500 and a navigation destination 606 decreases, the electronic device 500 generates a discrete tactile output 604 (e.g., a "Major" tactile output described above with reference to Table 1) in response to detecting that the electronic device 500 is oriented towards the navigation destination 606.

Figure 6X:
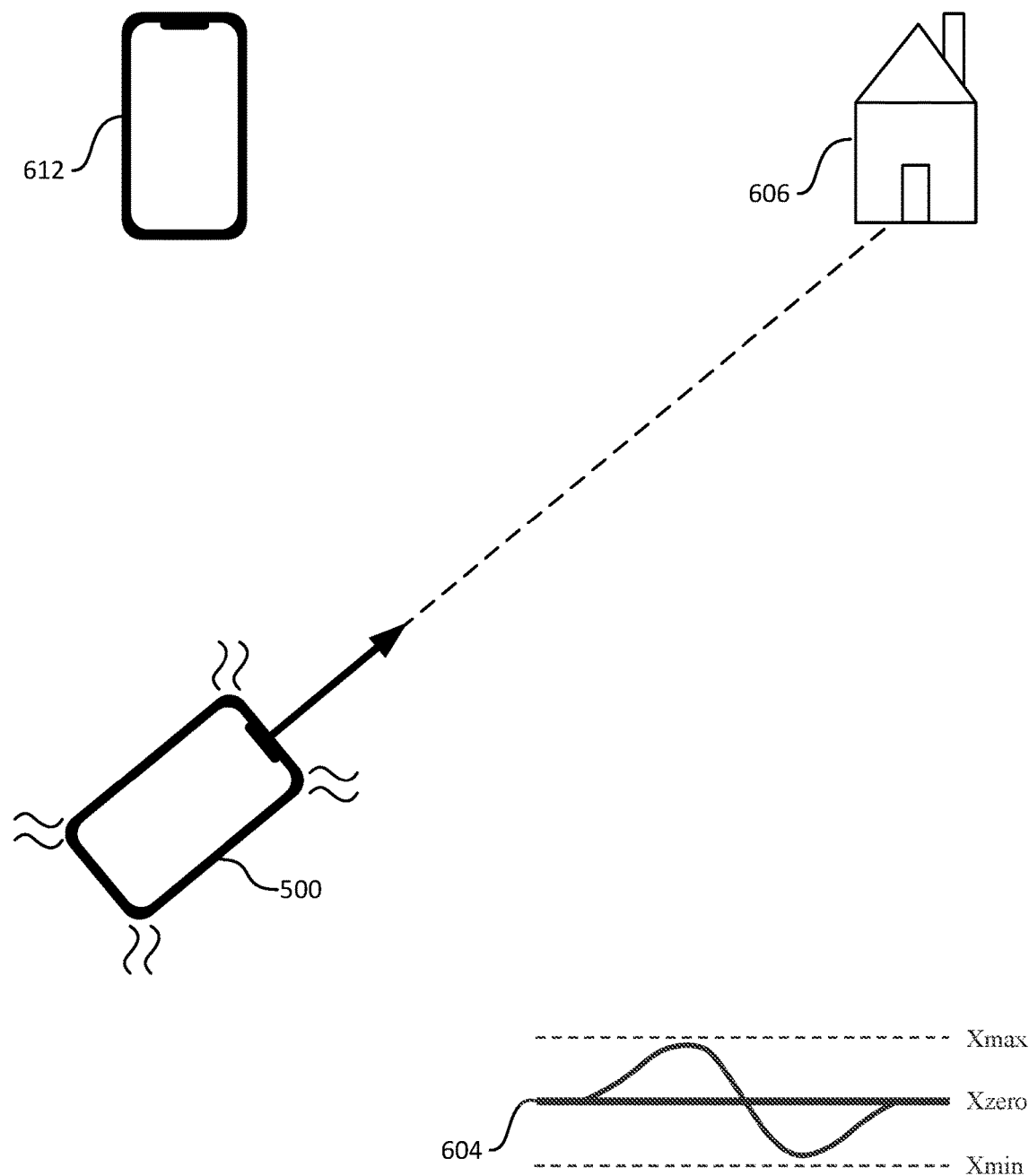
Figure 6Y:
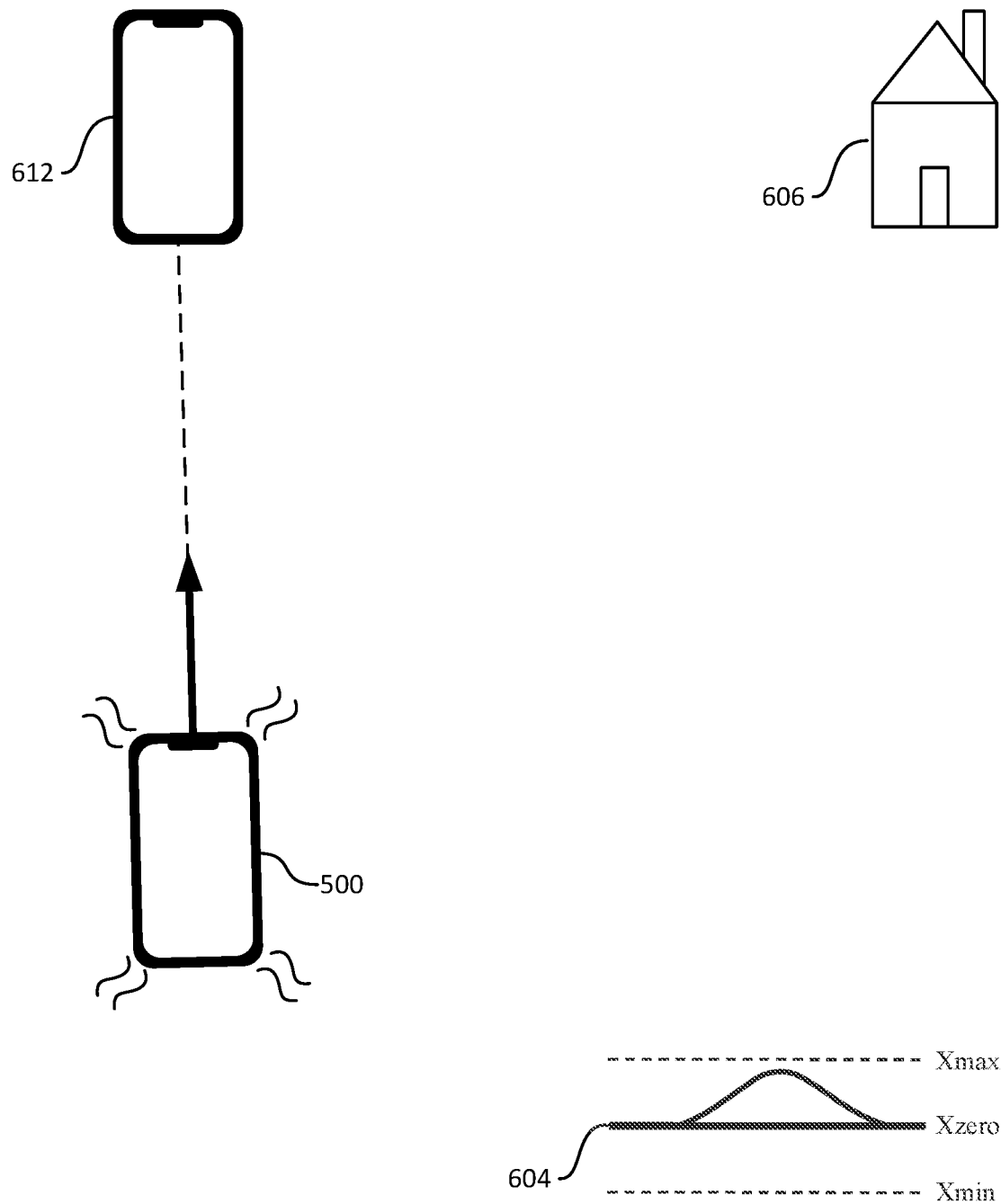

In FIGS. 6X-6Y, the electronic device 500 generates a tactile output with a different texture in response to being oriented towards different types of objects. In FIG. 6X, the electronic device 500 is oriented towards a navigation destination 606. In response to the electronic device's orientation towards the navigation destination 606, the electronic device 500 generates a tactile output 604 that includes periodic discrete tactile outputs (e.g., periodic "Major" tactile outputs described above with reference to Table 1).

In FIG. 6Y, the electronic device 500 is oriented towards another electronic device 612. In response to the electronic device's orientation towards the other electronic device 612, the electronic device 500 generates a continuous textural tactile output 604 (e.g., a "Minor" tactile output described above with reference to Table 1). Thus, as shown in FIGS. 6X-6Y, the electronic device 500 generates tactile output sequences with different textures that indicate the type of object towards which the electronic device 500 is oriented.

Figure 6Z:
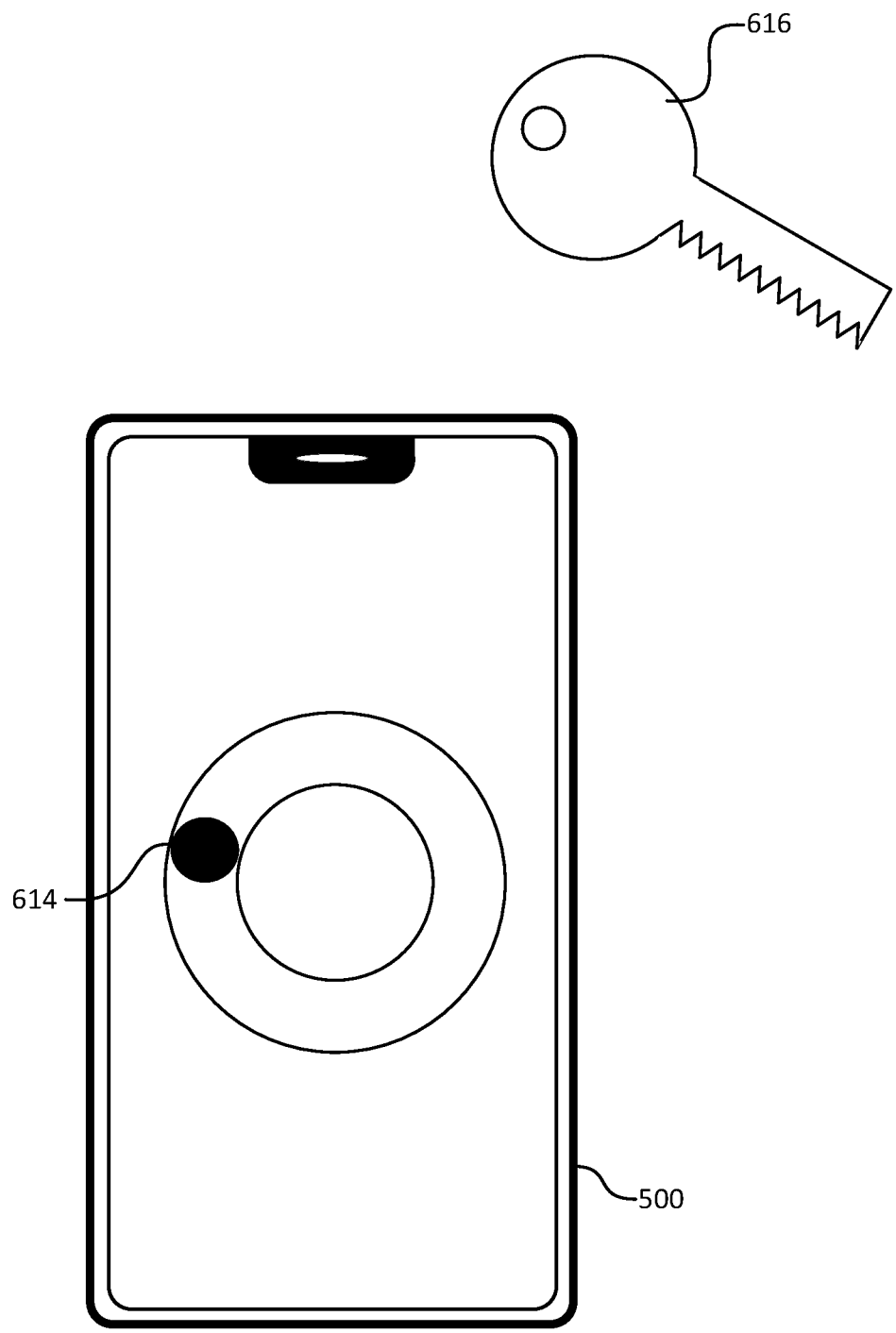
Figure 6A:
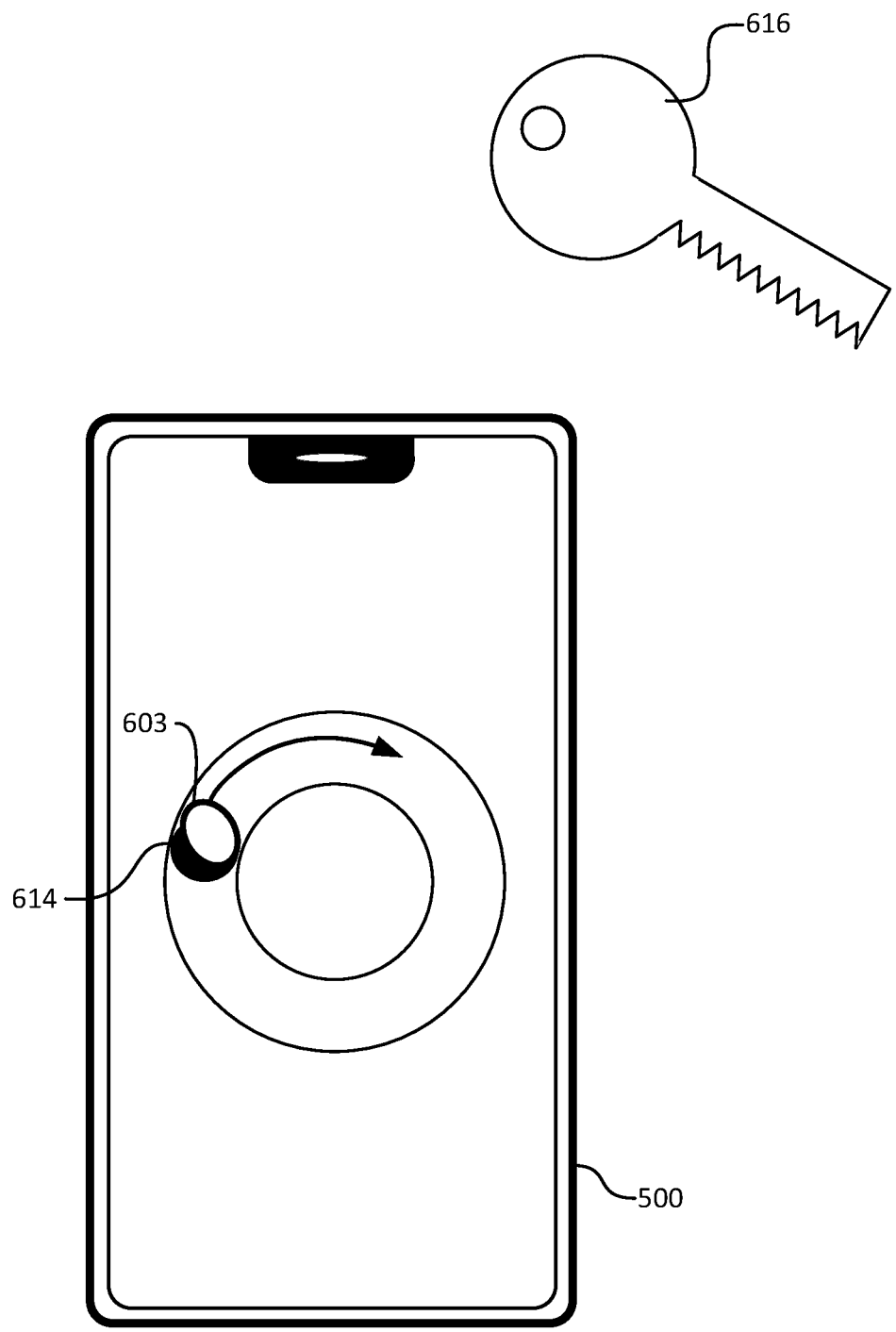
Figure 6B:
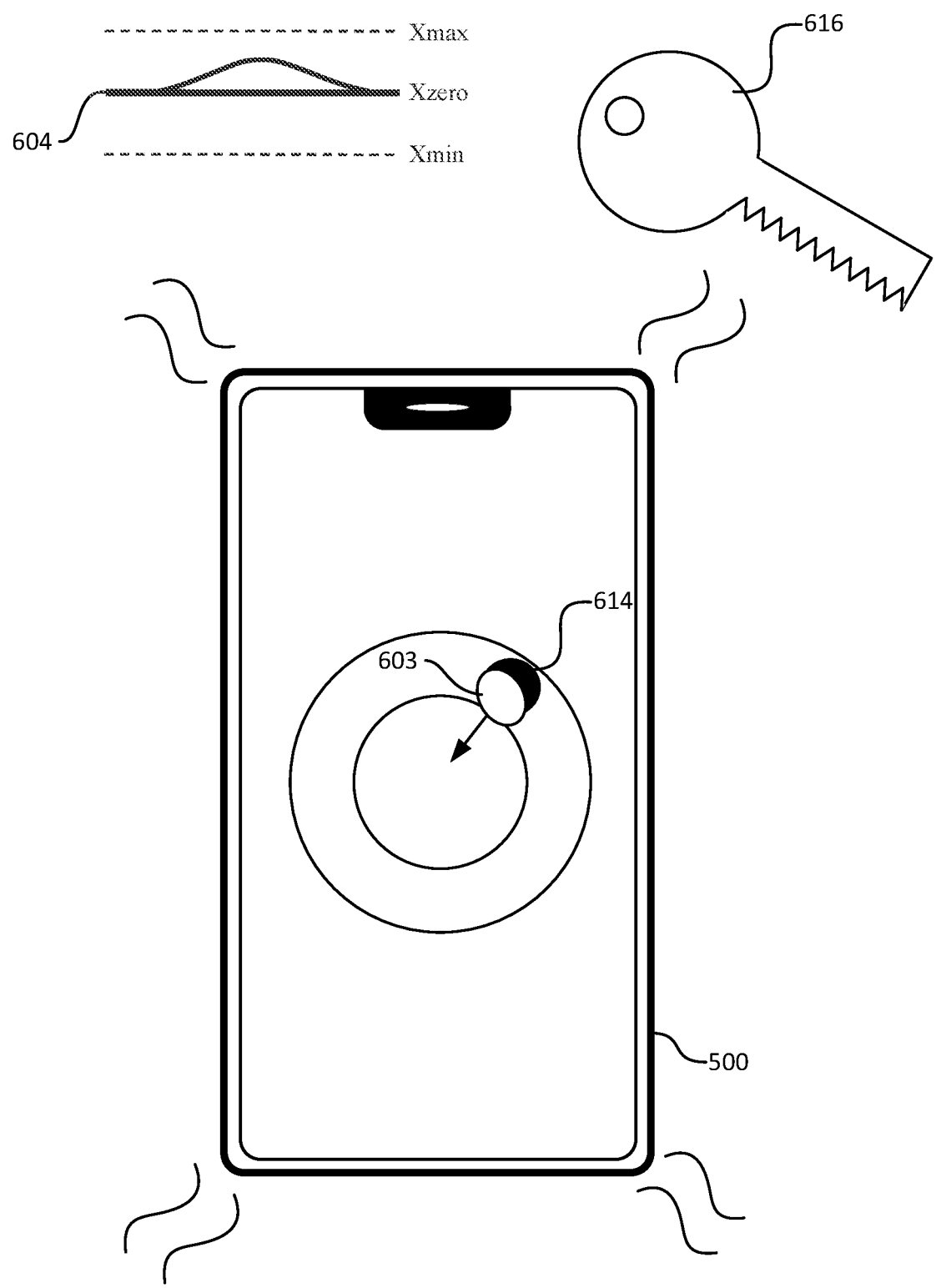
Figure 6C:
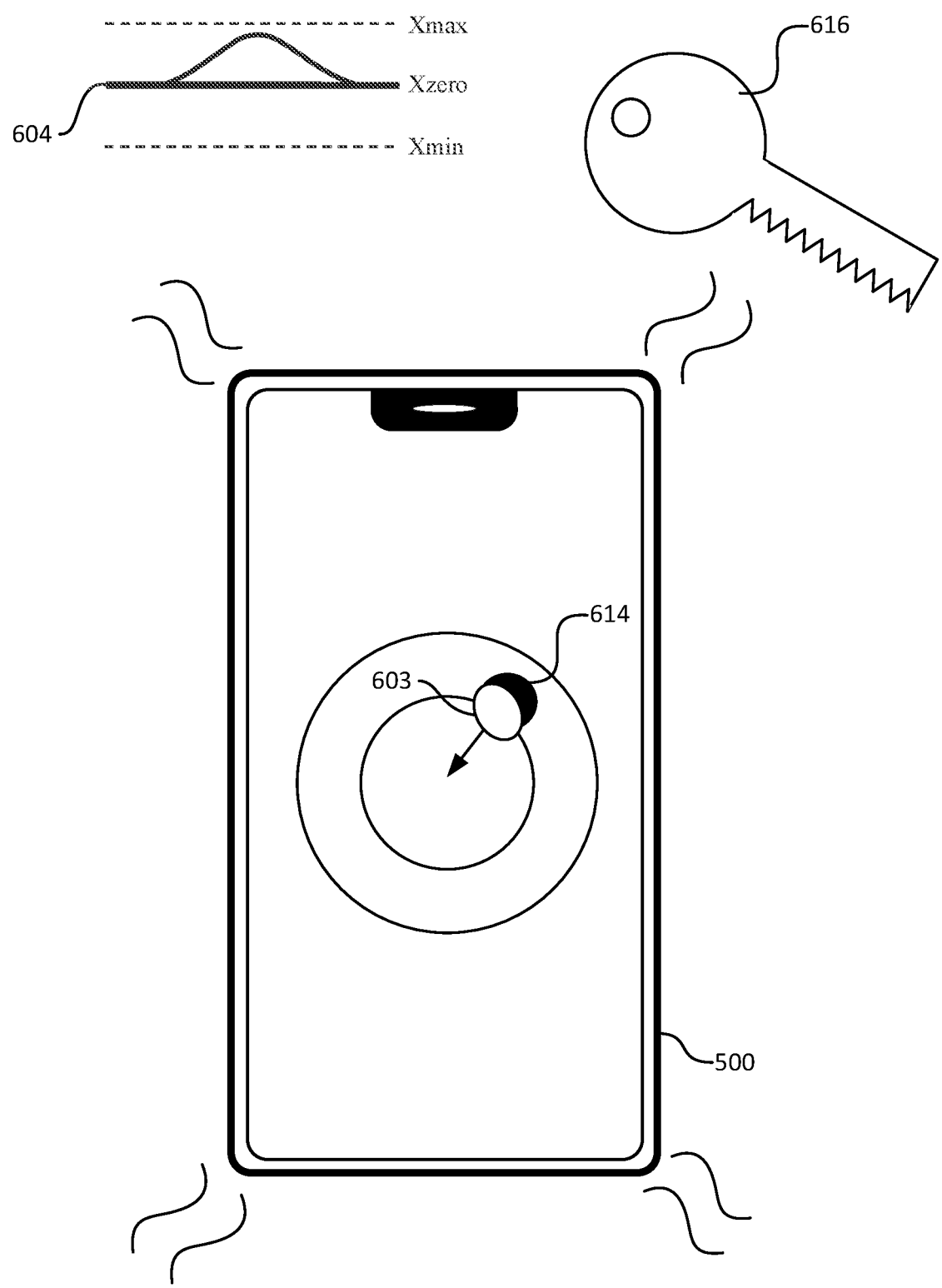
Figure 6D:
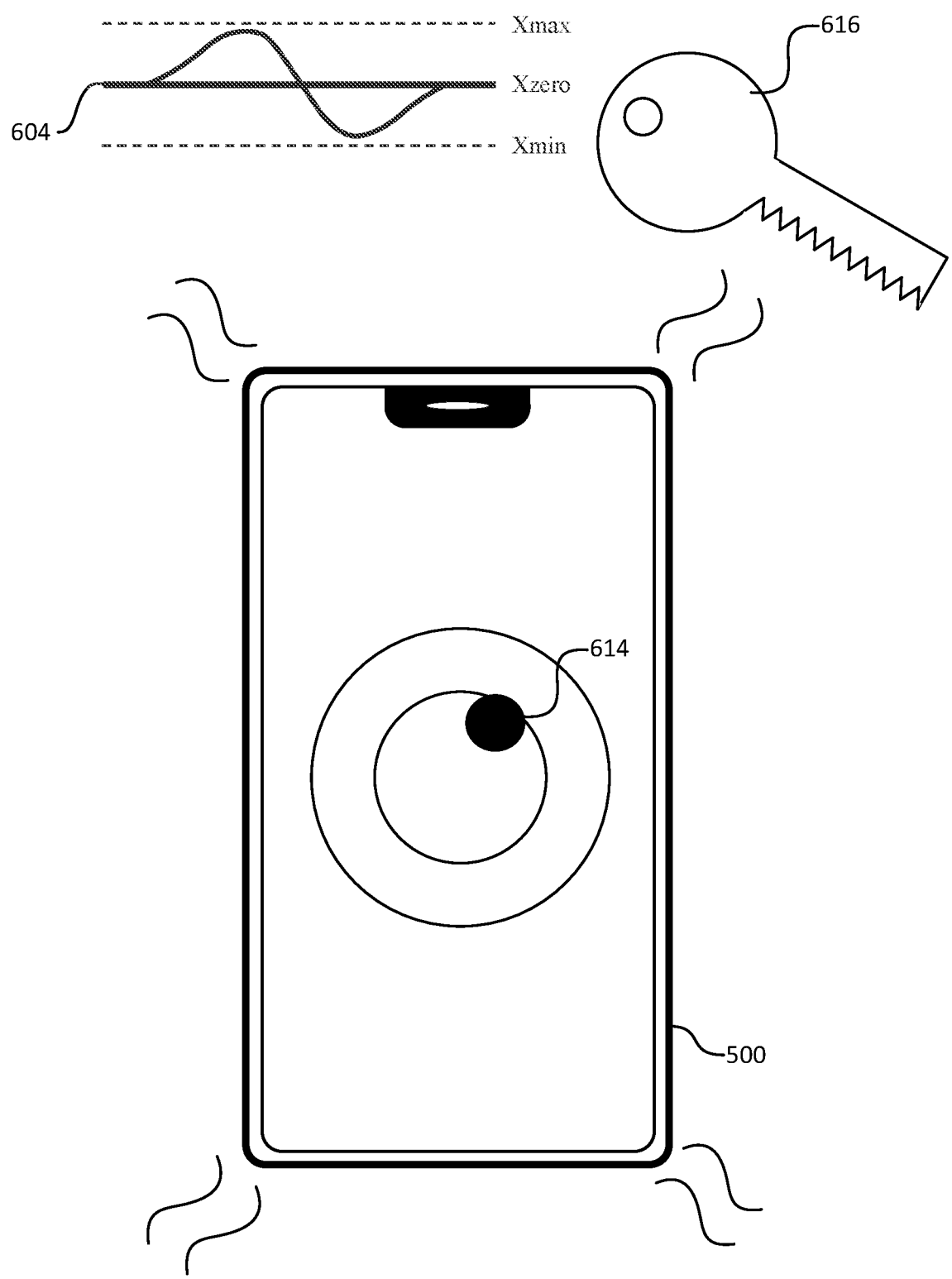
Figure 7A:
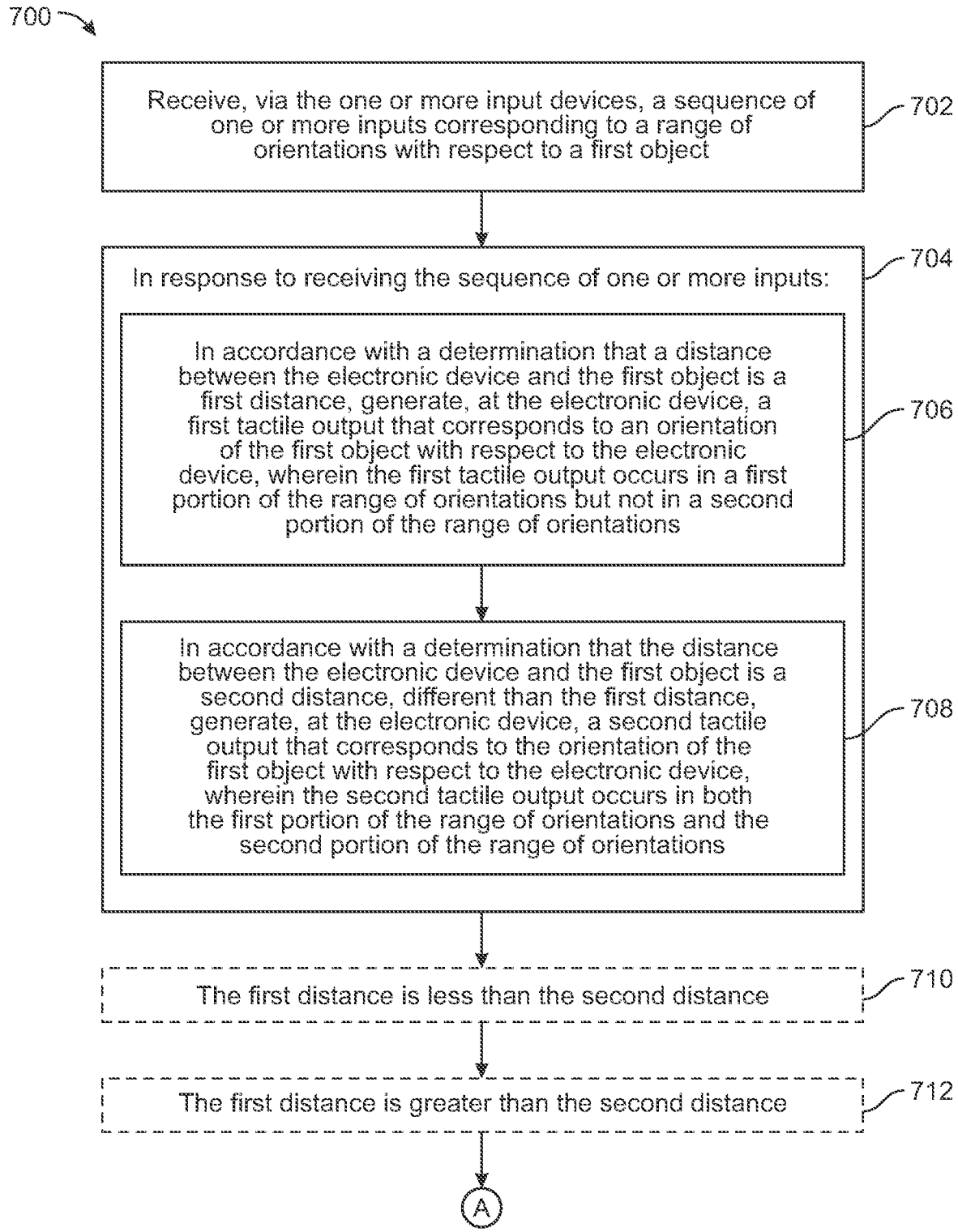
FIGS. 7A-7E are flow diagrams illustrating a method of generating a tactile output sequence in response to detecting that the electronic device is oriented within a range of orientations that changes as the distance between the electronic device and a respective object changes in accordance with some embodiments of the disclosure.
Figure 7B:
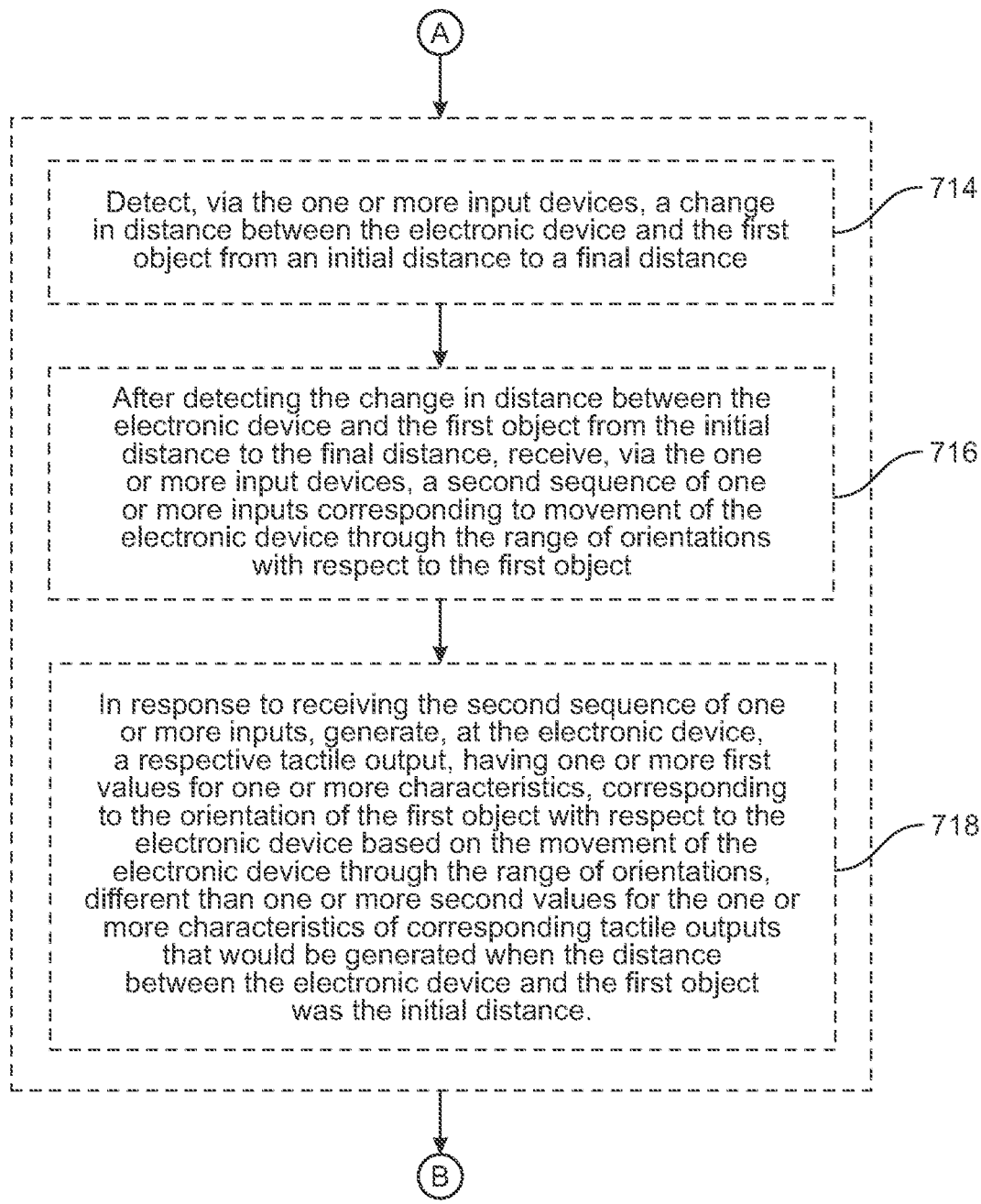
Figure 7C:
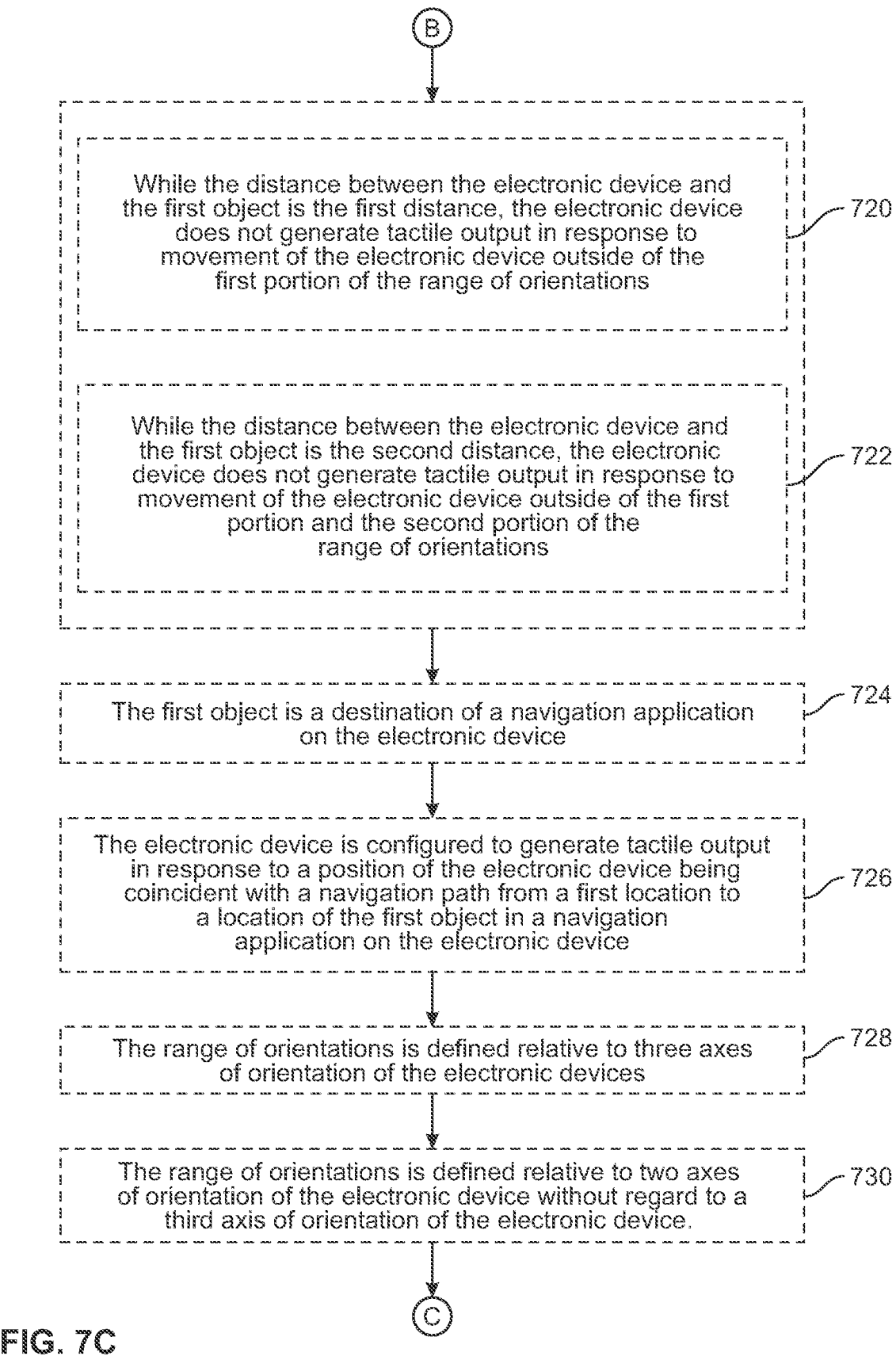
Figure 7D:
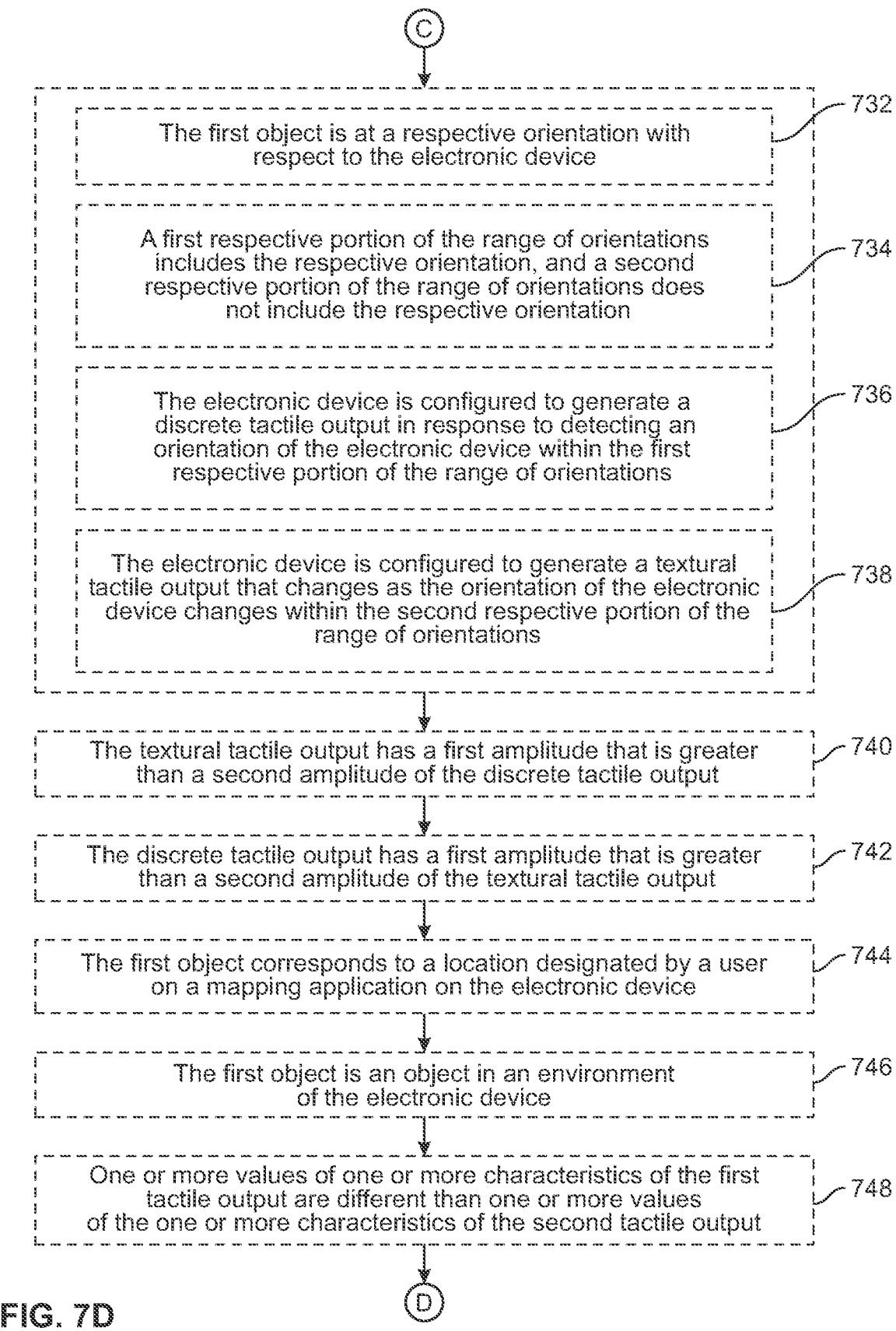
Figure 7E:
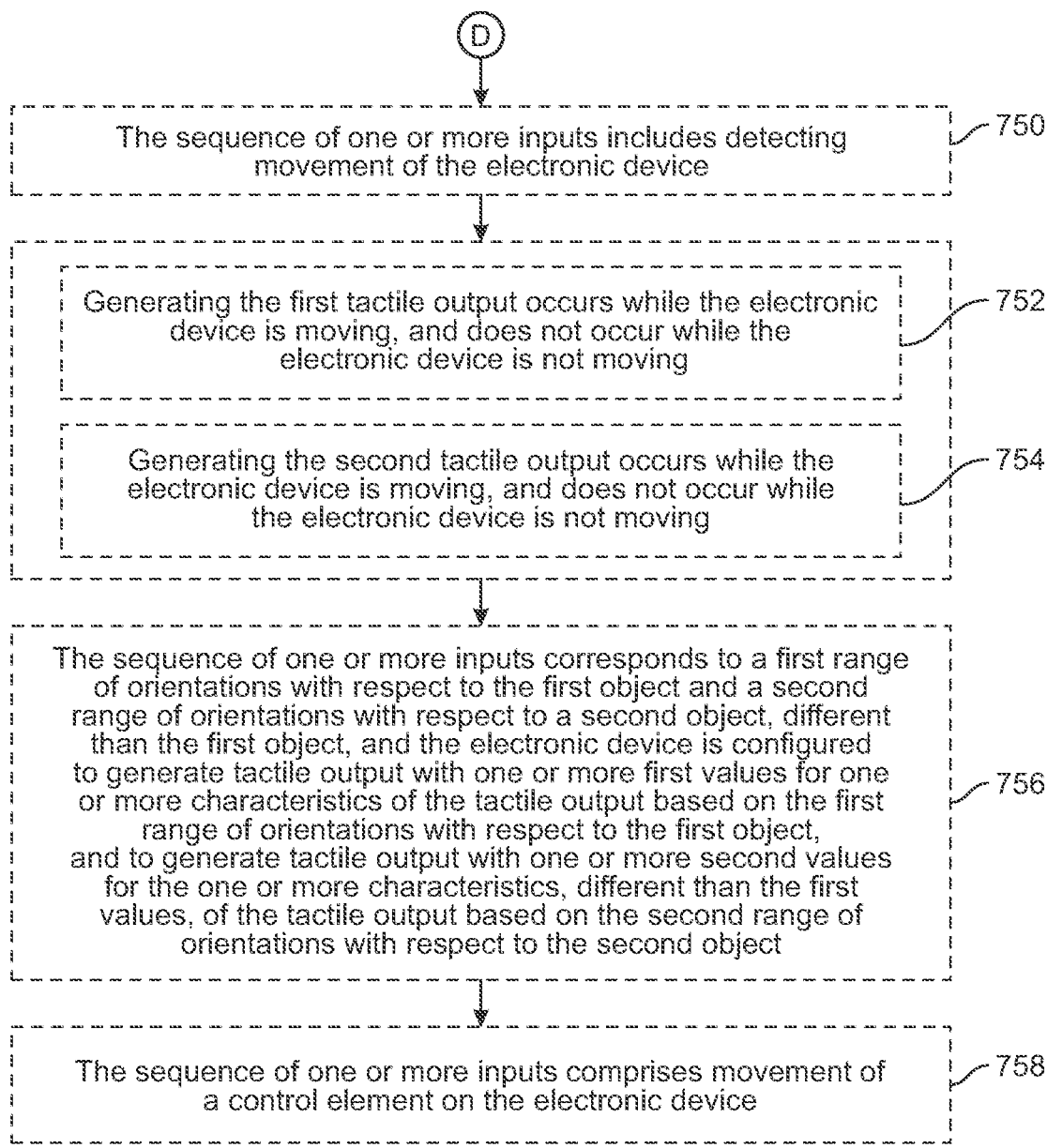

FIGS. 6Z-6DD illustrate the electronic device 500 generating a tactile output 604 in response to an orientation of a control element 614 displayed on the display 504 relative to an object 616. As shown in FIG. 6Z, the electronic device 500 presents a control element 614 on the display 504. The user is able to move the control element 614 to define an angle and/or distance of the electronic device 500 relative to an object 616. The object 616 includes a transceiver in communication with the electronic device 500 to enable the electronic device 500 to determine the location of the object 616 to generate the tactile output indicative of the location of the object 616. In FIG. 6Z, the orientation of the control element 614 is an angle that does not point towards the object 616, so the electronic device 500 forgoes generating a tactile output.

In FIG. 6AA, the user selects (e.g., with contact 603) the control element to move the control element to a different orientation. In FIG. 6BB, in response to the user input illustrated in FIG. 6AA, the electronic device 500 moves the control element 614 to an orientation that is towards the object 616. In response to the orientation of the control element, the electronic device 500 generates a tactile output 604 (e.g., a "Minor" tactile output described above with reference to Table 1). The tactile output 604 is a continuous textural tactile output with an amplitude or intensity that corresponds to the distance from the electronic device 500 represented by the control element 614. As shown in FIG. 6BB, the user selects (e.g., with contact 603) the control element 603 to move the control element 614 to a position that represents a shorter distance from the electronic device 500.

In response to the user input illustrated in FIG. 6BB, the electronic device 500 presents the control element 614 at a new position that represents a shorter distance from the electronic device 500, as shown in FIG. 6CC. In response to the distance represented by the control element 614 in FIG. 6CC, the electronic device 500 generates a continuous textural tactile output 604 (e.g., a "Minor" tactile output described above with reference to Table 1). The tactile output 604 illustrated in FIG. 6CC has a greater amplitude or intensity than the amplitude or intensity of the tactile output 604 illustrated in FIG. 6BB. This is because, in FIG. 6CC, the distance represented by the control element 614 is closer to the distance between the electronic device 500 and the object 616 than the distance represented by the control element in FIG. 6DD. As shown in FIG. 6CC, the user selects (e.g., with contact 603) the control element 614 to adjust the distance from the electronic device 500 represented by the control element 614.

In FIG. 6DD, the electronic device 500 generates a tactile output 604 (e.g., a "Major" tactile output described above with reference to Table 1) that indicates that the orientation and distance of the electronic device 500 represented by the control element 614 corresponds to the location of the object 616. The tactile output 604 illustrated in FIG. 6DD is a sequence of periodic discrete tactile outputs that indicates that the orientation and distance of the control element 614 corresponds to the object 616.

FIGS. 7A-7E are flow diagrams illustrating a method of generating a tactile output sequence in response to detecting that the electronic device is oriented within a range of orientations that changes as the distance between the electronic device and a respective object changes in accordance with some embodiments of the disclosure. The method 700 is optionally performed at an electronic device such as device 100, device 300, device 500 as described above with reference to FIGS. 1A-1B, 2-3, 4A-4B and 5A-5H. Some operations in method 700 are, optionally combined and/or order of some operations is, optionally, changed.

As described below, the method 700 provides ways to generate tactile feedback indicative of a range of orientations that changes as the distance between the electronic device and a respective object changes. The method reduces the cognitive burden on a user when interaction with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 6B, an electronic device (e.g., electronic device 500, a mobile device (e.g., a tablet, a smartphone, a media player, or a wearable device) in communication with one or more of a touch screen, an accelerometer, a motion sensor, and/or a position sensor (e.g., GPS or the like)) in communication with one or more input devices receives (702), via the one or more input devices, a sequence of one or more inputs corresponding to a range of orientations with respect to a first object 602 (e.g., detecting, with one or more of the accelerometer, position sensor, and motion sensor, the orientation and/or distance of the electronic device relative to the first object, and/or the change in the orientation and/or distance of the electronic device relative to the first object). For example, the first object is a destination of a navigation application running on the electronic device and the one or more inputs indicate the electronic device's relative position and distance from the destination. As another example, the first object is an object that is discoverable by and/or able to be interacted with by the electronic device (e.g., the first object is another electronic device, such as a smart door lock or a smartphone) that is within a proximity threshold of the electronic device (e.g., 10, 20, 40, 100 feet). In some embodiments, the inputs correspond to changes in orientation and/or distance of the electronic device with respect to the first object. In some embodiments, the inputs correspond to directional inputs detected at the touch screen of the electronic device relative to the first object, where the touch inputs are detected at locations on the touch screen relative to a location or orientation on the touch screen that corresponds to the first object (e.g., that corresponds to the direction at which the first object is located with respect to a reference axis on the electronic device).

In some embodiments in response to receiving the sequence of one or more inputs (704), in accordance with a determination that a distance between the electronic device 500 and the first object 602 is a first distance, such as in FIGS. 6D-6F, the electronic device 500 generates (706), at the electronic device 500, a first tactile output 604 (e.g., haptics, vibration, etc.) that corresponds to an orientation of the first object 602 with respect to the electronic device 500 (e.g., generating the tactile output in accordance with a determination that a predetermined location, reference axis, or part of the electronic device is facing towards the first object), wherein the first tactile output 604 occurs in a first portion of the range of orientations (e.g., including angle Φ) but not in a second portion of the range of orientations (e.g., including the angle θ) (e.g., the electronic device determines the distance and/or orientation (e.g., angle of offset) of the electronic device relative to the object). In some embodiments, the portions of the range of orientations in which the tactile output is generated is based on the determined distance between the electronic device and the first object. For example, in accordance with a determination that the electronic device is a first distance from the first object, the first tactile response is generated in response to an orientation of the electronic device that is within an angle of offset relative to the first object within a first range of angles.

In some embodiments, in response to receiving the sequence of one or more inputs (704), in accordance with a determination that the distance between the electronic device 500 and the first object 602 is a second distance, such as in FIGS. 6B-6C, different than the first distance illustrated in FIGS. 6D-6F, the electronic device 500 generates (708), at the electronic device 500, a second tactile output 604 that corresponds to the orientation of the first object 602 with respect to the electronic device 500, wherein the second tactile output occurs in both the first portion of the range of orientations and the second portion of the range of orientations (e.g., for example, in accordance with a determination that the electronic device is a second distance from the first object, the second tactile output is generated in response to an orientation of the electronic device that is within an angle of offset relative to the first object within a second range of angles). In some embodiments, the tactile output is generated in response to a smaller range of angles between a reference axis on the electronic device and the first object as the distance between the electronic device and the first object decreases. In some embodiments, the tactile output is generated in response to a larger range of angles between the electronic device and the first object as the distance between the electronic device and the first object increases.

The above-described manner of varying the portions of the range of angles in which the tactile output is generated as the distance between the electronic device and the first object varies allows the electronic device to use tactile output to communicate how far away the first object is from the electronic device, which simplifies interactions between the user and the electronic device and enhances the operability of the electronic device (e.g., by conveying the distance or change in distance between the electronic device and the first object in a manner different from a visual or audio indication), which, additionally, reduces power usage and improves battery life of the electronic device by enabling the user to use the electronic device more quickly and efficiently, without requiring the use of the display device of the electronic device or touch screen inputs from the user, which reduces power usage.

In some embodiments, such as in FIGS. 6A-6F, the first distance is less than the second distance (710) (e.g., the range of orientations of the electronic device relative to the object that causes the electronic device to generate the tactile output increases as the electronic device gets further away from the object).

The above-described manner of increasing the range of orientations of the electronic device relative to the object that causes the electronic device to generate a tactile output as the electronic device gets further away from the object allows the electronic device to provide a more precise indication of the location of the object as the electronic device gets closer to the object, compared to when the electronic device is further away from the object without the use of the display device, which reduces power usage and improves battery life of the electronic device by enabling the user to use the electronic device more quickly and efficiently.

In some embodiments, such as in FIGS. 6G-6I, the first distance is greater than the second distance (712) (e.g., the range of orientations of the electronic device relative to the object that causes the electronic device to generate the tactile output decreases as the electronic device gets further away from the object).

The above-described manner of decreasing the range of orientations of the electronic device relative to the object that causes the electronic device to generate a tactile output as the electronic device gets further away from the object allows the electronic device to provide a more precise indication of the location of the object when the electronic device is further away from the device compared to when the electronic device is closer to the object without the use of the display device, which reduces power usage and improves battery life of the electronic device by enabling the user to use the electronic device more quickly and efficiently.

In some embodiments, such as in FIGS. 6C-6D, the electronic device 500 detects (714), via the one or more input devices (e.g., GPS or some other location services input device, a camera, a wireless communication device, or a user interface presented on the touch screen of the electronic device that the user is able to interact with to change the orientation of an indication in the user interface), a change in distance between the electronic device 500 and the first object 602 from an initial distance illustrated in FIG. 6C to a final distance illustrated in FIG. 6D (e.g., the electronic device moves such that the distance between the first object and the electronic device is different when the movement started to when the movement is complete).

In some embodiments, such as in FIGS. 6D-6F, after detecting the change in distance between the electronic device and the first object from the initial distance in FIG. 6C to the final distance in FIGS. 6D-6F, the electronic device 500 receives (716), via the one or more input devices, a second sequence of one or more inputs corresponding to movement of the electronic device 500 through the range of orientations with respect to the first object 602 (e.g., detecting, with the one or more of the accelerometer, position sensor, and motion sensor, the orientation and/or distance of the electronic device relative to the first object, and/or the change in the orientation and/or distance of the electronic device relative to the first object). For example, the electronic device moves in a same or similar manner to the manner described above while at a different distance from the first object than the distance described above, such as through a range of orientations with respect to the first object.

In some embodiments, such as in FIGS. 6D-6F, in response to receiving the second sequence of one or more inputs, the electronic device 500 generates (718), at the electronic device, a respective tactile output 604, having one or more first values for one or more characteristics (e.g., frequency, amplitude, pattern, frequency of discrete pulses, etc.), such as frequency, corresponding to the orientation of the first object 602 with respect to the electronic device 500 based on the movement of the electronic device 500 through the range of orientations (e.g., as the orientation of the electronic device changes, the value of the one or more characteristics changes), different than one or more second values for the one or more characteristics of corresponding tactile outputs that would be generated when the distance between the electronic device and the first object was the initial distance, such as the tactile output 604 illustrated in FIG. 6C (e.g., the one or more characteristics of the tactile output are different and/or change in different ways depending on the distance between the first object and the electronic device when the electronic device moves through the range of orientations with respect to the first object). For example, when the electronic device is the initial distance from the first object and moves through the range of orientations with respect to the first object, the electronic device presents a tactile output that has a first frequency and has a range of amplitudes that changes as the orientation of the electronic device changes. As another example, when the electronic device is the final distance from the first object and moves through the range of orientations with respect to the first object, the electronic device presents a tactile output that has a second frequency different from the first frequency and/or has a range of amplitudes that changes as the orientation of the electronic device changes. Although the range of orientations that the electronic device moves through are optionally the same at the initial and final distances, the range of amplitudes is optionally different. In some embodiments, the range of amplitudes is the same and the frequency is different because the electronic device is a different distance from the first object.

The above-described manner of altering the values for one or more characteristics of the tactile output as the electronic device moves through the range of orientations depending on the distance between the electronic device and the first object allows the electronic device to convey information about both the distance from and orientation relative to the first object using a tactile output, which reduces power usage and improves battery life of the electronic device by enabling the user to use the electronic device more quickly and efficiently, such as by conveying more information using the tactile output instead of using the display device to present a user interface with some of the information.

In some embodiments, such as in FIGS. 6D-6F, while the distance between the electronic device 500 and the first object 602 is the first distance, the electronic device 500 does not generate tactile output in response to movement of the electronic device outside of the first portion of the range of orientations, such as while the angle between the electronic device 500 and the object 602 is θ (720) (e.g., when the electronic device is in the second portion of the range of orientations or otherwise outside of the first portion of the range of orientations and the first distance from the first object, the electronic device does not generate a tactile output). For example, while the electronic device is presenting navigational instructions to the first object (e.g., a geographic location, such as a building located at an address), the electronic device presents a tactile output when the electronic device is pointed towards the first object, within a first range of angles, and does not present the tactile output when the electronic device is pointed in a direction outside of the first range of angles around the location in the direction of the first object.

In some embodiments, while the distance between the electronic device 500 and the first object 602 is the second distance, such as in FIGS. 6A-6C the electronic device does not generate tactile output in response to movement of the electronic device outside of the first portion and the second portion of the range of orientations (722), such as if the electronic device 500 moved to an angle greater than θ. For example, while the electronic device is presenting navigational instructions to the first object (e.g., a geographic location, such as a building located at an address), the electronic device presents a tactile output when the electronic device is pointed towards the first object (e.g., within the first and second portions of the range of orientations), within a second range of angles, and does not present the tactile output when the electronic device is pointed in a direction outside of the second range of angles around the location in the direction of the first object (e.g., outside of the first and second portions of the range of orientations.

The above-described manner of forgoing presenting the tactile output when the orientation is outside of a predetermined range of orientations allows the electronic device to communicate to the user a location of the first object relative to the electronic device using tactile outputs, which simplifies interactions between the user and the electronic device and enhances the operability of the electronic device (e.g., conveying to the user the location of the first object relative to the electronic device without requiring the user to view a user interface presented on the electronic device), which, additionally, reduces power usage and improves battery life of the electronic device by enabling the user to use the electronic device more quickly and efficiently and also conserves power by forgoing presenting a user interface via the display device.

In some embodiments, such as in FIG. 6K, the first object is a destination 606 of a navigation application on the electronic device 500 (724) (e.g., the electronic device presents navigation directions to the destination and generates the tactile output when the electronic device is oriented towards the destination). In some embodiments, the electronic device presents a different tactile output when the electronic device is within a predetermined distance of the destination (e.g., when the electronic device has arrived at the destination). For example, the electronic device presents a continuous tactile output while navigating to the destination when the electronic device is oriented towards the destination and then presents a different, discrete tactile output to indicate arrival at the destination.

The above-described manner of presenting the tactile output to indicate the location of a navigation destination allows the electronic device to communicate the navigation instructions to the user using the tactile output, which simplifies interactions between the user and the electronic device and enhances the operability of the electronic device (e.g., by enabling the user to receive the navigation completion instructions without looking at a user interface presented via the display device), which, additionally, reduces power usage and improves battery life of the electronic device by enabling the user to use the electronic device more quickly and efficiently.

In some embodiments, such as in FIG. 6K, the electronic device 500 is configured to generate tactile output in response to a position of the electronic device 500 being coincident with a navigation path from a first location to a location of the first object 606 in a navigation application on the electronic device (726) (e.g., the electronic device presents navigation directions to the destination and generates the tactile output when the electronic device is oriented towards and/or on the path to the destination). In some embodiments, the electronic device presents a different tactile output when the electronic device is within a predetermined distance of the destination (e.g., when the electronic device has arrived at the destination). For example, the electronic device presents a continuous tactile output while navigating to the destination when the electronic device is oriented towards the path to the destination and/or is proceeding along and on the path, and then presents a different, discrete tactile output to indicate arrival at the destination. In some embodiments, when the electronic device is off of the navigation path to the first object, the electronic device does not generate a tactile output or generates a tactile output in response to the electronic device detecting that the orientation of the electronic device is towards the first object, rather than towards the navigation path. While the electronic device is on the navigation path, the electronic device optionally only generates the tactile output in response to detecting that the electronic device is moving (e.g., moving in a manner that indicates the user is making a scanning motion with the electronic device) and optionally does not generate the tactile output while the electronic device is on the navigation path if the electronic device is not moving.

The above-described manner of presenting the tactile output to indicate the location of a path to a navigation destination allows the electronic device to communicate the navigation instructions to the user using the tactile output, which simplifies interactions between the user and the electronic device and enhances the operability of the electronic device (e.g., by enabling the user to receive the navigation instructions without looking at a user interface presented via the display device), which, additionally, reduces power usage and improves battery life of the electronic device by enabling the user to use the electronic device more quickly and efficiently.

In some embodiments, such as in FIG. 6P, the range of orientations is defined relative to three axes of orientation of the electronic device 500 (728) (e.g., the first and second portions of the range of orientations include ranges of angles in each of three dimensions (e.g., roll, pitch, and yaw of the electronic device)).

The above-described manner of generating tactile outputs for different portions of orientations of the electronic device in three dimensions allows the electronic device to convey to the user location information about the first object in three dimensions, which simplifies interactions between the user and the electronic device and enhances the operability of the electronic device (e.g., by presenting more information than could be presented by generating outputs for different portions of orientations of the electronic device in fewer dimensions, such as in two dimensions), which, additionally, reduces power usage and improves battery life of the electronic device by enabling the user to use the electronic device more quickly and efficiently.

In some embodiments, such as in FIG. 6Q, the range of orientations is defined relative to two axes of orientation of the electronic device 500 without regard to a third axis of orientation of the electronic device (730) (e.g., the first and second portions of the range of orientations includes ranges of angles in each of two dimensions (e.g., yaw and pitch)). That is to say, the range of orientations is optionally independent of the roll of the electronic device.

The above-described manner of generating tactile outputs for different portions of orientations of the electronic device in two dimensions allows the electronic device to simplify the computations for determining whether the electronic device's orientation is in the first and/or second portion of the range of orientations, which reduces power usage and improves battery life of the electronic device by enabling the user to use the electronic device more quickly and efficiently.

In some embodiments, such as in FIGS. 6R-6T, the first object 606 is at a respective orientation with respect to the electronic device 500 (732). In some embodiments, a first respective portion of the range of orientations includes the respective orientation, such as in FIG. 6R, and a second respective portion of the range of orientations does not include the respective orientation, such as in FIG. 6T (734) (e.g., the first respective portion of the range of orientations corresponds to the electronic device being oriented towards the first object within a predetermined range of angles (e.g., 2 degrees, 5 degrees, 10 degrees, etc.) and the second respective portion of the range of orientations corresponds to the electronic device being oriented away from the first object (e.g., outside of the first range of orientations, or being oriented with a relative angle to the first object that is outside of the predetermined range of angles)).

In some embodiments, such as in FIG. 6T, the electronic device 500 is configured to generate a discrete tactile 604 output in response to detecting an orientation of the electronic device 500 within the first respective portion of the range of orientations (736) (e.g., the electronic device generates a tactile output that corresponds to a tap or a series of periodic taps when the electronic device is oriented towards the first object). In some embodiments, such as in FIGS. 6R-6S, the electronic device 500 is configured to generate a textural tactile output 604 that changes as the orientation of the electronic device 500 changes within the second respective portion of the range of orientations (738) (e.g., the electronic device generates a continuous textural tactile output while the electronic device is oriented away from the first location. In some embodiments, a characteristic (e.g., frequency, amplitude, pattern, etc.) of the textural tactile output changes in accordance with how close or far away from the first object the electronic device is oriented). For example, as the electronic device's orientation changes within the second respective range of orientations to be oriented further away from the first object, the amplitude of the textural tactile output increases. As another example, as the electronic device changes within the second respective range of orientations to be oriented further away from the first object, the amplitude of the textural tactile output decreases.

The above-described manner of presenting a discrete tactile output when the electronic device is oriented in the first respective portion of the range of orientations and presenting a textural tactile output when the electronic device is oriented in the second respective portion of the range of orientations allows the electronic device to present tactile outputs that distinguish the first respective portion of the range of orientations from the second respective portion of the range of orientations, which simplifies interactions between the user and the electronic device and enhances the operability of the electronic device (e.g., by providing more information using the tactile outputs and optionally without using an accompanying user interface displayed via the display device), which, additionally, reduces power usage and improves battery life of the electronic device by enabling the user to use the electronic device more quickly and efficiently and additionally conserves power by presenting information using the tactile output rather than the display device)

In some embodiments, such as in FIG. 6S, the textural tactile output 604 has a first amplitude that is greater than a second amplitude of the discrete tactile output 604, such as in FIG. 6T (740) (e.g., In some embodiments, while the electronic device is oriented in the second respective portion of the range of orientations, the amplitude of the tactile output increases as the orientation of the electronic device moves further away from the first respective portion of the range of orientations, and decreases as the orientation of the electronic device moves towards the first respective portion of the range of orientations).

The above-described manner of presenting a discrete tactile output with the second amplitude when the electronic device is oriented in the first respective portion of the range of orientations and presenting a textural tactile output with the first amplitude when the electronic device is oriented in the second respective portion of the range of orientations allows the electronic device to present tactile outputs that distinguish the first respective portion of the range of orientations from the second respective portion of the range of orientations, which simplifies interactions between the user and the electronic device and enhances the operability of the electronic device (e.g., by presenting more information using the tactile outputs and optionally without using an accompanying user interface displayed via the display device), which, additionally, reduces power usage and improves battery life of the electronic device by enabling the user to use the electronic device more quickly and efficiently and additionally conserves power by presenting information using the tactile output rather than the display device.

In some embodiments, such as in FIG. 6T, the discrete tactile output 604 has a first amplitude that is greater than a second amplitude of the textural tactile output 604, such as in FIG. 6R (742) (e.g., In some embodiments, while the electronic device is oriented in the second respective portion of the range of orientations, the amplitude of the tactile output decreases as the orientation of the electronic device moves further away from the first respective portion of the range of orientations, and increases as the orientation of the electronic device moves towards the first respective portion of the range of orientations).

The above-described manner of presenting a discrete tactile output with the first amplitude when the electronic device is oriented in the first respective portion of the range of orientations and presenting a textural tactile output with the second amplitude when the electronic device is oriented in the second respective portion of the range of orientations allows the electronic device to present tactile outputs that distinguish the first respective portion of the range of orientations from the second respective portion of the range of orientations, which simplifies interactions between the user and the electronic device and enhances the operability of the electronic device (e.g., by presenting more information using the tactile outputs and optionally without using an accompanying user interface displayed via the display device), which, additionally, reduces power usage and improves battery life of the electronic device by enabling the user to use the electronic device more quickly and efficiently and additionally conserves power by presenting information using the tactile output rather than the display device.

In some embodiments, such as in FIG. 6K, the first object 606 corresponds to a location 610 designated by a user on a mapping application on the electronic device 500 (744) (e.g., the electronic device generates the tactile outputs based on the orientation of the electronic device relative to the location designated by the user on the mapping application on the electronic device). For example, when the electronic device is relatively close to the location, the electronic device presents the tactile output for a relatively wide range of orientations relative to the location and, when the electronic device is further from the location, the electronic device presents the tactile output for a relatively narrow range of orientations relative to the location. The user-defined location on a map of the mapping application is optionally visually indicated by a pin or pin-like element placed at that location on the map of the mapping application.

The above-described manner of presenting the tactile output to indicate a location designated by the mapping application allows the electronic device to communicate the location designated on the mapping application to the user using the tactile output, which simplifies interactions between the user and the electronic device and enhances the operability of the electronic device (e.g., by enabling the user to receive information about the location designated on the mapping application without looking at a user interface presented via the display device), which, additionally, reduces power usage and improves battery life of the electronic device by enabling the user to use the electronic device more quickly and efficiently.

In some embodiments, such as in FIG. 6Z, the first object 616 is an object in an environment of the electronic device 500 (746) (e.g., the first object is a second electronic device, such as a smartphone, media player, wearable device, personal computer, or a smart home device (e.g., smart lock, smart lights, smart thermostat, smart kitchen appliance etc.) that the electronic device is able to interact with or some other device that the electronic device is able to recognize via image recognition using a camera in communication with the electronic device). For example, the electronic device generates the tactile output in response to detecting the first object to indicate to the user the location of the object. As another example, when the first object is a second electronic device, the electronic device generates the tactile output to indicate that the electronic device is able to interact with the second electronic device. In some embodiments, the first object is not an electronic device, but rather simply a physical object, such as a landmark or a building or a door.

The above-described manner of generating the tactile output in response to the electronic device's orientation relative to an object in the environment of the electronic device allows the electronic device to convey information to the user about the object in the environment of the electronic device (e.g., location, whether or not the electronic device is able to interact with the first object) using the tactile output optionally without presenting a user interface via the display device, which simplifies interactions between the user and the electronic device and enhances the operability of the electronic device (e.g., by enabling the user to feel the tactile output to receive the information about the object without looking at the electronic device), which, additionally, reduces power usage and improves battery life of the electronic device by enabling the user to use the electronic device more quickly and efficiently and further reduces power usage when providing the tactile output without presenting a user interface via the display device.

In some embodiments, such as in FIGS. 6A-6F, one or more values of one or more characteristics of the first tactile output 604 illustrated in FIG. 6A are different than one or more values of the one or more characteristics of the second tactile output 604 illustrated in FIG. 6F (748) (e.g., the one or more characteristics are one or more of frequency, amplitude, pattern, frequency of discrete pulses, etc.). For example, in addition to generating the tactile output for different portions of the range of orientations at the different distances from the first object, the electronic device also generates tactile outputs with differing values for the one or more characteristics for the different distances from the first object (e.g., for the same orientation with respect to the first object, the electronic device generates tactile outputs with different values for one or more of the above characteristics when the electronic device is different distances from the first object).

The above-described manner of varying the values of the one or more characteristics of the tactile outputs when the distance between the electronic device and the first object are different allows the electronic device to convey, with the tactile output, the distance between the electronic device and the first object, which simplifies interactions between the user and the electronic device and enhances the operability of the electronic device (e.g., conveying more information using the tactile outputs which enables the user to receive the information about distance to the first electronic device without looking at a user interface displayed via the display device), which, additionally, reduces power usage and improves battery life of the electronic device by enabling the user to use the electronic device more quickly and efficiently and optionally enables the electronic device to forgo presenting a user interface via the display device which provides further power savings.

In some embodiments, such as in FIGS. 6B-6C, the sequence of one or more inputs includes detecting movement of the electronic device 500 (750) (e.g., the electronic device generates the tactile outputs while the electronic device is moving (e.g., moving closer to and further away from the first object, moving in orientation with respect to the first object, etc.) and does not generate the tactile outputs when the electronic device is not moving).

The above-described manner of generating the tactile outputs in response to detecting movement of the electronic device allows the electronic device to forgo generating the tactile output when no movement of the electronic device is detected, which reduces power usage and improves battery life of the electronic device by enabling the user to use the electronic device more quickly and efficiently.

In some embodiments, such as in FIG. 6B, generating the first tactile output 604 occurs while the electronic device 500 is moving, and does not occur while the electronic device 500 is not moving, such as in FIG. 6A (752) (e.g., the electronic device generates the tactile outputs while the electronic device is moving and does not generate the tactile outputs when the electronic device is not moving). Even if the electronic device is oriented in an orientation that is in the first portion of the range of orientations, the electronic device optionally does not generate the tactile output if the electronic device is not moving. In some embodiments, generating the second tactile output 604 occurs while the electronic device 500 is moving such as in FIG. 6F, and does not occur while the electronic device is not moving (754) (e.g., the electronic device generates the tactile outputs while the electronic device is moving and does not generate the tactile outputs when the electronic device is not moving). Even if the orientation of the electronic device is in an orientation that is in the first or second portions of the range of orientations, the electronic device does not generate the tactile output when the electronic device is not moving.

The above-described manner of generating the tactile outputs in response to detecting movement of the electronic device allows the electronic device to forgo generating the tactile output when no movement of the electronic device is detected, which reduces power usage and improves battery life of the electronic device by enabling the user to use the electronic device more quickly and efficiently.

In some embodiments, such as in FIGS. 6X-6Y, the sequence of one or more inputs corresponds to a first range of orientations with respect to the first object 606 and a second range of orientations with respect to a second object 612, different than the first object 606, and the electronic device 500 is configured to generate tactile output 604 with one or more first values for one or more characteristics (e.g., frequency, amplitude, pattern, etc.) of the tactile output 604 based on the first range of orientations with respect to the first object 606, such as in FIG. 6X (e.g., the electronic device generates a tactile output with a particular pattern (e.g., a sharp pattern that includes a series of periodic discrete tactile outputs) in response to detecting the electronic device is oriented in a first range of orientations with respect to the first object, such as being oriented towards the first object within a predetermined range of angles), and to generate tactile output 604 with one or more second values for the one or more characteristics, different than the first values, of the tactile output based on the second range of orientations with respect to the second object 612, such as in FIG. 6Y (756) (e.g., the electronic device generates a tactile output with a particular pattern (e.g., a rumbling pattern that includes a tactile output with an oscillating amplitude) in response to detecting the electronic device is oriented in the second range of orientations with respect to the second object, such as being oriented towards the second object within a predetermined range of angles). In some embodiments, the electronic device varies a different characteristic of the tactile output within the first range of orientations with respect to the first object, such as increasing the amplitude of the tactile output as the electronic device's orientation is closer to being aligned with the first object. In some embodiments, the electronic device varies a different characteristic of the tactile output within the second range of orientations with respect to the second object, such as increasing the amplitude of the tactile output as the electronic device's orientation is closer to being aligned with the second object. In some embodiments, the electronic device generates tactile outputs with different textures in response to detecting that the electronic device is oriented towards objects of different types. For example, the electronic device optionally generates a series of discrete tactile pulses in response to detecting that the electronic device is oriented towards a smart home device (e.g., smart lock, smart climate control device, smart kitchen appliance, smart light, etc.) and generates a rumbling tactile output in response to detecting that the electronic device is oriented towards a personal electronic device (e.g., smart watch, smart phone, media player, tablet, computer) belonging to a different user than the user of the electronic device.

The above-described manner of generating a tactile output with a different value for a given characteristic depending on which object toward which the electronic device is oriented allows the electronic device to communicate to the user which object towards which the electronic device is oriented using the tactile output, which simplifies interactions between the user and the electronic device and enhances the operability of the electronic device (e.g., by informing the user which object towards which the electronic device is oriented without requiring the user to look at a user interface presented via the display device), which, additionally, reduces power usage and improves battery life of the electronic device by enabling the user to use the electronic device more quickly and efficiently, and further reduces power usage if the electronic device forgoes presenting a user interface via the display device while generating the tactile outputs.

In some embodiments, such as in FIG. 6Z, the sequence of one or more inputs comprises movement of a control element 614 on the electronic device 500 (758) (e.g., the electronic device generates the tactile output in response to detecting the orientation of the control element relative to the first electronic device). For example, the electronic device presents a user interface via the display device that includes an indication of an orientation and a distance that is manipulable by the user. For example, the user is able to move the control element to define a distance and orientation relative to the electronic device and, in response, the electronic device generates a tactile output indicative of the orientation (and distance) represented by the control element relative to the first object. In response to detecting that the control element is in the first portion of the range of orientations but not the second portion of the range of orientations, the electronic device generates the first tactile output. In response to detecting that the control element is in the second range of orientations, the electronic device generates the second tactile output.

The above-described manner of presenting the tactile output in response to the orientation of the control element allows the electronic device to enable the user to use the control element to search for the object without changing the orientation of the electronic device itself, which simplifies interactions between the user and the electronic device and enhances the operability of the electronic device (e.g., by enabling the user to change the orientation and position of the control element faster than the user would be able to change the orientation and position of the electronic device), which, additionally, reduces power usage and improves battery life of the electronic device by enabling the user to use the electronic device more quickly and efficiently.

It should be understood that the particular order in which the operations in FIGS. 7A-7E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, and 1300) are also applicable in an analogous manner to method 700 described above with respect to FIGS. 7A-7E. For example, the ways of generating tactile output in response to a range of orientations that changes in response to the distance between the electronic device and a respective object described above with reference to method 700 optionally have one or more of the characteristics of the ways of modifying a tactile output as the orientation of an electronic device relative to a respective object changes, generating tactile outputs indicative of AR planes, and generating tactile outputs indicative of data sharing with a second electronic device, etc., described herein with reference to other methods described herein (e.g., methods 900, 1100, and 1300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7I are, optionally, implemented by components depicted in FIGS. 1A-1B. For example, receiving operations 702 and 716 and generating operations 706, 708, and 718 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Modifying a Tactile Output in Accordance with Orientation Relative to a Respective Object Users interact with electronic devices in many different manners, including locating objects using the electronic device. In some embodiments, an electronic device generates a tactile output with a characteristic that changes as the orientation of the electronic device relative to the object changes. The embodiments described below provide ways in which the electronic device prevents auto-dismissal of indications of events in response to detecting an object hovering over the touch-sensitive display of the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 8A-8EE illustrates exemplary ways in which the electronic device 500 changes one or more characteristics of a tactile output in response to detecting a change in the orientation of the electronic device relative to a respective object in accordance with some embodiments of the disclosure. The embodiments in these figures are used to illustrate the processes described below, including the processes described with reference to FIGS. 9A-9F.

FIGS. 8A-8B illustrate the electronic device 500a generating a tactile output sequence 804 defined by a point cloud model 808 around the location of an object 806. As shown in FIG. 8A, the electronic device 500a is located within the point cloud model 808 around the object 806. At the electronic device's location illustrated in FIG. 8A, the electronic device 500a generates a tactile output sequence (e.g., a "Major tactile output described above with reference to Table 1). The tactile output sequence includes a series of discrete tactile pulses indicative of the electronic device's location within the point cloud 808 model around the object 806.

In FIG. 8B, the electronic device 500a moves closer to the object 806 within the point cloud model 808 around the location of the object 806. In response to the location of the electronic device 500a within the point cloud model 808 around the location of the object 806, the electronic device 500a generates a tactile output sequence (e.g., a "Major-reduced" tactile output described above with reference to Table 1). The tactile output sequence includes a series of discrete tactile pulses indicative of the electronic device's location within the point cloud 808 model around the object 806. The frequency of the tactile output illustrated in FIG. 8B is higher than the frequency of the tactile output illustrated in FIG. 8A because the electronic device 500a is closer to the object 806 in FIG. 8B than the electronic device 500a is in FIG. 8A. The period between discrete tactile taps in the tactile output sequence 804 illustrated in FIG. 8B is shorter than the period between discrete tactile taps in the tactile output sequence 804 illustrated in FIG. 8A. More generally, as the points in the point cloud 808 get denser, the period of discrete tactile taps in a tactile output sequence generated by the electronic device 500 gets shorter.

Figure 8C:
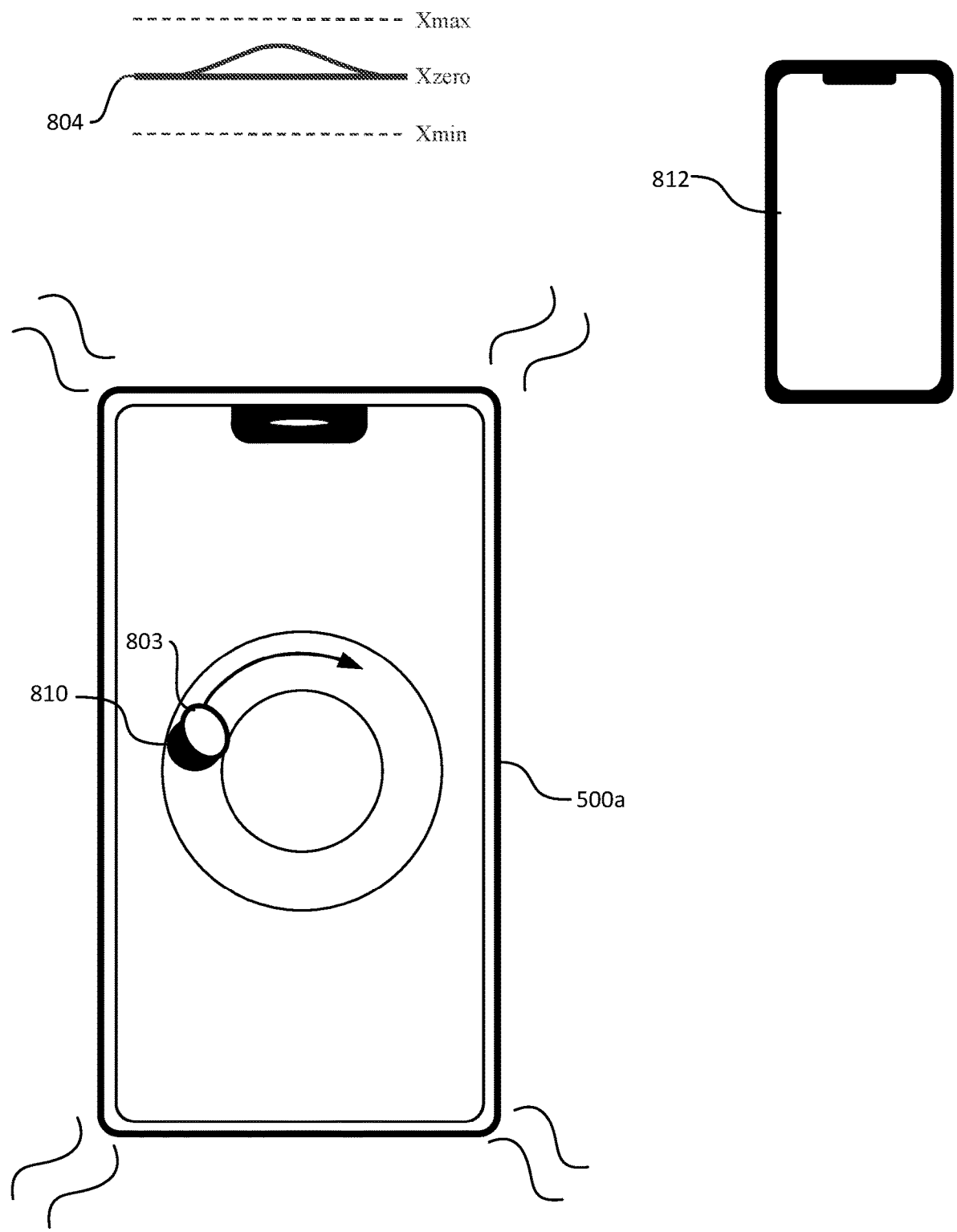
Figure 8D:
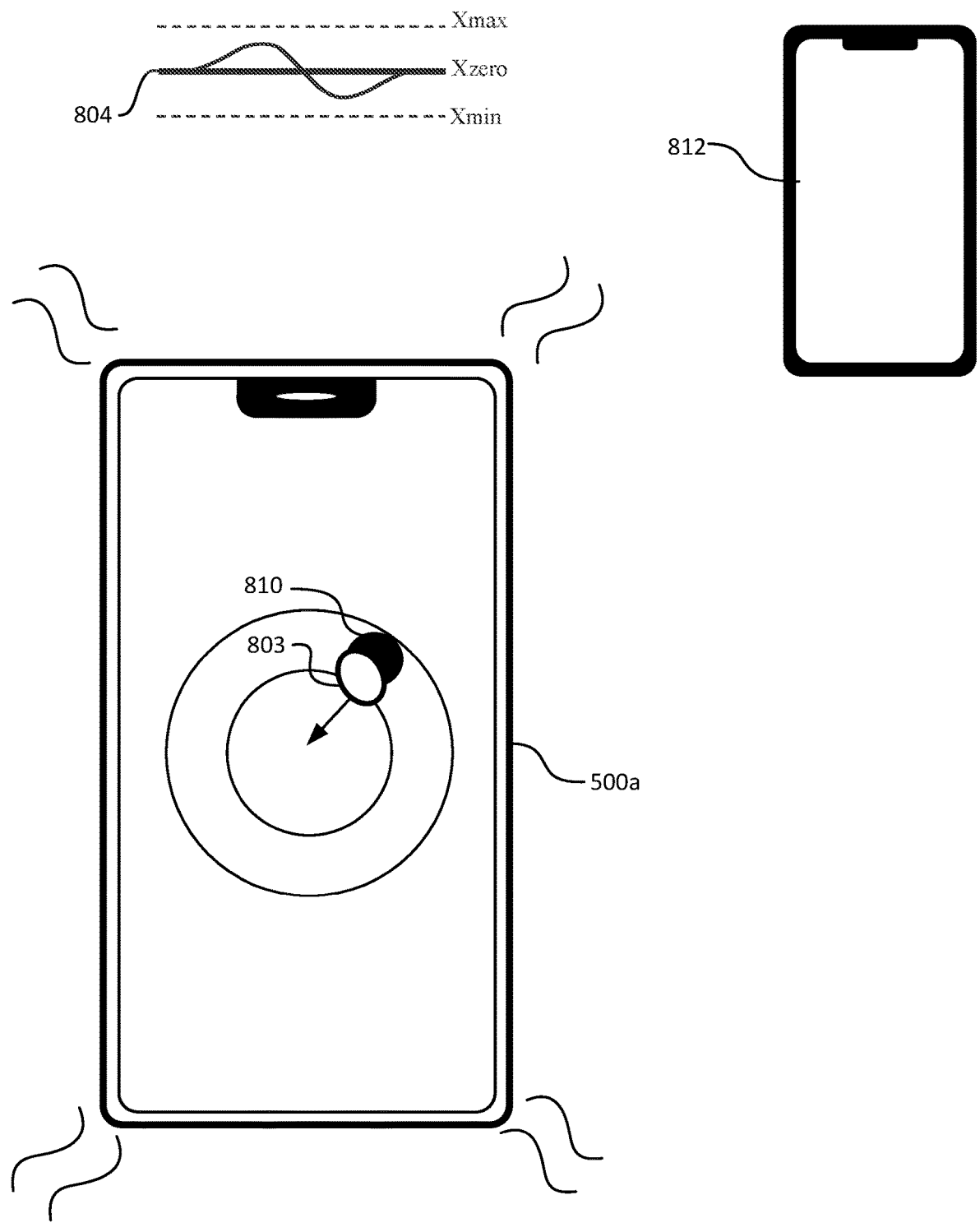
Figure 8E:
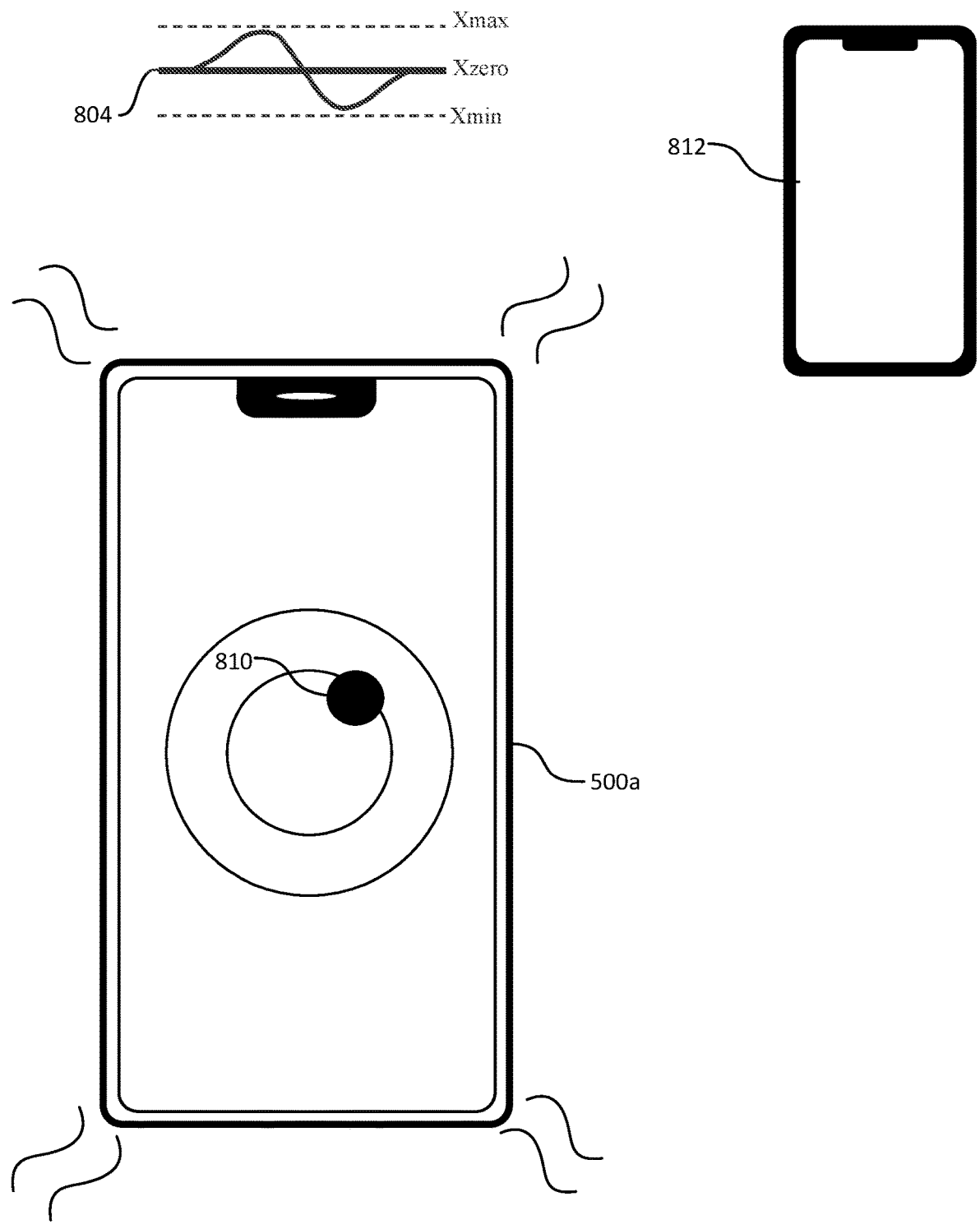

FIGS. 8C-8E illustrate the electronic device 500a generating a tactile output 804 that changes in response to changes in the orientation of a control element 810 displayed on the display 504 relative to another electronic device 812. As shown in FIG. 8C, while the orientation of the control element 810 is pointed away from the other electronic device 812, the electronic device 500 generates a tactile output sequence 804 (e.g., a "Minor" tactile output described above with reference to Table 1) that is a continuous textural tactile output sequence. The user selects (e.g., with contact 803) the control element 810 to change the orientation of the control element 810.

In FIG. 8D, the electronic device 500a presents the control element 810 at a position in accordance with the user input illustrated in FIG. 8C. As shown in FIG. 8D, the orientation of the control element 810 is towards the other electronic device 812. In response to the orientation of the control element 810 relative to the other electronic device 812, the electronic device 500a generates a tactile output sequence 804 (e.g., a "Major" tactile output sequence) that includes periodic discrete tactile pulses. The user selects (e.g., with contact 803) the control element 810 to change the distance from the electronic device 500a represented by the control element 810.

In response to the user input illustrated in FIG. 8D, the electronic device 500a moves the control element 810 to the position illustrated in FIG. 8E. In response to the position of the control element 810, the electronic device 500 generates a tactile output sequence 804 (e.g., a "Major" tactile output described above with reference to Table 1) that includes a series of periodic discrete tactile pulses. The intensity or amplitude of the tactile output 804 illustrated in FIG. 8E is greater than the intensity or amplitude of the tactile output 804 illustrated in FIG. 8D because the distance represented by the control element 810 illustrated in FIG. 8E is closer to the location of the second electronic device 812 than the distance represented by the control element 810 in FIG. 8D.

Figure 8F:
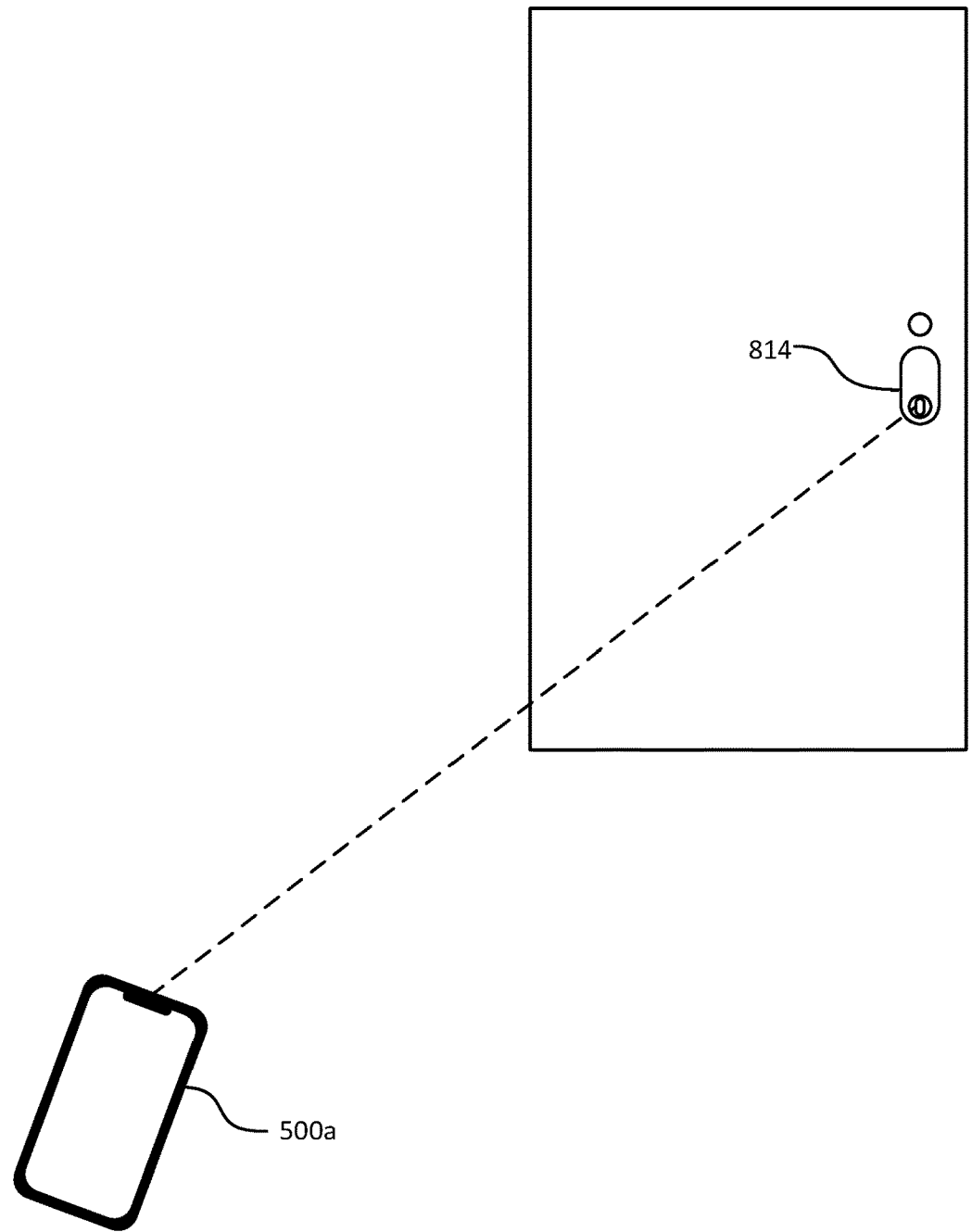

FIGS. 8F-8G illustrate the electronic device 500a generating a tactile output in response to detecting a smart lock 814 within communication range of the electronic device 500a. In FIG. 8F, the electronic device 500a is positioned at a distance away from the smart lock 814 that is further than the communication range of the smart lock 814 and electronic device 500a. Thus, the electronic device 500a is not presently in communication with the smart lock 814 and does not generate a tactile output that indicates the smart lock 814.

In FIG. 8G, the electronic device 500a is closer to the smart lock 814 than the distance between the electronic device 500a and the smart lock 814 in FIG. 8F. Thus, the electronic device 500a is in communication with the smart lock 814 in FIG. 8G. In response to detecting the smart lock 814, the electronic device 500a generates a tactile output. The tactile output is a discrete tactile output (e.g., a "Major" tactile output described above with reference to Table 1), including a single discrete tactile output or a periodic series of discrete tactile pulses, or a continuous textural tactile output (e.g., a "Minor" tactile output described above with reference to Table 1).

Figure 8H:
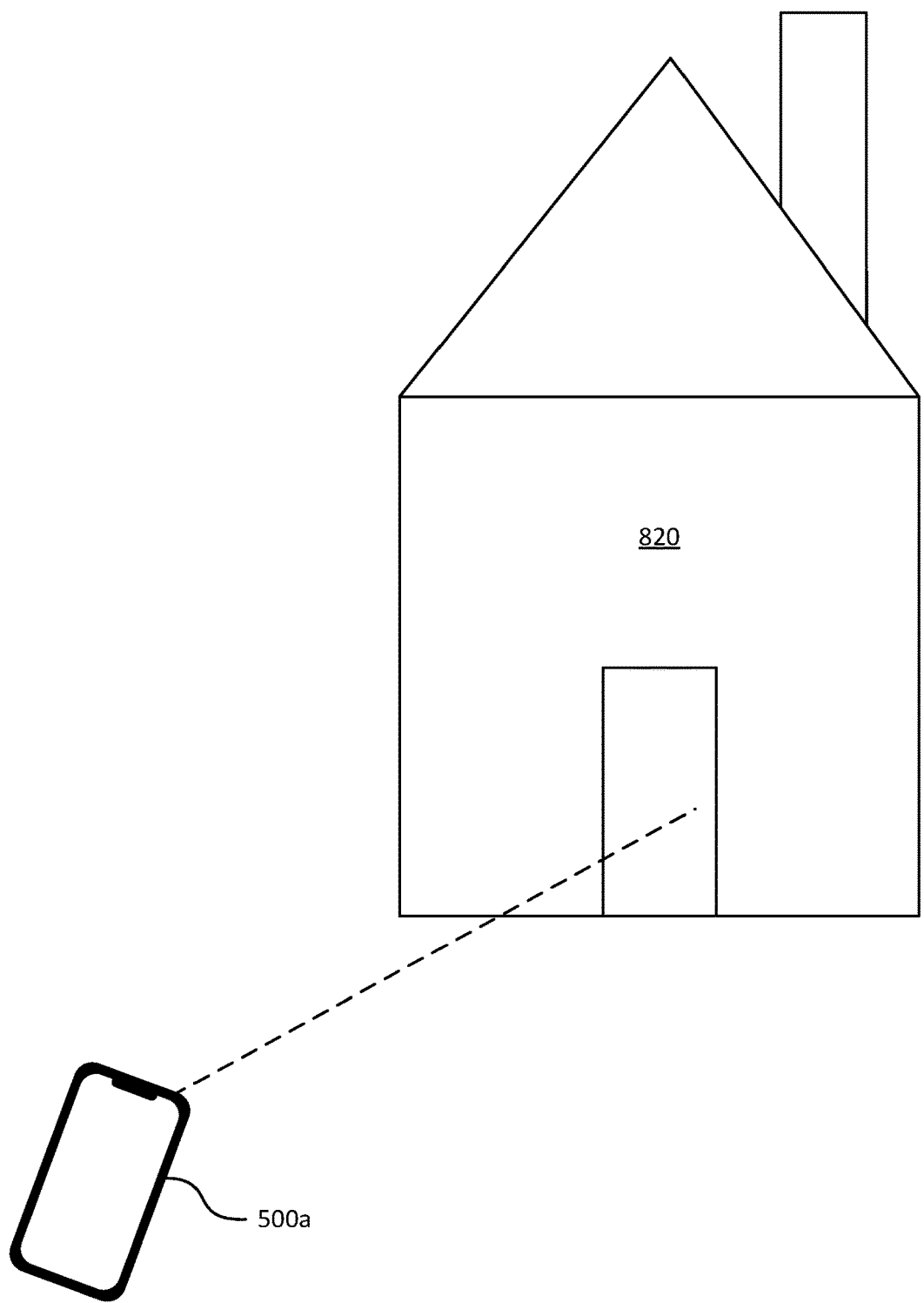
Figure 8I:
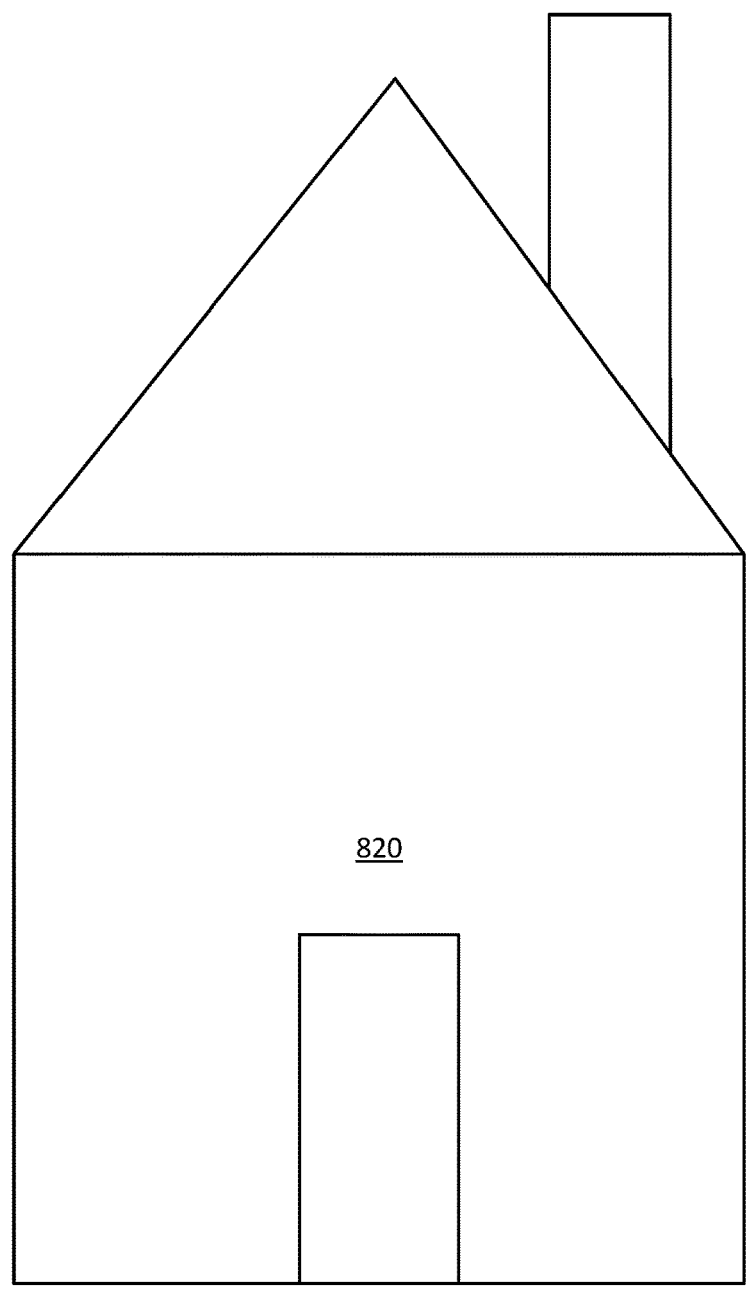

In some embodiments, while navigating to a navigation destination, the electronic device 500 generates a tactile output in response to detecting that the electronic device 500 crosses a first threshold distance from the navigation destination while moving towards the navigation destination. In this way, the electronic device 500 indicates to the user that the user has arrived at the navigation destination. FIGS. 8H-8I illustrate the electronic device 500a generating a tactile output in response to detecting the electronic device 500a crossing a threshold distance from a navigation destination 820 while moving towards the navigation destination 820. In this way, the electronic device 500a is able to indicate to the user that the electronic device 500a is arriving at the navigation destination 820.

In FIG. 8H, the electronic device 500a is positioned a distance away from the navigation destination 820 while navigating towards the navigation destination 820. The distance is greater than the threshold distance and the electronic device 500a does not generate a tactile output at the distance illustrated in FIG. 8H.

In FIG. 8I, the electronic device 500a moves closer to the navigation destination 820 and crosses the threshold distance. In response to crossing the threshold distance while moving closer to the navigation destination, the electronic device 500a generates a tactile output and an audio output. The tactile output and audio output indicate to the user that the electronic device 500a has arrived at the navigation destination 820. If the electronic device 500 crosses the threshold distance while moving away from the navigation destination 820, the electronic device does not generate the tactile output.

In some embodiments, while navigating to a navigation destination, the electronic device 500 generates a tactile output in response to detecting that the electronic device crosses a threshold distance from the navigation destination while moving away from the navigation destination. In this way, the electronic device 500 informs the user that they are moving the wrong way according to the navigation directions. FIGS. 8J-8K illustrate the electronic device 500a generating a tactile output in response to detecting the electronic device 500a crossing a threshold distance from a navigation destination 820 while moving away from the navigation destination 820. In this way, the electronic device 500a is able to indicate to the user that the electronic device 500a is moving past or away from the navigation destination 820.

In FIG. 8J, the electronic device 500a is positioned a distance away from the navigation destination 820 while navigating towards the navigation destination 820. The distance is less than the threshold distance and the electronic device 500a does not generate a tactile output at the distance illustrated in FIG. 8J.

In FIG. 8K, the electronic device 500a moves further away from the navigation destination 820 and crosses the threshold distance. In response to crossing the threshold distance while moving away from the navigation destination, the electronic device 500a generates a tactile output and an audio output. The tactile output and audio output indicate to the user that the electronic device 500a is moving the wrong way with respect to the navigation destination 820. In some embodiments, the tactile output and audio output illustrated in FIG. 8K are different from the tactile output and audio output illustrated in FIG. 8I. If the electronic device 500 crosses the threshold distance while moving towards the navigation destination 820, the electronic device does not generate the tactile output.

Figure 8L:
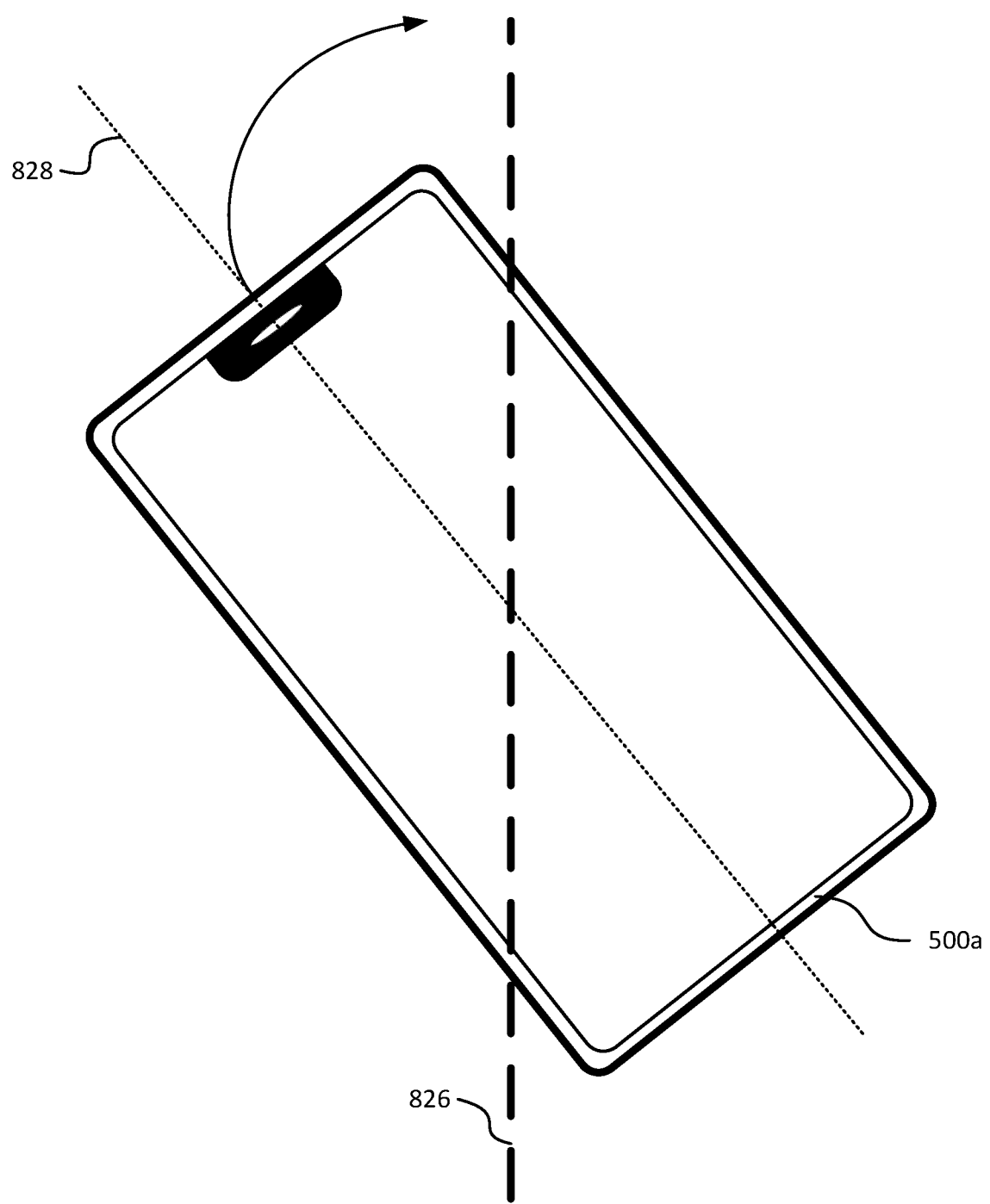
Figure 8M:
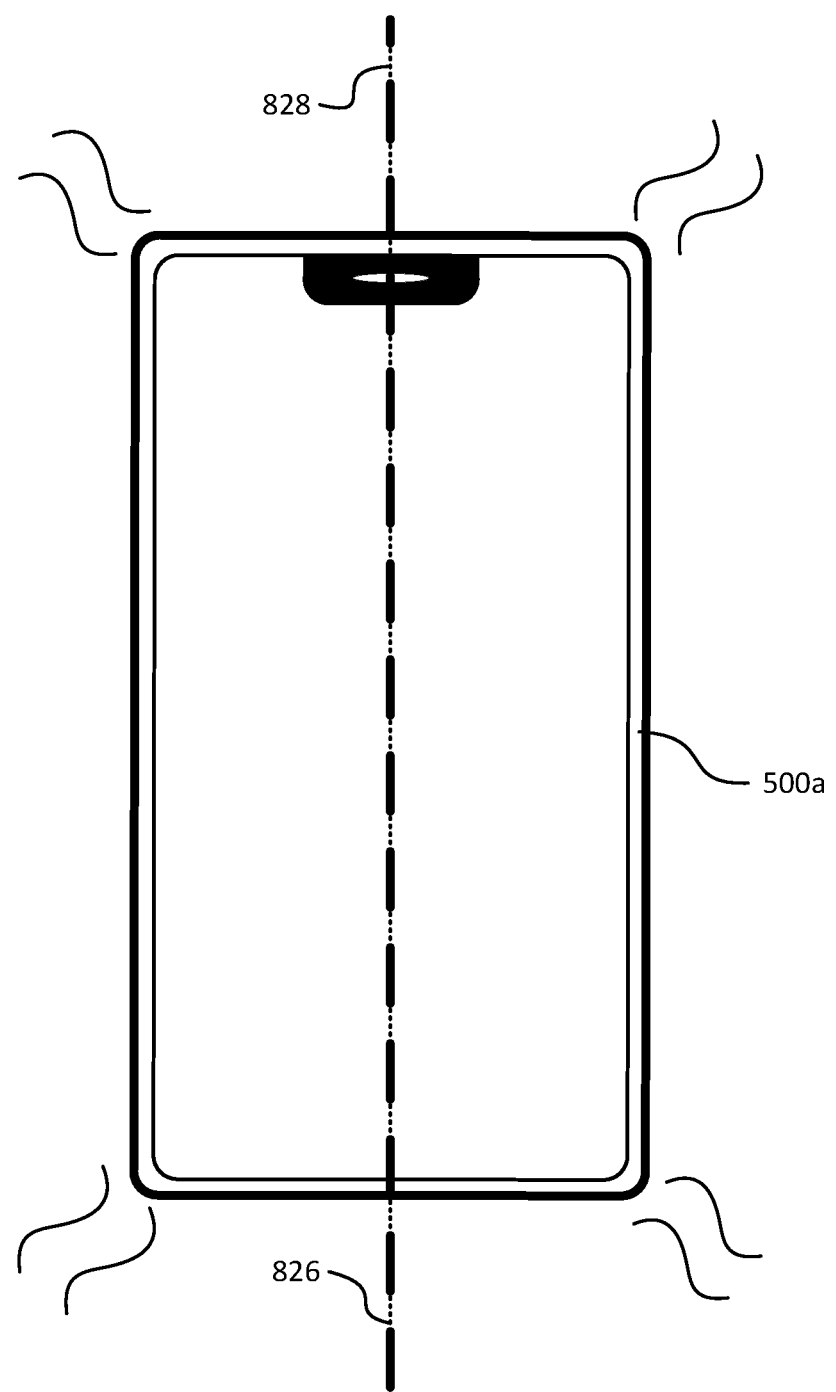

FIGS. 8L-8M illustrate the electronic device 500a generating a tactile output in response to moving into a predetermined orientation 826. The predetermined orientation is optionally an orientation at which the electronic device 500a is able to interact with AR (augmented reality) content, a smart home appliance, or another physical or virtual object. In FIG. 8L, the center axis 828 of the electronic device 500a is not aligned with a predetermined orientation 826. Therefore, the electronic device 500a does not generate a tactile output. As shown in FIG. 8L, the user moves the electronic device 500a towards the predetermined orientation. In FIG. 8M, the electronic device 500 is positioned such that the center axis 828 of the electronic device 500a aligns with the predetermined orientation 826. In response to the electronic device's orientation matching the predetermined orientation 826, the electronic device 500 generates a tactile output (e.g., a "Major" tactile output described above with reference to Table 1).

Figure 8N:
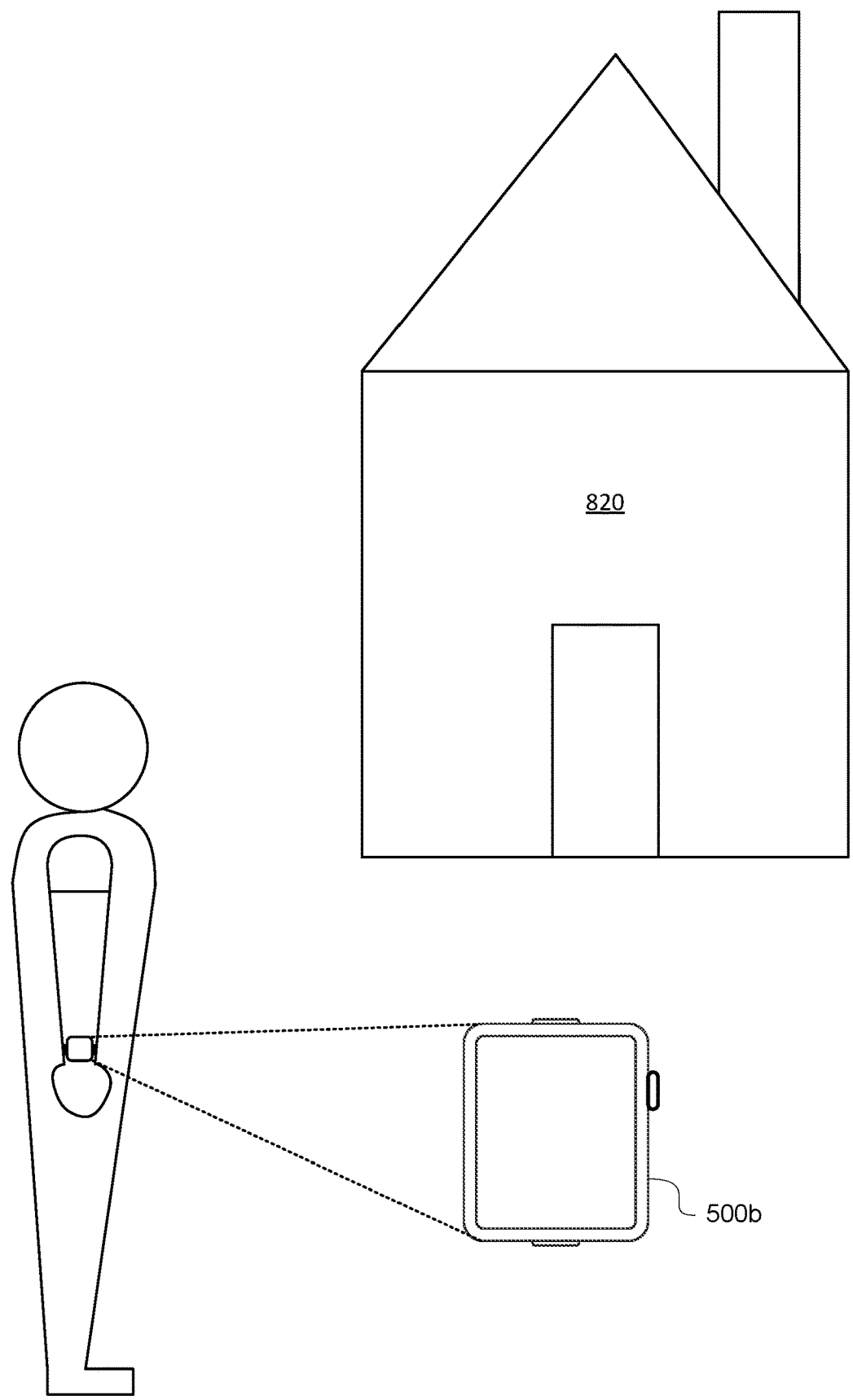
Figure 8O:
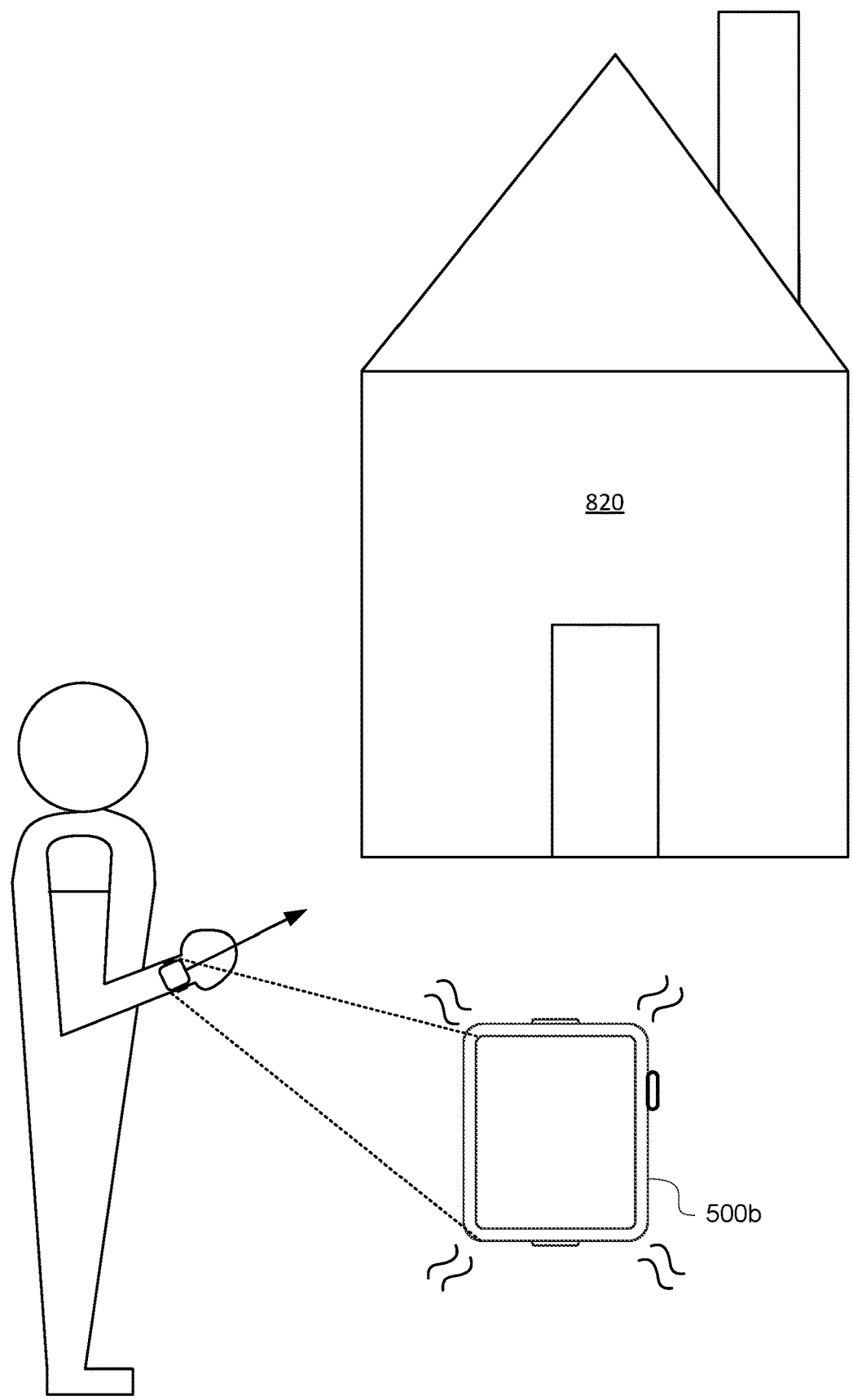

FIGS. 8N-8O illustrate a wearable electronic device 500b generating a tactile output in response to detecting that the user is pointing at a navigation destination 820 with the hand of the arm that wears the wearable electronic device 500b. In FIG. 8N, the user wears the electronic device 500b on their arm and does not point at the navigation destination 820. Because the orientation of the electronic device 500b is not indicative of the user pointing at the navigation destination 820, the electronic device 500b does not generate a tactile output. In FIG. 8O, the user points at the navigation destination 820 using the hand of the arm that wears the electronic device 500b. In response to detecting that the orientation of the electronic device 500b is indicative of the user pointing at the navigation destination 820, the electronic device 500b generates a tactile output (e.g., a "Major" tactile output described above with reference to Table 1). In this way, a wearable electronic device 500b is able to indicate the location of the navigation destination 820 to the user with the tactile output.

Figure 8P:
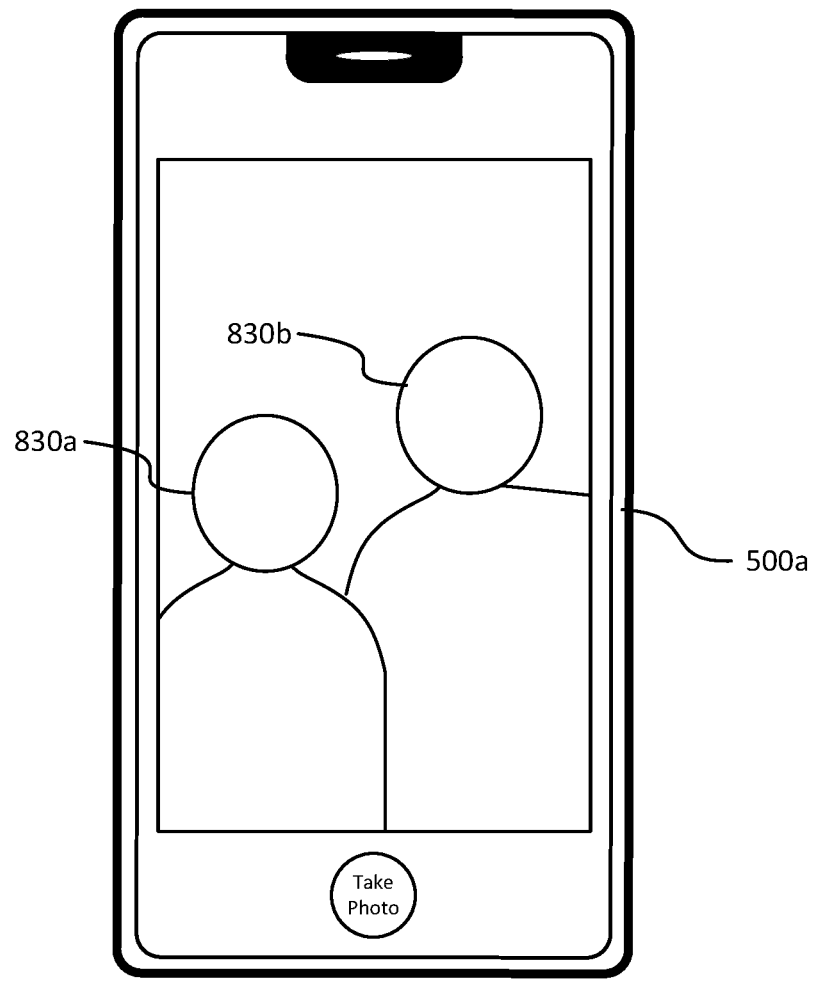
Figure 8Q:
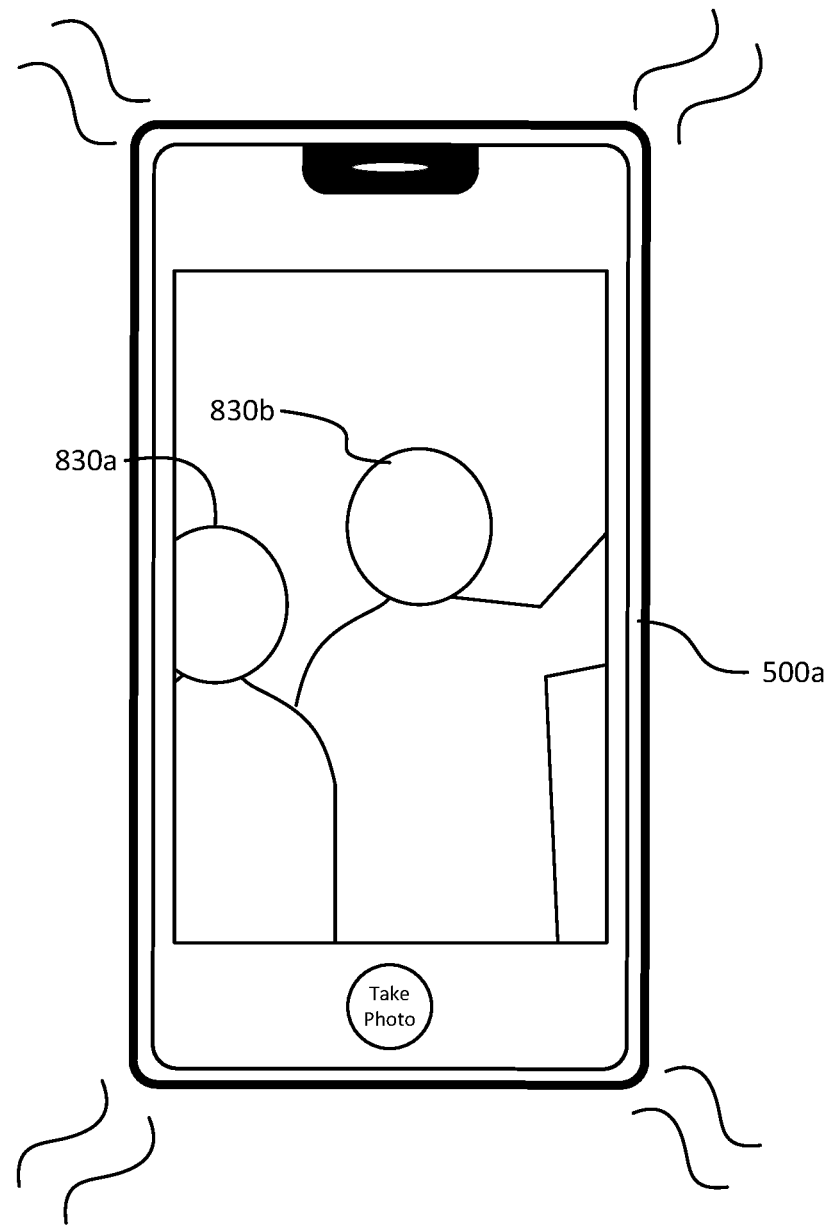

FIGS. 8P-8Q illustrate the electronic device 500a generating a tactile output when a face 830a is cut out of a field of view of a camera of the electronic device 500a while taking a picture with the camera of the electronic device 500a. In FIG. 8P, the camera of the electronic device 500a captures an image of faces 830a and 830b (e.g., using a camera on the same face of the electronic device as is the display of the electronic device). Because both faces are within the field of view of the camera of the electronic device 500a, the electronic device 500a does not generate a tactile output. Even if one or more of faces 830a and 830b move around within the field of view of the camera of the electronic device 500a, the electronic device 500a optionally will not generate a tactile output as long as both faces 830a and 830b are fully within the field of view of the camera of the electronic device 500a.

In FIG. 8Q, the electronic device 500a detects that one of the faces 830a has moved such that is partially cropped out of the field of view of the camera of the electronic device 500a (e.g., the face reaches an edge of the field of view of the camera). In response to detecting that the face 830a is partially cropped out of the image, the electronic device 500a generates a tactile output. In this way, the electronic device 500a uses the tactile output to notify the user that one of the faces 830a is partially cropped out of the field of view of the camera of the electronic device 500a.

Figure 8R:
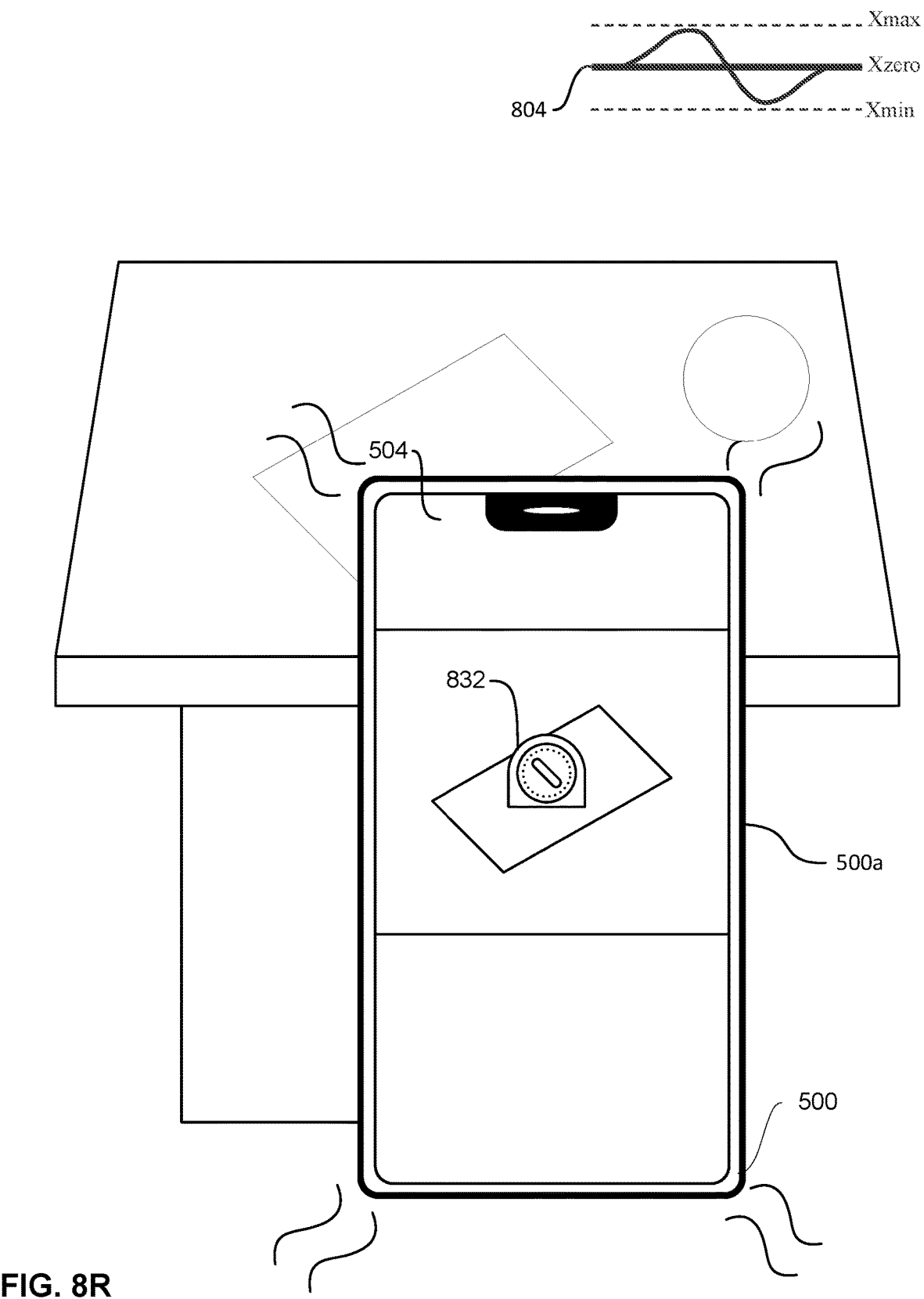

In FIGS. 8R-8S illustrate the electronic device 500a generating a tactile output 804 that is indicative of AR (augmented reality) content generated by the electronic device 500a. In FIG. 8R, a camera of the electronic device 500a captures an image of a location of the table at which the virtual timer 832 is located in the AR content. The electronic device 500a presents an image on the display 504 that includes a virtual timer 832. In response to presenting the image of the virtual timer 832, the electronic device 500a generates a tactile output (e.g., a "Major" tactile output described above with reference to Table 1). The tactile output is a series of periodic discrete tactile pulses that simulate the ticking of the virtual timer 832.

In FIG. 8S, the electronic device 500a is posited such that the location of the virtual timer is no longer in the field of view of the camera of the electronic device 500a. Thus, in FIG. 8S, the electronic device 500a generates a tactile output (e.g., a "Minor" tactile output described above with reference to Table 1) indicative of the AR plane captured in the field of view of the camera of the second electronic device 500a, rather than the tactile output that was indicative of the virtual timer, and different than the tactile output that was indicative of the virtual timer. The tactile output is a continuous textural tactile output with one or more characteristics indicative of the AR plane captured in the field of view of the camera of the electronic device 500a. The tactile output is generated in accordance with one or more steps of method 1100.

FIGS. 8T-8U illustrate how the electronic device 500a generates a tactile output when the electronic device 500a is pointed towards a smart lock with which the electronic device 500a is able to communicate and does not generate the tactile output when the electronic device 500a is pointed towards a smart lock with which the electronic device 500a is not able to communicate.

In FIG. 8T, the orientation of the electronic device 500a is towards a smart lock 814a with which the electronic device 500a is not able to communicate and away from a smart lock 814b with which the electronic device 500a is able to communicate. In response to the electronic device's orientation, the electronic device 500 does not generate a tactile output because the electronic device 500a is not able to communicate with smart lock 814a and is not oriented towards smart lock 814b, with which the electronic device 500 is able to communicate. Thus, when the user orients the electronic device 500a towards a smart lock 814a with which the electronic device 500b is not able to communicate, the electronic device 500a does not generate a tactile output indicative of the smart lock 814a.

In FIG. 8U, the orientation of the electronic device 500a is towards a smart lock 814b with which the electronic device 500a is able to communicate and away from a smart lock 814a with which the electronic device 500a is not able to communicate. In response to the electronic device's orientation, the electronic device 500 generates a tactile output indicative of smart lock 814b. Thus, when the user orients the electronic device 500a towards a smart lock 814b with which the electronic device 500b is able to communicate, the electronic device 500a generates a tactile output indicative of the smart lock 814b.

Figure 8V:
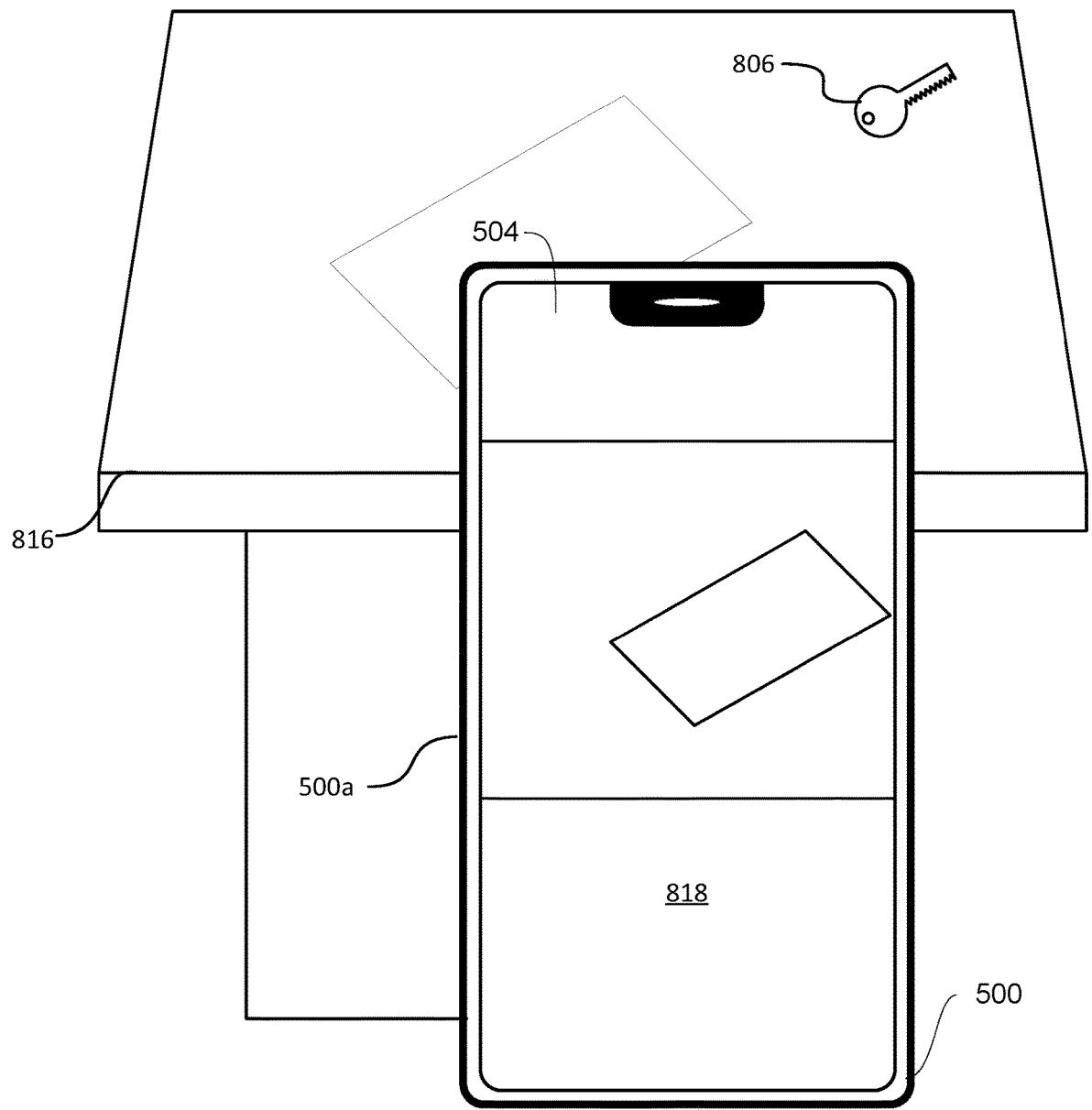
Figure 8W:
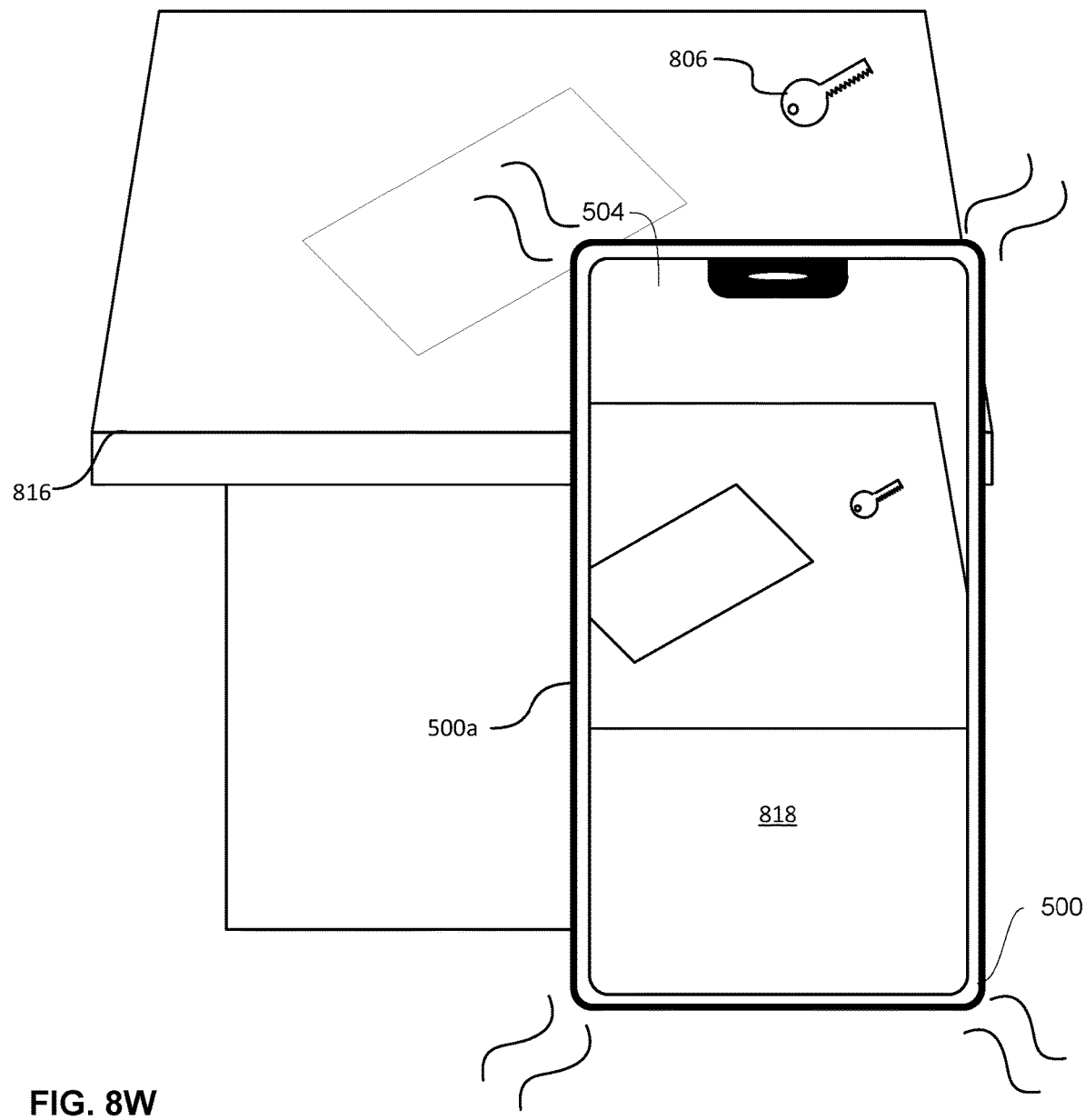

FIGS. 8V-8W illustrate the electronic device 500a generating a tactile output indicative of an object 806 that the electronic device 500a is able to locate using image recognition. In FIG. 8V, the electronic device 500a presents an image captured by the camera of the electronic device 500a. The image does not include the object 806 that the electronic device 500a is able to identify with image recognition. Therefore, the electronic device 500a forgoes generating a tactile output.

In FIG. 8W, the electronic device 500a captures an image 818 that includes the object 806. In response to recognizing the object 806 within the image 818, the electronic device 500a generates a tactile output indicative of the object 806. In this way, the electronic device 500a is able to use the tactile output to indicate to the user that the object 806 has been located with image recognition.

Figure 8X:
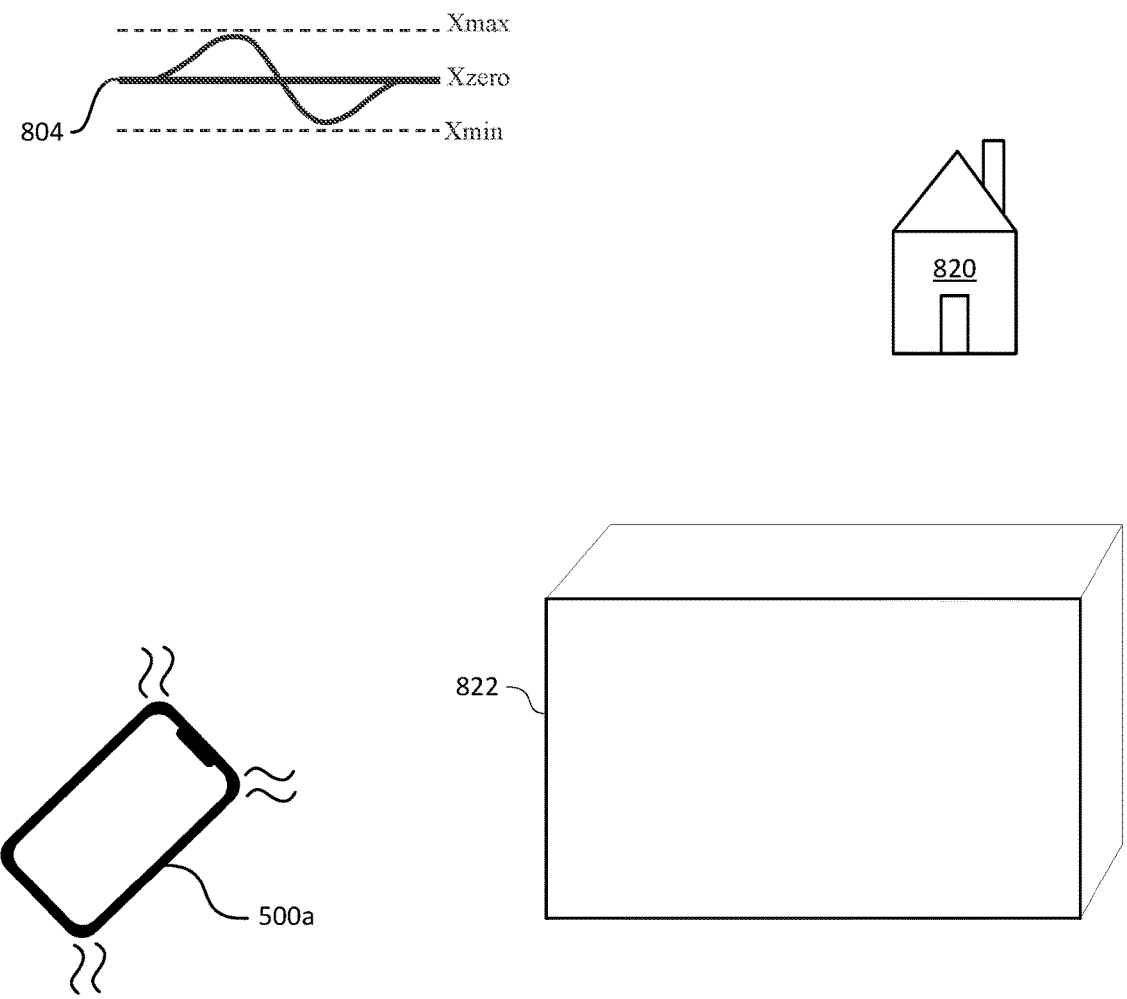
Figure 8Y:
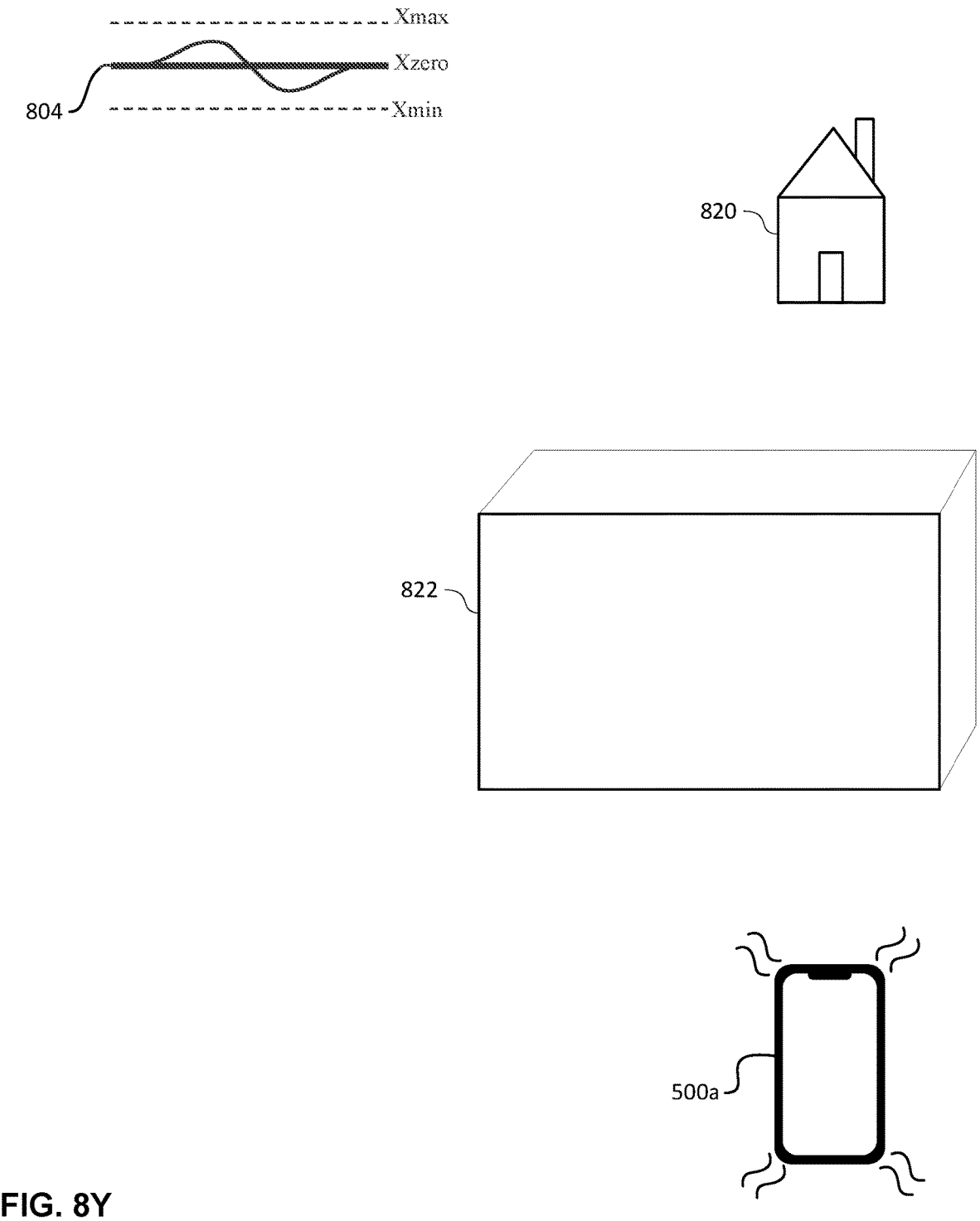
Figure 8B:
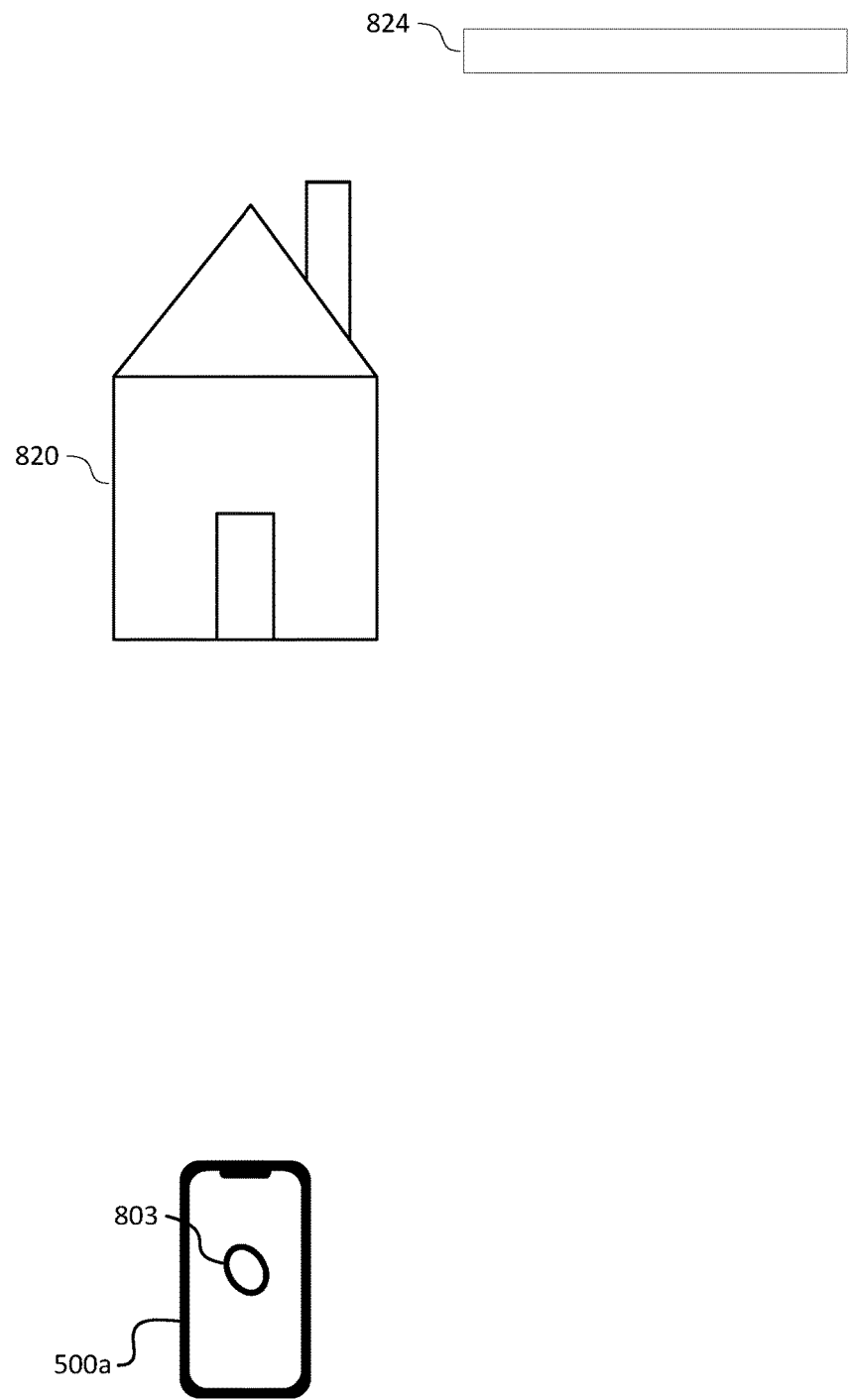
Figure 8C:
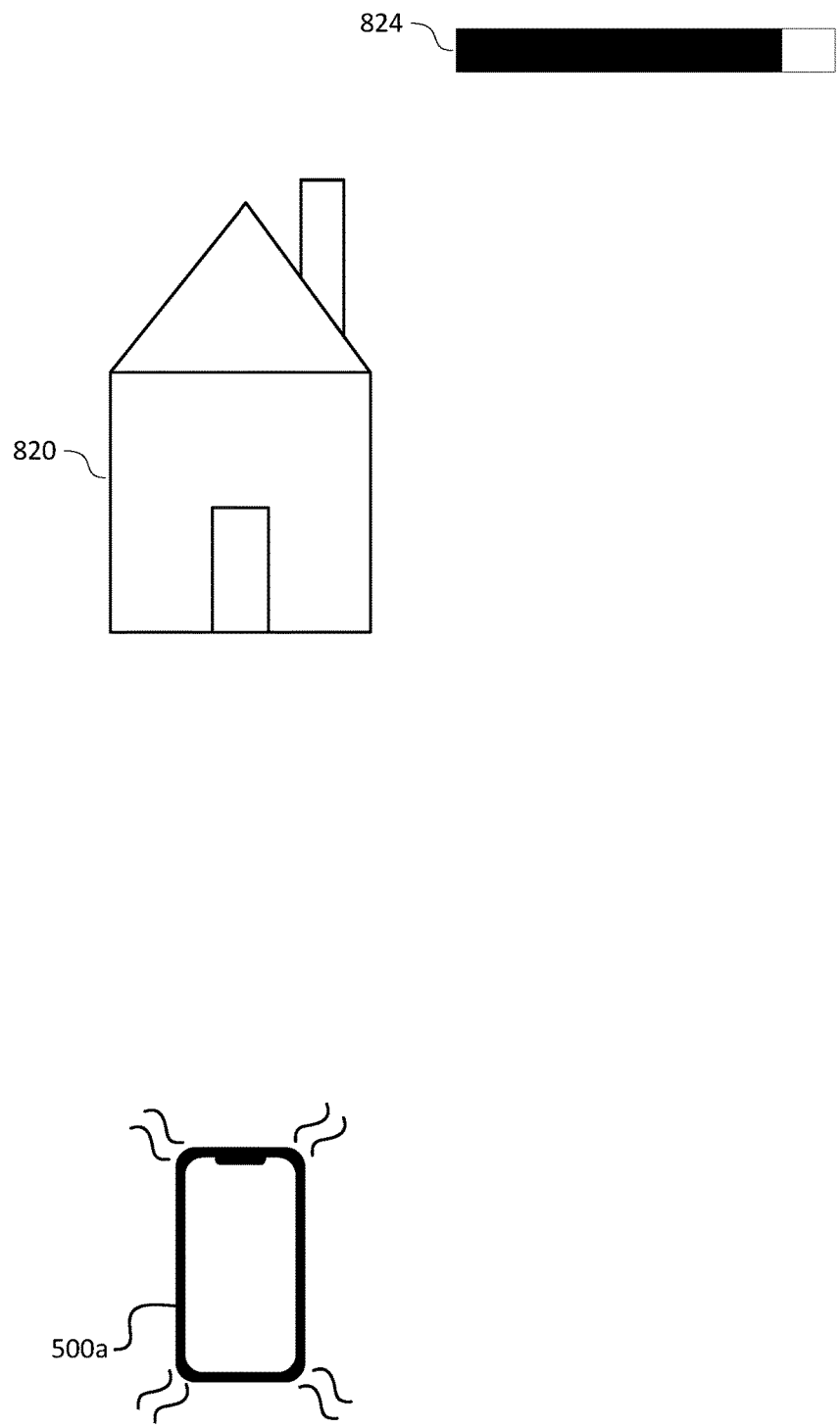
Figure 9A:
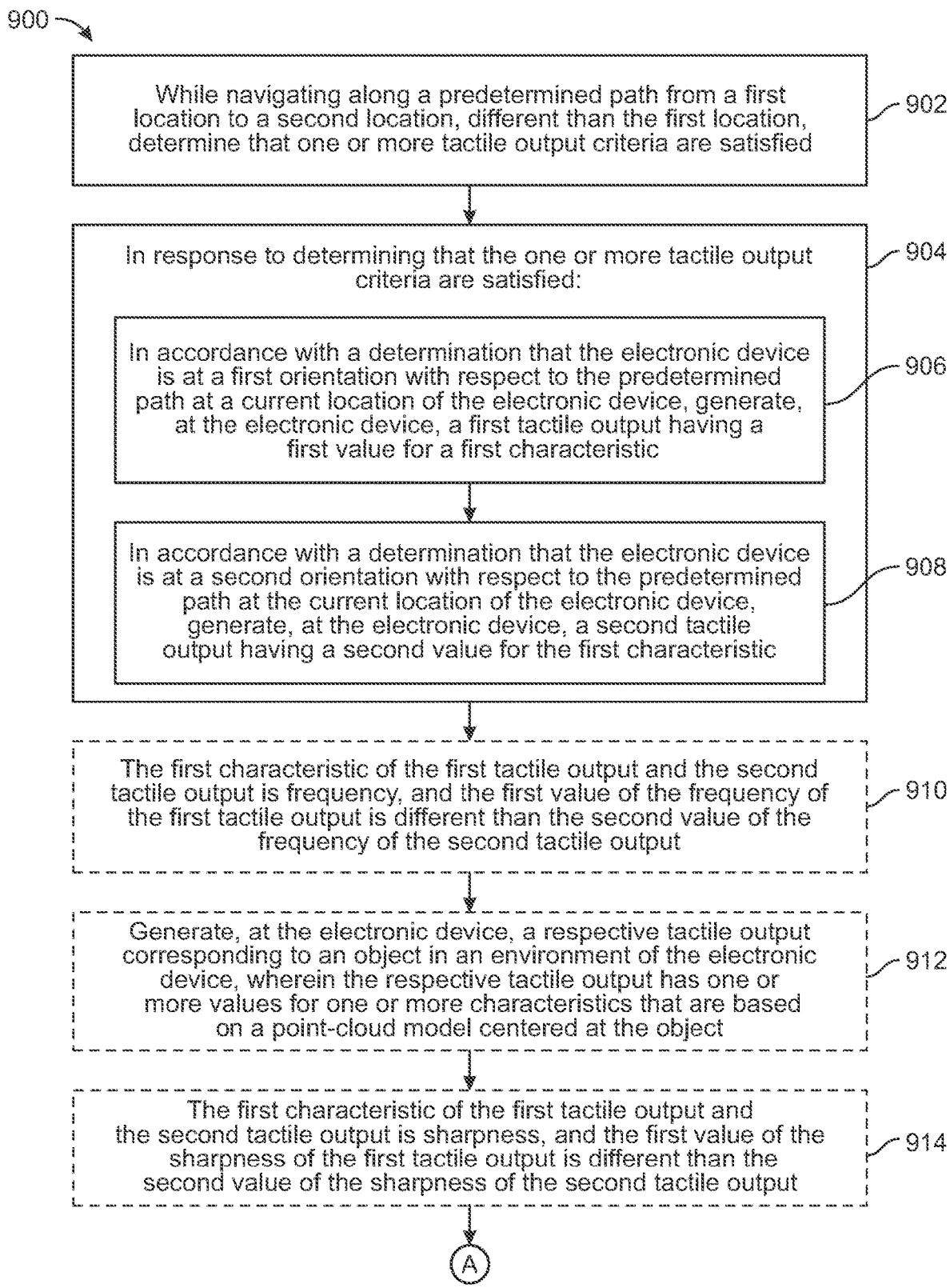
FIGS. 9A-9F are flow diagrams illustrating a method of changing one or more characteristics of a tactile output in response to detecting a change in the orientation of the electronic device relative to a respective object in accordance with some embodiments of the disclosure.
Figure 9B:
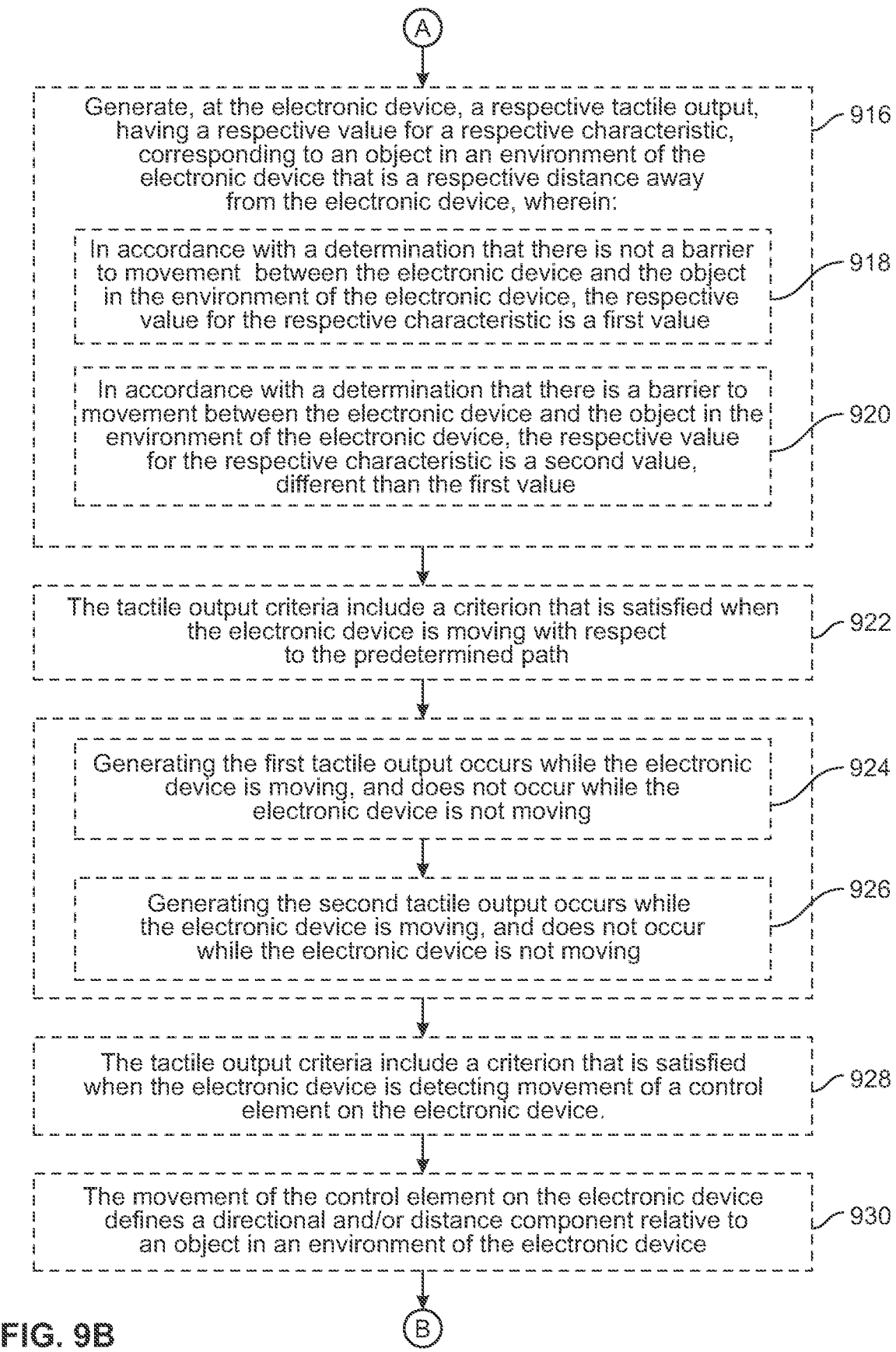
Figure 9C:
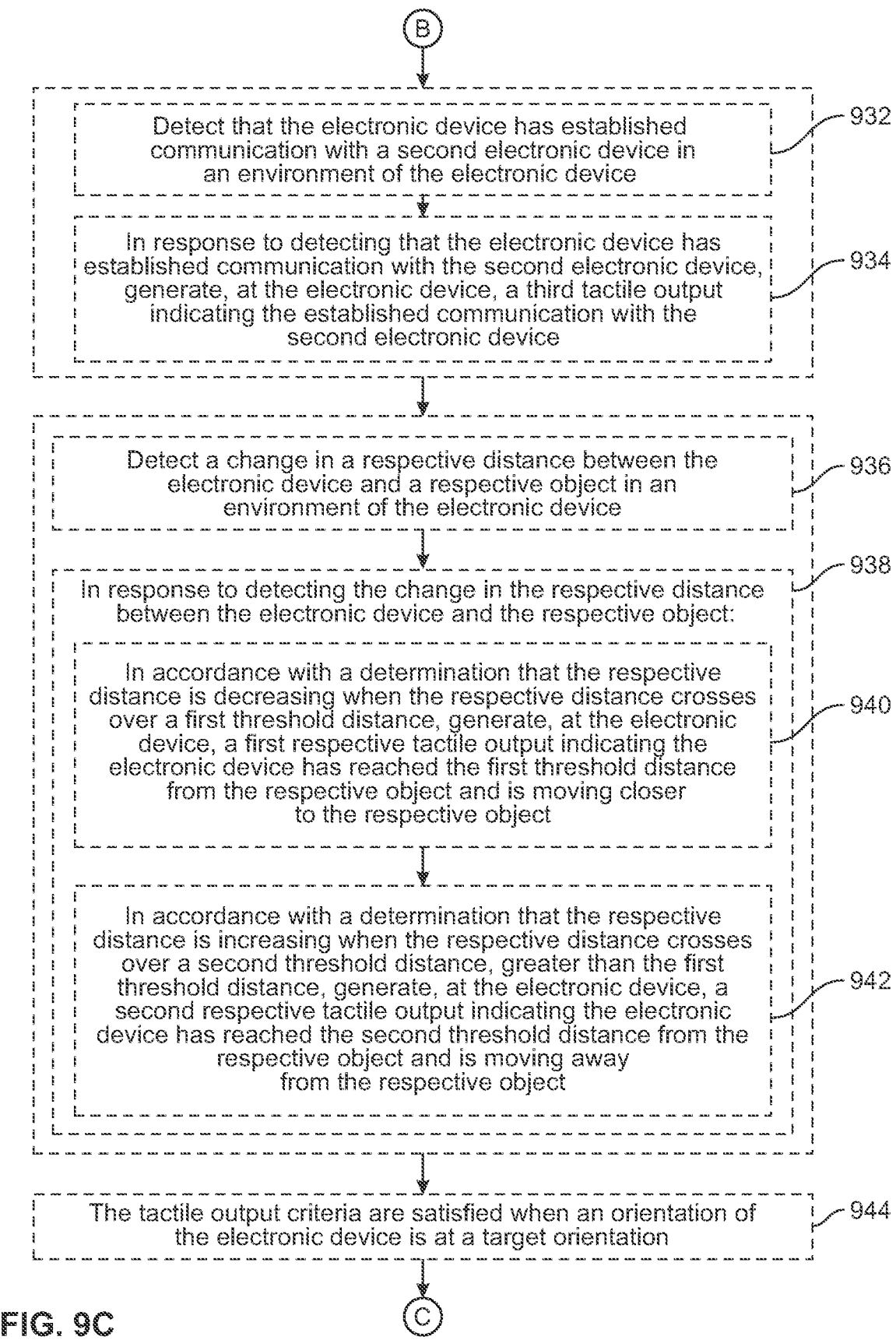
Figure 9D:
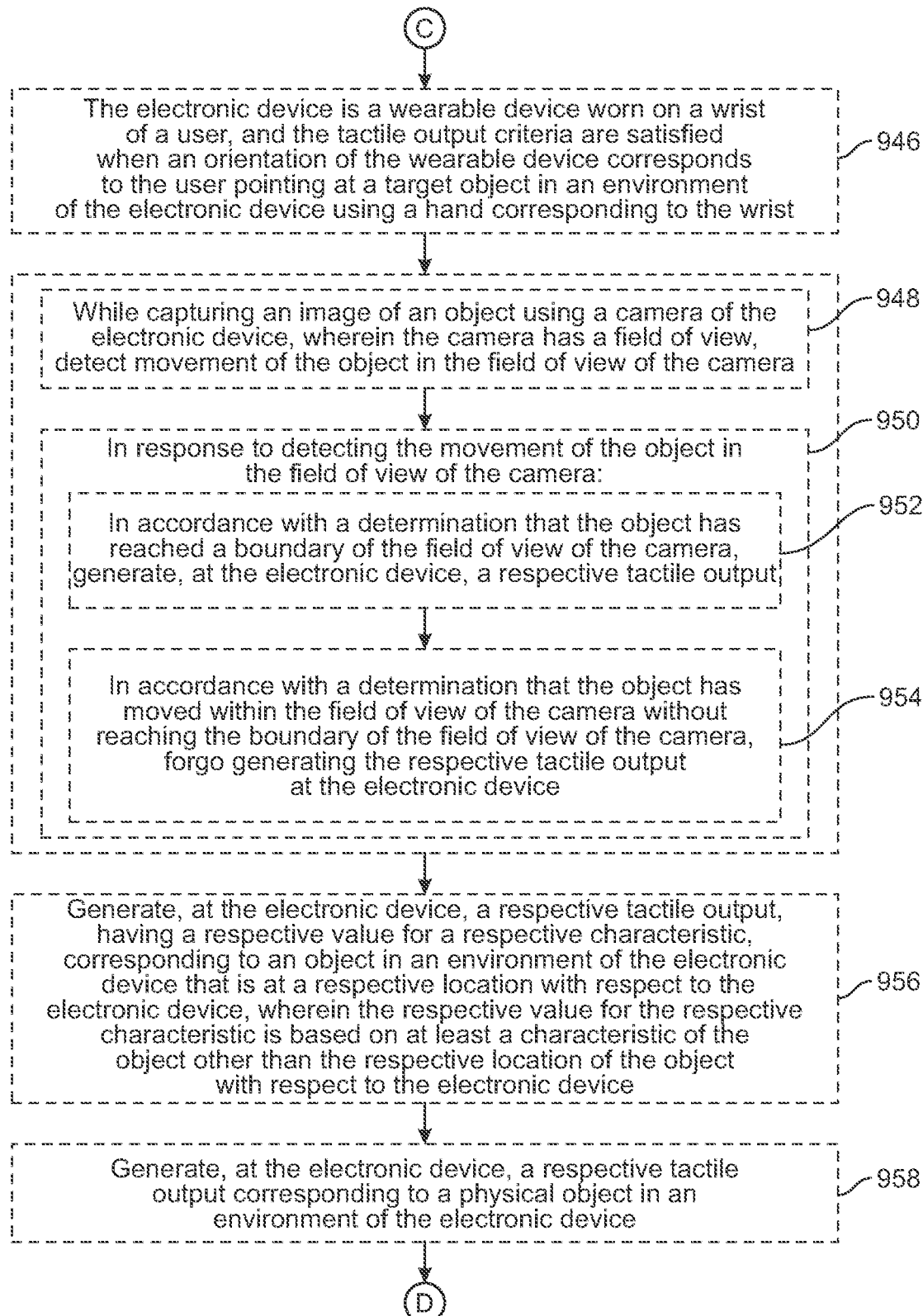
Figure 9E:
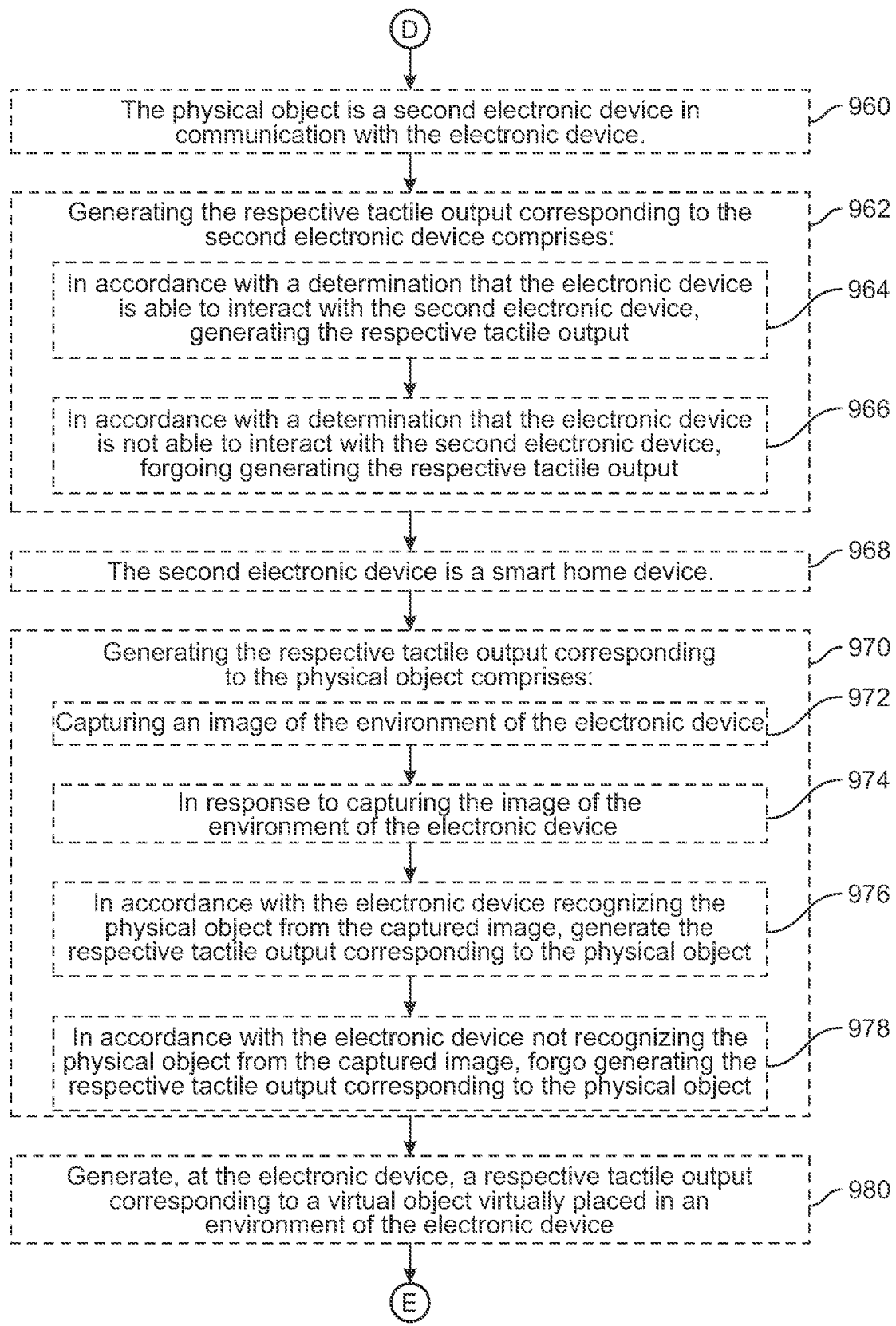
Figure 9F:
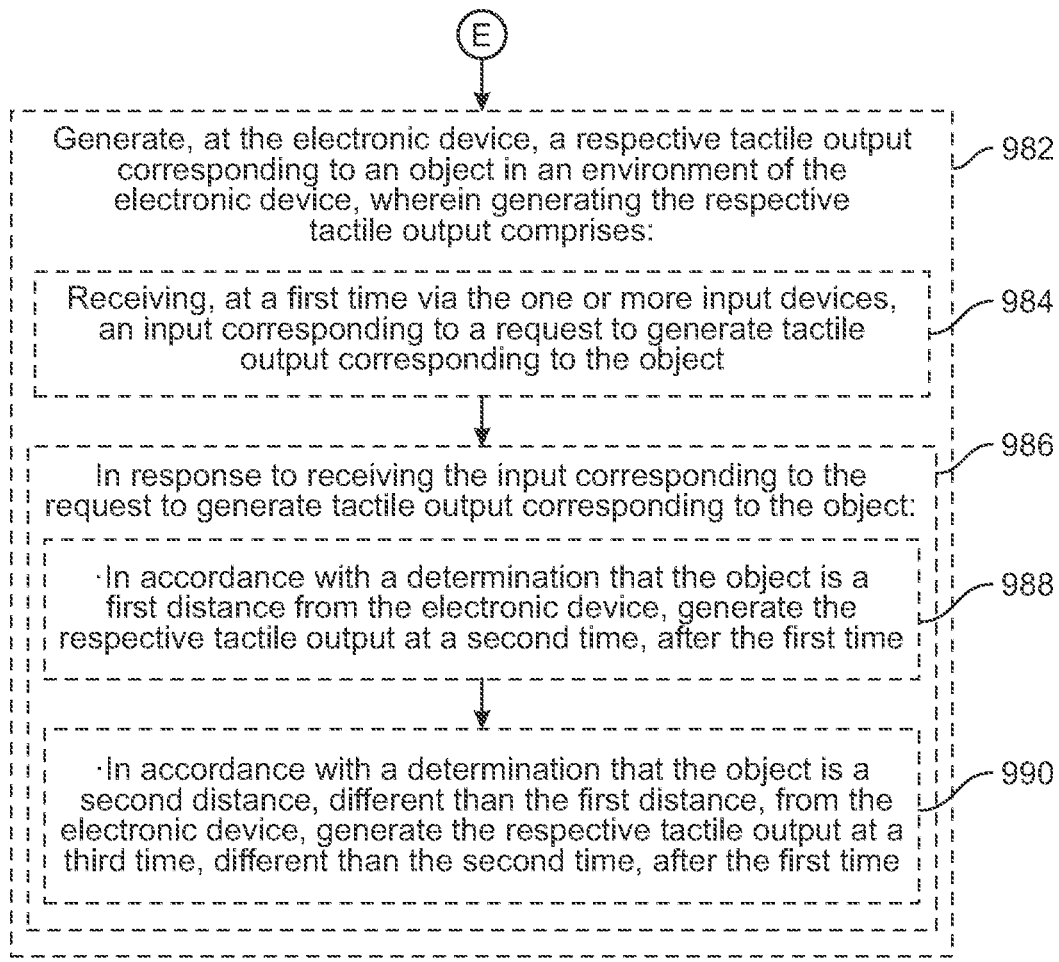

FIGS. 8X-8Y illustrate how the electronic device 500a modifies a tactile output 804 depending on whether or not there is a barrier 822 between the electronic device 500a and a navigation destination 820 (or more generally any object of interest, such as an object that has been designated by a user of the electronic device). In FIG. 8X, the electronic device 500a is oriented towards the navigation destination 820 without barrier 822 being between the electronic device 500a and the navigation destination 820. In response to detecting the orientation of the electronic device 500a towards the navigation destination 820 without the barrier 822 between the electronic device 500a and the navigation destination 820, the electronic device 500 generates a tactile output sequence 804 (e.g., a "Major" tactile output sequence described above with reference to Table 1). The tactile output sequence 804 includes a series of periodic discrete tactile pulses. As shown in FIG. 8Y, the intensity or amplitude of the tactile output sequence 804 decreases when there is a barrier 822 between the electronic device 500a and the navigation destination 820.

FIGS. 8Z-8AA illustrate how the electronic device 500a generates tactile outputs indicative of the orientation of the electronic device 500a relative to a navigation destination 820 only when the electronic device 500a is moving (e.g., the user moves the electronic device 500a in a scanning motion, such as a left-right scanning motion). In FIG. 8Z, the electronic device 500a is oriented towards the navigation destination 820 while moving. In response to the orientation of the electronic device 500a relative to the navigation destination, the electronic device 500a generates a tactile output. The tactile output has one or more characteristics (e.g., texture, frequency, amplitude, etc.) indicative of one or more characteristics (e.g., orientation, distance) of the electronic device's position relative to the navigation destination 820. In FIG. 8AA, the electronic device 500a remains in the same location and orientation as the location and orientation of the electronic device 500a in FIG. 8Z. In FIG. 8AA, the electronic device 500a does not generate a tactile output indicative of the orientation of the electronic device 500a relative to the navigation destination 820 because the electronic device 500a is not moving.

FIGS. 8BB-8EE illustrate how the electronic device 500a generates a tactile output in response to a user input with a delay that is indicative of the distance between the electronic device 500a and a navigation destination 820 (or more generally any object of interest, such as an object that has been designated by a user of the electronic device). As shown in FIG. 8BB, while the electronic device 500a is positioned a distance away from a navigation destination 820, the user enters an input (e.g., with contact 803) requesting that the electronic device 500a generate a tactile output after a delay in time 824 that is indicative of the distance between the electronic device 500a and the navigation destination 820 (e.g., analogous to transmitting a sonar pulse towards the navigation destination). In FIG. 8CC, the electronic device 500a generates the tactile output at a time 824 after the input was received that represents the distance between the electronic device 500a and the navigation destination 820.

In FIGS. 8DD-8EE, the electronic device 500a is a distance from the navigation destination 820 that is closer than the distance between the electronic device 500a and the navigation destination 820 illustrated in FIGS. 8BB-8CC. As shown in FIG. 8DD, the user enters an input (e.g., with contact 803) requesting that the electronic device 500a generate a tactile output after a delay in time 824 that is indicative of the distance between the electronic device 500a and the navigation destination 820. In FIG. 8EE, the electronic device 500a generates the tactile output after a delay in time 824 that is indicative of the distance between the electronic device 500a and the navigation destination 820. Because the distance between the electronic device 500a and the navigation destination 820 illustrated in FIG. 8EE is less than the distance between the electronic device 500a and navigation destination 820 illustrated in FIG. 8CC, the delay in time 824 illustrated in FIG. 8EE is less than the delay in time 824 illustrated in FIG. 8CC.

FIGS. 9A-9F are flow diagrams illustrating a method of changing one or more characteristics of a tactile output in response to detecting a change in the orientation of the electronic device relative to a respective object in accordance with some embodiments of the disclosure. The method 900 is optionally performed at an electronic device such as device 100, device 300, device 500 as described above with reference to FIGS. 1A-1B, 2-3, 4A-4B and 5A-5H. Some operations in method 900 are, optionally combined and/or order of some operations is, optionally, changed.

In some embodiments, such as in FIGS. 8C-8E, an electronic device (e.g., electronic device 500a, a mobile device (e.g., a tablet, a smartphone, a media player, or a wearable device) in communication with one or more of a touch screen, an accelerometer, a motion sensor, and/or a position sensor (e.g., GPS or the like)) in communication with one or more input devices, while navigating along a predetermined path from a first location (e.g., the location of electronic device 500a) to a second location (e.g., location of object 812) (e.g., following a route of a navigation application running on the electronic device from the location of the electronic device to an object located at the second location), different than the first location, the electronic device 500a determines (902) that one or more tactile output criteria are satisfied (e.g., tactile output criteria include criteria that are satisfied when a reference axis on the electronic device is within a predetermined orientation range (e.g., +/−30 degrees, +/−20 degrees, +/−10 degrees) relative to the second object and/or the predetermined path); In some embodiments, the tactile output is generated in response to detecting a "sweeping" motion of the electronic device while navigating along the path such that a reference axis on the device moves from a large angle offset with respect to the orientation of the path at the location of the electronic device, to a small or zero angle offset with respect to the orientation of the path at the location of the electronic device, and crosses over the orientation of the path at the location of the electronic device to then reach a large angle offset with respect to the orientation of the path at the location of the electronic device).

In some embodiments, such as in FIG. 8C, in response to determining that the one or more tactile output criteria are satisfied (904), in accordance with a determination that the electronic device 500a is at a first orientation (e.g., distance, angle of offset, etc.) with respect to the predetermined path (e.g., or the second location) at a current location of the electronic device 500a, the electronic device generates (906), at the electronic device, a first tactile output 804 (e.g., haptics, vibration) having a first value for a first characteristic (e.g., intensity, texture (frequency), pattern, duration, etc.). In some embodiments, the electronic device generates a tactile output that comprises periodic bursts of tactile outputs (e.g., a tactile output pattern). For example, as the angle of offset between the reference axis on the electronic device and the orientation of the predetermined path at the location of the electronic device decreases, the period of the bursts becomes shorter (e.g., quicker, higher frequency).

In some embodiments, such as in FIG. 8D, in response to determining that the one or more tactile output criteria are satisfied (904), in accordance with a determination that the electronic device 500a is at a second orientation with respect to the predetermined path (e.g., or the second location) at the current location of the electronic device, the electronic device generates (908), at the electronic device, a second tactile output 804 having a second value for the first characteristic (e.g., the electronic device generates a tactile output that comprises periodic bursts of tactile output (e.g., a tactile output pattern)). For example, as the angle of offset between a predetermined location on the electronic device and the second predetermined location increases, the period of the bursts becomes longer (e.g., slower, lower frequency).

The above-described manner of changing a value of a characteristic of the tactile output in response to a change in orientation between the electronic device and the predetermined path allows the electronic device to communicate an orientation of the second location with respect to a defined navigation path using a tactile output, which simplifies interactions between the user and the electronic device and enhances the operability of the electronic device (e.g., by conveying the orientation of the predetermined path in a manner other than a visual or audio indication), which, additionally, reduces power usage and improves battery life of the electronic device by enabling the user to use the electronic device more quickly and efficiently, without requiring the use of the display device of the electronic device or touch screen inputs from the user, which reduces power usage.

In some embodiments, such as in FIGS. 8A-8B, the first characteristic of the first tactile output 804 illustrated in FIG. 8A and the second tactile output 804 illustrated in FIG. 8B is frequency, and the first value of the frequency of the first tactile output is different than the second value of the frequency of the second tactile output (910) (e.g., the frequency of the tactile output increases as the angle between a central axis of the electronic device and the predetermined path increases (or as the distance between the electronic device and the predetermined path increases), or the frequency of the tactile output decreases as the angle between the central axis of the electronic device and the predetermined path increases (or as the distance between the electronic device and the predetermined path increases).

The above-described manner of varying the frequency of the tactile output as the orientation of the electronic device relative to the predetermined path varies allows the electronic device to communicate to the user the location of the predetermined path using the tactile output, which simplifies interactions between the user and the electronic device and enhances the operability of the electronic device (e.g., by enabling the user to determine the location of the path without viewing a user interface of the electronic device), which, additionally, reduces power usage and improves battery life of the electronic device by enabling the user to use the electronic device more quickly and efficiently and enables the electronic device to communicate the location of the path to the user without presenting a user interface via the display device, which further preserves power.

In some embodiments, such as in FIG. 8A-8B, the electronic device 500a generates (912), at the electronic device, a respective tactile output corresponding to an object 806 in an environment of the electronic device, wherein the respective tactile output 804 has one or more values for one or more characteristics that are based on a point-cloud model 808 centered at the object (e.g., the path to the object is a direct path from the location of the electronic device and a characteristic of the tactile output has a value that increases or decreases as the path gets shorter). For example, the point-cloud model is denser at locations closest to the object and is sparser at locations further from the object. The points of the point cloud optionally represent a characteristic of the tactile output, such as frequency, amplitude, pattern, or frequency of discrete tactile bursts. In some embodiments, the frequency of discrete tactile bursts increases as the electronic device gets closer to the object (e.g., density of the points in the point cloud represent frequency of discrete tactile bursts).

The above-described manner of basing the one or more values of the tactile output on a point cloud model around the object allows the electronic device to vary a value of the tactile output as the distance between the electronic device and the object varies, which simplifies interactions between the user and the electronic device and enhances the operability of the electronic device (e.g., by communicating to the user to distance between the electronic device and the object based on the changing value of the tactile output), which, additionally, reduces power usage and improves battery life of the electronic device by enabling the user to use the electronic device more quickly and efficiently and enables the electronic device to communicate the distance from the object to the user without presenting a user interface via the display device, which further preserves power.

In some embodiments, such as in FIGS. 8X-8Y, the first characteristic of the first tactile output 804 illustrated in FIG. 8X and the second tactile output 804 illustrated in FIG. 8Y is sharpness (e.g., the difference in amplitude between subsequent tactile bursts), and the first value of the sharpness of the first tactile output is different than the second value of the sharpness of the second tactile output (914) (e.g., the first tactile output is sharper than the second output and includes a series of discrete pulses and the second tactile output includes a series of pulses with varying amplitude that creates a rumbling feeling). For example, the tactile output 804 illustrated in FIG. 8X is sharper than the tactile output 804 illustrated in FIG. 8Y.

The above-described manner of varying the sharpness of the tactile output as the orientation of the electronic device relative to the predetermined path varies allows the electronic device to communicate to the user the orientation/location of the predetermined path using the tactile output, which simplifies interactions between the user and the electronic device and enhances the operability of the electronic device (e.g., by enabling the user to determine the location/orientation of the predetermined path without viewing a user interface presented via the display device), which, additionally, reduces power usage and improves battery life of the electronic device by enabling the user to use the electronic device more quickly and efficiently and enables the electronic device to communicate the location/orientation of the path to the object without presenting a user interface via the display device, which further preserves power.

In some embodiments, such as in FIGS. 8X-8Y, the electronic device 500a generates (916), at the electronic device, a respective tactile output 804, having a respective value for a respective characteristic (e.g., frequency, amplitude, pattern, etc.), corresponding to an object 820 in an environment of the electronic device that is a respective distance away from the electronic device (e.g., the predetermined path is from the electronic device to the object in the environment of the electronic device).

In some embodiments, such as in FIG. 8X, in accordance with a determination that there is not a barrier 822 to movement (e.g., a wall or fence) between the electronic device 500a and the object 820 in the environment of the electronic device, the respective value for the respective characteristic is a first value (918) (e.g., there are no physical barriers between the electronic device and the object; in some examples, this is no physical barriers between the electronic device and the object along the predetermined path, and in some examples, this is no physical barriers between the electronic device and the object along a direct line from the electronic device to the object, independent of the predetermined path).

In some embodiments, such as in FIG. 8Y, in accordance with a determination that there is a barrier to movement (e.g., a wall or fence) between the electronic device 500a and the objet 820 in the environment of the electronic device, the respective value for the respective characteristic is a second value, different than the first value (920) (e.g., there is a physical barrier (e.g., a wall, a building, etc.) between the electronic device and the object; in some examples, this is the existence of one or more physical barriers between the electronic device and the object along the predetermined path, and in some examples, this is the existence of one or more barriers between the electronic device and the object along a direct line from the electronic device to the object, independent of the predetermined path). For example, the electronic device generates a series of discrete tactile pulses when there is no wall between the electronic device and the object and generates a tactile output with a rumbling texture when there is a wall between the electronic device and the object. Alternatively, in some embodiments, the electronic device generates a tactile output with a first amplitude when there is no wall between the electronic device and the object and generates a tactile output with a second amplitude, less than the first amplitude, when there is a wall between the electronic device and the object.

The above-described manner of modifying a characteristic of the tactile output in accordance with a determination that there is a wall between the electronic device and the object allows the electronic device to indicate to the user that the object is on the other side of the wall using the tactile output, which simplifies interactions between the user and the electronic device and enhances the operability of the electronic device (e.g., by communicating to the user that the object is on the other side of the wall without requiring the user look at a user interface via the display device), which, additionally, reduces power usage and improves battery life of the electronic device by enabling the user to use the electronic device more quickly and efficiently and enables the electronic device to communicate the whether or not the object is on the other side of a wall to the user without presenting a user interface via the display device, which further preserves power.

In some embodiments, such as in FIG. 8Z, the tactile output criteria include a criterion that is satisfied when the electronic device 500a is moving with respect to the predetermined path (922) (e.g., the tactile output is generated while the electronic device is moving (e.g., moving closer to and further away from the path, moving in orientation with respect to the path, etc.)). For example, moving the electronic device in a scanning motion causes the electronic device to generate the tactile output that indicates the electronic device's orientation relative to the predetermined path.

The above-described manner of generating the tactile output when the electronic device is moving allows the electronic device to enable the user to request the tactile output by moving the electronic device, which simplifies interactions between the user and the electronic device and enhances the operability of the electronic device (e.g., by enabling the user to request that the electronic device generate the tactile output without interacting with a user interface presented via the display device), which, additionally, reduces power usage and improves battery life of the electronic device by enabling the user to use the electronic device more quickly and efficiently and enables the electronic device to generate the tactile output on demand without presenting a user interface via the display device, which further preserves power.

In some embodiments, generating the first tactile output occurs while the electronic device 500a is moving, such as in FIG. 8Z, and does not occur while the electronic device is not moving (924), such as in FIG. 8AA (e.g., moving the electronic device in a scanning motion causes the electronic device to generate the tactile output that indicates the electronic device's orientation relative to the predetermined path and holding the electronic device still (e.g., the movement of the electronic device is below a predetermined movement threshold) causes the electronic device to forgo generating the tactile output).

In some embodiments, generating the second tactile output occurs while the electronic device 500a is moving, such as in FIG. 6Z, and does not occur while the electronic device is not moving, such as in FIG. 8AA (926) (e.g., moving the electronic device in a scanning motion causes the electronic device to generate the tactile output that indicates the electronic device's orientation relative to the predetermined path and holding the electronic device still (e.g., the movement of the electronic device is below a predetermined movement threshold) causes the electronic device to forgo generating the tactile output).

The above-described manner of forgoing generating the tactile output when the electronic device is not moving allows the electronic device to conserve power when the electronic device is not moving, which improves battery life of the electronic device.

In some embodiments, such as in FIG. 8C, the tactile output criteria include a criterion that is satisfied when the electronic device 500a is detecting movement of a control element 810 on the electronic device (928) (e.g., the electronic device displays, via the display device, a user interface that includes a control element for searching for the object that allows the user to specify an orientation and distance relative to the current orientation and position of the electronic device). For example, the electronic device presents a radial dial with an indicator that the user is able to position at a desired angle and distance and, in response to detecting a user input moving the indicator, the electronic device generates the tactile output.

The above-described manner of generating the tactile output in response to detecting movement of the control element allows the electronic device to generate the tactile output in response to a user input, which simplifies interactions between the user and the electronic device and enhances the operability of the electronic device (e.g., enabling the user to selectively initiate and cease the generation of the tactile output to better understand the meaning of the tactile output), which, additionally, reduces power usage and improves battery life of the electronic device by enabling the user to use the electronic device more quickly and efficiently.

In some embodiments, such as in FIGS. 8C-8E, the movement of the control element 810 on the electronic device 500a defines a directional and/or distance component relative to an object 812 in an environment of the electronic device (930) (e.g., the electronic device displays, via the display device, a user interface that includes a control element that enables the user to select a distance and angle relative to the current location and orientation of the electronic device for searching for the object). In some embodiments, the orientation of the electronic device relative to the predetermined path is the orientation of the control element relative to the predetermined path and the distance of the electronic device relative to the predetermined path is defined by a distance component represented by the control element. In this way, the user is able to search for the predetermined path by moving the control element rather than moving the electronic device. For example, the electronic device presents a radial dial with an indicator that the user is able to place at a desired angle and distance and, in response to detecting a user input moving the indicator, the electronic device generates the tactile output with a characteristic that indicates the orientation and/or distance of the indicator relative to the predetermined path to the object. As another example, as the user changes the orientation and/or distance represented by the control element, the electronic device generates a tactile output with a characteristic (e.g., amplitude, frequency, pattern, texture, frequency of periodic pulses) that changes as the orientation and location represented by the control element gets closer to the predetermined path and/or a respective object, thus enabling the user to locate the object using the control element.

The above-described manner of defining the directional and/or distance component relative to the object with the control element allows the electronic device to indicate, with the tactile output, the orientation of the object relative to the control element, which simplifies interactions between the user and the electronic device and enhances the operability of the electronic device (e.g., by enabling the user to search for the object without moving the electronic device), which, additionally, reduces power usage and improves battery life of the electronic device by enabling the user to use the electronic device more quickly and efficiently.

In some embodiments, such as in FIG. 8G, the electronic device 500a detects (932) that the electronic device has established communication with a second electronic device 814 in an environment of the electronic device (e.g., a smart door lock at the second location on the predetermined path). In some embodiments, such as in FIG. 8G in response to detecting that the electronic device 500a has established communication with the second electronic device 814, the electronic device generates (934), at the electronic device, a third tactile output indicating the established communication with the second electronic device (e.g., the third tactile output is generated in response to establishing communication with the second electronic device and in accordance with a determination that the electronic device is authorized to communicate with the second electronic device). For example, when the electronic device is in communication range of a smart door lock that the electronic device is authorized to interact with, the electronic device generates the third tactile output. In some embodiments, the third tactile output has a different value for the first characteristic than both the first and second tactile outputs.

The above-described manner of generating the third tactile output indicating the established communication with the second electronic device allows the electronic device to communicate to the user that the communication with the second electronic device has been established using the tactile output, which simplifies interactions between the user and the electronic device and enhances the operability of the electronic device (e.g., by communicating to the user the communication with the second electronic device has been established without requiring the user to look at a user interface presented via the display device), which, additionally, reduces power usage and improves battery life of the electronic device by enabling the user to use the electronic device more quickly and efficiently and enables the electronic device to generate the tactile output that is indicative of the communication with the second electronic device without presenting a user interface via the display device, which further preserves power.

In some embodiments, such as in FIGS. 8H-8K, the electronic device 500a detects (936) a change in a respective distance between the electronic device and a respective object 820 in an environment of the electronic device (e.g., movement of the electronic device that increases or decreases the distance between the electronic device and the respective object).

In some embodiments, such as in FIGS. 8H-8I, in response to detecting the change in the respective distance between the electronic device 500a and the respective object 820 (938), in accordance with a determination that the respective distance is decreasing when the respective distance crosses over a first threshold distance, such as in FIGS. 8H-8I, the electronic device 500a generates (940), at the electronic device, a first respective tactile output indicating the electronic device has reached the first threshold distance from the respective object and is moving closer to the respective object 820 (e.g., For example, the respective object is a navigation destination selected by the user in a navigation application and the first threshold distance is a distance for which the electronic device determines it has arrived at the destination. In some embodiments, the electronic device generates an audio output concurrently with the first respective tactile output. The electronic device optionally forgoes generating a corresponding tactile output in response to detecting that the electronic device is moving away from the respective object while crossing the first threshold distance).

In some embodiments, such as in FIGS. 8J-8K, in response to detecting the change in the respective distance between the electronic device 500a and the respective object 820 (938), in accordance with a determination that the respective distance is increasing when the respective distance crosses over a second threshold distance, such as in FIGS. 8J, 8K, greater than the first threshold distance, the electronic device 500a generates (942), at the electronic device, a second respective tactile output indicating the electronic device has reached the second threshold distance from the respective object 820 and is moving away from the respective object 820 (e.g., the second threshold distance is a predetermined distance further away from the respective object than a previous location of the electronic device). For example, the electronic device moves towards the respective object and then moves away from the respective object by a predetermined amount to the second threshold distance. In response to reaching the second threshold distance from the respective object, the electronic device generates the tactile output to indicate to the user that the electronic device is moving away from the respective object. In some embodiments, the electronic device generates an audio output concurrently with the second respective tactile output. The electronic device optionally forgoes generating a corresponding tactile output in response to detecting that the electronic device is moving towards the respective object while crossing the second threshold distance.

The above-described manner of generating the first respective tactile output in response to reaching the first threshold distance while moving towards the respective object and generating the second respective tactile output in response to reaching the second threshold distance while moving away from the respective object allows the electronic device to communicate to the user when the electronic device is close to the respective object and when the electronic device has sufficiently departed from the respective object using the tactile outputs, which simplifies interactions between the user and the electronic device and enhances the operability of the electronic device (e.g., by enabling the user to locate the respective object without looking at a user interface presented on the display device), which, additionally, reduces power usage and improves battery life of the electronic device by enabling the user to use the electronic device more quickly and efficiently and enables the electronic device to generate the tactile output that is indicative of the location of the respective object without presenting a user interface via the display device, which further preserves power.

In some embodiments, such as in FIG. 8M, the tactile output criteria are satisfied when an orientation of the electronic device 500a is at a target orientation (944) (e.g., a respective function of the electronic device requires that the electronic device be in the target orientation, such as upright (e.g., within a range of angles of upright, such as +/−5 degrees, 10 degrees, 15 degrees of upright)). For example, in response to detecting that the electronic device is upright, the electronic device generates the tactile output. In some embodiments, the tactile output criteria are not satisfied when the orientation of the electronic device is not at the target orientation.

The above-described manner of generating the tactile output in response to determining that the electronic device is in the target orientation allows the electronic device to communicate to the user that the electronic device is in the target orientation using the tactile output, which simplifies interactions between the user and the electronic device and enhances the operability of the electronic device (e.g., enabling the user to confirm that the electronic device is in the target orientation without looking at a user interface presented via the display device), which, additionally, reduces power usage and improves battery life of the electronic device by enabling the user to use the electronic device more quickly and efficiently and enables the electronic device to generate the tactile output that is indicative of the target orientation without presenting a user interface via the display device, which further preserves power.

In some embodiments, such as in FIG. 8O, the electronic device 500b is a wearable device (e.g., a smart watch) worn on a wrist of a user, and the tactile output criteria are satisfied when an orientation of the wearable device corresponds to the user pointing at a target object 820 in an environment of the electronic device using a hand corresponding to the wrist (946) (e.g., while wearing a smart watch on their left wrist, the user points at the target object with their left hand). In response to detecting the orientation of the smart watch that corresponds to the user pointing at the target object with their left hand, the smart watch generates the tactile output. In some embodiments, the tactile output criteria are not satisfied when the orientation of the electronic device does not correspond to the user pointing at the target object.

The above-described manner of generating the tactile output when the user is pointing at the target object allows the electronic device to communicate to the user the location of the target object using the tactile output, which simplifies interactions between the user and the electronic device and enhances the operability of the electronic device (e.g., by communicating the location of the target object without requiring that the user look at a user interface presented via the display device), which, additionally, reduces power usage and improves battery life of the electronic device by enabling the user to use the electronic device more quickly and efficiently and enables the electronic device to generate the tactile output that is indicative of the location of the target object without presenting a user interface via the display device, which further preserves power.

In some embodiments, such as in FIG. 8Q, while capturing an image of an object 830*a* using a camera of the electronic device 500*a*, wherein the camera has a field of view, the electronic device detects (948) movement of the object in the field of view of the camera (e.g., while taking a photograph of one or more faces, detecting movement of one of the faces in the field of view of the camera, such as due to movement of the electronic device and/or movement of the faces).

In some embodiments, such as in FIG. 8Q, in response to detecting the movement of the object 830*a* in the field of view of the camera (950), in accordance with a determination that the object 830*a* has reached a boundary of the field of view of the camera, the electronic device 500*a* generates (952), at the electronic device, a respective tactile output (e.g., determining that one of the faces has moved from being fully in the field of view of the camera to fully or partially outside of the field of view of the camera). For example, while capturing a photo of a person, the electronic device detects that the person's face is fully or partially cut off and generates the tactile output.

In some embodiments, such as in FIG. 8P, in response to detecting the movement of the object 830*a* in the field of view of the camera (950), in accordance with a determination that the object 830*a* has moved within the field of view of the camera without reaching the boundary of the field of view of the camera, the electronic device forgoes (954) generating the respective tactile output at the electronic device (e.g., in response to detecting movement of one or more of the faces within the field of view of the camera that does not include reaching the boundary of the field of view, the electronic device forgoes generating the tactile output).

The above-described manner of generating the tactile output when the object reaches a boundary of the field of view allows the electronic device to communicate to the user that the object reached the boundary of the field of view using the tactile output, which simplifies interactions between the user and the electronic device and enhances the operability of the electronic device (e.g., by informing the user that the object reached the boundary of the field of view before the user captures the image), which, additionally, reduces power usage and improves battery life of the electronic device by enabling the user to use the electronic device more quickly and efficiently, such as by informing the user that the object is cut off before the photo is captured so the user is able to adjust the position of the camera before capturing the image, thus avoiding having to re-take the photograph.

In some embodiments, such as in FIGS. 8X-8Y, the electronic device 500*a* generates (956), at the electronic device, a respective tactile output 804, having a respective value for a respective characteristic (e.g., frequency, amplitude, texture, etc.), corresponding to an object 820 in an environment of the electronic device that is at a respective location with respect to the electronic device, wherein the respective value for the respective characteristic is based on at least a characteristic of the object other than the respective location of the object with respect to the electronic device (e.g., the characteristic of the tactile output is indicative of the characteristic of the object). For example, different smart home appliances (e.g., smart locks, smart kitchen appliances, smart climate control devices, smart lights, etc.) have different associated tactile textures that are generated in response to the electronic device determining that it is oriented towards a respective smart home appliance. For example, a clock in the environment of the electronic device optionally causes the electronic device to generate a tick-tock style tactile output when the electronic device is oriented towards the clock, which is optionally different than the tactile output generated by the electronic device when the electronic device is oriented towards a different object in the environment of the electronic device.

The above-described manner of generating a tactile output with a characteristic that is indicative of a characteristic of an object other than the object's location allows the electronic device to communicate the characteristic of the object to the user with the tactile output, which simplifies interactions between the user and the electronic device and enhances the operability of the electronic device (e.g., by enabling the user to determine the characteristic of the object without viewing a user interface presented via the display device), which, additionally, reduces power usage and improves battery life of the electronic device by enabling the user to use the electronic device more quickly and efficiently and enables the electronic device to generate the tactile output that is indicative of the characteristic and/or identity of the object without presenting a user interface via the display device, which further preserves power.

In some embodiments, such as in FIG. 8Y, the electronic device 500*a* generates (958), at the electronic device, a respective tactile output 804 corresponding to a physical object 820 in an environment of the electronic device (e.g., the electronic device identifies the physical object based on image recognition and/or based on detecting an electronic locator device that is attached to the object). For example, the object is a household object, such as a key or an electronic locator device that is attached to the key.

The above-described manner of generating the tactile output in response to a physical object allows the electronic device to communicate the location of the object to the user with the tactile output, which simplifies interactions between the user and the electronic device and enhances the operability of the electronic device (e.g., by enabling the user to determine the location of the object without viewing a user interface presented via the display device), which, additionally, reduces power usage and improves battery life of the electronic device by enabling the user to use the electronic device more quickly and efficiently and enables the electronic device to generate the tactile output that is indicative of the object without presenting a user interface via the display device, which further preserves power.

In some embodiments, such as in FIG. 8U, the physical object is a second electronic device 814*b* in communication with the electronic device (960) (e.g., an electronic device belonging to the user (e.g., a smart home appliance) or an electronic device belonging to another user (e.g., the other user's smartphone)). For example, the electronic device is able to locate the smartphone of the other user to enable the user to find the other user.

The above-described manner of generating the tactile output in accordance with the electronic device's orientation relative to a second electronic device allows the electronic device to communicate to the user the location or path to the second electronic device using the tactile output, which simplifies interactions between the user and the electronic device and enhances the operability of the electronic device (e.g., by communicating to the user the location or path to the second electronic device without requiring the user to look at a user interface via the display device), which, additionally, reduces power usage and improves battery life of the electronic device by enabling the user to use the electronic device more quickly and efficiently and enables the electronic device to generate the tactile output that is indicative of the second electronic device without presenting a user interface via the display device, which further preserves power.

In some embodiments, such as in FIG. 8U, generating the respective tactile output corresponding to the second electronic device 814b comprises (962): in accordance with a determination that the electronic device 500a is able to interact with the second electronic device 814b (e.g., the second electronic device has authorized the first electronic device to communicate with the second electronic device), generating the respective tactile output (964), such as in FIG. 8U; and in accordance with a determination that the electronic device 500a is not able to interact with the second electronic device 814a, forgoing generating the respective tactile output (966), such as in FIG. 8T (e.g., the second electronic device has not authorized the first electronic device to communicate with the second electronic device). For example, the electronic device generates the tactile output when it is oriented towards a smart lock that the first electronic device is authorized to lock or unlock. As another example, the electronic device forgoes generating the tactile output when it is oriented towards a smart lock that the electronic device is not authorized to lock and unlock.

The above-described manner of generating the tactile output only when the electronic device is authorized to interact with the second electronic device allows the electronic device to communicate to the user that the electronic device is capable of interacting with the second electronic device and to save power when the electronic device is not authorized to communicate with the second electronic device, which simplifies interactions between the user and the electronic device and enhances the operability of the electronic device (e.g., by enabling the user to receive information about the second electronic device that the first electronic device is authorized to communicate with without requiring the user look at a user interface presented via the display device), which, additionally, reduces power usage and improves battery life of the electronic device by enabling the user to use the electronic device more quickly and efficiently.

In some embodiments, such as in FIG. 8U, the second electronic device 814b is a smart home device (968) (e.g., a smart lock, a smart kitchen appliance (e.g., refrigerator, oven, stove, microwave, coffee maker, etc.), a smart climate control device (e.g., thermostat, fan, etc.), a smart light, etc.). For example, when the user points the electronic device at a smart lock on the door of their home that has been configured to communicate with the electronic device, the electronic device generates the tactile output.

The above-described manner of generating the tactile output in response to the electronic device's orientation relative to a smart home appliance allows the electronic device to communicate to the user that the electronic device is in communication range of the smart home appliance, which simplifies interactions between the user and the electronic device and enhances the operability of the electronic device (e.g., by communicating to the user information about the smart home appliance without requiring the user to look at a user interface via the display device), which, additionally, reduces power usage and improves battery life of the electronic device by enabling the user to use the electronic device more quickly and efficiently and enables the electronic device to generate the tactile output that is indicative of the smart home device without presenting a user interface via the display device, which further preserves power.

In some embodiments, such as in FIGS. 8V-8W, generating the respective tactile output corresponding to the physical object 806 comprises (970), capturing an image of the environment of the electronic device 500a (972) (e.g., using a camera that is in communication with the electronic device); and in response to capturing the image of the environment of the electronic device (974): in accordance with the electronic device 500a recognizing the physical object 805 from the captured image, such as in FIG. 8W, generating the respective tactile output corresponding to the physical object 806 (976) (e.g., the electronic device generates the tactile output when the physical object is in the field of view of the camera and the electronic device recognizes the physical object); and in accordance with the electronic device 500a not recognizing the physical object 806 from the captured image, forgoing generating the respective tactile output corresponding to the physical object (978) (e.g., if the device does not recognize the object from the camera/image recognition, no tactile output is generated for that object). For example, the electronic device recognizes a key or some other object in the field of view of the camera and generates the tactile output in response.

The above-described manner of generating the tactile output in response to recognizing the physical object with image recognition allows the electronic device to identify objects and generate tactile outputs indicative of the objects even when the object is not a second electronic device in communication with the electronic device or an object at a predetermined location, which simplifies interactions between the user and the electronic device and enhances the operability of the electronic device (e.g., by expanding the capabilities of the electronic device to include locating objects with image recognition), which, additionally, reduces power usage and improves battery life of the electronic device by enabling the user to use the electronic device more quickly and efficiently by enabling the user to locate and identify a greater number of objects.

In some embodiments, such as in FIG. 8R, the electronic device 500a generates (980), at the electronic device, a respective tactile output corresponding to a virtual object 832 virtually placed in an environment of the electronic device (e.g., the electronic device generates virtual objects as part of an augmented reality application on the electronic device). For example, the electronic device generates a virtual timer and, when the electronic device is oriented towards the virtual timer in the augmented reality environment of the electronic device, the electronic device generates a series of tactile "ticks" representing the timer.

The above-described manner of generating the tactile output corresponding to a virtual object allows the electronic device to indicate the virtual object to the user, which simplifies interactions between the user and the electronic device and enhances the operability of the electronic device (e.g., by enabling the user to more quickly locate the virtual object), which, additionally, reduces power usage and improves battery life of the electronic device by enabling the user to use the electronic device more quickly and efficiently.

In some embodiments, such as in FIGS. 8BB-8EE, the electronic device 500a generates (982), at the electronic device, a respective tactile output corresponding to an object 820 in an environment of the electronic device.

In some embodiments, generating the respective tactile output comprises receiving, at a first time 824 via the one or more input devices, an input 803 corresponding to a request to generate tactile output corresponding to the object (984) illustrated in FIG. 8BB (e.g., the electronic device detects an input requesting that the electronic device generate a tactile output indicative of the distance between the electronic device and the object, such as selection of a "ping" button displayed via the display device).

In some embodiments, generating the respective tactile output comprises in response to receiving the input corresponding to the request to generate tactile output corresponding to the object 820 (986) illustrated in FIG. 8BB, in accordance with a determination that the object 820 is a first distance from the electronic device, generating the respective tactile output at a second time 824, after the first time (988), such as in FIG. 8CC (e.g., the second time corresponds to the first distance); and in accordance with a determination that the object 820 is a second distance, different than the first distance, such as in FIG. 8EE, from the electronic device 500*a*, generating the respective tactile output at a third time 824, different than the second time, after the first time (990) (e.g., the third time corresponds to the second distance). The time between receiving the input and generating the tactile output optionally corresponds to the distance between the electronic device and the object. In some embodiments, the further the electronic device is located from the object, the longer the delay between the receiving the input and generating the tactile output and, the shorter the distance between the electronic device and the object, the shorter the delay between detecting the input and generating the tactile output. For example, if the first distance is shorter than the second distance, the second time is closer to the first time than the third time is to the first time.

The above-described manner of generating the tactile output in accordance with the distance between the electronic device and the object in response to a user input allows the electronic device to communicate the distance between the electronic device and the object to the user with the tactile output, which simplifies interactions between the user and the electronic device and enhances the operability of the electronic device (e.g., by enabling the user to receive information about the distance between the electronic device and the object without looking at a user interface via the display device), which, additionally, reduces power usage and improves battery life of the electronic device by enabling the user to use the electronic device more quickly and efficiently and enables the electronic device to generate the tactile output that is indicative of the distance between the electronic device and the object without presenting a user interface via the display device, which further preserves power.

It should be understood that the particular order in which the operations in FIGS. 9A-9F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, and 1300) are also applicable in an analogous manner to method 900 described above with respect to FIGS. 9A-9F. For example, the ways the electronic device modifies a characteristic of a tactile output sequence described above with reference to method 900 optionally have one or more of the characteristics of modifying the range of orientations in which the electronic device generates the tactile output, generating tactile outputs indicative of AR planes, and generating tactile outputs indicative of data sharing with a second electronic device, etc., described herein with reference to other methods described herein (e.g., methods 700, 1100, 1300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 9A-9F are, optionally, implemented by components depicted in FIGS. 1A-1B. For example, receiving operations 984 and generating operations 906, 908, and 912, are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Generating Tactile Outputs Indicative of AR Planes

Users interact with electronic devices in many different manners, including interacting with Augmented Reality (AR) content. The embodiments described below provide ways in which an electronic device generates tactile outputs having characteristics related to one or more characteristics of one or more planes in the vicinity of the electronic device included in AR content presented by the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 10A-10I illustrate exemplary ways an electronic device 500 generates tactile outputs 1002 with characteristics indicative of the orientation of a camera of the electronic device 500 relative to one or more AR (augmented reality) planes in accordance with one or more embodiments of the disclosure. The embodiments in these figures are used to illustrate the processes described below, including the processes described with reference to FIGS. 11A-11C.

Figure 10E:
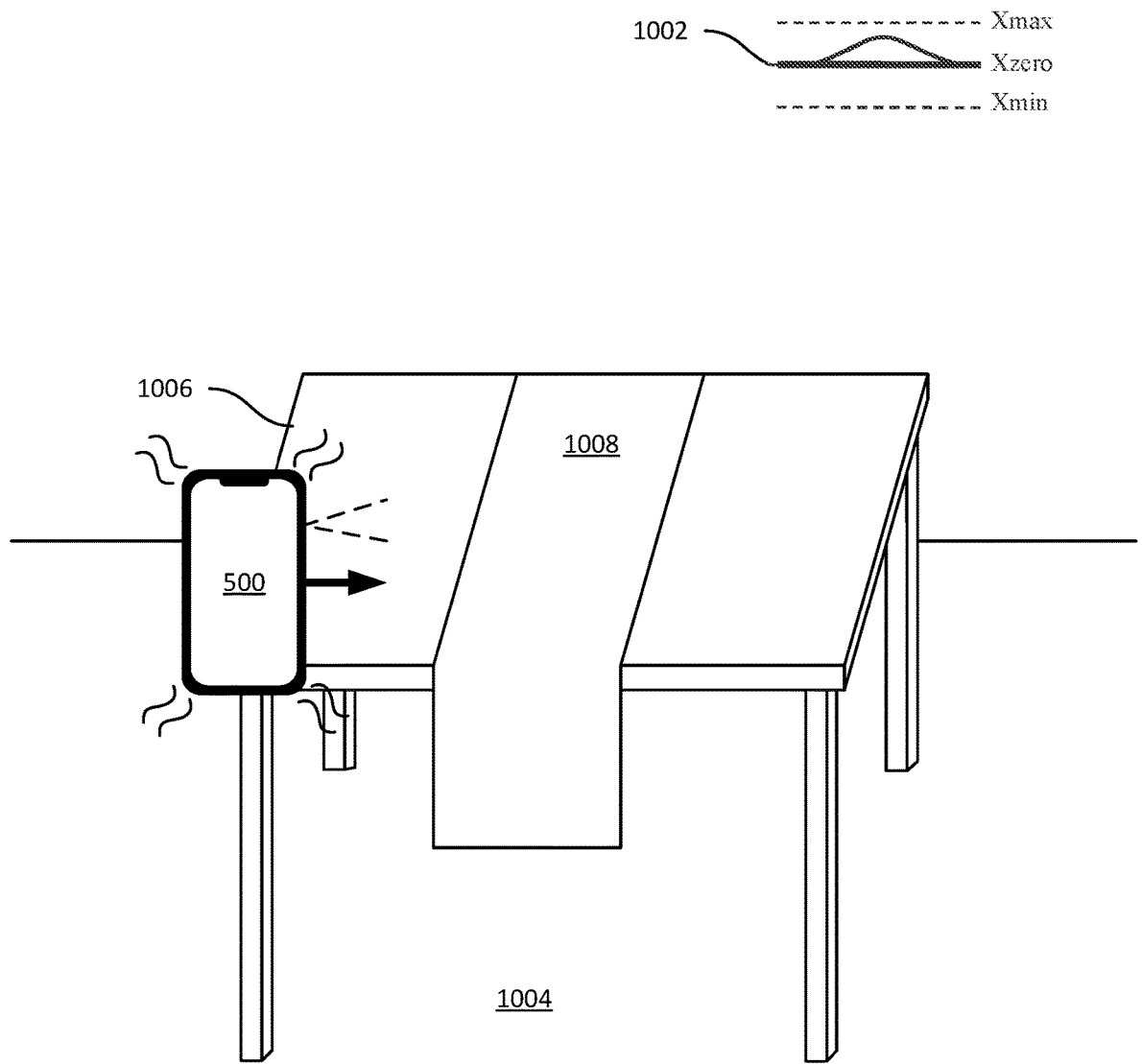

FIGS. 10A-10B illustrate the electronic device 500 generating a tactile output indicative of the camera of the electronic device 500 being oriented towards the floor 1004, which is one of the planes in AR content generated by the electronic device 500. In FIG. 10A, the camera of the electronic device 500 is oriented towards part of the floor 1004. In response to the camera of the electronic device 500 being oriented towards the floor 1004, the electronic device 500 generates a tactile output 1002 (e.g., a "Minor-Reduced" tactile output described above with reference to Table 1) that has a frequency indicative of the floor 1004. The tactile output 1002 is a continuous textural tactile output. With respect to FIGS. 10A-10I, in some embodiments, the electronic device 500 generates the tactile output only when the electronic device 500 is moving while in some embodiments, the electronic device 500 generates the tactile output regardless of whether or not the electronic device is moving 500.

In FIG. 10B, the camera of the electronic device 500 is oriented towards a different part of the floor 1004. In response to the orientation of the camera of the electronic device 500, the electronic device 500 reduces the amplitude of the tactile output 1002 to indicate that the section of the floor 1004 towards which the camera of the electronic device 500 is oriented is further away from the electronic device 500 than the section of the floor 1004 towards which the camera of the electronic device 500 was oriented in FIG. 10A. Thus, the electronic device 500 generates a tactile output 1002 with a frequency that is indicative of the AR plane towards which the camera of the electronic device 500 is oriented and an amplitude that is indicative of the distance between the camera of the electronic device 500 and the portion of the AR plane towards which the camera is oriented.

In FIG. 10C, the camera of the electronic device 500 is oriented towards the table 1006. In response to the orientation of the camera of the electronic device 500, the electronic device 500 generates a tactile output 1002 (e.g., a "Minor" tactile output described above with reference to Table 1). The tactile output 1002 is a continuous textural tactile output with a frequency indicative of the table 1006 that is different from the frequency of the tactile output 1002 illustrated in FIGS. 10A-10B that is indicative of the floor 1004.

In FIG. 10D, the camera of the electronic device 500 is oriented towards an edge of the table 1006. In response to the orientation of the camera of the electronic device 500, the electronic device 500 generates one or more discrete tactile outputs 1002 (e.g., a "Major" tactile output described above with reference to Table 1) indicative of the edge of the table 1006 (e.g., when the camera reaches an edge of an AR plane, the electronic device optionally generates a tactile output indicative of the edge of the AR plane, different from the tactile output generated for the remainder of the AR plane itself).

In FIGS. 10E-10F, the amplitude of a tactile output 1002 generated by the electronic device 500 changes as the velocity with which the camera of the electronic device 500 moves across the table 1006 changes. In FIG. 10E, the camera of the electronic device 500 moves with respect to the table 1006 at a relatively low velocity. In response to the orientation and velocity of the camera of the electronic device 500, the electronic device 500 generates a tactile output sequence 1002 (e.g., a "Minor" tactile output described above with reference to Table 1). The tactile output sequence 1002 is a continuous textural tactile output with an amplitude or intensity indicative of the velocity of the camera of the electronic device 500.

In FIG. 10F, the camera of the electronic device 500 moves with respect to the table 1006 at a relatively high velocity. In response to the orientation and velocity of the camera of the electronic device 500, the electronic device 500 generates a tactile output sequence 1002 (e.g., a "Minor" tactile output described above with reference to Table 1). The tactile output sequence 1002 is a continuous textural tactile output with an amplitude or intensity indicative of the velocity of the camera of the electronic device 500. The amplitude of the tactile output sequence 1002 illustrated in FIG. 10F is higher than the amplitude of the tactile output sequence 1002 illustrated in FIG. 10E because the velocity of the camera of the electronic device 500 is higher in FIG. 10F than the velocity of the camera of the electronic device 500 in FIG. 10E.

Figure 10H:
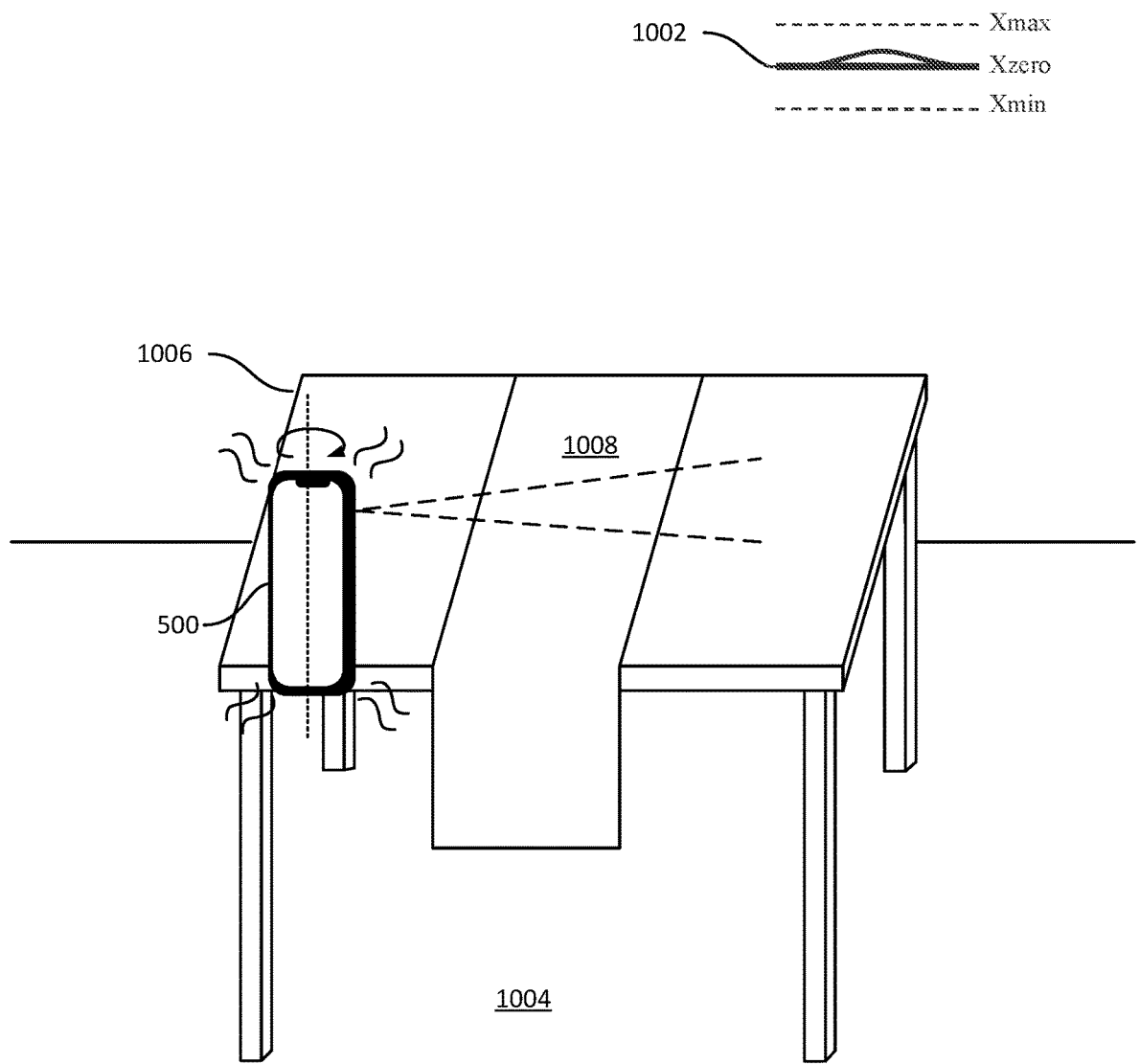

FIGS. 10G-10H illustrate the electronic device 500 generating a tactile output sequence 1002 with an amplitude indicative of the distance between the camera of the electronic device 500 and the location of table 1006 towards which the camera of the electronic device 500 is oriented. In FIG. 10G, the camera of the electronic device 500 is oriented towards a section of the table 1006 that is relatively close to the camera of the electronic device 500. In response to the orientation of the camera of the electronic device 500 relative to the table 1006, the electronic device 500 generates a tactile output sequence 1002 (e.g., a "Minor" tactile output sequence described above with reference to Table 1). The tactile output sequence 1002 has a frequency that is indicative of the table 1006 and an amplitude indicative of the distance between the camera of the electronic device 500 and the location of table 1006 toward which the camera of the electronic device 500 is oriented.

In FIG. 10H, the camera of the electronic device 500 is oriented towards a section of the table 1006 that is relatively far from the camera of the electronic device 500. In response to the orientation of the camera of the electronic device 500 relative to the table 1006, the electronic device 500 generates a tactile output sequence 1002 (e.g., a "Minor" tactile output sequence described above with reference to Table 1). The tactile output sequence 1002 has a frequency that is indicative of the table 1006 and an amplitude indicative of the distance between the camera of the electronic device 500 and the location of table 1006 toward which the camera of the electronic device 500 is oriented. The tactile output 1002 illustrated in FIG. 10H has an amplitude that is less than the amplitude of the tactile output 1002 illustrated in FIG. 10G because the camera electronic device 500 is oriented towards a section of the table 1006 that is relatively far away in FIG. 10H and the camera electronic device 500 is oriented towards a section of the table 1006 that is relatively close in FIG. 10G.

Figure 10I:
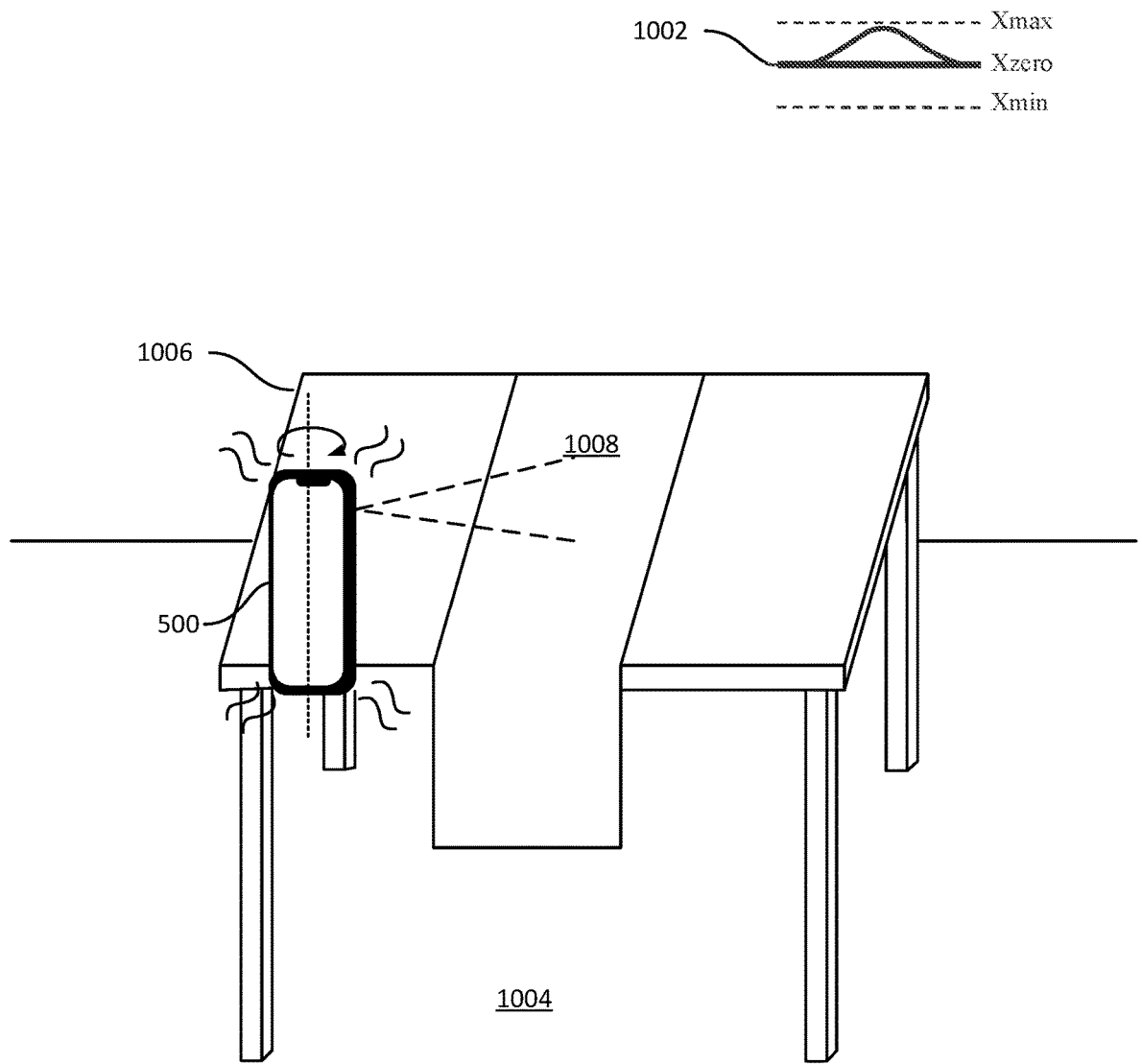

In FIG. 10I, the camera of the electronic device 500 is oriented towards a piece of fabric 1008 that is on the table 1006. The electronic device 500 recognizes that the fabric 1008 has a different texture than the table 1006. In response, the electronic device 500 generates a tactile output sequence 1002 that is sharper than the tactile output sequences generated while the camera of the electronic device 500 is oriented towards other parts of the table, as shown in FIGS. 10C-10H.

Figure 11A:
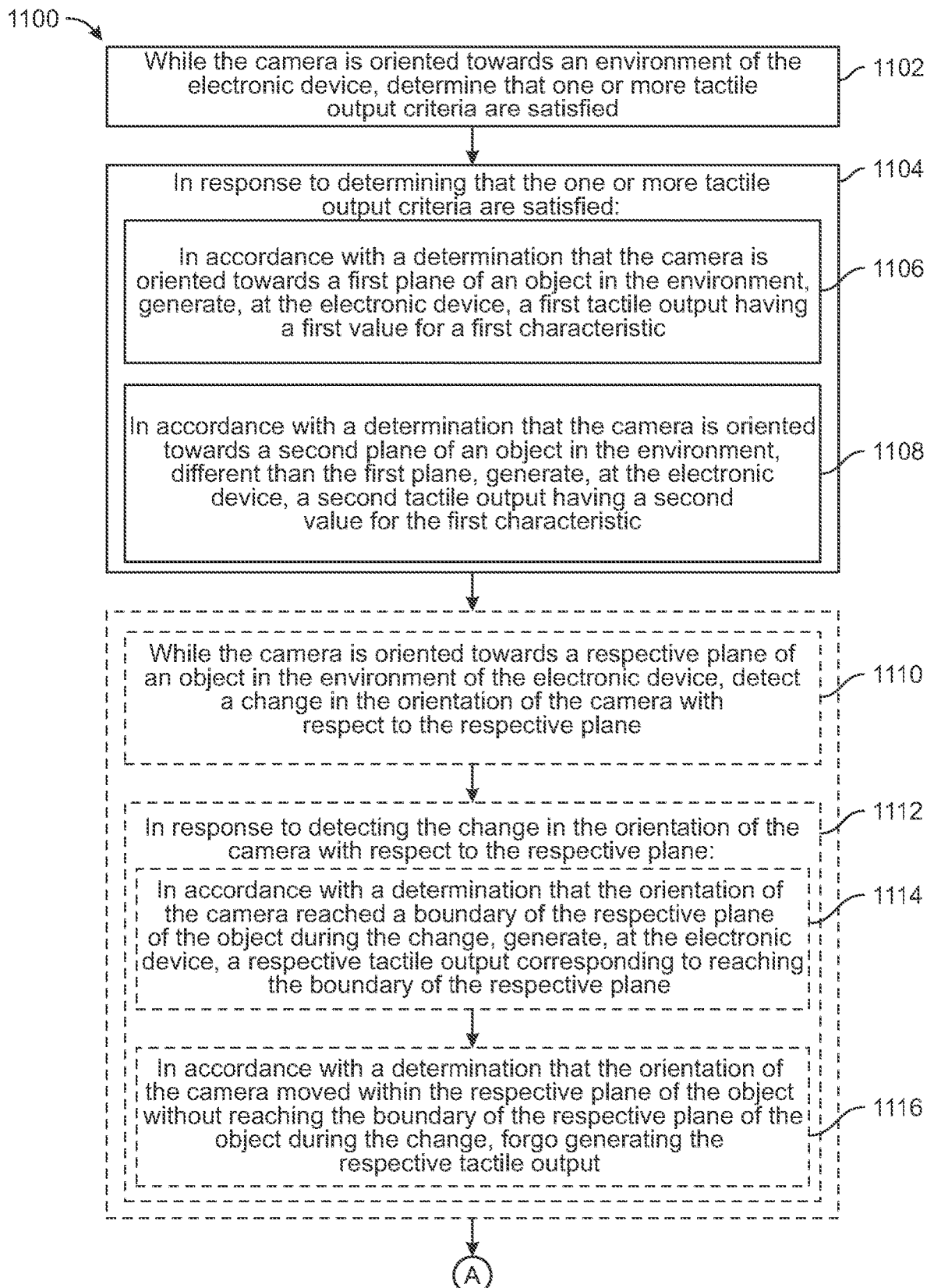
FIGS. 11A-11C are flow diagrams illustrating a method of generating tactile outputs with characteristics indicative of the orientation of a camera of the electronic device relative to one or more AR (augmented reality) planes in accordance with some embodiments of the disclosure.
Figure 11B:
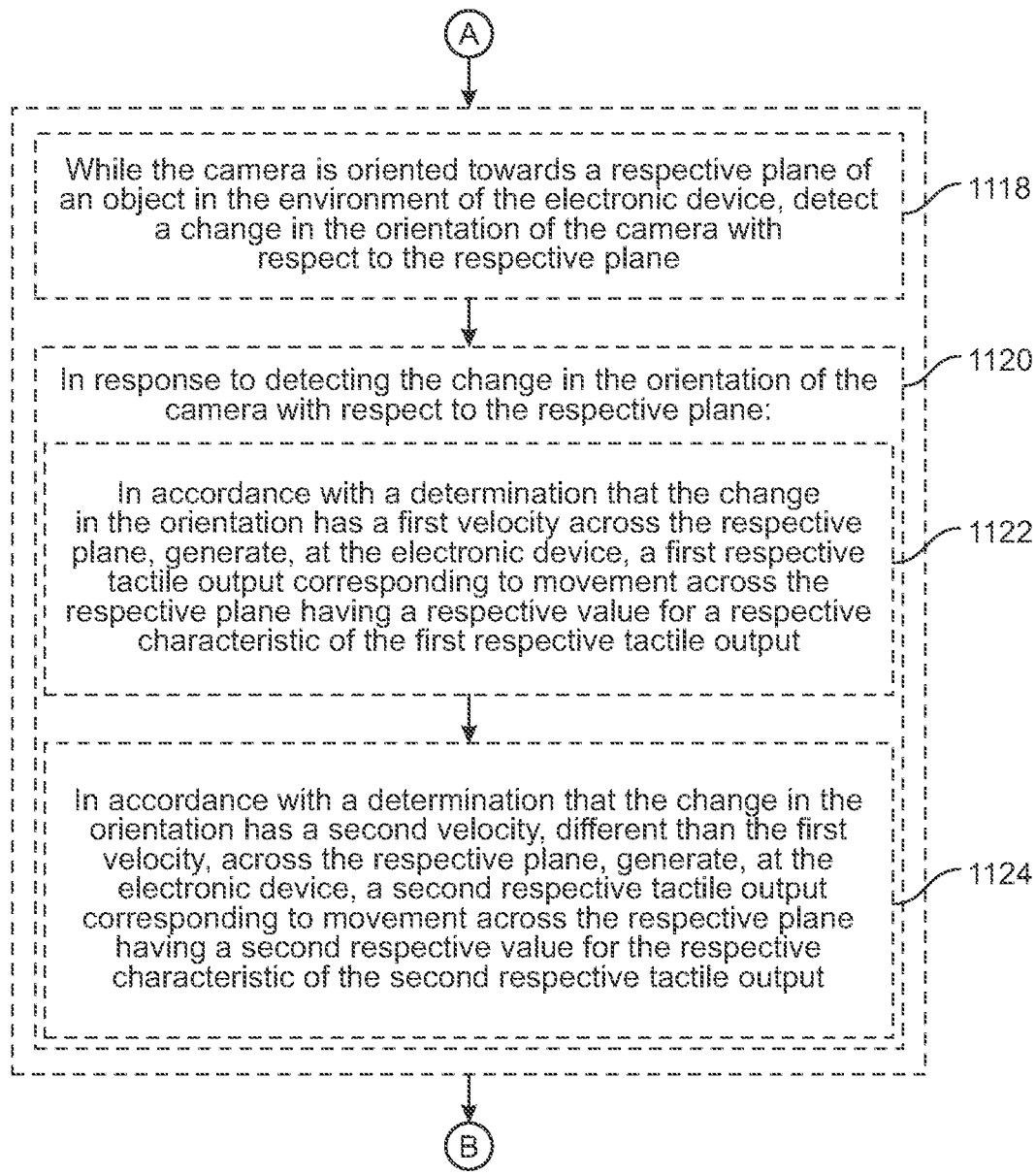
Figure 11C:
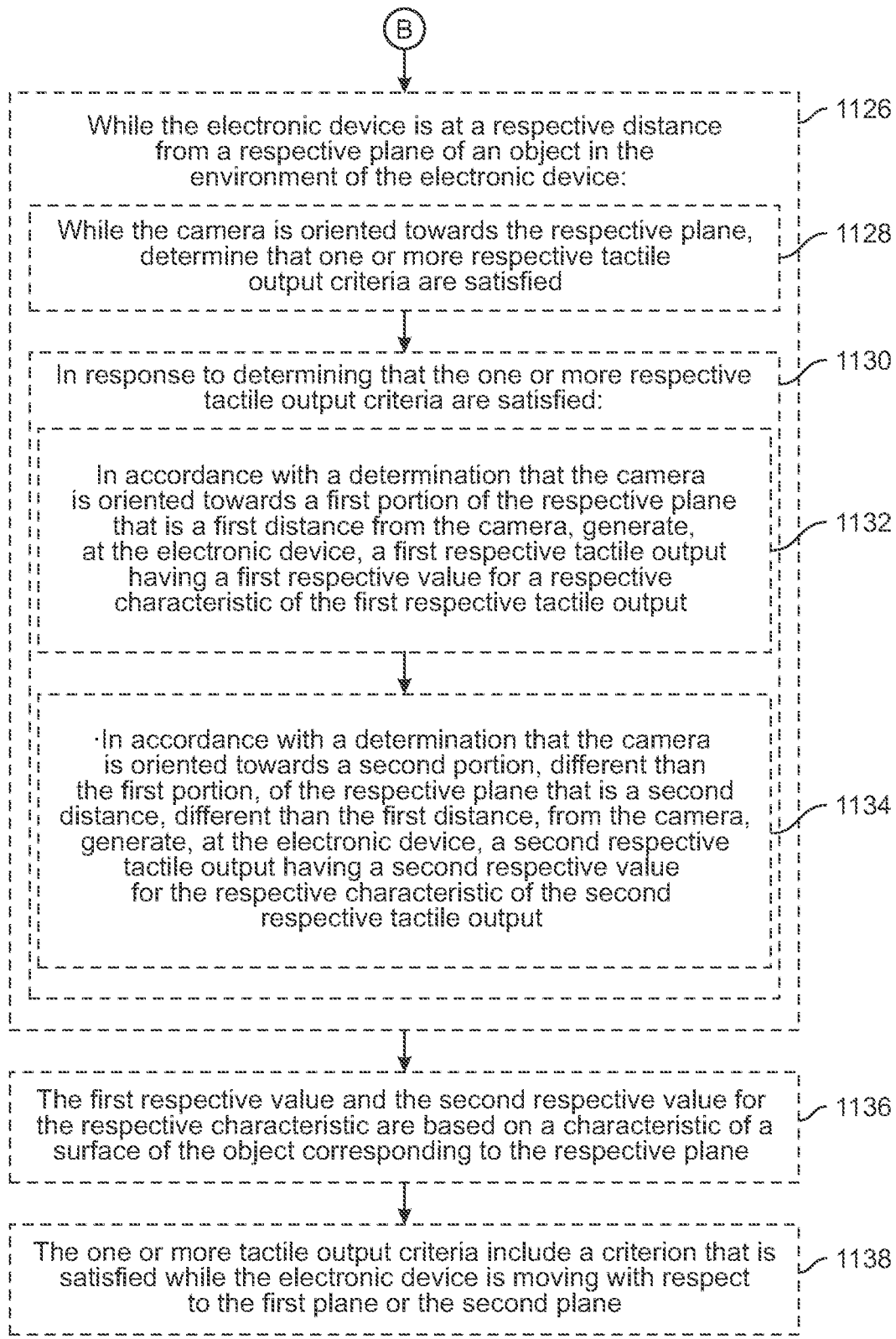

FIGS. 11A-11C are flow diagrams illustrating a method 1100 of generating tactile outputs with characteristics indicative of the orientation of a camera of the electronic device relative to one or more AR (augmented reality) planes in accordance with some embodiments of the disclosure. The method 1100 is optionally performed at an electronic device such as device 100, device 300, device 500, as described above with reference to FIGS. 1A-1B, 2-3, 4A-4B and 5A-5H. Some operations in method 1100 are, optionally combined and/or order of some operations is, optionally, changed.

In some embodiments, such as in FIG. 10A an electronic device (e.g., electronic device 500, a mobile device (e.g., a tablet, a smartphone, a media player, or a wearable device), laptop computer, or desktop computer in communication with a camera or some other directional indicator (e.g., a laser pointer, a light) that produces an indication corresponding to an orientation of the electronic device) in communication with one or more input devices, while the camera is oriented towards an environment of the electronic device, determines (1102) that one or more tactile output criteria are satisfied (e.g., the camera captures an image of the environment of the electronic device). For example, a camera captures an image of a location towards which the camera is oriented. As another example, a laser generator generates a laser dot on a location in space towards which the laser generator is oriented. The tactile output criteria optionally include a criterion that is satisfied when operating a tactile output augmented reality (AR) application on the electronic device. The tactile output criteria optionally include a criterion that is satisfied when the electronic device has identified a plane of an object in the environment of the electronic device, and the camera on the electronic device is oriented towards the identified plane. The tactile output criteria optionally include a criterion that is satisfied when the orientation of the camera changes with respect to identified plane in the environment of the electronic device).

In some embodiments, such as in FIG. 10A, in response to determining that the one or more tactile output criteria are satisfied (1104), in accordance with a determination that the camera is oriented towards a first plane 1004 of an object in the environment (e.g., a surface, such as the ground, or a surface of an object, such as a floor, table, wall, etc.), the electronic device 500 generates (1106), at the electronic device, a first tactile output 1002 (e.g., haptics, vibration) having a first value for a first characteristic (e.g., intensity, texture (frequency), pattern, duration etc.). In some embodiments, the electronic device associates a first tactile output texture with the first plane and generates a tactile output with the first tactile output texture in accordance with the determination that the camera is oriented towards the first plane.

In some embodiments, such as in FIG. 10C, in response to determining that the one or more tactile output criteria are satisfied, in accordance with a determination that the camera is oriented towards a second plane 1006 of an object in the environment, different than the first plane 1004, the electronic device 500 generates (1108), at the electronic device, a second tactile output 1002 having a second value for the first characteristic (e.g., the electronic device associates a second tactile output texture with the second plane and generates a tactile output with the second tactile output texture in accordance with the determination that the camera is oriented towards the second plane). For example, the electronic device generates a higher frequency tactile output when the camera is oriented towards a plane that is closer to the camera, and generates a lower frequency tactile output when the camera is oriented towards a plane that is further from the camera. In some embodiments, rather than the distance from the camera, the characteristics of the planes that cause the above different tactile output are their respective distances from an identified ground plane in the environment of the electronic device.

The above-described manner of varying a characteristic of the tactile output in response to a change in which plane the camera of the electronic device is oriented towards allows the electronic device to confirm which plane the camera is oriented towards and use tactile output to communicate information about such plane, which simplifies interactions between the user and the electronic device and enhances the operability of the electronic device (e.g., by reducing user error of inadvertently orienting the camera towards a plane that is different from an intended plane), which, additionally, reduces power usage and improves battery life of the electronic device by enabling the user to use the electronic device more quickly and efficiently, without requiring the use of the display device of the electronic device or touch screen inputs from the user, which reduces power usage.

In some embodiments, such as in FIGS. 10C-10D, while the camera is oriented towards a respective plane 1006 of an object in the environment of the electronic device, the electronic device 500 detects (1110) a change in the orientation of the camera with respect to the respective plane (e.g., a portion of the respective plane that is in the field of view of the camera changes). For example, the electronic device changes orientation so the portion of the plane in the center of the field of view of the camera of the electronic device changes.

In some embodiments, such as in FIG. 10D, in response to detecting the change in the orientation of the camera with respect to the respective plane 1006 (1112), in accordance with a determination that the orientation of the camera reached a boundary of the respective plane of the object during the change, the electronic device 500 generates (1114), at the electronic device, a respective tactile output 1002 corresponding to reaching the boundary of the respective plane (e.g., one or more characteristics of the tactile output changes in response to detecting the boundary of the respective plane).

In some embodiments, such as in FIG. 10C, in accordance with a determination that the orientation of the camera moved within the respective plane 1006 of the object without reaching the boundary of the respective plane of the object during the change, the electronic device 500 forgoes (1116) generating the respective tactile output (e.g., the electronic device continues to present the tactile output that is not indicative of the boundary of the plane). For example, while the camera of the electronic device is oriented towards a table, the electronic device detects that the orientation of the camera changes to capture the edge of the table. In response to the camera capturing the edge of the table, the electronic device generates a different tactile output than the tactile output that was generated when the camera was oriented towards a portion of the table that is not the edge of the table. In some embodiments, instead of the tactile output corresponding to the edge, the electronic device generates a textural tactile output while the camera is scanning the surface of the table, within the edges of the table.

The above-described manner of presenting the tactile output corresponding to the edge of the respective plane allows the electronic device to communicate to the user that the camera is oriented towards a boundary of the plane using the tactile output, which simplifies interactions between the user and the electronic device and enhances the operability of the electronic device (e.g., by enabling the user to more quickly identify the boundary of the plane), which, additionally, reduces power usage and improves battery life of the electronic device by enabling the user to use the electronic device more quickly and efficiently.

In some embodiments, such as in FIGS. 10E-10F, while the camera is oriented towards a respective plane 1006 of an object in the environment of the electronic device 500, the electronic device detects (1118) a change in the orientation of the camera with respect to the respective plane (e.g., detecting movement and/or change in orientation of the electronic device while the camera is oriented towards the respective plane).

In some embodiments, such as in FIG. 10E, in response to detecting the change in the orientation of the camera with respect to the respective plane 1006 (1120), in accordance with a determination that the change in the orientation has a first velocity across the respective plane, the electronic device 500 generates (1122), at the electronic device, a first respective tactile output 1002 corresponding to movement across the respective plane having a respective value for a respective characteristic (e.g., amplitude, frequency, texture, etc.) of the first respective tactile output (e.g., the electronic device generates a tactile output that has a first value for a first characteristic associated with the respective plane and a second value for a second characteristic associated with the velocity of the movement). For example, while the electronic device moves at a first velocity across the respective plane, the electronic device generates a tactile output that has a frequency associated with the respective plane and a first amplitude associated with the first velocity.

In some embodiments, such as in FIG. 10F, in response to detecting the change in the orientation of the camera with respect to the respective plane 1006 (1120), in accordance with a determination that the change in the orientation has a second velocity, different than the first velocity, across the respective plane, the electronic device 500 generates (1124), at the electronic device, a second respective tactile output 1002 corresponding to movement across the respective plane having a second respective value for the respective characteristic of the second respective tactile output (e.g., the electronic device generates a tactile output that has a frequency associated with the respective plane and an amplitude associated with the velocity of the movement). For example, while the electronic device moves at a second velocity across the respective plane, the electronic device generates a tactile output that has a frequency associated with the respective plane and a second amplitude associated with the second velocity. In some embodiments, the amplitude of the tactile output is higher when the velocity is higher, though in some embodiments, the amplitude of the tactile output is higher when the velocity is lower.

The above-described manner of changing a respective characteristic of the tactile output in accordance with the velocity of the camera relative to the respective plane allows the electronic device to communicate the velocity of the camera relative to the respective plane to the user with the tactile output, which simplifies interactions between the user and the electronic device and enhances the operability of the electronic device (e.g., by enabling the user to more quickly determine the velocity of the camera's movement across the respective plane), which, additionally, reduces power usage and improves battery life of the electronic device by enabling the user to use the electronic device more quickly and efficiently.

In some embodiments, such as in FIGS. 10G-10H, while the electronic device 500 is at a respective distance from a respective plane 1006 of an object in the environment of the electronic device (1126), while the camera is oriented towards the respective plane, determining that one or more respective tactile output criteria are satisfied (1128) (e.g., the plane is in the field of view of the camera, the electronic device is running an augmented reality application, the plane is associated with a tactile output, the field of view of the camera is moving with respect to the respective plane, etc.).

In some embodiments, such as in FIGS. 10G-10H, while the electronic device 500 is at a respective distance from a respective plane 1006 of an object in the environment of the electronic device (1126), in response to determining that the one or more respective tactile output criteria are satisfied (1130): in accordance with a determination that the camera is oriented towards a first portion of the respective plane 1006 that is a first distance from the camera, such as in FIG. 10G, the electronic device 500 generates, at the electronic device, a first respective tactile output 1002 having a first respective value for a respective characteristic of the first respective tactile output (1132) (e.g., the electronic device generates a tactile output that has a first characteristic associated with the respective plane and a second characteristic associated with the distance between the camera and the respective plane), and in accordance with a determination that the camera is oriented towards a second portion, different than the first portion, of the respective plane 1006 that is a second distance, different than the first distance, from the camera, the electronic device 500 generates, at the electronic device, a second respective tactile output 1002 having a second respective value for the respective characteristic of the second respective tactile output (1134) (e.g., the position of the electronic device relative to the respective plane is the same while oriented towards the first portion of the respective plane and while oriented towards the second portion of the respective plane, but the orientation of the electronic device relative to the plane is different (e.g., the electronic device rotates)). For example, while oriented towards the first portion of the respective plane, the electronic device generates a tactile output that has a frequency that is associated with the respective plane and an amplitude that is associated with the first distance between the camera and the first portion of the respective plane. For example, while oriented towards the second portion of the respective plane, the electronic device generates a tactile output that has a frequency that is associated with the respective plane and an amplitude that is associated with the second distance between the camera and the second portion of the respective plane. In some embodiments, the amplitude of the tactile output increases as the distance between the camera and the respective portion of the respective plane towards which the camera is oriented decreases, though in some embodiments, the amplitude of the tactile output decreases as the distance between the camera and the respective portion of the respective plane towards which the camera is oriented decreases.

The above-described manner of varying the respective characteristic of the tactile output based on the distance between the electronic device and the portion of the respective plane towards which the camera is oriented allows the electronic device to convey information to the user about the orientation of the electronic device relative to the respective plane, which simplifies interactions between the user and the electronic device and enhances the operability of the electronic device (e.g., by enabling the user to more quickly determine the orientation of the electronic device relative to the respective plane), which, additionally, reduces power usage and improves battery life of the electronic device by enabling the user to use the electronic device more quickly and efficiently.

In some embodiments, such as in FIG. 10I, the first respective value and the second respective value for the respective characteristic are based on a characteristic of a surface 1008 of the object 1006 corresponding to the respective plane (1136) (e.g., the electronic device determines the type of surface of the object towards which the camera is oriented based on image recognition). For example, the electronic device generates a tactile output with a smooth texture in response to detecting that the camera is oriented towards a surface with a smooth texture and the electronic device generates a tactile output with a rough texture in response to detecting that the camera is oriented towards a surface with a rough texture.

The above-described manner of generating a tactile output that is indicative of a characteristic of a surface of an object corresponding to the respective plane allows the electronic device to communicate the characteristic of the surface to the user with the tactile output, which simplifies interactions between the user and the electronic device and enhances the operability of the electronic device (e.g., by enabling the user to more quickly identify the portion of the respective plane towards which the camera is oriented), which, additionally, reduces power usage and improves battery life of the electronic device by enabling the user to use the electronic device more quickly and efficiently.

In some embodiments, such as in FIG. 10F, the one or more tactile output criteria include a criterion that is satisfied while the electronic device 500 is moving with respect to the first plane 1006 or the second plane (1138) (e.g., the electronic device does not generate the tactile output when it is not moving, even if the other tactile output criteria are satisfied). In some embodiments, movement includes a change in distance between the electronic device and/or the camera and the respective surface, a change in orientation between the electronic device and/or camera relative to the respective surface, movement of the respective surface, and movement of the electronic device and/or camera in a direction parallel to the respective surface that does not change the distance between the electronic device and/or camera and the respective plane, but changes which portion of the respective plane towards which the electronic device and/or camera is oriented.

The above-described manner of generating the tactile output in response to movement of the electronic device with respect to the respective plane allows the electronic device to forgo generating the tactile output when the electronic device and/or camera is stationary, which reduces power usage and improves battery life of the electronic device by enabling the user to use the electronic device more quickly and efficiently.

It should be understood that the particular order in which the operations in FIGS. 11A-11C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, and 1300) are also applicable in an analogous manner to method 1100 described above with respect to FIGS. 11A-11C. For example, the ways of generating tactile outputs indicative of AR planes described above with reference to method 1100 optionally have one or more of the characteristics of the ways of generating tactile outputs for a range of orientations of the electronic device that changes with respect to the distance of the electronic device from a respective object, modifying tactile outputs as the orientation of the electronic device changes, and generating tactile outputs indicative of data sharing with a second electronic device, etc., described herein with reference to other methods described herein (e.g., methods 700, 900, and 1300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 11A-11C are, optionally, implemented by components depicted in FIGS. 1A-1B. For example, generating operations 1106, 1108, and 1114 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Generating Tactile Outputs Indicative of Data Sharing

Users interact with electronic devices in many different manners, including sharing data with other electronic devices. The embodiments described below provide ways in which an electronic device generates tactile outputs indicative of initiating a data sharing process with a second electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 12A:
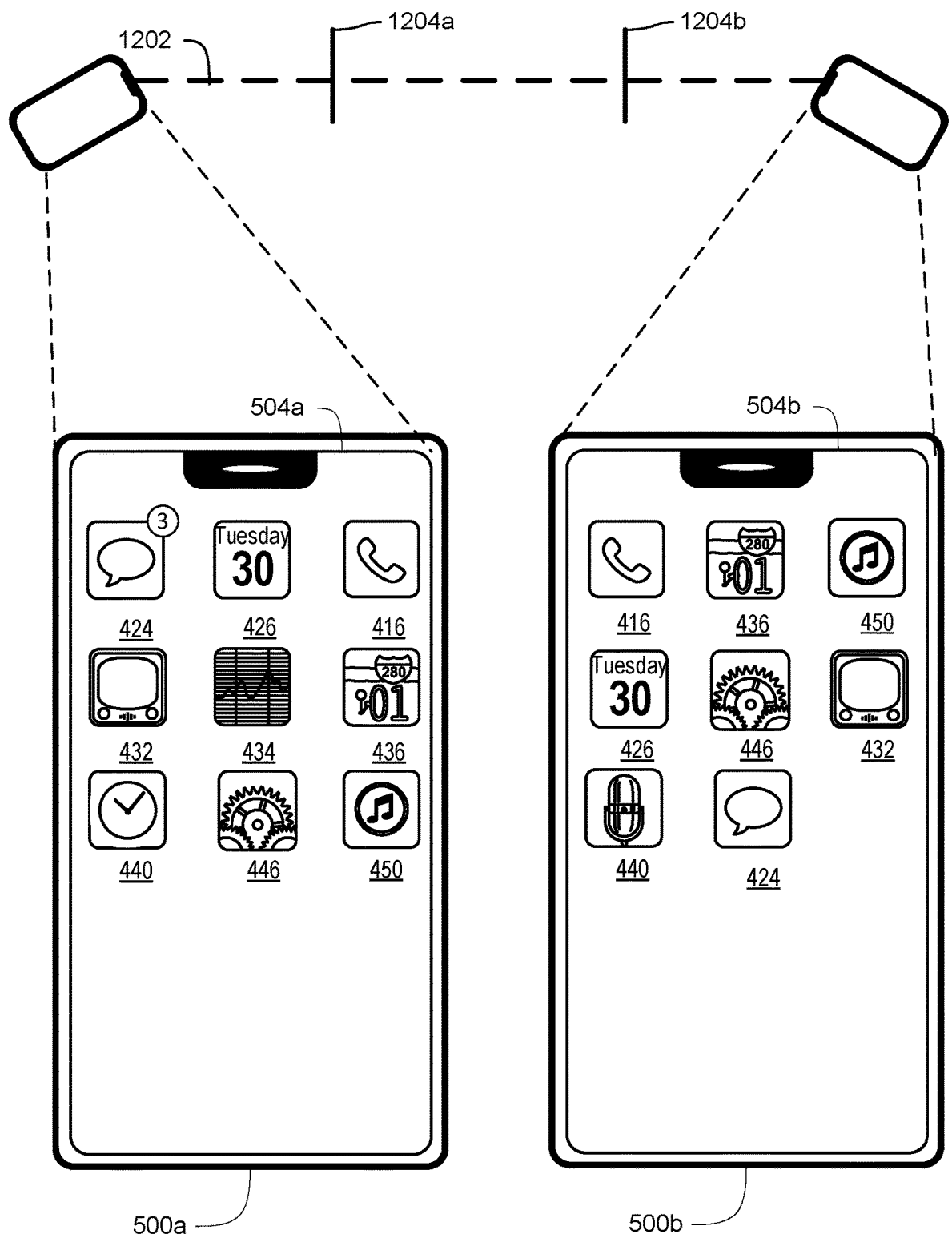
FIGS. 12A-12Q illustrate exemplary ways in which a first electronic device generates tactile outputs indicative of a data sharing process with a second electronic device in accordance with some embodiments of the disclosure.
Figure 12B:
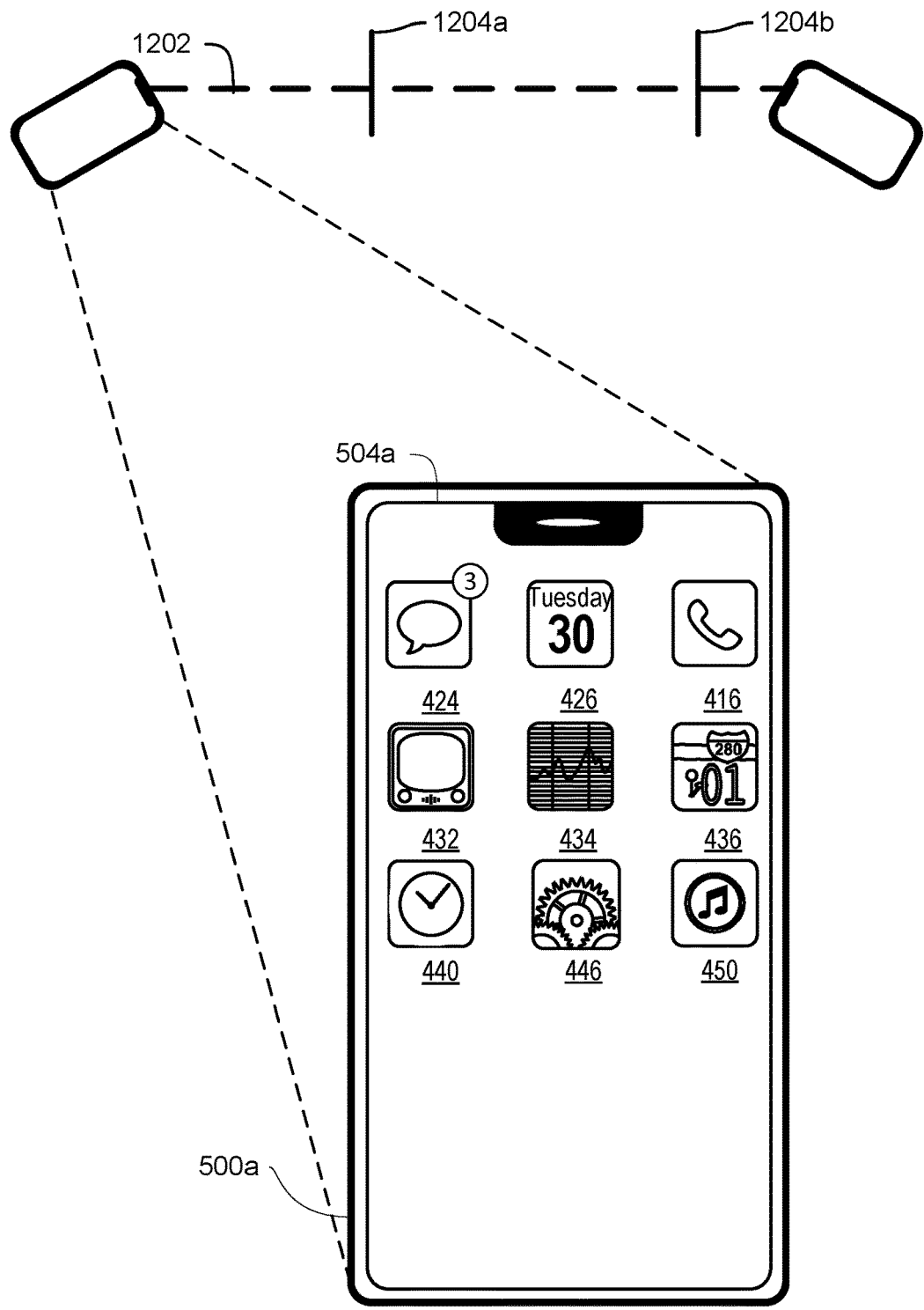
Figure 12C:
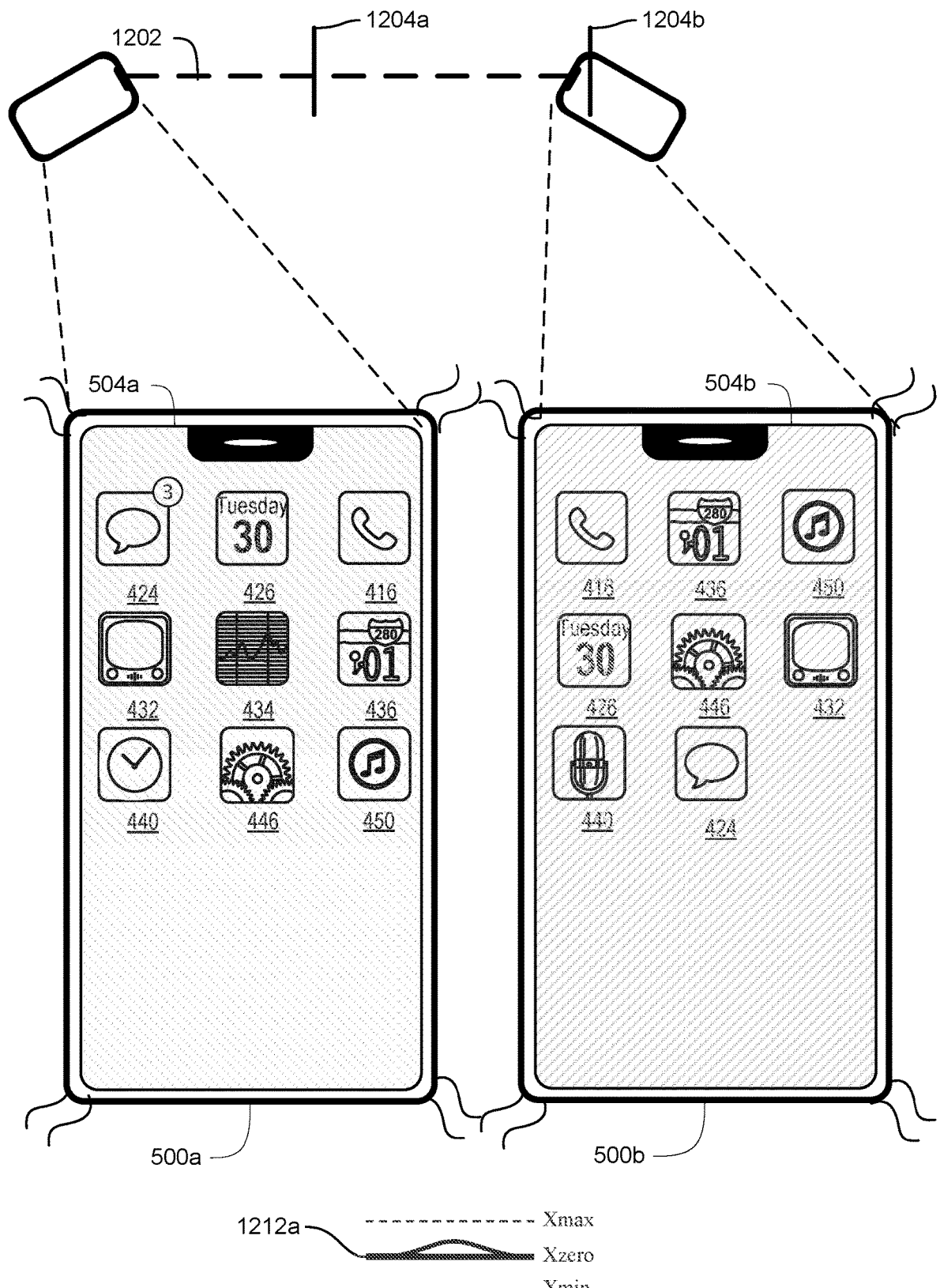
Figure 12D:
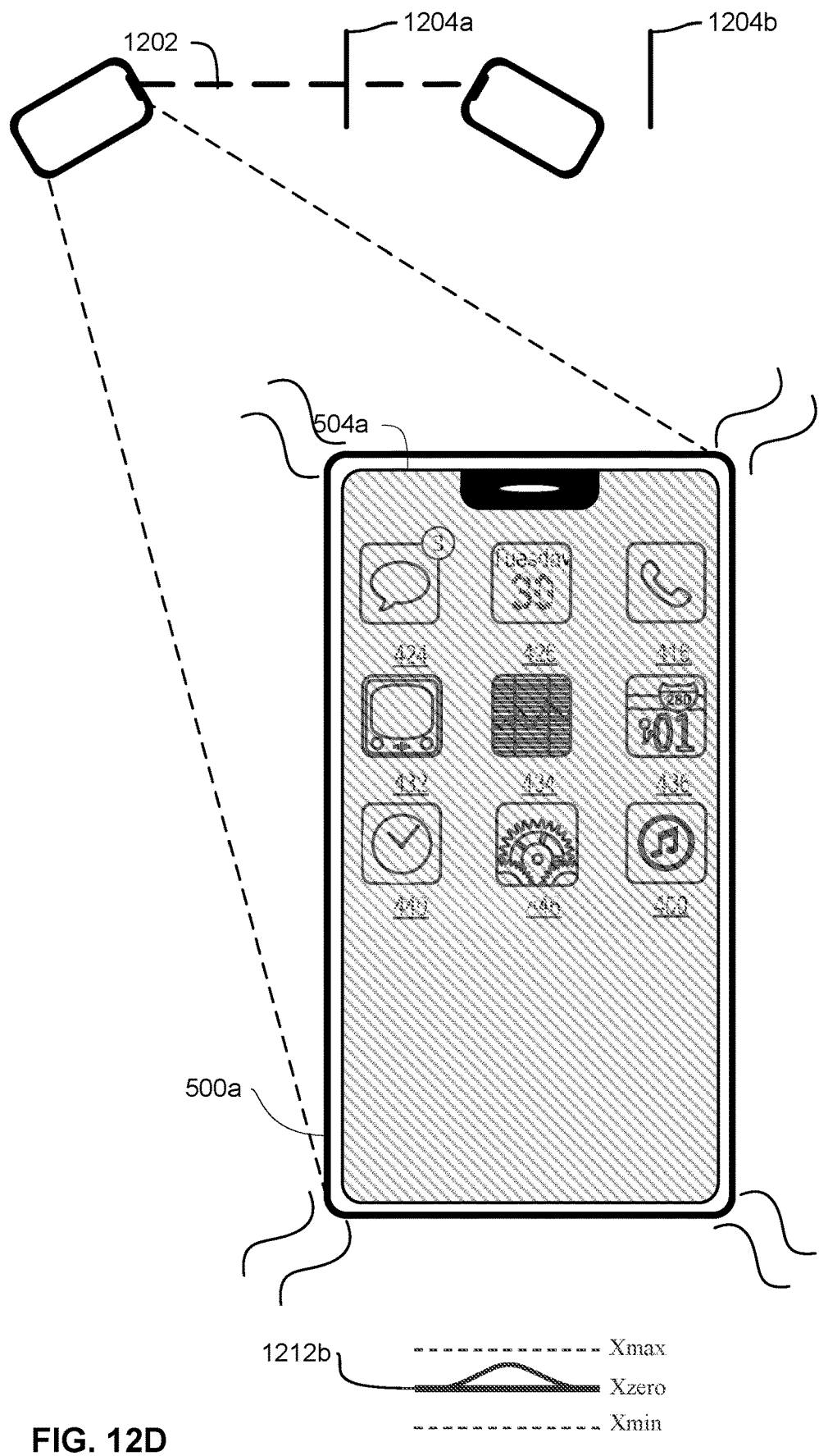
Figure 12E:
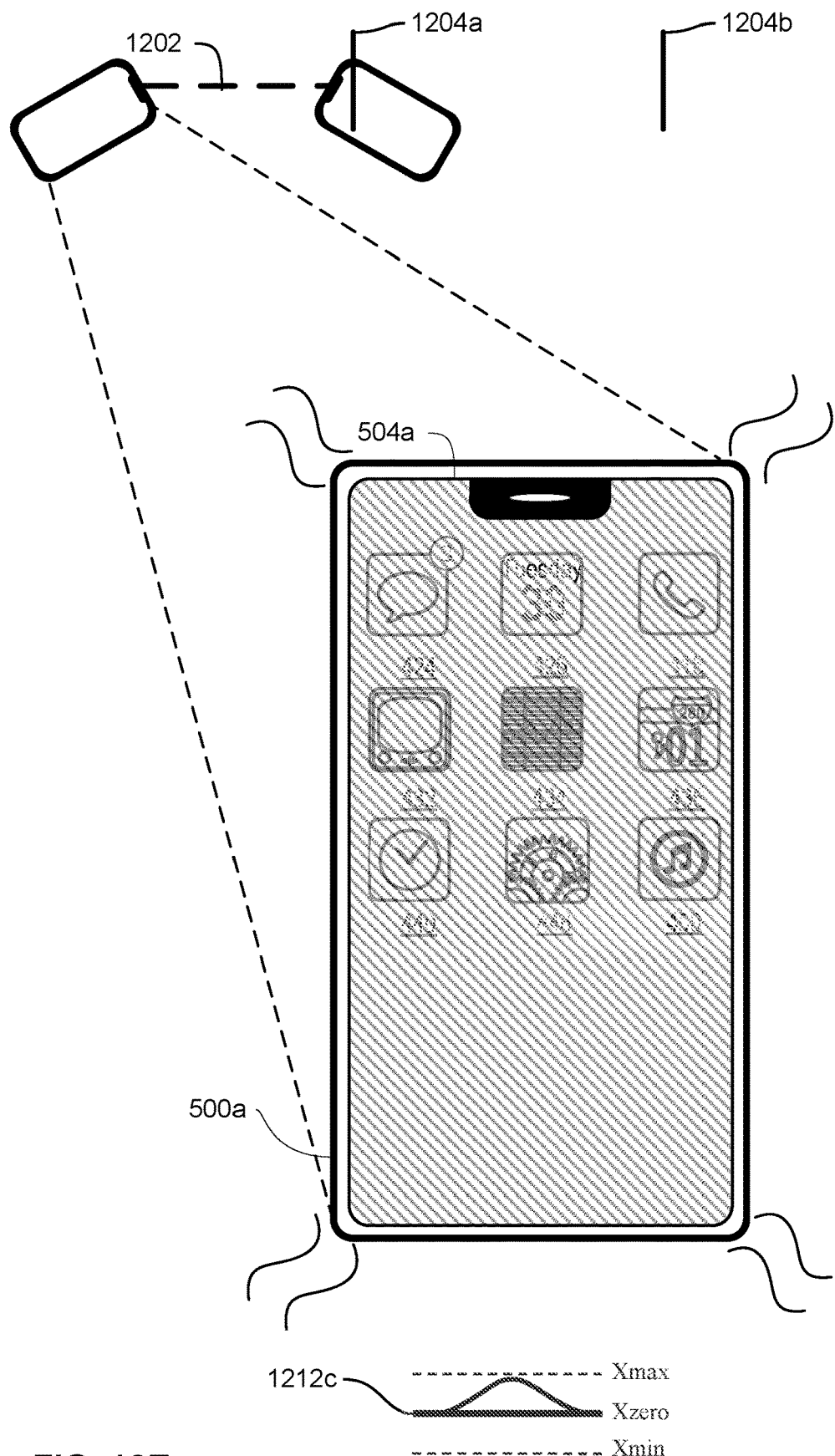
Figure 12F:
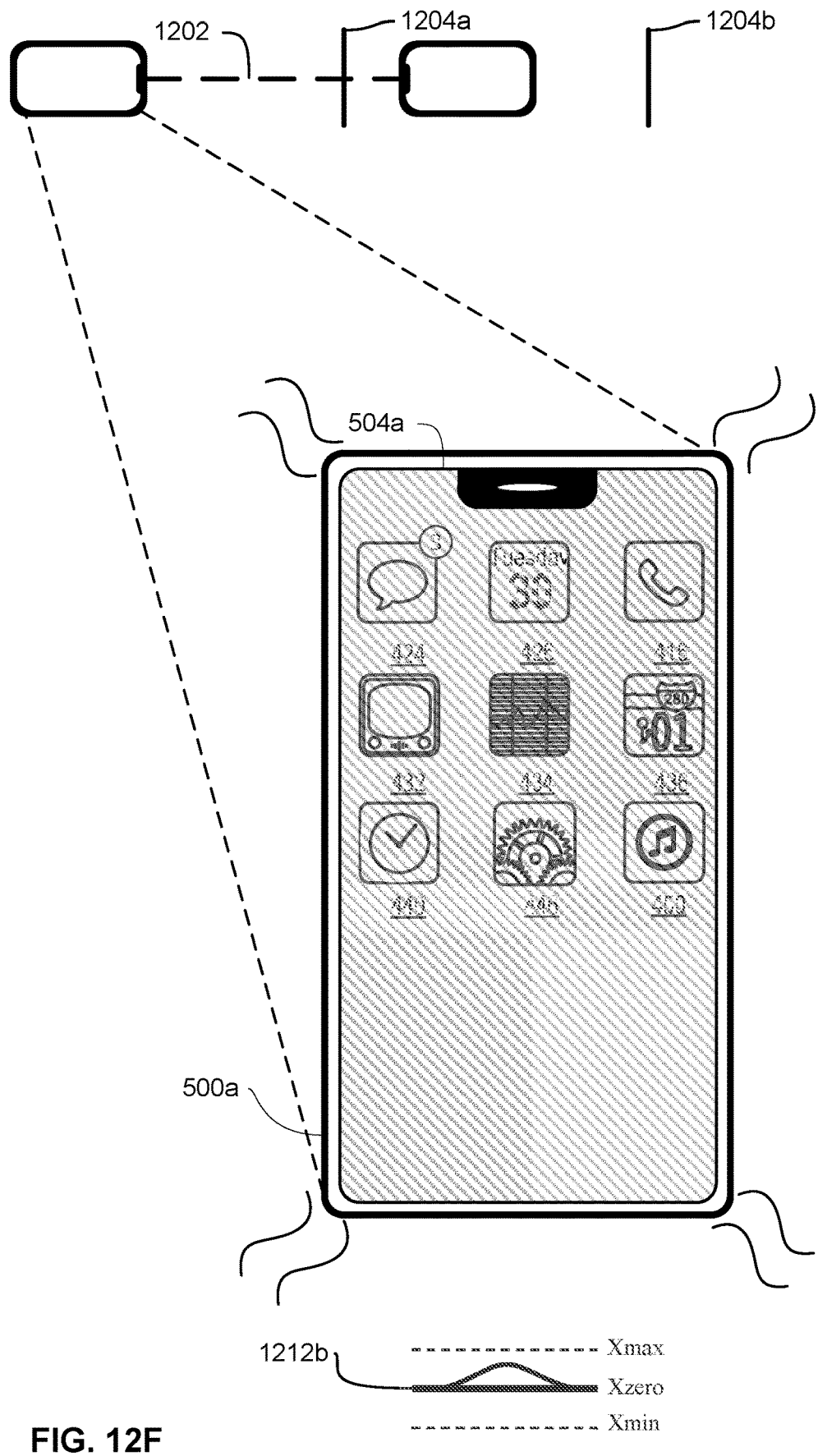
Figure 12G:
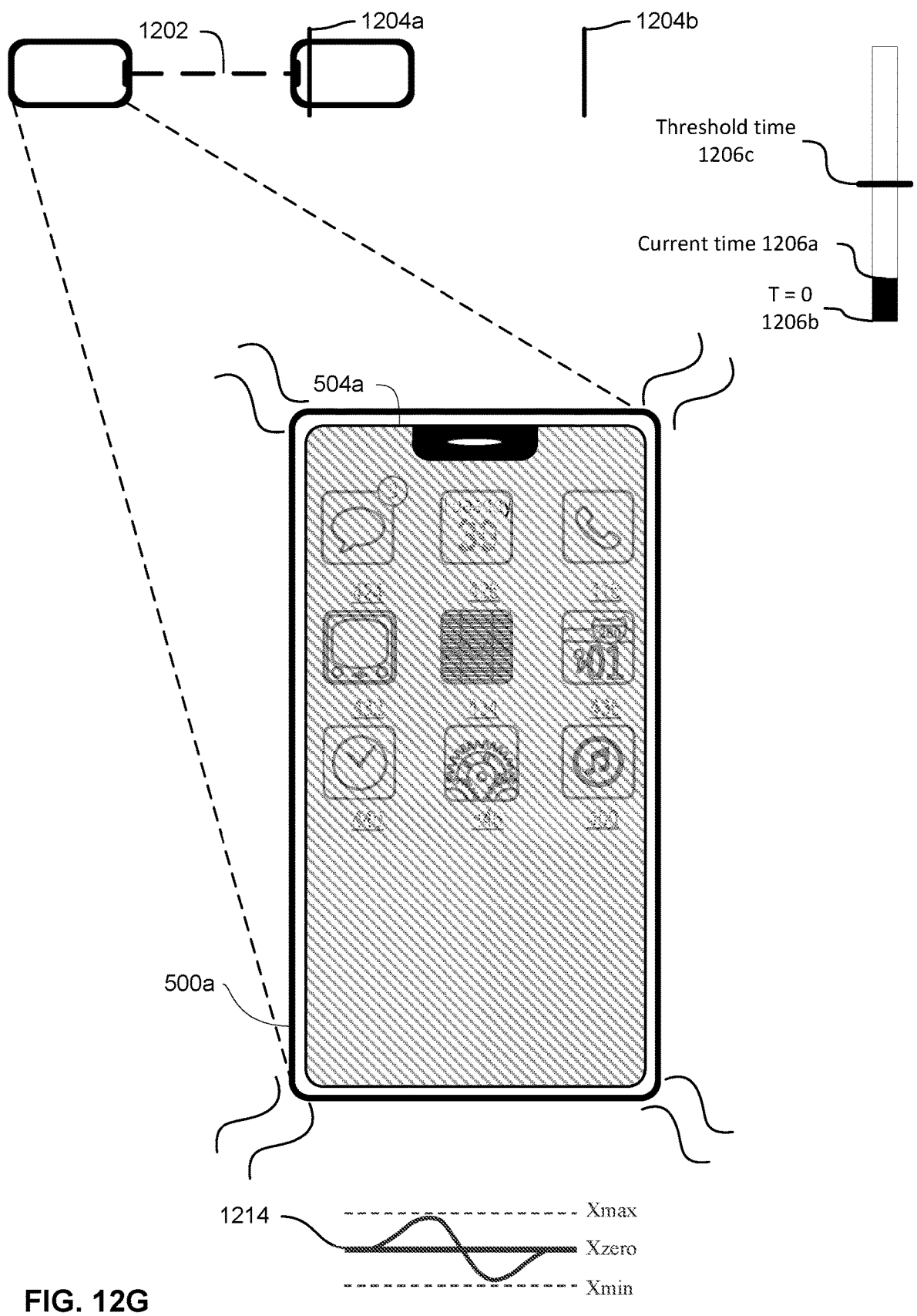
Figure 12H:
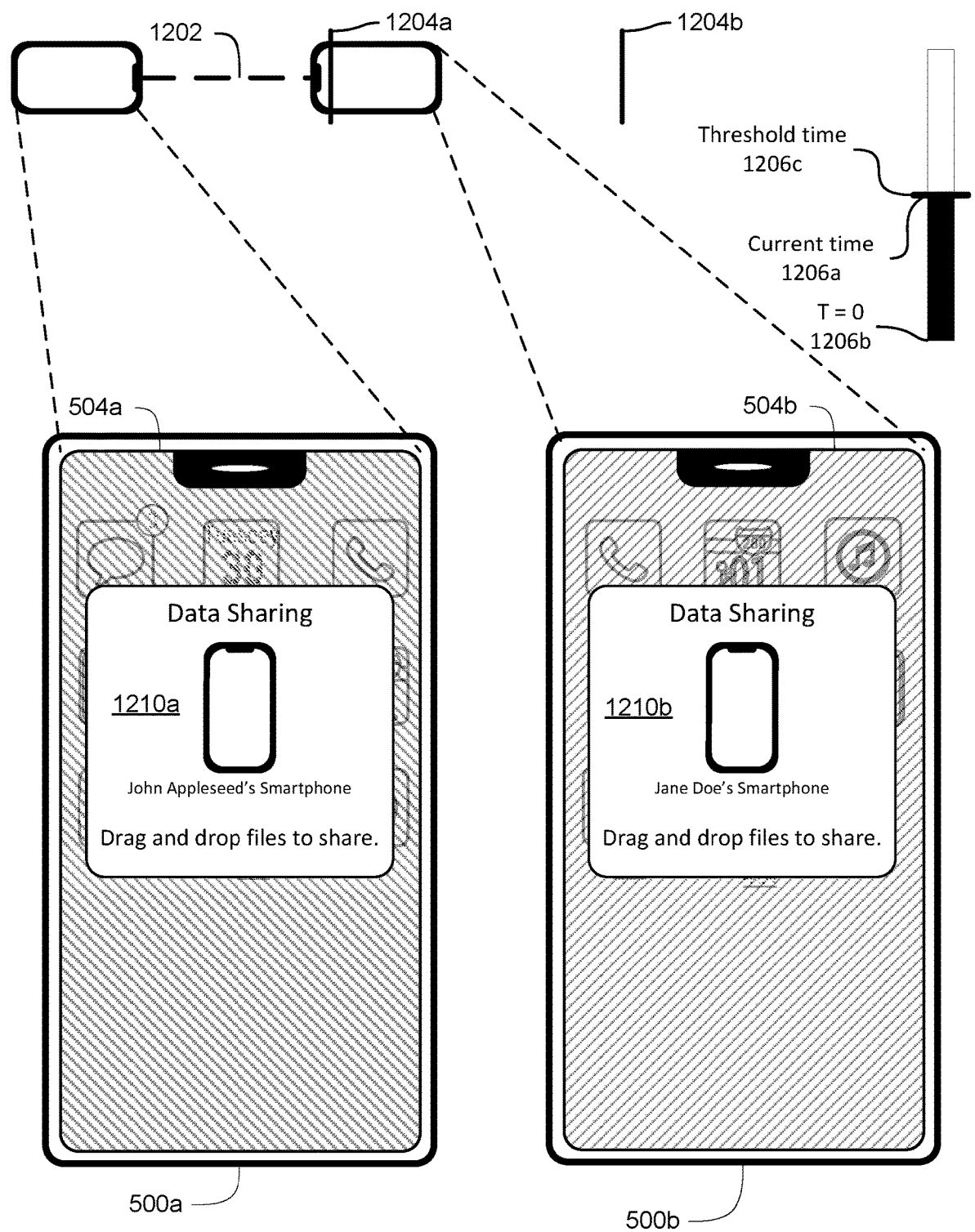
Figure 12I:
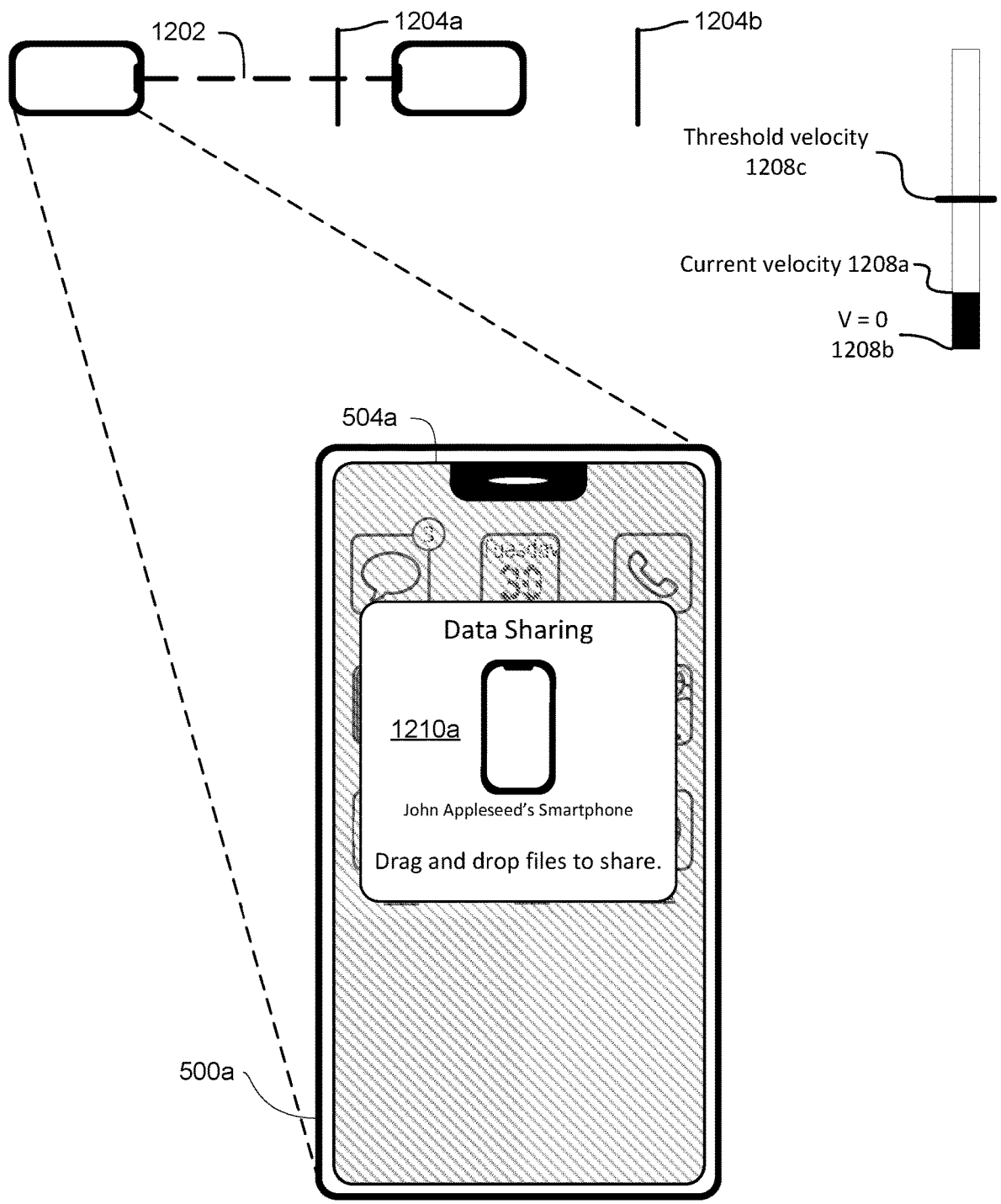
Figure 12J:
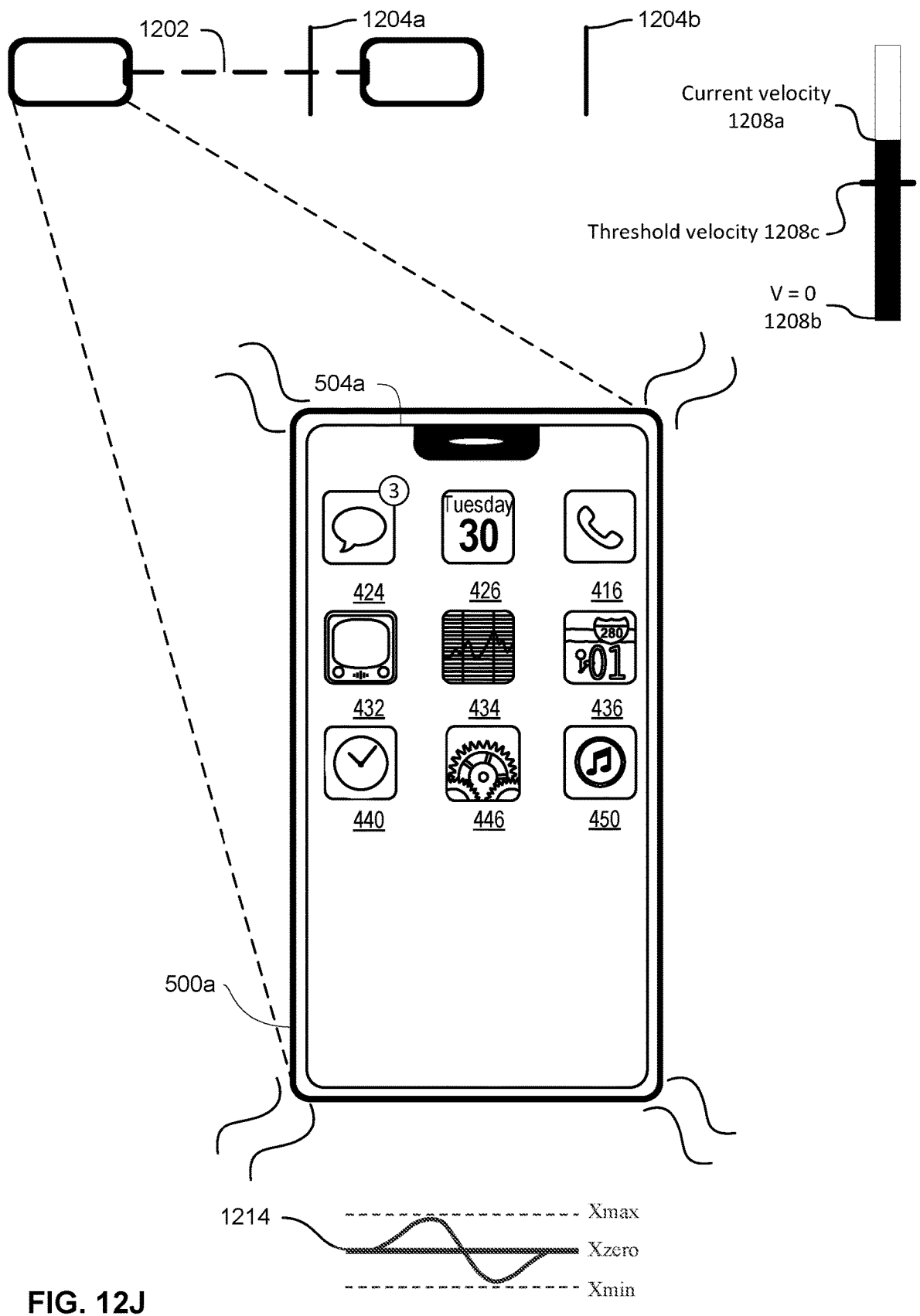
Figure 12K:
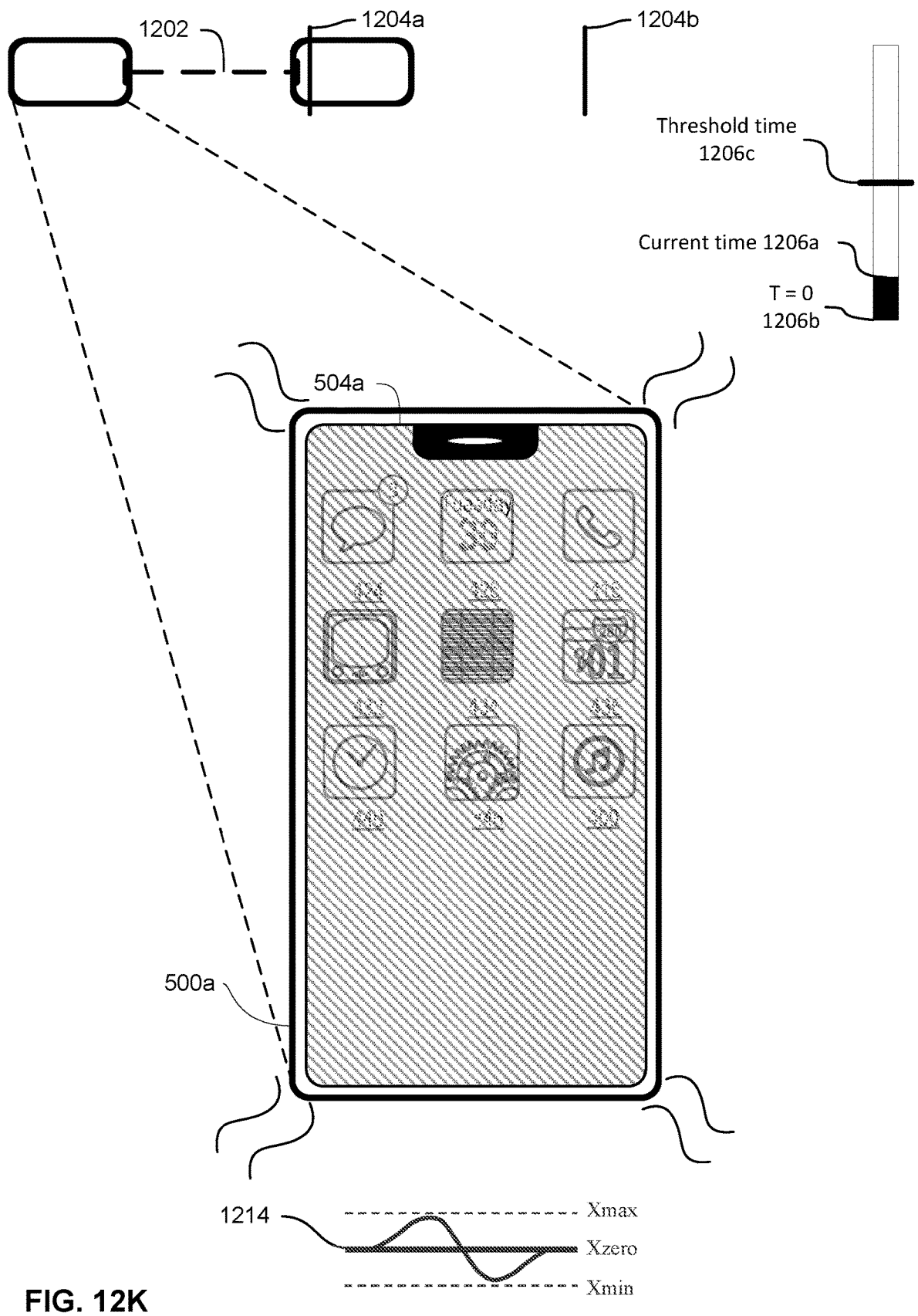
Figure 12L:
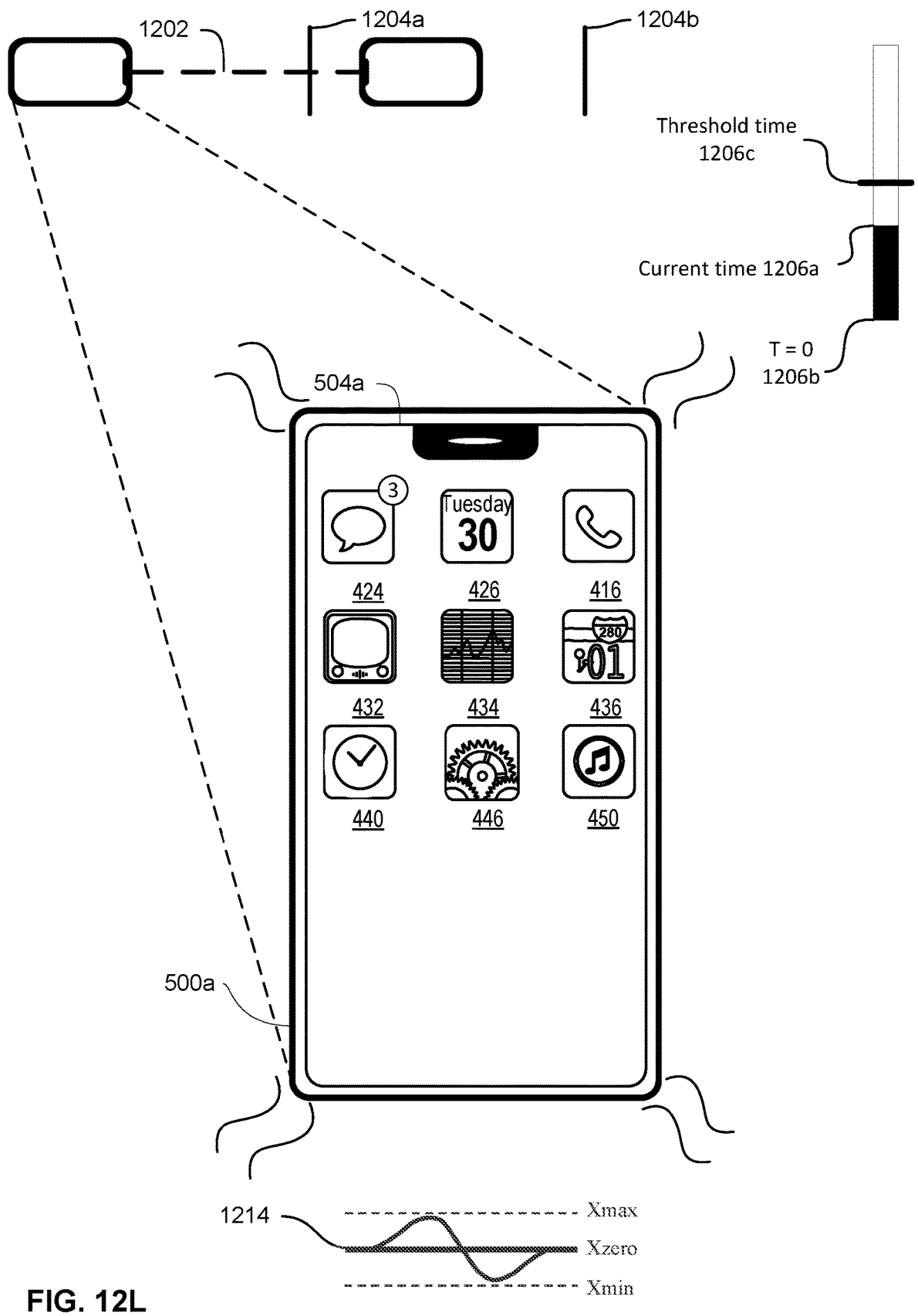
Figure 12M:
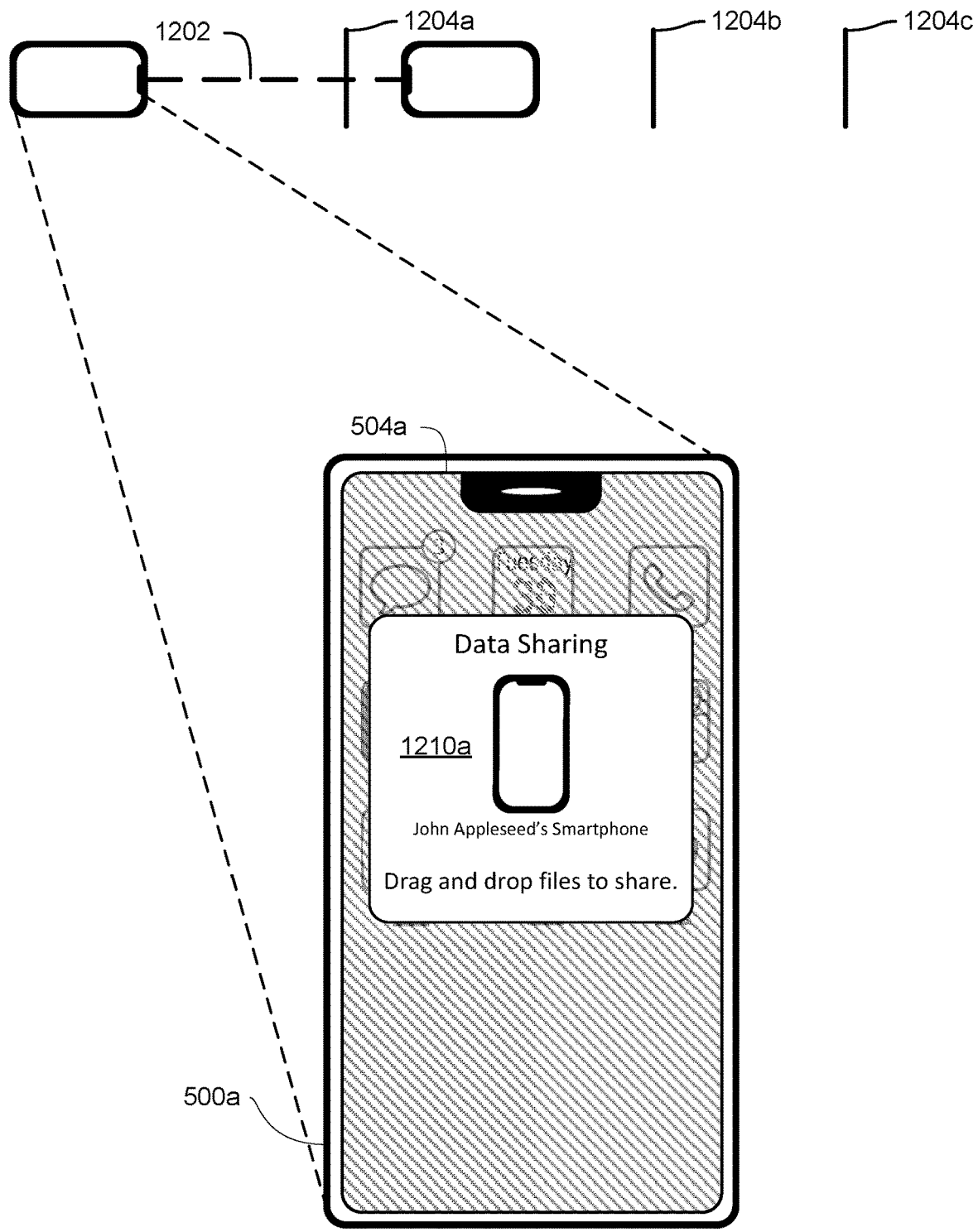
Figure 12N:
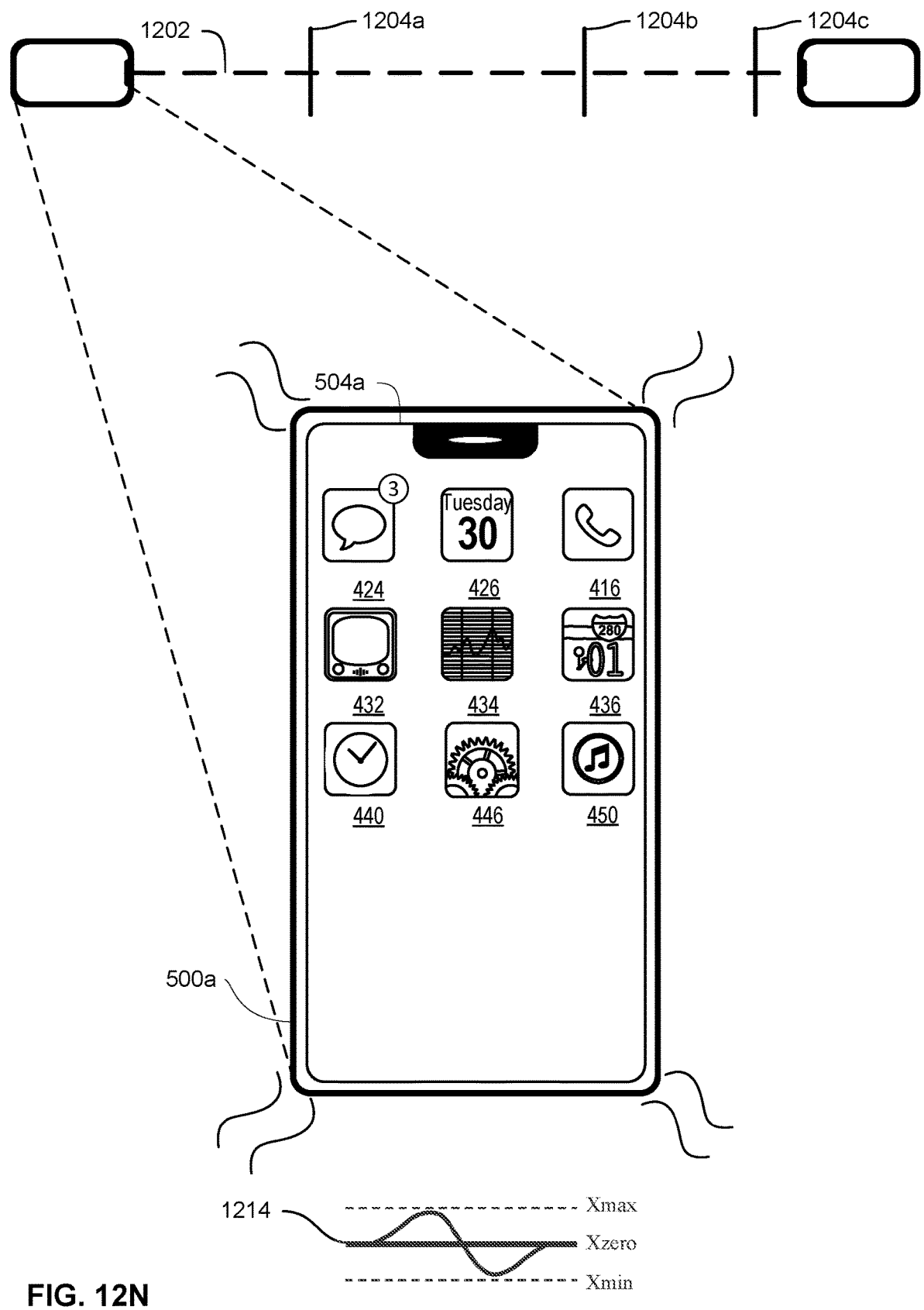
Figure 12O:
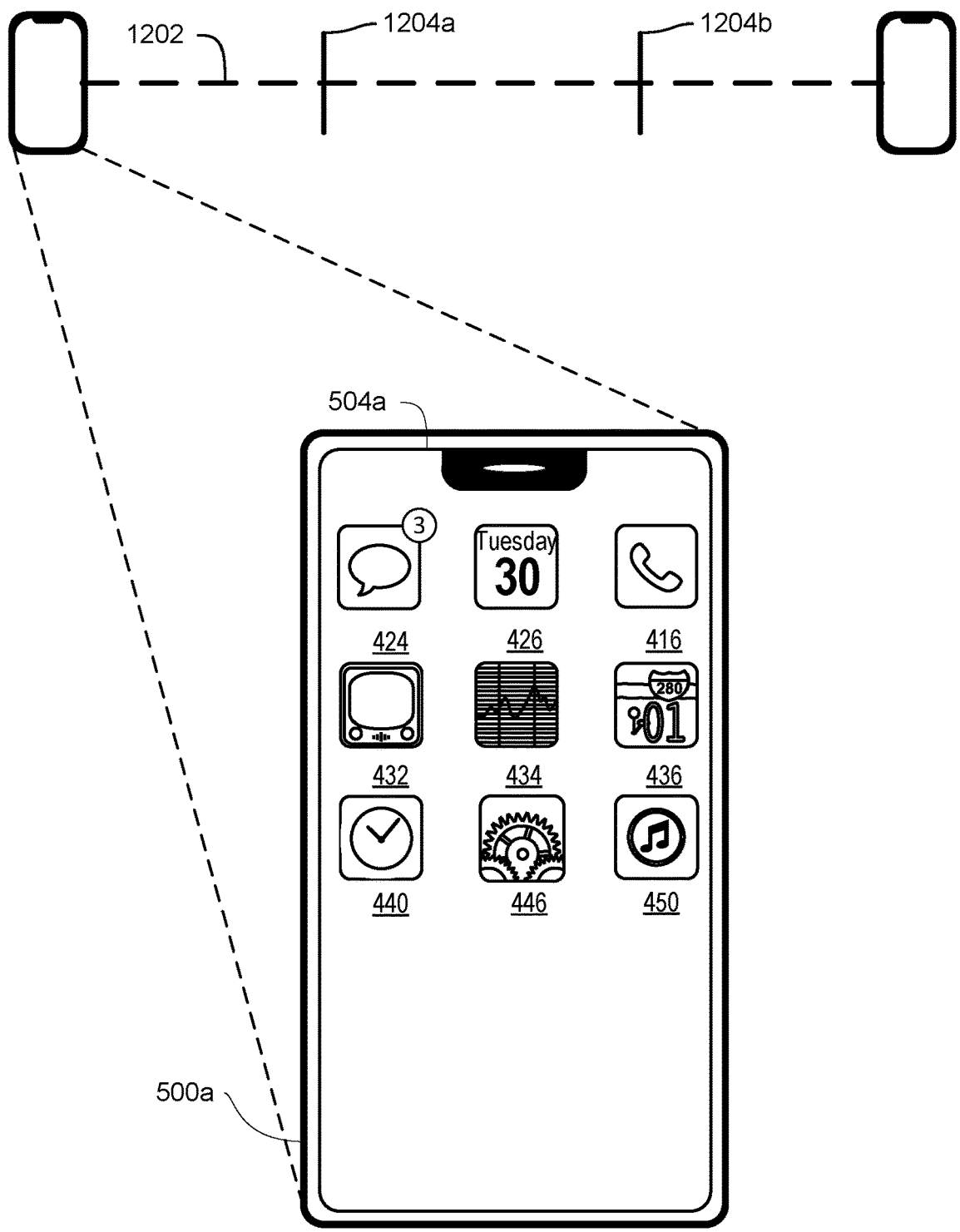
Figure 12P:
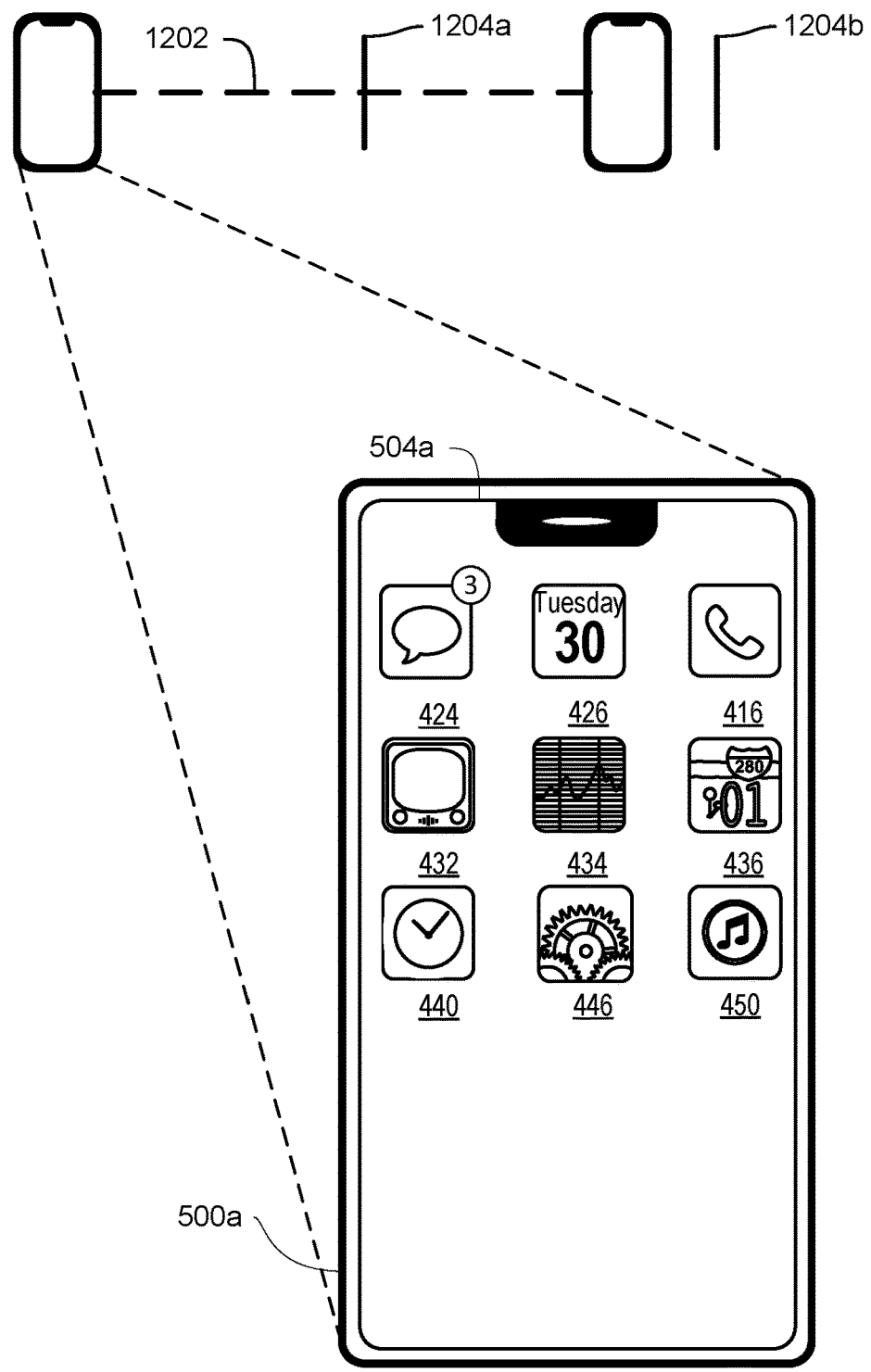
Figure 12Q:
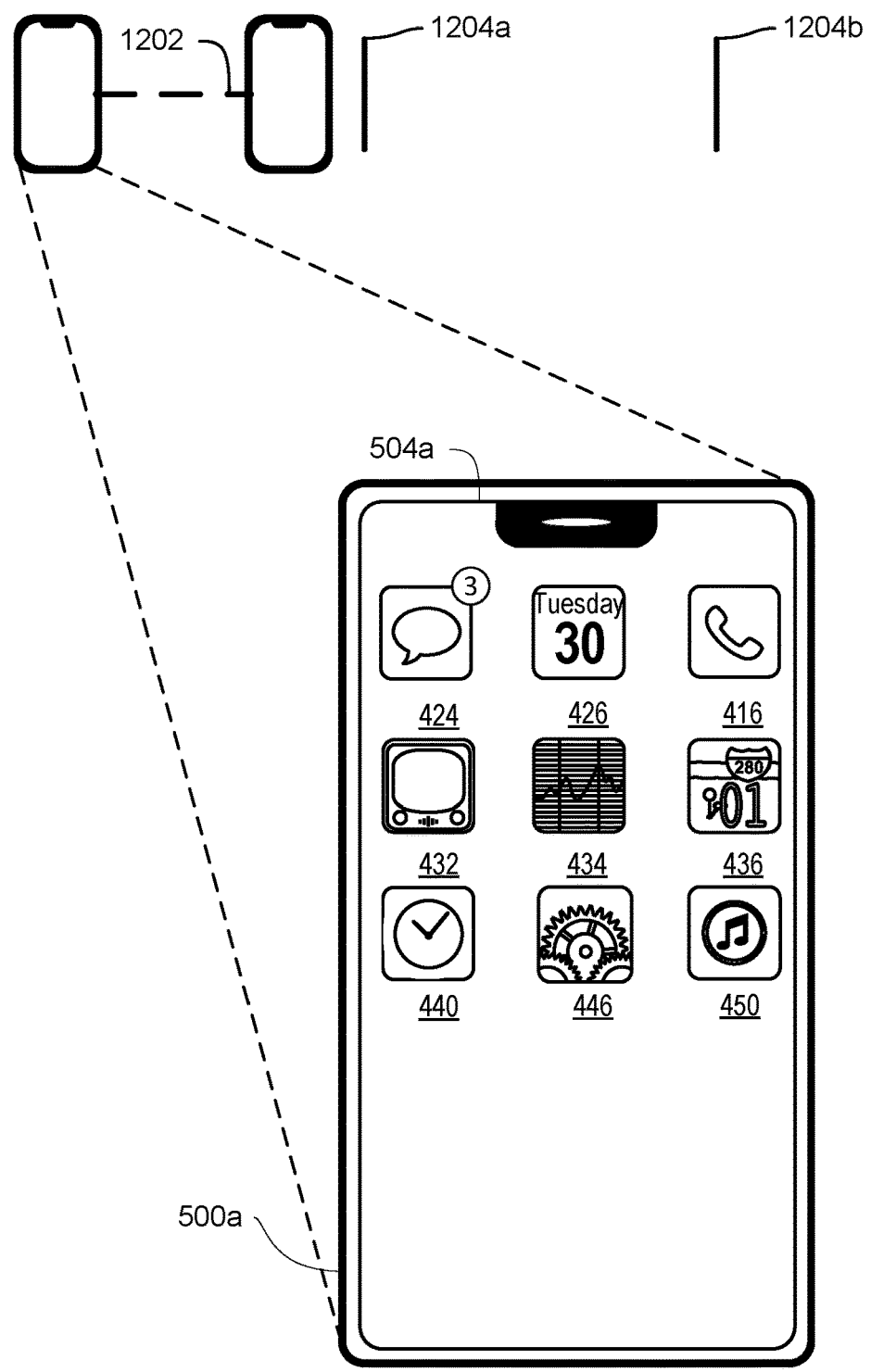
Figure 13A:
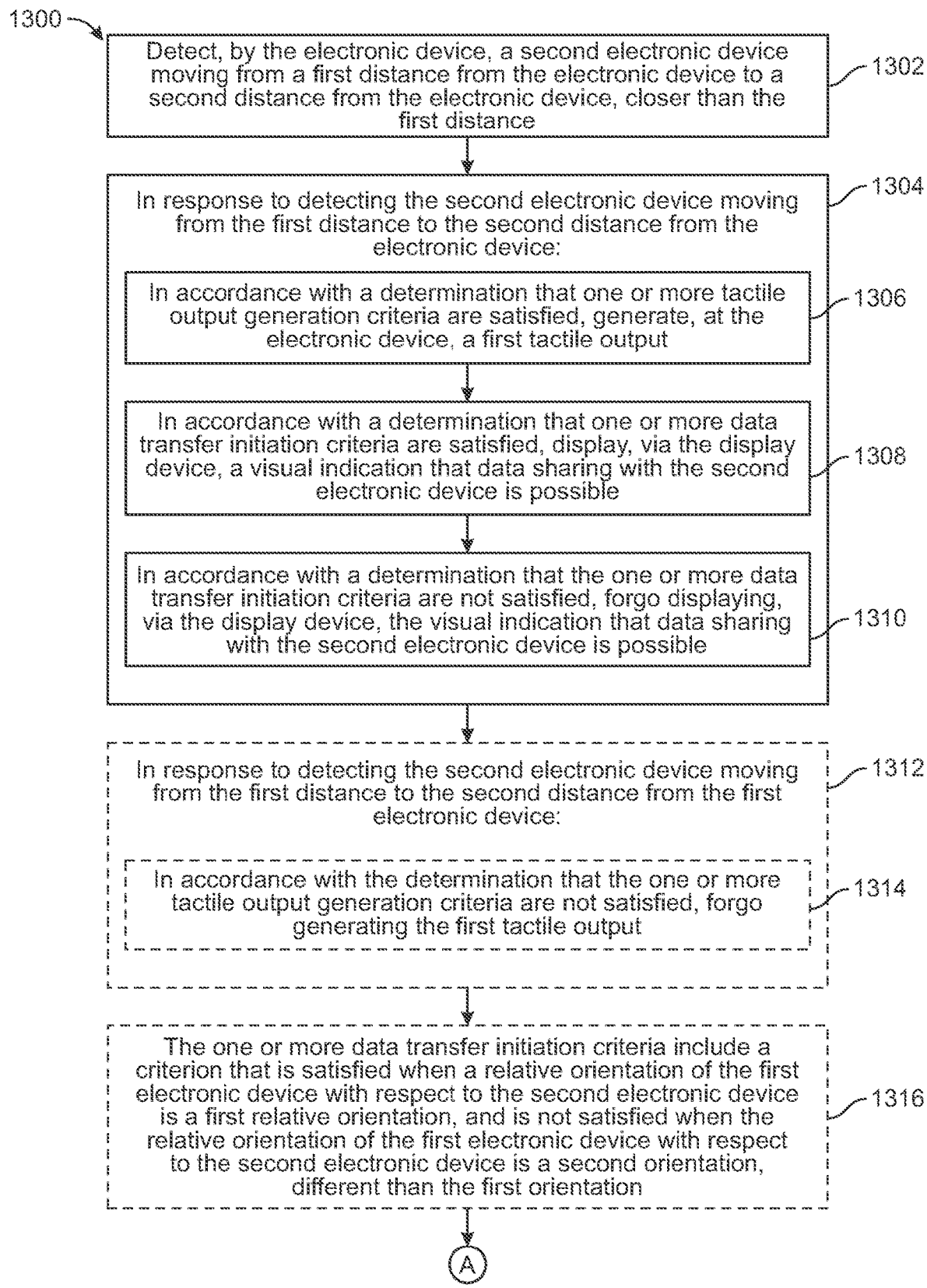
FIGS. 13A-13F are flow diagrams illustrating a method of generating tactile outputs indicative of a data sharing process with a second electronic device in accordance with some embodiments.
Figure 13B:
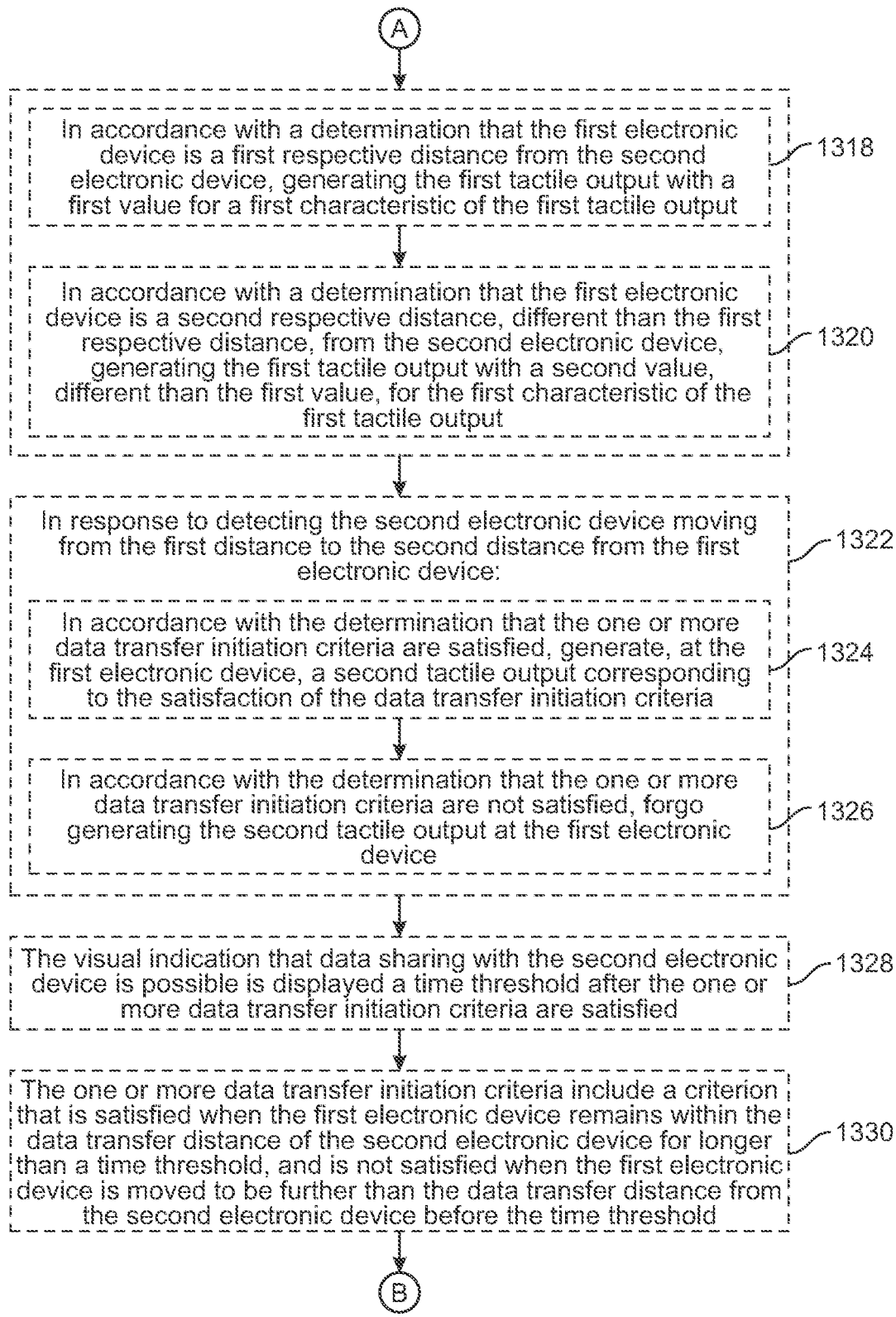
Figure 13C:
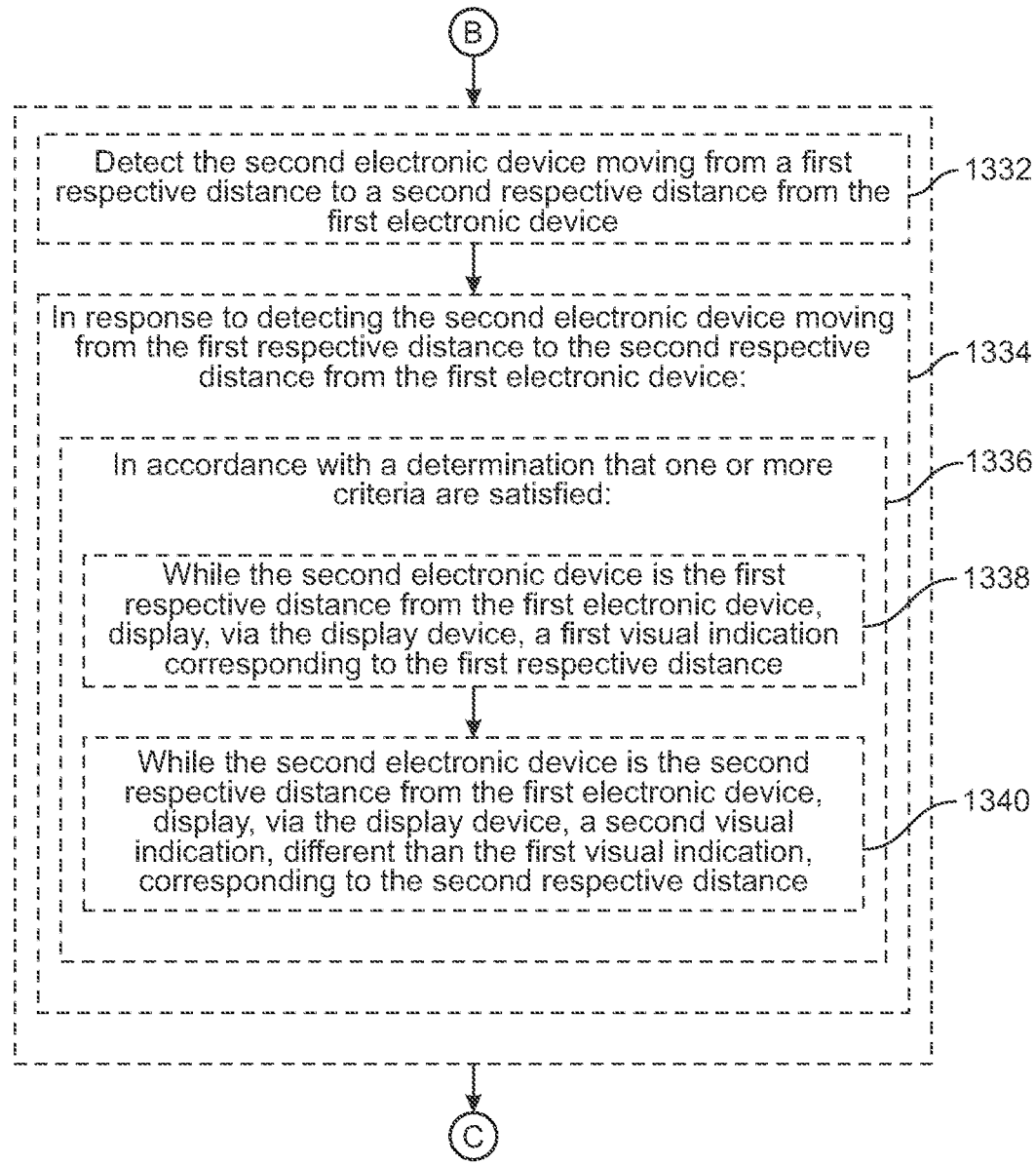
Figure 13D:
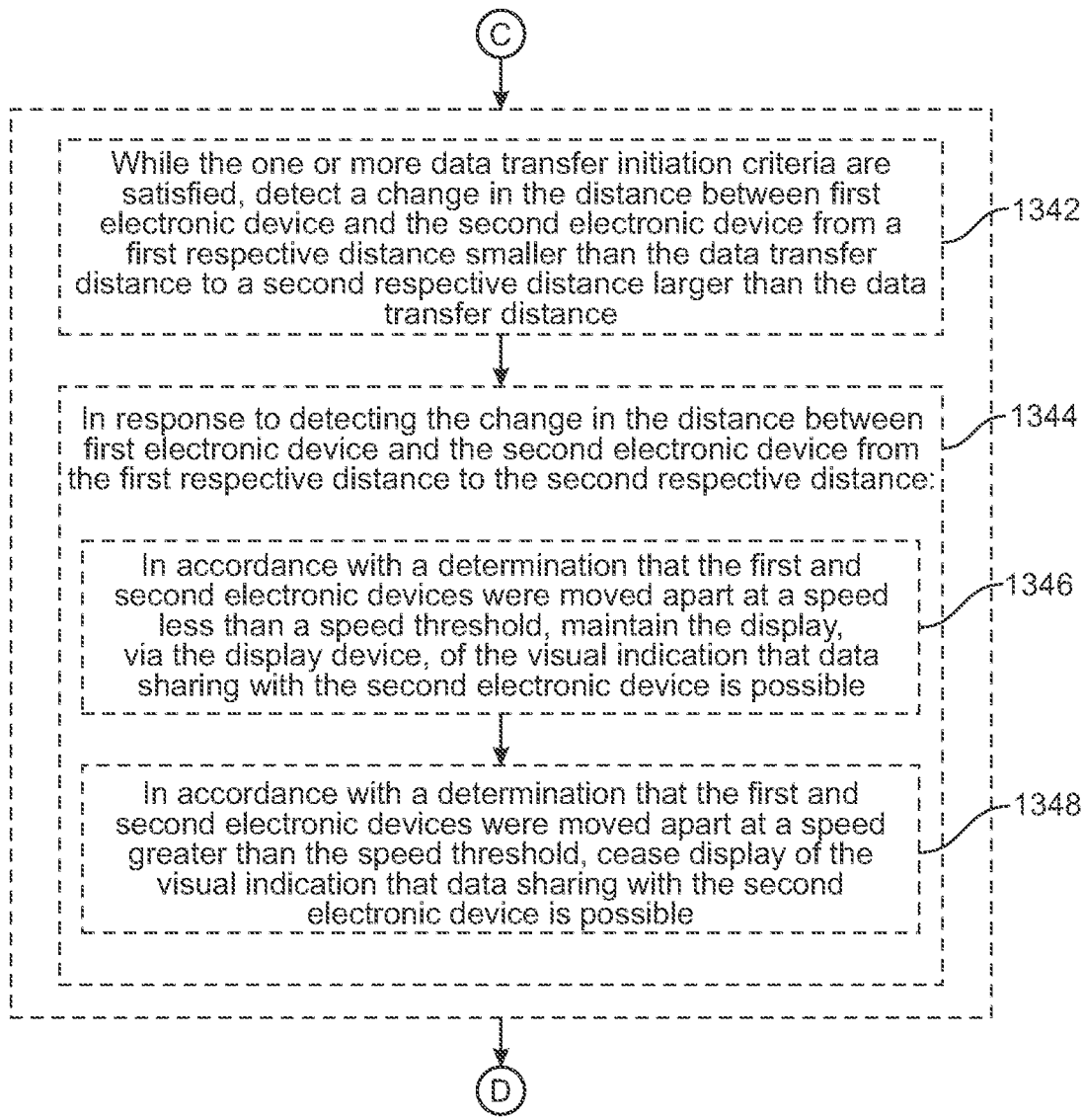
Figure 13E:
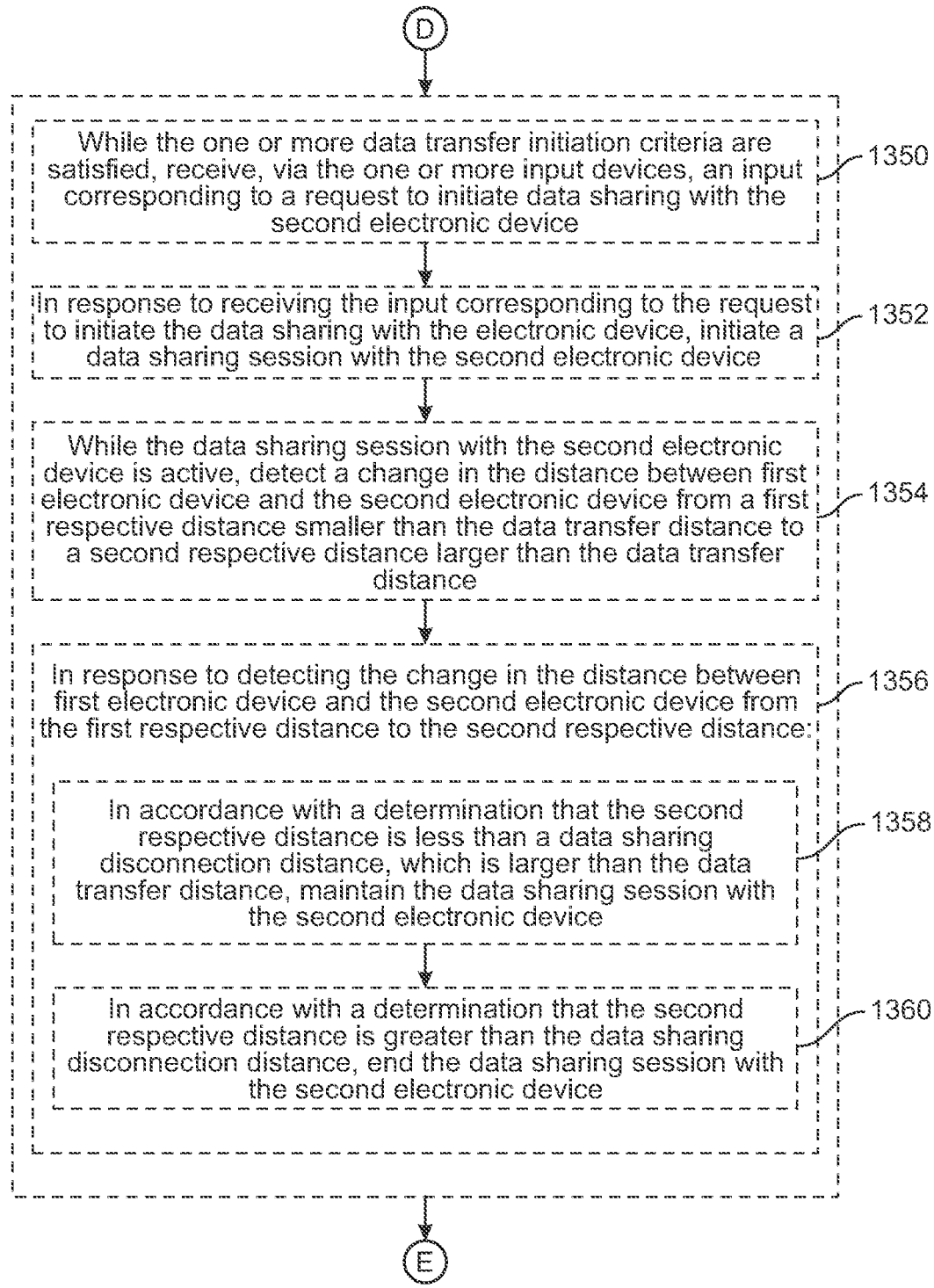
Figure 13F:
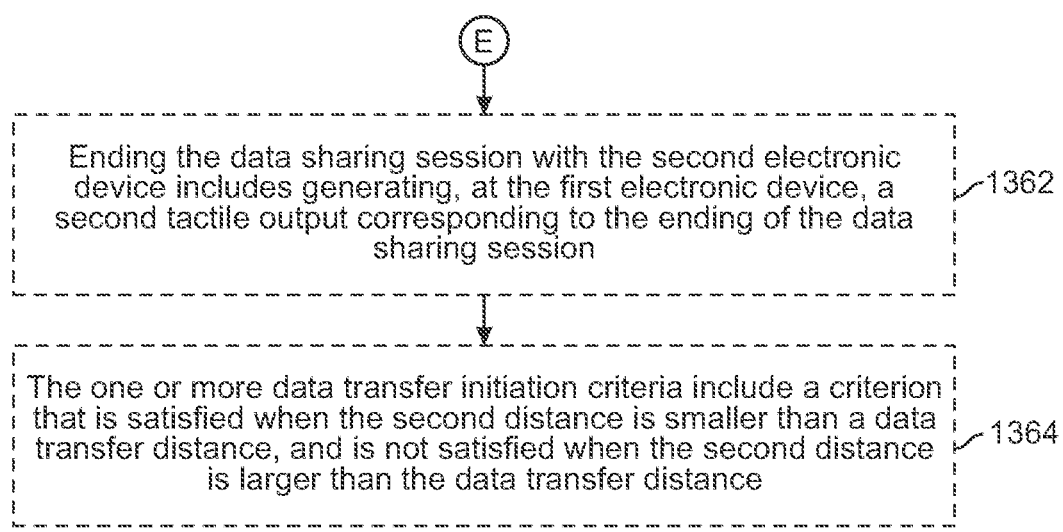

FIGS. 12A-12Q illustrate exemplary ways in which a first electronic device 500a generates tactile outputs indicative of a data sharing process with a second electronic device 500b in accordance with some embodiments of the disclosure. The embodiments in these figures are used to illustrate the processes described below, including the processes described with reference to FIGS. 13A-13F.

In FIGS. 12A-12B the electronic devices 500a and 500b are a distance 1202 apart from each other that exceeds a first threshold distance 1204b. While the electronic devices 500a and 500b are further from each other than the first threshold distance 1204b, the electronic devices 500a and 500b do not generate a tactile output or a visual indication indicative of data sharing with the other electronic device. As shown in FIG. 12A, while the electronic devices 500a and 500b are positioned further apart than the first threshold 1204b, each electronic device presents a respective home screen user interface, for example (in some examples, the two devices are displaying different respective user interfaces, such as user interfaces of messaging applications, game applications, web browsing applications, etc.). In FIG. 12B, the electronic devices 500a and 500b move closer to each other but are still further apart than the first threshold distance 1204b. Because the electronic devices 500a and 500b are further apart than the first threshold distance 1204b, the electronic devices 500a and 500b do not generate a tactile output or a visual indication indicative of data sharing with the other electronic device. As shown in FIG. 12B, the first electronic device 500a continues to present the home screen user interface.

In FIG. 12C, the electronic devices 500a and 500b move towards each other such that the distance 1202 between the electronic devices 500a and 500b is less than the first threshold distance 1204b. In response to crossing the first threshold 1204b, the electronic devices 500a and 500b generate a tactile output 1212a (e.g., a "Minor" tactile output described above with reference to Table 1) and display the respective home screen user interfaces with a blurred visual effect. The tactile output sequence 1212a is a continuous textural tactile output sequence with an amplitude or intensity indicative of the distance between the electronic devices 500a and 500b.

In FIG. 12D, the electronic devices 500a and 500b move closer to each other to a distance 1202 that is within the first threshold 1204b but further than the second threshold 1204a. In response to the decreased distance 1202 between the electronic devices 500a and 500b, the electronic device 500a generates a tactile output 1212b (e.g., a "Minor" tactile output described above with reference to Table 1) with an increased amplitude and increases the blur effect over the home screen user interface. Additionally, the blur effect of the user interface displayed on display 504a increases as the distance between the electronic devices 500a and 500b decreases.

In FIG. 12E, the electronic devices 500a and 500b move closer to each other to a distance 1202 that is within the second threshold 1204a while the electronic devices 500a and 500b are at an orientation relative to each other that causes the electronic devices 500a and 500b to generate the tactile output but does not cause the electronic devices 500a and 500b to initiate a data transfer. Thus, in FIG. 12E, the first electronic device 500a generates a tactile output 1212c (e.g., a "Minor" tactile output described above with reference to Table 1) with a higher amplitude than the tactile output 1212b and increases the blur effect relative to the blur effect illustrated in FIG. 12D to indicate the change in distance between the electronic devices 500a and 500b, but does not initiate a data transfer process. As will be described below with reference to FIG. 12F, the orientation of the electronic devices 500a and 500b that causes the data transfer to be initiated is when the top edge of each of electronic devices 500a and 500b are facing each other within a threshold range of angles (e.g., 1 degree, 5 degrees, 10 degrees, etc.). In FIG. 12E, the angle between the electronic devices 500a and 500b is outside of the threshold range of angles.

In FIG. 12F, the electronic devices 500a and 500b are positioned at a distance 1202 that is greater than the first threshold 1204a while the electronic devices 500a and 500b are at an orientation relative to each other that causes the electronic devices 500a and 500b to initiate a data transfer. The electronic devices 500a and 500b are oriented such that the top edges of the electronic devices 500a and 500b face each other within a threshold range of angles (e.g., 1 degree, 5 degrees, 10 degrees). In FIG. 12F, the first electronic device 500a generates a tactile output 1212b (e.g., a "Minor" tactile output described above with reference to Table 1) that indicates the distance 1202 between the first and second electronic devices 500a and 500b. The electronic devices 500a and 500b do not initiate a data transfer process because the distance 1202 between the electronic devices 500a and 500b is larger than the first threshold distance 1204a.

As shown in FIGS. 12G-12H, in response to detecting that the distance 1202 between the electronic devices 500a and 500b is within the second threshold distance 1204a and the orientation of the electronic devices 500a and 500b is the orientation that causes initiation of the data transfer for a time threshold 1206c, the electronic devices 500a and 500b initiate the data transfer process. In FIG. 12G, the distance 1202 between the electronic devices 500a and 500b is less than the first threshold distance 1204a and the orientation of the electronic devices is an orientation that causes the data transfer process to initiate. In response to detecting that a plurality of data transfer initiation criteria (e.g., orientation, distance) are satisfied, the first electronic device 500a generates a tactile output 1214 (e.g., a "Major" tactile output described above with reference to Table 1). The tactile output 1214 is a discrete tactile output. In FIG. 12G, the time 1206a that the electronic devices have satisfied the data transfer initiation criteria is less than a threshold time 1206c. As will be described in more detail with respect to FIGS. 12L and 12Q, if the electronic devices 500a and 500b stop satisfying the data transfer initiation criteria before the threshold time 1206c is reached, the data transfer process will not be initiated. However, if the devices continue to satisfy the data transfer initiation criteria for the threshold time 1206c, the next step in the data transfer process will optionally be initiated.

For example, as shown in FIG. 12H, in response to the data transfer initiation criteria (e.g., distance and orientation) being satisfied for the threshold amount of time 1206c while the two devices are within the threshold distance 1204a of each other and at the proper orientation with respect to each other, the electronic devices 500a and 500b initiate a process to share data. The first electronic device 500a displays an indication 1210a that sharing with the second electronic device 500b is possible. Likewise, the second electronic device 500b displays an indication 1210b that sharing with the first electronic device 500a is possible. In some embodiments, the first and second electronic devices 500a and 500b generate a discrete tactile output (e.g., a "Major" tactile output described above with reference to Table 1) and/or an audio indication to indicate that the data sharing process has been initiated (e.g., when threshold time 1206c has been reached). Once the data sharing process is initiated, the users of the electronic devices 500a and 500b are able to drag and drop indications of one or more files to the data sharing indications 1210a or 1210b to initiate a process to share the files with the other electronic device 500a or 500b. In some embodiments, the files are shared using a wireless network sharing protocol between the two electronic devices.

Once the data sharing process has been initiated, it is optionally not necessary for the electronic devices 500a and 500b to remain within the second threshold distance 1204a of each other for the data sharing connection between the devices to continue. As shown in FIG. 12I, when the electronic devices 500a and 500b move apart from each other (e.g., to greater than threshold distance 1204a) at a velocity 1208a that is below a threshold velocity 1208c, the electronic device 500a continues to present the indication 1210a of data sharing with the second electronic device 500b and the data sharing connection is not broken. Likewise, the second electronic device 500b continues to present the indication 1210b of data sharing with the first electronic device 500a illustrated in FIG. 12H.

In FIG. 12J, however, the first and second electronic devices 500a and 500b move apart from each other (e.g., to greater than threshold distance 1204a) at a velocity 1208a that exceeds the threshold velocity 1208c. In response to the movement of the electronic devices 500a and 500b, the data sharing connection is disconnected. As shown in FIG. 12J, the first electronic device 500a generates a tactile output 1214 (e.g., a "Major" tactile output described above with reference to Table 1) to indicate that the data sharing connection has disconnected. The first electronic device 500a stops presenting the indication 1210a that data sharing with the second electronic device 500b is possible once the data sharing connection is disconnected. The second electronic device 500b optionally behaves in a similar manner.

As described above with reference to FIGS. 12G-12H, the data sharing criteria (e.g., distance and orientation) optionally must be satisfied for a threshold time 1206c for the data sharing process to be initiated. As shown in FIGS. 12K-L, if the electronic devices 500a and 500b move apart from each other to a distance that is greater than the second threshold distance 1204a, the data sharing process is not initiated. FIG. 12K illustrates the first and second electronic devices 500a and 500b at a distance 1202 that is less than the second threshold distance 1204a and in an orientation that causes the data transfer process to be initiated. In other words, the data sharing criteria are satisfied. As described above with reference to FIG. 12K, the electronic device 500a generates a tactile output 1214 indicating that the data transfer criteria are satisfied.

In FIG. 12L, the electronic devices 500a and 500b move apart from each other to a distance 1202 that is greater than the second threshold distance 1204a before threshold time 1206c is reached. Because the electronic devices 500a and 500b move apart from each other at a time 1206a that is less than the threshold time 1206c, the data sharing process is not initiated. As shown in FIG. 12L, the first electronic device 500a generates a tactile output 1214 (e.g., a "Major" tactile output sequence described with reference to Table 1) and stops displaying the home screen with the blur effect. The tactile output 1214 is a discrete tactile output. It should be understood that the second electronic device 500b optionally behaves in a manner similar to the first electronic device 500a. In some embodiments, rather than ceasing to display the blur effect and presenting the tactile output as shown in FIG. 12L, the electronic devices continue to present the blur effect and the continuous textural tactile output, such as in FIG. 12D, without initiating the data transfer process.

FIGS. 12N-12M illustrate disconnection of the data sharing connection in response to the electronic devices 500a and 500b moving away from each other to a distance 1202 that exceeds a third threshold distance 1204c at which the data sharing connection is disconnected. As shown in FIG. 12M, the electronic devices 500a and 500b are currently configured to share data with one another.

In FIG. 12N, the data sharing connection is disconnected when the electronic devices 500a and 500b move to a distance 1202 away from one another that exceeds a third distance threshold 1204c that is greater than the second threshold distance 1204a at which the data sharing process is initiated. Although the third distance threshold 1204c is illustrated as being greater than the first threshold distance 1204b at which the electronic devices begin generating a tactile output that indicates that data sharing is possible, in some embodiments, the third threshold distance 1204c is less than or equal to the first threshold distance 1204b. As shown in FIG. 12N, the electronic device 500a stops presenting the indication that data sharing is possible and generates a tactile output 1214 (e.g., a "Major" tactile output described above with reference to Table 1) indicating that the data sharing connection has disconnected.

FIGS. 12O-12Q illustrate that the data sharing process is not initiated if the orientations of the electronic devices 500a and 500b relative to each other do not meet predetermined orientation criteria. In FIG. 12O, the electronic devices 500a and 500b are a distance 1202 away from each other that is greater than the first threshold distance 1204b and oriented such that the top edges of the electronic devices 500a and 500b face the same direction (e.g., both facing up on the page).

In FIG. 12P, the electronic devices 500a and 500b move to a distance that is between the first and second threshold distances 1204b and 1204a. Although the electronic devices 500a and 500b are at a distance 1202 that is less than the first threshold distance 1204b, the electronic devices do not generate the tactile output or display the blur effect illustrated in FIGS. 12C-12D because the electronic devices 500a and 500b are not oriented towards each other as shown in FIG. 12C-12D. Further, if the electronic devices 500a and 500b moved from the orientation illustrated in FIG. 12C to the orientation illustrated in FIG. 12P, the electronic devices would optionally stop generating the tactile output and stop displaying the blur effect because of the change in orientation of the electronic devices 500a and 500b. If, on the other hand, the electronic devices 500a and 500b moved from the orientation in FIG. 12P to the orientation illustrated in FIG. 12C, the electronic devices 500a and 500b would optionally behave as described above with reference to FIG. 12C.

Likewise, as shown in FIG. 12Q, the electronic devices are positioned a distance 1202 from each other that is less than the second threshold distance 1204a. Because the orientation of the electronic devices 500a and 500b relative to each other does not satisfy tactile output generation criteria (e.g., facing towards each other with a threshold angle of error, such as in FIGS. 12C-12D) or data sharing initiation criteria (e.g., facing towards each other, such as in FIG. 12H), the electronic devices 500a and 500b do not generate the tactile output, display the visual blur effect or the indication that data sharing is possible, or initiate the process to share data. If the electronic devices 500a and 500b moved from the position illustrated in FIG. 12H to the position illustrated in FIG. 12Q, the data sharing connection would be disconnected. If, on the other hand, the electronic devices 500a and 500b moved from the orientation in FIG. 12Q to the orientation illustrated in FIG. 12H, the electronic devices 500a and 500b would optionally behave as described above with reference to FIG. 12G (e.g., present the blurred visual effect and generate the continuous textural tactile output until the threshold time is reached, at which time the data sharing connection would be initiated).

Although FIGS. 12B, 12D-12G, and 12I-12Q do not illustrate details of the second electronic device 500b, it should be understood that the second electronic device 500b behaves in manners similar to the manners of electronic device 500a illustrated and described with reference to these figures, respectively.

FIGS. 13A-13F are flow diagrams illustrating a method 1300 of generating tactile outputs indicative of a data sharing process with a second electronic device in accordance with some embodiments. The method 1300 is optionally performed at an electronic device such as device 100, device 300, device 500, as described above with reference to FIGS. 1A-1B, 2-3, 4A-4B and 5A-5H. Some operations in method 1300 are, optionally combined and/or order of some operations is, optionally, changed.

In some embodiments, such as in FIGS. 12A-12B, an electronic device (e.g., electronic device 500a, a mobile device (e.g., a tablet, a smartphone, a media player, or a wearable device) in communication with a display device (e.g., a touch screen) and/or one or more buttons or switches, laptop computer in communication with a display device, touch screen, mouse, trackpad, and/or keyboard, or desktop computer in communication with a display device, touch screen, mouse, trackpad, and/or keyboard) in communication with one or more input devices detects (1302), by the electronic device 500a, a second electronic device 500b (e.g., a mobile device, laptop computer, or desktop computer) moving from a first distance from the electronic device to a second distance from the electronic device, closer than the first distance (e.g., one or more communication devices of the first and second electronic devices are optionally in communication with one another, such as via Wi-Fi, Bluetooth, infrared, near-field communication (NFC), or some other communication protocol, and are able to detect the distance between the two devices and changes in that distance). In some embodiments, the first distance must be less than a threshold distance (e.g., 15 feet, 10 feet, 5 feet, 3 feet, 1 foot) for the following actions to occur in the first place.

In some embodiments, such as in FIG. 12C, in response to detecting the second electronic device 500*b* moving from the first distance to the second distance from the electronic device 500*a* (1304), in accordance with a determination that one or more tactile output generation criteria are satisfied, the electronic device generates (1306), at the electronic device, a first tactile output 1212*a* (e.g., haptics, vibration, etc.). The one or more tactile output generation criteria optionally include criteria related to distance between the electronic device and the second electronic device, a communication link between the electronic device and the second electronic device, the orientation of the electronic devices with respect to one another For example, the electronic device generates a tactile output with a predetermined value for a first characteristic that indicates that a second electronic device is proximate to the electronic device. For example, the tactile output is a burst having a predetermined intensity, texture, and duration. In some embodiments, the electronic device generates faster and/or stronger tactile output pulses as the second electronic device moves closer and closer, and slower and/or weaker tactile output pulses as the second electronic device moves further and further away.

In some embodiments, such as in FIG. 12H, in response to detecting the second electronic device 500*b* moving from the first distance to the second distance from the electronic device 500*a* (1304), in accordance with a determination that one or more data transfer initiation criteria are satisfied, the electronic device displays (1308), via the display device, a visual indication 1210*a* (e.g., text and/or an image) that data sharing with the second electronic device is possible (e.g., the data transfer initiation criteria further include one or more of a criterion that is satisfied when the second electronic device is stored as a contact on the electronic device, a criterion that is satisfied when the electronic device operates in a data transfer mode, a criterion that is satisfied when the electronic device and second electronic device are on the same wireless network, etc.). In some embodiments, the visual indication includes a selectable option that, when selected, initiates data transfer between the electronic device and the second electronic device. In some embodiments, if the first and second devices are held at less than the data transfer distance from one another for more than a time threshold (e.g., 1 second, 3 seconds, 5 seconds), then the data transfer initiation criteria are satisfied. In some embodiments, the visual indication that is presented is a visual indication of an application that is installed on the electronic device (e.g., a photos application, a messaging application, etc.) via which data is available to be shared with the second electronic device, and user input selecting the visual indication or dragging content to the visual indication causes sharing of content (or the dragged content) via the corresponding application with the second device.

In some embodiments, such as in FIG. 12C, in response to detecting the second electronic device 500*b* moving from the first distance to the second distance from the electronic device 500*a* (1304), in accordance with a determination that the one or more data transfer initiation criteria are not satisfied, the electronic device forgoes (1310) displaying, via the display device 504*a*, the visual indication 1210*a* that data sharing with the second electronic device is possible (e.g., In some embodiments, the data sharing criteria include a criterion that is not satisfied when the distance between the electronic device and the second electronic device increases to a predetermined threshold distance after the first tactile output is generated). For example, the user of the electronic device is able to move the electronic device away from the second electronic device to prevent the data transfer from initiating, and the visual indication that data sharing with the second electronic device is possible is not displayed.

The above-described manner of generating a tactile output in response to detecting that the second electronic device moves sufficiently close to the electronic device (e.g., for data transfer operations to be performed) allows the electronic device to communicate to the user that data transfer is possible using a tactile output, which simplifies interactions between the user and the electronic device and enhances the operability of the electronic device (e.g., the user is able to detect the tactile output in situations in which a visual indication or audio indication may not be detectable, such as when the electronic device is in a bag, purse, or pocket of the user), which, additionally, reduces power usage and improves battery life of the electronic device by enabling the user to use the electronic device more quickly and efficiently.

In some embodiments, such as in FIG. 12B, in response to detecting the second electronic device 500*b* moving from the first distance to the second distance from the first electronic device 500*a* (1312), in accordance with the determination that the one or more tactile output generation criteria are not satisfied (e.g., distance criteria, orientation criteria, etc.), the electronic device 500*a* forgoes (1314) generating the first tactile output (e.g., if moving the second electronic device from the first distance to the second distance from the first electronic device does not place the first and second electronic devices within a threshold distance from each other or does not result in the first and second electronic devices having an orientation relative to one another that meets orientation criteria, then the tactile output is not generated and the data transfer connection is not established).

The above-described manner of forgoing generating the tactile output when one or more tactile output generation criteria are not met allows the first electronic device to forgo presenting the tactile output when the one or more tactile output generation criteria are not met, which simplifies interactions between the user and the first electronic device and enhances the operability of the first electronic device (e.g., by forgoing generating the tactile output in situations in which the data transfer connection is not intended by the user of the first electronic device and/or the second electronic device), which, additionally, reduces power usage and improves battery life of the first electronic device by enabling the user to use the first electronic device more quickly and efficiently and enables the electronic device to further save energy when the one or more tactile output generation criteria are not met by forgoing generating the tactile output.

In some embodiments, such as in FIG. 12H, the one or more data transfer initiation criteria include a criterion that is satisfied when a relative orientation of the electronic device 500*a* with respect to the second electronic device 500*b* is a first relative orientation, and is not satisfied when the relative orientation of the electronic device 500*a* with respect to the second electronic device 500*b* is a second orientation, different than the first orientation (1316), such as in FIG. 12E (e.g., the criterion is satisfied when the top edges of the first electronic device and the second electronic device are facing one another and is not satisfied when the electronic devices are in a different orientation). When the electronic devices are in a different orientation from the first orientation, data transfer is optionally not initiated, even if the distance between the two devices satisfies the data transfer distance criterion.

The above-described manner of including a criterion based on the orientation of the first and second electronic devices relative to one another allows the first electronic device to forgo initiating the data transfer when the user places the first electronic device in an orientation that does not satisfy the criterion, which simplifies interactions between the user and the first electronic device and enhances the operability of the first electronic device (e.g., by enabling the user to terminate the data transfer connection without navigating a user interface displayed via the display device), which, additionally, reduces power usage and improves battery life of the first electronic device by enabling the user to use the first electronic device more quickly and efficiently.

In some embodiments, such as in FIG. 12C, generating the first tactile output 1212a comprises, in accordance with a determination that the electronic device 500a is a first respective distance from the second electronic device 500b, generating the first tactile output 121a with a first value for a first characteristic of the first tactile output (1318) (e.g., frequency, amplitude, pattern, texture, etc.); and in accordance with a determination that the electronic device 500a is a second respective distance, different than the first respective distance, from the second electronic device 500b, such as in FIG. 12D, generating the first tactile output 1212b with a second value, different than the first value, for the first characteristic of the first tactile output (1320) (e.g., as the distance between the first electronic device and the second electronic device decreases, the amplitude of the tactile output increases).

The above-described manner of generating a tactile output that has a characteristic that varies as the distance between the first electronic device and the second electronic device varies allows the first electronic device to communicate to the user the distance between the electronic devices without the user looking at a user interface via the display device, which simplifies interactions between the user and the first electronic device and enhances the operability of the first electronic device (e.g., by more quickly communicating the distance between the electronic devices to the user when the user is not looking at the first electronic device), which, additionally, reduces power usage and improves battery life of the first electronic device by enabling the user to use the first electronic device more quickly and efficiently.

In some embodiments, such as in FIG. 12G, in response to detecting the second electronic device 500b moving from the first distance to the second distance from the electronic device 500a (1322), in accordance with the determination that the one or more data transfer initiation criteria are satisfied, the electronic device generates (1324), at the first electronic device, a second tactile output 1214 corresponding to the satisfaction of the data transfer initiation criteria (e.g., the second tactile output has one or more characteristics that are different from the first tactile output). For example, the first tactile output is a continuous textural tactile output and the second tactile output is a discrete tactile output.

In some embodiments, such as in FIG. 12F, in response to detecting the second electronic device 500b moving from the first distance to the second distance from the electronic device 500a (1322), in accordance with the determination that the one or more data transfer initiation criteria are not satisfied, the electronic device forgoes (1326) generating the second tactile output at the first electronic device (e.g., the first electronic device continues to generate the first tactile output until either the data transfer initiation criteria are satisfied or until the tactile output generation criteria are no longer satisfied).

The above-described manner of generating the second tactile output in response to the data transfer initiation criteria being satisfied allows the first electronic device to communicate to the user that the first electronic device is ready to transfer data to/from the second electronic device using the tactile output, which simplifies interactions between the user and the first electronic device and enhances the operability of the first electronic device (e.g., by enabling the user to more quickly determine that the data transfer initiation criteria are satisfied), which, additionally, reduces power usage and improves battery life of the first electronic device by enabling the user to use the first electronic device more quickly and efficiently.

In some embodiments, such as in FIG. 12H, the visual indication 1210a that data sharing with the second electronic device 500b is possible is displayed a time threshold 1206c (e.g., 1, 2, 4 seconds) after the one or more data transfer initiation criteria are satisfied (1328) (e.g., the visual indication includes one or more of text or an image indicating the data sharing connection with the second electronic device). In some embodiments, the visual indication further includes a prompt asking the user to confirm the initiation of data sharing. For example, the electronic device presents an indication of the data sharing and a selectable option that, when selected, causes the electronic device to initiate data sharing and a selectable option that, when selected, causes the electronic device to terminate the connection to the second electronic device. Data sharing optionally does not proceed until the user selects the option to cause the electronic device to initiate the data sharing.

The above-described manner of presenting the visual indication after a time threshold allows the first electronic device to present the visual indication for a shorter amount of time which reduces power usage and improves battery life of the first electronic device by enabling the user to use the first electronic device more quickly and efficiently.

In some embodiments, such as in FIG. 12H, the one or more data transfer initiation criteria include a criterion that is satisfied when the first electronic device 500a remains within the data transfer distance of the second electronic 500b device for longer than a time threshold 1206c (e.g., 1, 2, 4 seconds), and is not satisfied when the first electronic device 500a is moved to be further than the data transfer distance 1204a from the second electronic device 500b before the time threshold 1206c (1330), such as in FIG. 12L (e.g., 1, 2, 4 seconds). For example, the electronic device detects the distance between the electronic device and the second electronic device increasing above the data transfer distance threshold within the time threshold and, in response, terminates the data sharing connection between the electronic device and the second electronic device. In some embodiments, the electronic device presents a prompt asking the user to confirm the initiation of data sharing. For example, the electronic device presents an indication of the data sharing and a selectable option that, when selected, causes the electronic device to initiate data sharing and a selectable option that, when selected, causes the electronic device to terminate the connection to the second electronic device. Data sharing optionally does not proceed until the user selects the option to cause the electronic device to initiate the data sharing.

The above-described manner of including a data transfer initiation that is not satisfied if the distance between the electronic devices becomes larger than the data transfer distance within a predetermined amount of time allows the first electronic device to enable the user to terminate the data transfer by moving the electronic device away from the second electronic device, which simplifies interactions between the user and the first electronic device and enhances the operability of the first electronic device (e.g., by providing a way to cancel the data transfer without interacting with a user interface presented via the display device), which, additionally, reduces power usage and improves battery life of the first electronic device by enabling the user to use the first electronic device more quickly and efficiently.

In some embodiments, such as in FIG. 12C, the electronic device 500a detects (1332) the second electronic device 500b moving from a first respective distance to a second respective distance from the first electronic device.

In some embodiments, such as in FIG. 12C, in response to detecting the second electronic device 500b moving from the first respective distance to the second respective distance from the first electronic device 500a (1334), in accordance with a determination that one or more criteria are satisfied (1336) (e.g., the two devices are sufficiently close together to establish communication and potential data transfer during the movement from the first respective distance to the second respective distance, the electronic devices are in a predetermined orientation with respect to one another, etc.): while the second electronic device 500b is the first respective distance from the first electronic device 500a illustrated in FIG. 12C, the electronic device displays (1338), via the display device, a first visual indication corresponding to the first respective distance (e.g., a user interface displayed via the display device is presented with a first amount of a darkening and/or blurring effect and is optionally accompanied with presentation of text or an image indicating the data transfer); and while the second electronic device 500b is the second respective distance from the first electronic device 500a illustrated in FIG. 12D, the electronic device displays (1340), via the display device, a second visual indication, different than the first visual indication, corresponding to the second respective distance (e.g., the user interface displayed via the display device is presented with a second amount of a darkening and/or blurring effect and is optionally accompanied with presentation of text or an image indicating the data transfer). For example, as the electronic devices are moved closer together, the user interface is presented with a greater degree of darkening and/or blur of the user interface that was displayed before the two devices were brought together.

The above-described manner of presenting the visual indication corresponding to the respective distance between the first electronic device and the second electronic device allows the first electronic device to indicate to the user the distance between the first and second electronic devices which are capable of transferring data, which simplifies interactions between the user and the first electronic device and enhances the operability of the first electronic device (e.g., by enabling the user to more quickly determine that data transfer with the second electronic device is possible and the degree to which the electronic devices need to be moved together to initiate data transfer), which, additionally, reduces power usage and improves battery life of the first electronic device by enabling the user to use the first electronic device more quickly and efficiently.

In some embodiments, such as in FIG. 12I, while the one or more data transfer initiation criteria are satisfied, the electronic device detects (1342) a change in the distance between first electronic device 500a and the second electronic device 500b from a first respective distance smaller than the data transfer distance 1204a to a second respective distance larger than the data transfer distance (e.g., one or both the electronic devices moves away from the other electronic device).

In some embodiments, such as in FIG. 12I, in response to detecting the change in the distance between first electronic device 500a and the second electronic device 500b from the first respective distance to the second respective distance (1344): in accordance with a determination that the first and second electronic devices 500a and 500b were moved apart at a speed 1208a less than a speed threshold 1208c, the electronic device maintains (1346) the display, via the display device 504a, of the visual indication 1210a that data sharing with the second electronic device is possible (e.g., when the electronic devices move away from one another at a speed that is relatively slow, the visual indication continues to be presented and the data transfer connection/potential connection persists); and in accordance with a determination that the first and second electronic devices 500a and 500b were moved apart at a speed 1208a greater than the speed threshold 1208c, the electronic device ceases (1348) display of the visual indication that data sharing with the second electronic device is possible, such as in FIG. 12J (e.g., when the electronic devices move away from one another at a speed that is relatively fast, the visual indication ceases to be presented and the data transfer connection/potential connection ceases).

The above-described manner of continuing to present the visual indication when the speed is less than the speed threshold and ceasing to present the visual indication when the speed is greater than the speed threshold allows the first electronic device to enable the user to terminate the data sharing connection by moving the first electronic device away from the second electronic device at a speed above the threshold speed, which simplifies interactions between the user and the first electronic device and enhances the operability of the first electronic device (e.g., by enabling the user to terminate the data sharing connection without navigating a user interface displayed via the display device), which, additionally, reduces power usage and improves battery life of the first electronic device by enabling the user to use the first electronic device more quickly and efficiently and reduces user error of inadvertently terminating the data transfer connection in response to movements that are at a speed below the speed threshold and enables the users of the electronic devices to continue the data sharing operation without continuing to position the electronic devices at the data transfer distance and orientation.

In some embodiments, while the one or more data transfer initiation criteria are satisfied, the electronic device receives (1350), via the one or more input devices, an input corresponding to a request to initiate data sharing with the second electronic device 504b, such as dragging an item of content to indication 1210a illustrated in FIG. 12H (e.g., selection of the visual indication that data sharing with the second electronic device is possible, dragging and dropping a representation of an item of content to the visual indication for sharing with the second electronic device, etc.). In some embodiments, in response to receiving the input corresponding to the request to initiate the data sharing with the electronic device 500a, the electronic device initiates (1352) a data sharing session with the second electronic device 500b (e.g., sending one or more files to the second electronic device or receiving one or more files from the second electronic device).

In some embodiments, such as in FIG. 12M, while the data sharing session with the second electronic device 500b is active, the electronic device 500a detects (1354) a change in the distance between first electronic device and the second electronic device from a first respective distance smaller than the data transfer distance 1204a to a second respective distance 1202 larger than the data transfer distance (e.g., one or both the electronic devices moves away from the other electronic device).

In some embodiments, such as in FIG. 12M, in response to detecting the change in the distance between first electronic device 500a and the second electronic device 500b from the first respective distance to the second respective distance (1356), in accordance with a determination that the second respective distance 1202 is less than a data sharing disconnection distance 1204c, which is larger than the data transfer distance 1204a, the electronic device maintains (1358) the data sharing session with the second electronic device (e.g., continuing to be connected to the second electronic device for data transfer, continuing to present the visual indication of the data transfer, continuing to send files to or receive files from the second electronic device, etc.); and in accordance with a determination that the second respective distance 1202 is greater than the data sharing disconnection distance 1204c, such as in FIG. 12N, the electronic device 500a ends (1360) the data sharing session with the second electronic device 500b (e.g., ceasing the data transfer connection with the second electronic device, ceasing the presentation of the visual indication of the data transfer, ceasing to send files to or receive files from the second electronic device).

The above-described manner of ending the data sharing session in response to detecting the distance between the first electronic device and the second electronic device exceeds the data sharing disconnection distance allows the first electronic device to enable the user to terminate the data sharing session by moving the first electronic device to a predetermined distance away from the second electronic device, which simplifies interactions between the user and the first electronic device and enhances the operability of the first electronic device (e.g., by enabling the user to terminate the data transfer session without navigating a user interface presented via the display device), which, additionally, reduces power usage and improves battery life of the first electronic device by enabling the user to use the first electronic device more quickly and efficiently, and reduces the chances of user error of inadvertently terminating the data transfer session when moving the electronic devices apart to a distance less than the data sharing disconnection distance and enables the users of the electronic devices to continue the data sharing operation without continuing to position the electronic devices at the data transfer distance and orientation.

In some embodiments, such as in FIG. 12N, ending the data sharing session with the second electronic device 500b includes generating, at the first electronic device 500a, a second tactile output 1214 corresponding to the ending of the data sharing session (1362) (e.g., the second tactile output is different from the first tactile output). For example, the first tactile output is a continuous textural tactile output and the second tactile output is a discrete tactile output.

The above-described manner of generating the second tactile output to indicate that the data sharing session has disconnected allows the first electronic device to indicate to the user that the data sharing session has terminated, which simplifies interactions between the user and the first electronic device and enhances the operability of the first electronic device (e.g., by enabling the user to more quickly determine that the data sharing session has terminated), which, additionally, reduces power usage and improves battery life of the first electronic device by enabling the user to use the first electronic device more quickly and efficiently.

In some embodiments, such as in FIG. 12H, the one or more data transfer initiation criteria include a criterion that is satisfied when the second distance 1202 is smaller than a data transfer distance 1204a (e.g., 12 inches, 6 inches, 3 inches, 1 inch), and is not satisfied when the second distance 1202 is larger than the data transfer distance 1204a (1364), such as in FIG. 12F (e.g., the criterion is not satisfied and data transfer does not initiate when the electronic devices are at a distance from one another that is larger than the data transfer distance).

The above-described manner of including a data transfer initiation criterion based on distance between the first and second electronic devices allows the first electronic device to enable the user to control whether or not to initiate the data transfer by changing the distance of the first electronic device relative to the second electronic device, which simplifies interactions between the user and the first electronic device and enhances the operability of the first electronic device (e.g., by enabling the user to control the data transfer initiation in a manner that is faster than interacting with a user interface displayed via the display device), which, additionally, reduces power usage and improves battery life of the first electronic device by enabling the user to use the first electronic device more quickly and efficiently.

It should be understood that the particular order in which the operations in FIGS. 13a-13F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, and 1100) are also applicable in an analogous manner to method 1300 described above with respect to FIGS. 13A-13F. For example, the ways of generating tactile outputs indicative of data sharing described above with reference to method 1300 optionally have one or more of the characteristics of the ways of generating tactile outputs for a range of orientations of the electronic device that changes with respect to the distance of the electronic device from a respective object, modifying tactile outputs as the orientation of the electronic device changes, and generating tactile outputs indicative of AR planes, etc., described herein with reference to other methods described herein (e.g., methods 700, 900, and 1100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 13A-13F are, optionally, implemented by components depicted in FIGS. 1A-1B. For example, displaying operations 1308, 1338, and 1340, generating operations 1306, 1318, and 1320, initiating operation 1352, and receiving operation 1350 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to present content of relevance to the user. The present disclosure contemplates that in some instances, this gathered data may include personal information data that uniquely identifies or can be used to identify a specific person. Such personal information data can include location-based data, online identifiers, demographic data, date of birth, telephone numbers, email addresses, home addresses, data or records relating to a user's health or level of fitness (e.g., vital signs measurements, medication information, exercise information), or any other personal information.

The present disclosure recognizes that the use of such personal information data, in the present technology, can be used to the benefit of users. Further, other uses for personal information data that benefit the user are also contemplated by the present disclosure. In some embodiments, determining the current location of an electronic device enables the electronic device to locate an object in the electronic device's near vicinity. Accordingly, use of such personal information data enables users to view information that is relevant to them. In some embodiments, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Further, such collection/sharing should occur only after receiving the consent of the users or other legitimate basis specified in applicable law. Personal information from users should be collected for legitimate uses only. Such information regarding the use of personal data should be prominent and easily accessible by users, and should be updated as the collection and/or use of data changes. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. For example, the present technology can be configured to allow users to select to "opt in" or "opt out" of participation in the collection of personal information data during registration for services or anytime thereafter. In another example, users can select not to enable location services that determine the location of the electronic device. As another example, users are able to disable settings that allow the electronic device to be discoverable by others and that allow the electronic device to transfer data with another electronic device. That is, the present disclosure contemplates that hardware and/or software elements can be provided to prevent or block access to such personal information data.

Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Moreover, it is the intent of the present disclosure that personal information data should be managed and handled in a way to minimize risks of unintentional or unauthorized access or use.

Therefore, although the present disclosure broadly covers use of personal information data to implement one or more various disclosed embodiments, the present disclosure also contemplates that the various embodiments can also be implemented without the need for accessing such personal information data. For example, content can be selected and delivered to users based on aggregated non-personal information data or a bare minimum amount of personal information, such as the content being handled only on the user's device or other non-personal information available to the content delivery services. That is, the various embodiments of the present technology are not rendered inoperable due to the lack of all or a portion of such personal information data.

Personally identifiable information data should be managed and handled so as to minimize risks of unintentional or unauthorized access or use, and the nature of authorized use should be clearly indicated to users. It is well understood that the use of personally identifiable information should follow privacy policies and practices that are generally recognized as meeting or exceeding industry or governmental requirements for maintaining the privacy of users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
    at an electronic device in communication with one or more input devices:
        while navigating from a first location to a second location, different than the first location, determining that one or more tactile output criteria are satisfied; and
        in response to determining that the one or more tactile output criteria are satisfied:
            in accordance with a determination that the electronic device is at a first orientation with respect to a path between a current location of the electronic device and the second location, generating, at the electronic device, a first tactile output having a first value for a first characteristic; and
            in accordance with a determination that the electronic device is at a second orientation with respect to the path between the current location of the electronic device and the second location, generating, at the electronic device, a second tactile output having a second value for the first characteristic.

2. The method of claim 1, wherein the first characteristic of the first tactile output and the second tactile output is frequency, and the first value of the frequency of the first tactile output is different than the second value of the frequency of the second tactile output.

3. The method of claim 1, further comprising:
    generating, at the electronic device, a respective tactile output corresponding to an object in an environment of the electronic device, wherein the respective tactile output has one or more values for one or more characteristics that are based on a point-cloud model centered at the object.

4. The method of claim 1, wherein the first characteristic of the first tactile output and the second tactile output is sharpness, and the first value of the sharpness of the first tactile output is different than the second value of the sharpness of the second tactile output.

5. The method of claim 1, further comprising:
    generating, at the electronic device, a respective tactile output, having a respective value for a respective characteristic, corresponding to an object in an environment of the electronic device that is a respective distance away from the electronic device, wherein:
        in accordance with a determination that there is not a barrier to movement between the electronic device and the object in the environment of the electronic device, the respective value for the respective characteristic is the first value, and
        in accordance with a determination that there is a barrier to movement between the electronic device and the object in the environment of the electronic device, the respective value for the respective characteristic is a second value, different than the first value.

6. The method of claim 1, wherein the one or more tactile output criteria include a criterion that is satisfied when the electronic device is moving with respect to the path.

7. The method of claim 6, wherein:
    generating the first tactile output occurs while the electronic device is moving, and does not occur while the electronic device is not moving, and
    generating the second tactile output occurs while the electronic device is moving, and does not occur while the electronic device is not moving.

8. The method of claim 1, wherein the one or more tactile output criteria include a criterion that is satisfied when the electronic device is detecting movement of a control element on the electronic device.

9. The method of claim 8, wherein the movement of the control element on the electronic device defines a directional and/or distance component relative to an object in an environment of the electronic device.

10. The method of claim 1, further comprising:
    detecting that the electronic device has established communication with a second electronic device in an environment of the electronic device; and
    in response to detecting that the electronic device has established communication with the second electronic device, generating, at the electronic device, a third tactile output indicating the established communication with the second electronic device.

11. The method of claim 1, further comprising:
    detecting a change in a respective distance between the electronic device and a respective object in an environment of the electronic device; and
    in response to detecting the change in the respective distance between the electronic device and the respective object:
        in accordance with a determination that the respective distance is decreasing when the respective distance crosses over a first threshold distance, generating, at the electronic device, a first respective tactile output indicating the electronic device has reached the first threshold distance from the respective object and is moving closer to the respective object; and
        in accordance with a determination that the respective distance is increasing when the respective distance crosses over a second threshold distance, greater than the first threshold distance, generating, at the electronic device, a second respective tactile output indicating the electronic device has reached the second threshold distance from the respective object and is moving away from the respective object.

12. The method of claim 1, wherein the one or more tactile output criteria are satisfied when an orientation of the electronic device is at a target orientation.

13. The method of claim 1, wherein the electronic device is a wearable device worn on a wrist of a user, and the one or more tactile output criteria are satisfied when an orientation of the wearable device corresponds to the user pointing at a target object in an environment of the electronic device using a hand corresponding to the wrist.

14. The method of claim 1, further comprising:
    while capturing an image of an object using a camera of the electronic device, wherein the camera has a field of view, detecting movement of the object in the field of view of the camera; and
    in response to detecting the movement of the object in the field of view of the camera:
        in accordance with a determination that the object has reached a boundary of the field of view of the camera, generating, at the electronic device, a respective tactile output; and
        in accordance with a determination that the object has moved within the field of view of the camera without reaching the boundary of the field of view of the camera, forgoing generating the respective tactile output at the electronic device.

15. The method of claim 1, further comprising:
generating, at the electronic device, a respective tactile output, having a respective value for a respective characteristic, corresponding to an object in an environment of the electronic device that is at a respective location with respect to the electronic device, wherein the respective value for the respective characteristic is based on at least a characteristic of the object other than the respective location of the object with respect to the electronic device.

16. The method of claim 1, further comprising:
generating, at the electronic device, a respective tactile output corresponding to a physical object in an environment of the electronic device.

17. The method of claim 16, wherein the physical object is a second electronic device in communication with the electronic device.

18. The method of claim 17, wherein generating the respective tactile output corresponding to the second electronic device comprises:
in accordance with a determination that the electronic device is able to interact with the second electronic device, generating the respective tactile output; and
in accordance with a determination that the electronic device is not able to interact with the second electronic device, forgoing generating the respective tactile output.

19. The method of claim 17, wherein the second electronic device is a smart home device.

20. The method of claim 16, wherein generating the respective tactile output corresponding to the physical object comprises:
capturing an image of the environment of the electronic device; and
in response to capturing the image of the environment of the electronic device:
in accordance with the electronic device recognizing the physical object from the captured image, generating the respective tactile output corresponding to the physical object; and
in accordance with the electronic device not recognizing the physical object from the captured image, forgoing generating the respective tactile output corresponding to the physical object.

21. The method of claim 1, further comprising:
generating, at the electronic device, a respective tactile output corresponding to a virtual object virtually placed in an environment of the electronic device.

22. The method of claim 1, further comprising:
generating, at the electronic device, a respective tactile output corresponding to an object in an environment of the electronic device, wherein generating the respective tactile output comprises:
receiving, at a first time via the one or more input devices, an input corresponding to a request to generate tactile output corresponding to the object; and
in response to receiving the input corresponding to the request to generate tactile output corresponding to the object:
in accordance with a determination that the object is a first distance from the electronic device, generating the respective tactile output at a second time, after the first time; and in accordance with a determination that the object is a second distance, different than the first distance, from the electronic device, generating the respective tactile output at a third time, different than the second time, after the first time.

23. An electronic device, comprising:
one or more processors;
memory; and
one or more programs, wherein the one or more programs are stored in the memory and configured to be executed by the one or more processors, the one or more programs including instructions for:
while navigating from a first location to a second location, different than the first location, determining that one or more tactile output criteria are satisfied; and
in response to determining that the one or more tactile output criteria are satisfied:
in accordance with a determination that the electronic device is at a first orientation with respect to a path between a current location of the electronic device and the second location, generating, at the electronic device, a first tactile output having a first value for a first characteristic; and
in accordance with a determination that the electronic device is at a second orientation with respect to the path between the current location of the electronic device and the second location, generating, at the electronic device, a second tactile output having a second value for the first characteristic.

24. The electronic device of claim 23, wherein the first characteristic of the first tactile output and the second tactile output is frequency, and the first value of the frequency of the first tactile output is different than the second value of the frequency of the second tactile output.

25. The electronic device of claim 23, wherein the one or more programs further include instructions for:
generating, at the electronic device, a respective tactile output corresponding to an object in an environment of the electronic device, wherein the respective tactile output has one or more values for one or more characteristics that are based on a point-cloud model centered at the object.

26. The electronic device of claim 23, wherein the first characteristic of the first tactile output and the second tactile output is sharpness, and the first value of the sharpness of the first tactile output is different than the second value of the sharpness of the second tactile output.

27. The electronic device of claim 23, wherein the one or more programs further include instructions for:
generating, at the electronic device, a respective tactile output, having a respective value for a respective characteristic, corresponding to an object in an environment of the electronic device that is a respective distance away from the electronic device, wherein:
in accordance with a determination that there is not a barrier to movement between the electronic device and the object in the environment of the electronic device, the respective value for the respective characteristic is the first value, and
in accordance with a determination that there is a barrier to movement between the electronic device and the object in the environment of the electronic device, the respective value for the respective characteristic is a second value, different than the first value.

28. The electronic device of claim 23, wherein the one or more tactile output criteria include a criterion that is satisfied when the electronic device is moving with respect to the path.

29. The electronic device of claim 28, wherein:
generating the first tactile output occurs while the electronic device is moving, and does not occur while the electronic device is not moving, and
generating the second tactile output occurs while the electronic device is moving, and does not occur while the electronic device is not moving.

30. The electronic device of claim 23, wherein the one or more tactile output criteria include a criterion that is satisfied when the electronic device is detecting movement of a control element on the electronic device.

31. The electronic device of claim 30, wherein the movement of the control element on the electronic device defines a directional and/or distance component relative to an object in an environment of the electronic device.

32. The electronic device of claim 23, wherein the one or more programs further include instructions for:
detecting that the electronic device has established communication with a second electronic device in an environment of the electronic device; and
in response to detecting that the electronic device has established communication with the second electronic device, generating, at the electronic device, a third tactile output indicating the established communication with the second electronic device.

33. The electronic device of claim 23, wherein the one or more programs further include instructions for:
detecting a change in a respective distance between the electronic device and a respective object in an environment of the electronic device; and
in response to detecting the change in the respective distance between the electronic device and the respective object:
in accordance with a determination that the respective distance is decreasing when the respective distance crosses over a first threshold distance, generating, at the electronic device, a first respective tactile output indicating the electronic device has reached the first threshold distance from the respective object and is moving closer to the respective object; and
in accordance with a determination that the respective distance is increasing when the respective distance crosses over a second threshold distance, greater than the first threshold distance, generating, at the electronic device, a second respective tactile output indicating the electronic device has reached the second threshold distance from the respective object and is moving away from the respective object.

34. The electronic device of claim 23, wherein the one or more tactile output criteria are satisfied when an orientation of the electronic device is at a target orientation.

35. The electronic device of claim 23, wherein the electronic device is a wearable device worn on a wrist of a user, and the one or more tactile output criteria are satisfied when an orientation of the wearable device corresponds to the user pointing at a target object in an environment of the electronic device using a hand corresponding to the wrist.

36. The electronic device of claim 23, wherein the one or more programs further include instructions for:
while capturing an image of an object using a camera of the electronic device, wherein the camera has a field of view, detecting movement of the object in the field of view of the camera; and in response to detecting the movement of the object in the field of view of the camera:
in accordance with a determination that the object has reached a boundary of the field of view of the camera, generating, at the electronic device, a respective tactile output; and
in accordance with a determination that the object has moved within the field of view of the camera without reaching the boundary of the field of view of the camera, forgoing generating the respective tactile output at the electronic device.

37. The electronic device of claim 23, wherein the one or more programs further include instructions for:
generating, at the electronic device, a respective tactile output, having a respective value for a respective characteristic, corresponding to an object in an environment of the electronic device that is at a respective location with respect to the electronic device, wherein the respective value for the respective characteristic is based on at least a characteristic of the object other than the respective location of the object with respect to the electronic device.

38. The electronic device of claim 23, wherein the one or more programs further include instructions for:
generating, at the electronic device, a respective tactile output corresponding to a physical object in an environment of the electronic device.

39. The electronic device of claim 38, wherein the physical object is a second electronic device in communication with the electronic device.

40. The electronic device of claim 39, wherein generating the respective tactile output corresponding to the second electronic device comprises:
in accordance with a determination that the electronic device is able to interact with the second electronic device, generating the respective tactile output; and
in accordance with a determination that the electronic device is not able to interact with the second electronic device, forgoing generating the respective tactile output.

41. The electronic device of claim 39, wherein the second electronic device is a smart home device.

42. The electronic device of claim 38, wherein generating the respective tactile output corresponding to the physical object comprises:
capturing an image of the environment of the electronic device; and
in response to capturing the image of the environment of the electronic device:
in accordance with the electronic device recognizing the physical object from the captured image, generating the respective tactile output corresponding to the physical object; and
in accordance with the electronic device not recognizing the physical object from the captured image, forgoing generating the respective tactile output corresponding to the physical object.

43. The electronic device of claim 23, wherein the one or more programs further include instructions for:
generating, at the electronic device, a respective tactile output corresponding to a virtual object virtually placed in an environment of the electronic device.

44. The electronic device of claim 23, wherein the one or more programs further include instructions for:

generating, at the electronic device, a respective tactile output corresponding to an object in an environment of the electronic device, wherein generating the respective tactile output comprises:
  receiving, at a first time via one or more input devices, an input corresponding to a request to generate tactile output corresponding to the object; and
  in response to receiving the input corresponding to the request to generate tactile output corresponding to the object:
    in accordance with a determination that the object is a first distance from the electronic device, generating the respective tactile output at a second time, after the first time; and
    in accordance with a determination that the object is a second distance, different than the first distance, from the electronic device, generating the respective tactile output at a third time, different than the second time, after the first time.

45. A non-transitory computer readable storage medium storing one or more programs, the one or more programs comprising instructions, which when executed by one or more processors of an electronic device, cause the electronic device to:
while navigating from a first location to a second location, different than the first location, determine that one or more tactile output criteria are satisfied; and
in response to determining that the one or more tactile output criteria are satisfied:
in accordance with a determination that the electronic device is at a first orientation with respect to a path between a current location of the electronic device and a second location, generate, at the electronic device, a first tactile output having a first value for a first characteristic; and
  in accordance with a determination that the electronic device is at a second orientation with respect to the path between the current location of the electronic device and the second location, generate, at the electronic device, a second tactile output having a second value for the first characteristic.

46. The non-transitory computer readable storage medium of claim 45, wherein the first characteristic of the first tactile output and the second tactile output is frequency, and the first value of the frequency of the first tactile output is different than the second value of the frequency of the second tactile output.

47. The non-transitory computer readable storage medium of claim 45, wherein the one or more programs further cause the electronic device to:
generate, at the electronic device, a respective tactile output corresponding to an object in an environment of the electronic device, wherein the respective tactile output has one or more values for one or more characteristics that are based on a point-cloud model centered at the object.

48. The non-transitory computer readable storage medium of claim 45, wherein the first characteristic of the first tactile output and the second tactile output is sharpness, and the first value of the sharpness of the first tactile output is different than the second value of the sharpness of the second tactile output.

49. The non-transitory computer readable storage medium of claim 45, wherein the one or more programs further cause the electronic device to:
generate, at the electronic device, a respective tactile output, having a respective value for a respective characteristic, corresponding to an object in an environment of the electronic device that is a respective distance away from the electronic device, wherein:
  in accordance with a determination that there is not a barrier to movement between the electronic device and the object in the environment of the electronic device, the respective value for the respective characteristic is the first value, and
  in accordance with a determination that there is a barrier to movement between the electronic device and the object in the environment of the electronic device, the respective value for the respective characteristic is a second value, different than the first value.

50. The non-transitory computer readable storage medium of claim 45, wherein the one or more tactile output criteria include a criterion that is satisfied when the electronic device is moving with respect to the path.

51. The non-transitory computer readable storage medium of claim 50, wherein:
generating the first tactile output occurs while the electronic device is moving, and does not occur while the electronic device is not moving, and
generating the second tactile output occurs while the electronic device is moving, and does not occur while the electronic device is not moving.

52. The non-transitory computer readable storage medium of claim 45, wherein the one or more tactile output criteria include a criterion that is satisfied when the electronic device is detecting movement of a control element on the electronic device.

53. The non-transitory computer readable storage medium of claim 52, wherein the movement of the control element on the electronic device defines a directional and/or distance component relative to an object in an environment of the electronic device.

54. The non-transitory computer readable storage medium of claim 45, wherein the one or more programs further cause the electronic device to:
detect that the electronic device has established communication with a second electronic device in an environment of the electronic device; and
in response to detecting that the electronic device has established communication with the second electronic device, generate, at the electronic device, a third tactile output indicating the established communication with the second electronic device.

55. The non-transitory computer readable storage medium of claim 45, wherein the one or more programs further cause the electronic device to:
detect a change in a respective distance between the electronic device and a respective object in an environment of the electronic device; and
in response to detecting the change in the respective distance between the electronic device and the respective object:
  in accordance with a determination that the respective distance is decreasing when the respective distance crosses over a first threshold distance, generate, at the electronic device, a first respective tactile output indicating the electronic device has reached the first threshold distance from the respective object and is moving closer to the respective object; and
  in accordance with a determination that the respective distance is increasing when the respective distance crosses over a second threshold distance, greater than the first threshold distance, generate, at the electronic device, a second respective tactile output indicating the electronic device has reached the second threshold distance from the respective object and is moving away from the respective object.

56. The non-transitory computer readable storage medium of claim 45, wherein the one or more tactile output criteria are satisfied when an orientation of the electronic device is at a target orientation.

57. The non-transitory computer readable storage medium of claim 45, wherein the electronic device is a wearable device worn on a wrist of a user, and the one or more tactile output criteria are satisfied when an orientation of the wearable device corresponds to the user pointing at a target object in an environment of the electronic device using a hand corresponding to the wrist.

58. The non-transitory computer readable storage medium of claim 45, wherein the one or more programs further cause the electronic device to:
while capturing an image of an object using a camera of the electronic device, wherein the camera has a field of view, detect movement of the object in the field of view of the camera; and
in response to detecting the movement of the object in the field of view of the camera:
in accordance with a determination that the object has reached a boundary of the field of view of the camera, generate, at the electronic device, a respective tactile output; and
in accordance with a determination that the object has moved within the field of view of the camera without reaching the boundary of the field of view of the camera, forgo generating the respective tactile output at the electronic device.

59. The non-transitory computer readable storage medium of claim 45, wherein the one or more programs further cause the electronic device to:
generate, at the electronic device, a respective tactile output, having a respective value for a respective characteristic, corresponding to an object in an environment of the electronic device that is at a respective location with respect to the electronic device, wherein the respective value for the respective characteristic is based on at least a characteristic of the object other than the respective location of the object with respect to the electronic device.

60. The non-transitory computer readable storage medium of claim 45, wherein the one or more programs further cause the electronic device to:
generate, at the electronic device, a respective tactile output corresponding to a physical object in an environment of the electronic device.

61. The non-transitory computer readable storage medium of claim 60, wherein the physical object is a second electronic device in communication with the electronic device.

62. The non-transitory computer readable storage medium of claim 61, wherein generating the respective tactile output corresponding to the second electronic device comprises:
in accordance with a determination that the electronic device is able to interact with the second electronic device, generating the respective tactile output; and
in accordance with a determination that the electronic device is not able to interact with the second electronic device, forgoing generating the respective tactile output.

63. The non-transitory computer readable storage medium of claim 40, wherein the second electronic device is a smart home device.

64. The non-transitory computer readable storage medium of claim 60, wherein generating the respective tactile output corresponding to the physical object comprises:
capturing an image of the environment of the electronic device; and
in response to capturing the image of the environment of the electronic device:
in accordance with the electronic device recognizing the physical object from the captured image, generating the respective tactile output corresponding to the physical object; and
in accordance with the electronic device not recognizing the physical object from the captured image, forgoing generating the respective tactile output corresponding to the physical object.

65. The non-transitory computer readable storage medium of claim 45, wherein the one or more programs further cause the electronic device to:
generate, at the electronic device, a respective tactile output corresponding to a virtual object virtually placed in an environment of the electronic device.

66. The non-transitory computer readable storage medium of claim 45, wherein the one or more programs further cause the electronic device to:
generate, at the electronic device, a respective tactile output corresponding to an object in an environment of the electronic device, wherein generating the respective tactile output comprises:
receiving, at a first time via one or more input devices, an input corresponding to a request to generate tactile output corresponding to the object; and
in response to receiving the input corresponding to the request to generate tactile output corresponding to the object:
in accordance with a determination that the object is a first distance from the electronic device, generating the respective tactile output at a second time, after the first time; and
in accordance with a determination that the object is a second distance, different than the first distance, from the electronic device, generating the respective tactile output at a third time, different than the second time, after the first time.

* * * * *